United States Patent [19]
Antkowiak

[11] Patent Number: 4,513,378
[45] Date of Patent: Apr. 23, 1985

[54] HIGH-ACCURACY NAVIGATING APPARATUS WITH STEP-DRIVEN PROJECTED CHART

[76] Inventor: Edward T. Antkowiak, Harbour Hill, York, Me. 03909

[21] Appl. No.: 313,233

[22] Filed: Oct. 20, 1981

[51] Int. Cl.[3] .......................... G01S 7/10; G01S 7/46; G06F 15/50

[52] U.S. Cl. .................................... 364/450; 343/389; 353/13; 364/452; 364/460

[58] Field of Search ............... 364/443, 444, 446, 447, 364/449, 450, 452, 460; 343/452, 389

[56] References Cited

U.S. PATENT DOCUMENTS

| | | | |
|---|---|---|---|
| 3,242,605 | 3/1966 | Kleinschmidt | 353/120 X |
| 3,333,357 | 8/1967 | Grogan | 353/120 X |
| 3,347,134 | 10/1967 | Nervin | 353/120 |
| 3,359,408 | 12/1967 | Briggs | 364/460 |
| 3,450,472 | 6/1969 | Warden | 353/11 |
| 3,474,556 | 10/1969 | Scovill | 343/452 X |
| 3,486,815 | 12/1969 | Roscoe | 364/447 X |
| 3,486,816 | 12/1969 | Streeter | 364/460 X |
| 3,501,765 | 3/1970 | Roscoe | 343/409 X |
| 3,538,313 | 11/1970 | Thomas et al. | 364/460 |
| 3,617,134 | 11/1971 | Frush et al. | 353/120 X |
| 3,652,836 | 3/1972 | Richardson et al. | 364/447 |
| 3,821,523 | 6/1974 | Chisholm et al. | 364/460 |
| 4,013,353 | 3/1977 | Portner et al. | 353/121 X |
| 4,086,632 | 4/1978 | Lions | 364/444 |
| 4,105,319 | 8/1978 | Wells et al. | 353/120 |
| 4,114,997 | 9/1978 | Lunetta | 353/11 |
| 4,253,150 | 2/1981 | Scovill | 364/449 |
| 4,283,763 | 8/1981 | Bylinsky et al. | 364/449 |

FOREIGN PATENT DOCUMENTS

| | | | |
|---|---|---|---|
| 2361677 | 3/1978 | France | 353/120 |
| 1464380 | 2/1977 | United Kingdom | 353/120 |

*Primary Examiner*—Felix D. Gruber
*Attorney, Agent, or Firm*—Cushman, Darby & Cushman

[57] ABSTRACT

A small fraction of the area shown in an ultraminiature color transparency of a standard navigating chart is projected onto a viewing screen, and the transparency is moved by a precision step-driven transport mechanism to hold the present position of the ship (or other craft) at crosshairs on the screen. The transport mechanism is controlled by a digital electronic computer that receives data from a human operator, from speed and direction sensors carried in the craft, and/or from radio navigational-aid (such as Loran) signals. The computer includes separate dedicated microprocessors for managing the transport mechanism and the receipt of sensor or radio signals, and a master general-purpose processor for performing calculations and coordinating the system functions with operator instructions.

The computer calculates position, "course to steer," and other parameters based on dead reckoning, manually entered bearings of navigational objects, and/or the data automatically received from such radio aids; and it controls the transparency transport on the basis of calculated position. By comparing dead-reckoning results with actual position fixes the computer determines set and drift, and it reads out "course to steer" that is corrected for set and drift. The computer can also control an autopilot, automatically setting a heading that produces the desired track, practically independent of currents.

11 Claims, 121 Drawing Figures

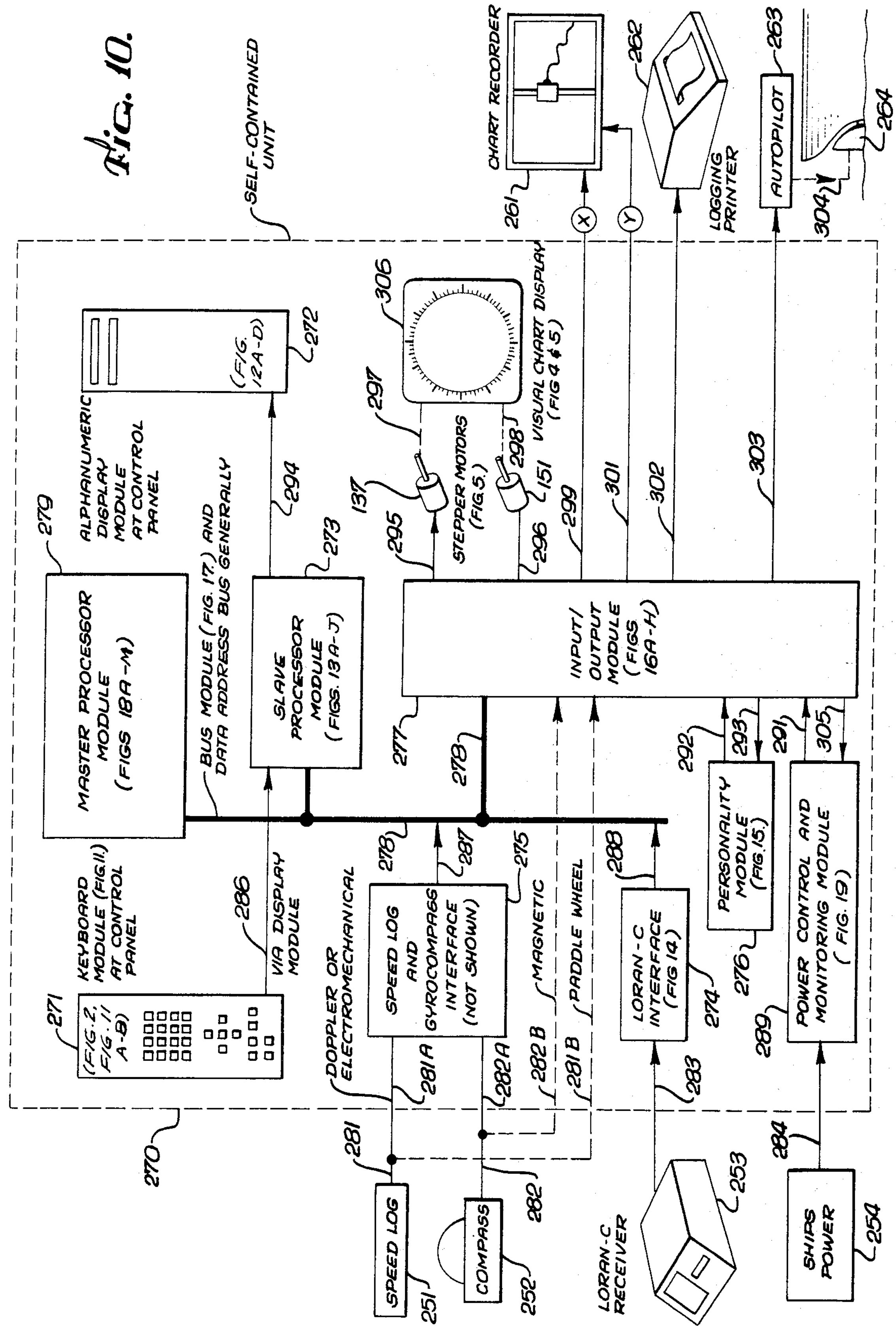
Fig. 10.
SELF-CONTAINED UNIT
270
MASTER PROCESSOR MODULE (FIGS 18A-M)
279
ALPHANUMERIC DISPLAY MODULE AT CONTROL PANEL
(FIG. 12A-D)
272
BUS MODULE (FIG. 17) AND DATA ADDRESS BUS GENERALLY
SLAVE PROCESSOR MODULE (FIGS. 13A-J)
273
294
KEYBOARD MODULE (FIG. 11) AT CONTROL PANEL
(FIG. 2, FIG. 11 A-B)
271
286
VIA DISPLAY MODULE
INPUT/OUTPUT MODULE (FIGS 16A-H)
277
278
STEPPER MOTORS (FIG. 5)
137
151
295
296
297
298
306
VISUAL CHART DISPLAY (FIG 4 & 5)
299
301
302
303
X
Y
CHART RECORDER
261
262
LOGGING PRINTER
AUTOPILOT
263
264
304
SPEED LOG AND GYROCOMPASS INTERFACE (NOT SHOWN)
275
287
DOPPLER OR ELECTROMECHANICAL
MAGNETIC
PADDLE WHEEL
281A
282A
282B
281B
281
282
SPEED LOG
251
COMPASS
252
LORAN-C INTERFACE (FIG 14)
274
288
283
LORAN-C RECEIVER
253
PERSONALITY MODULE (FIG. 15)
276
292
293
POWER CONTROL AND MONITORING MODULE (FIG. 19)
289
291
305
284
SHIPS POWER
254

FIG. 11.A
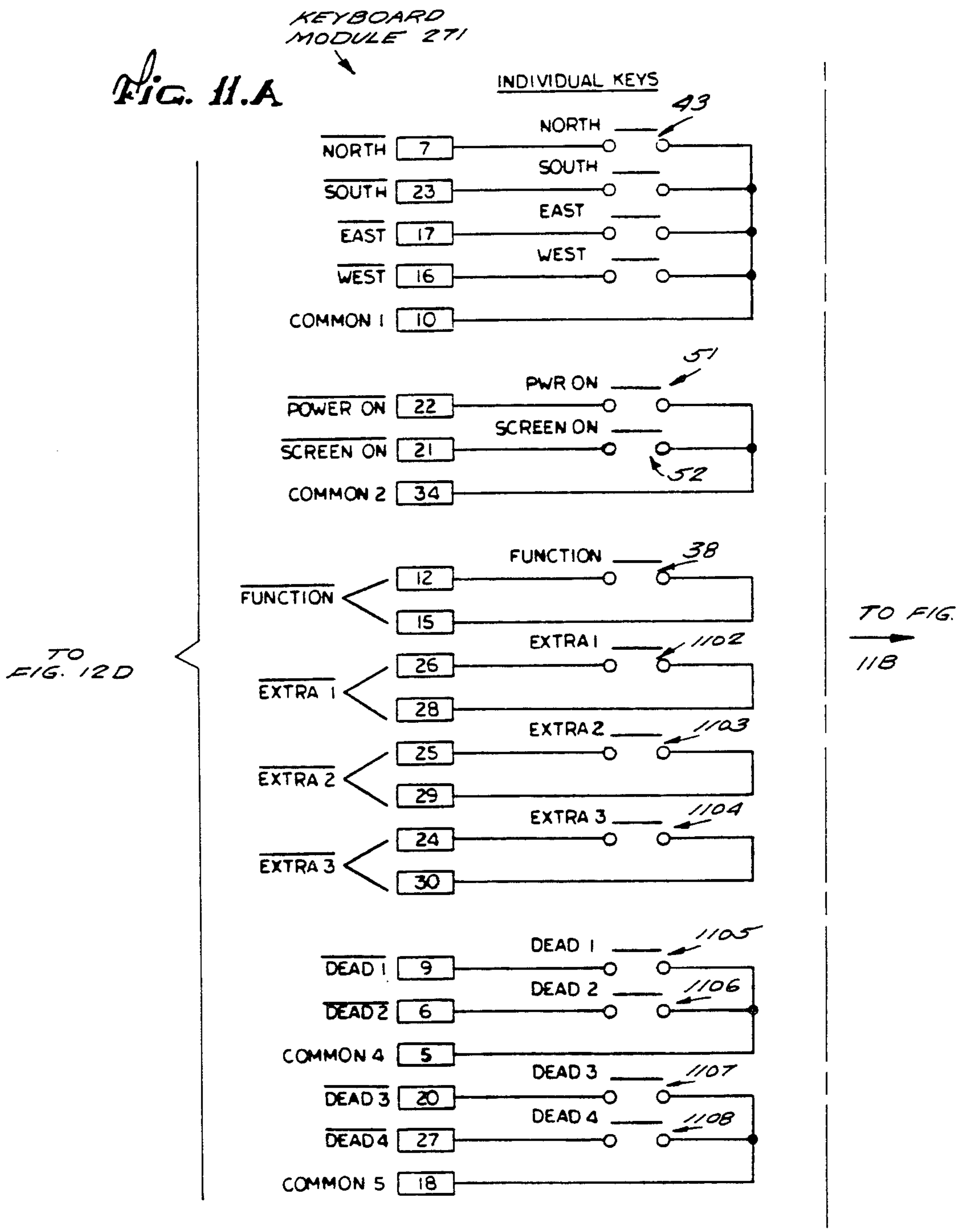

FIG. 11.B
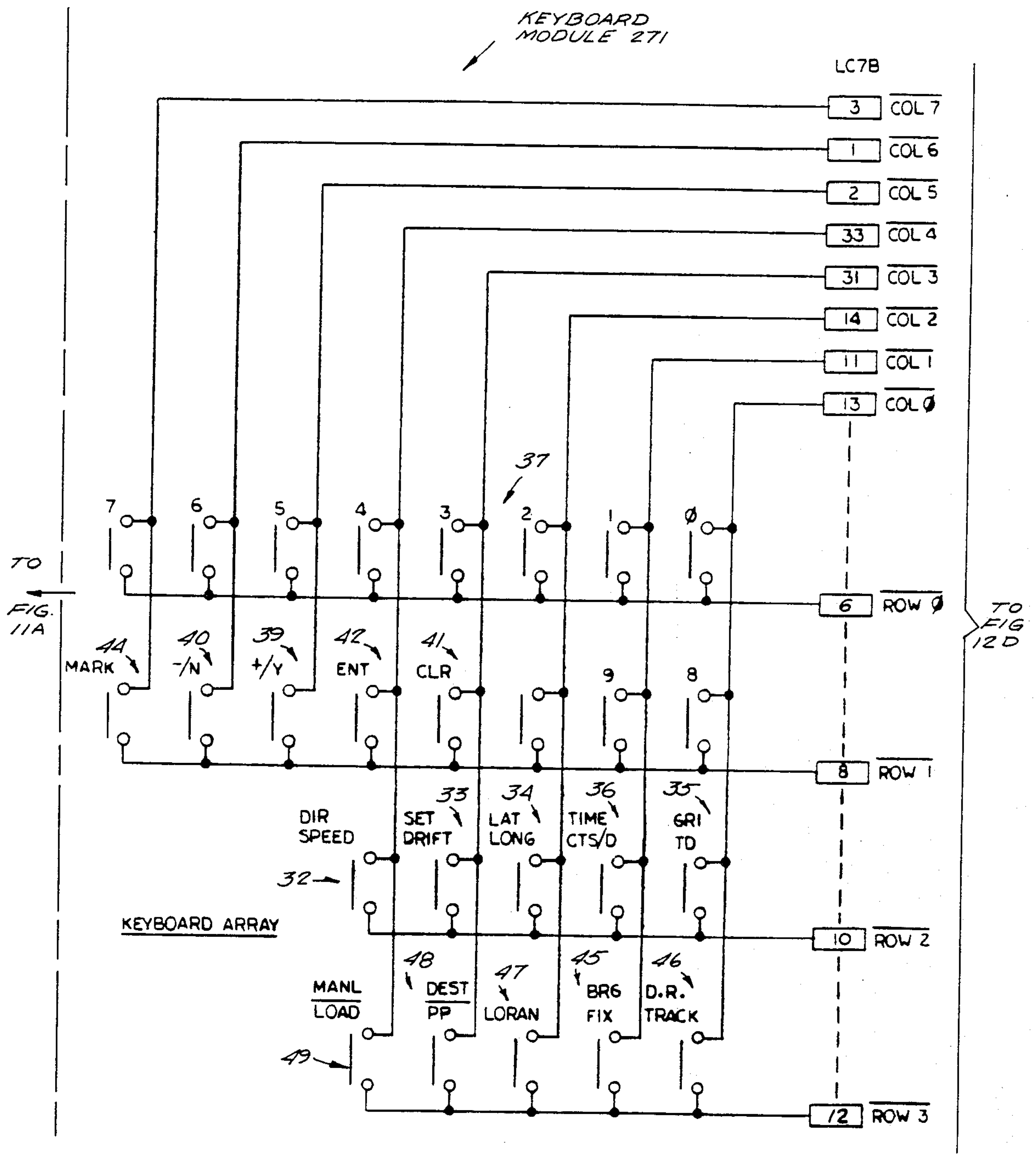

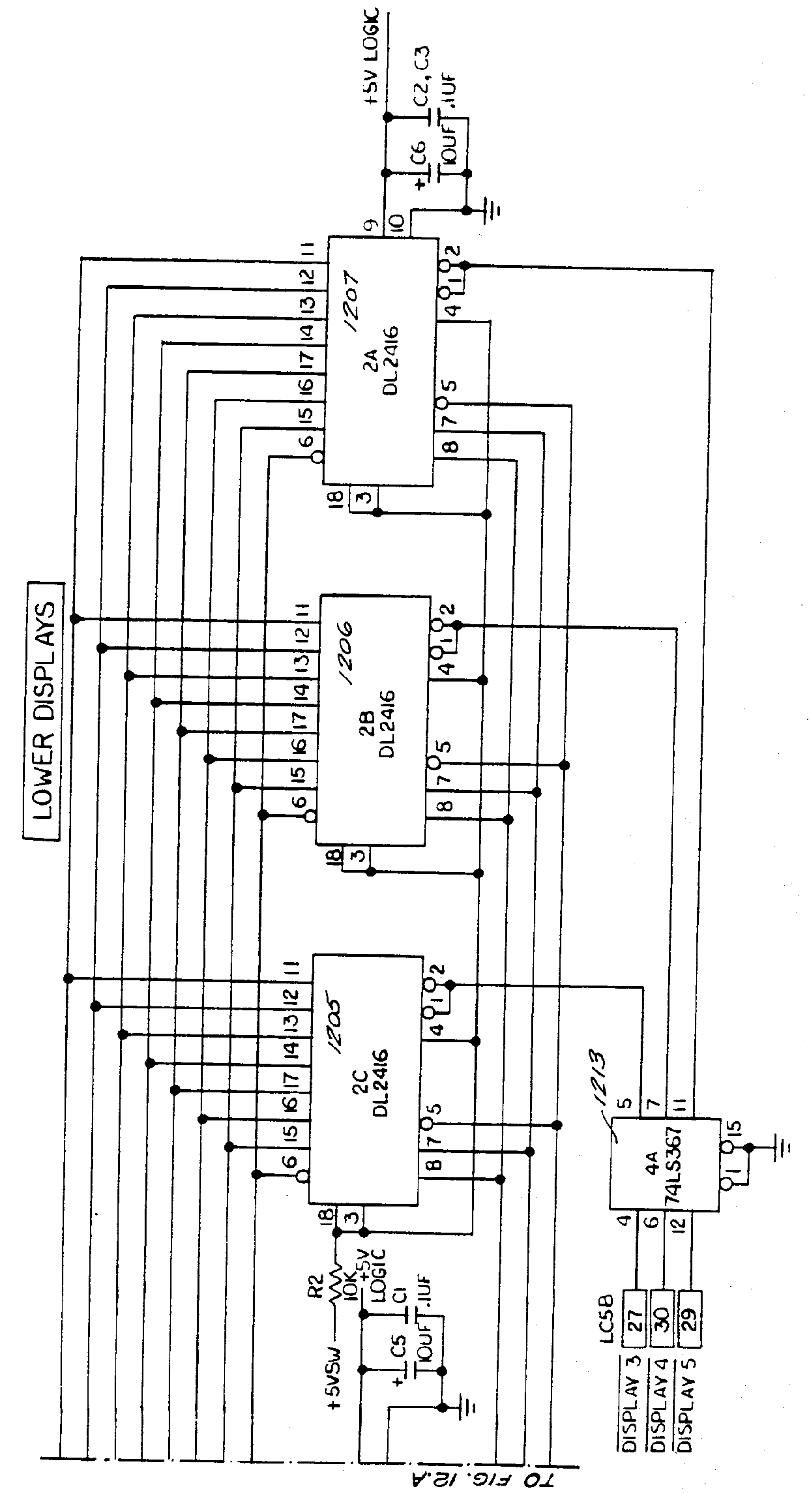
FIG. 12.B

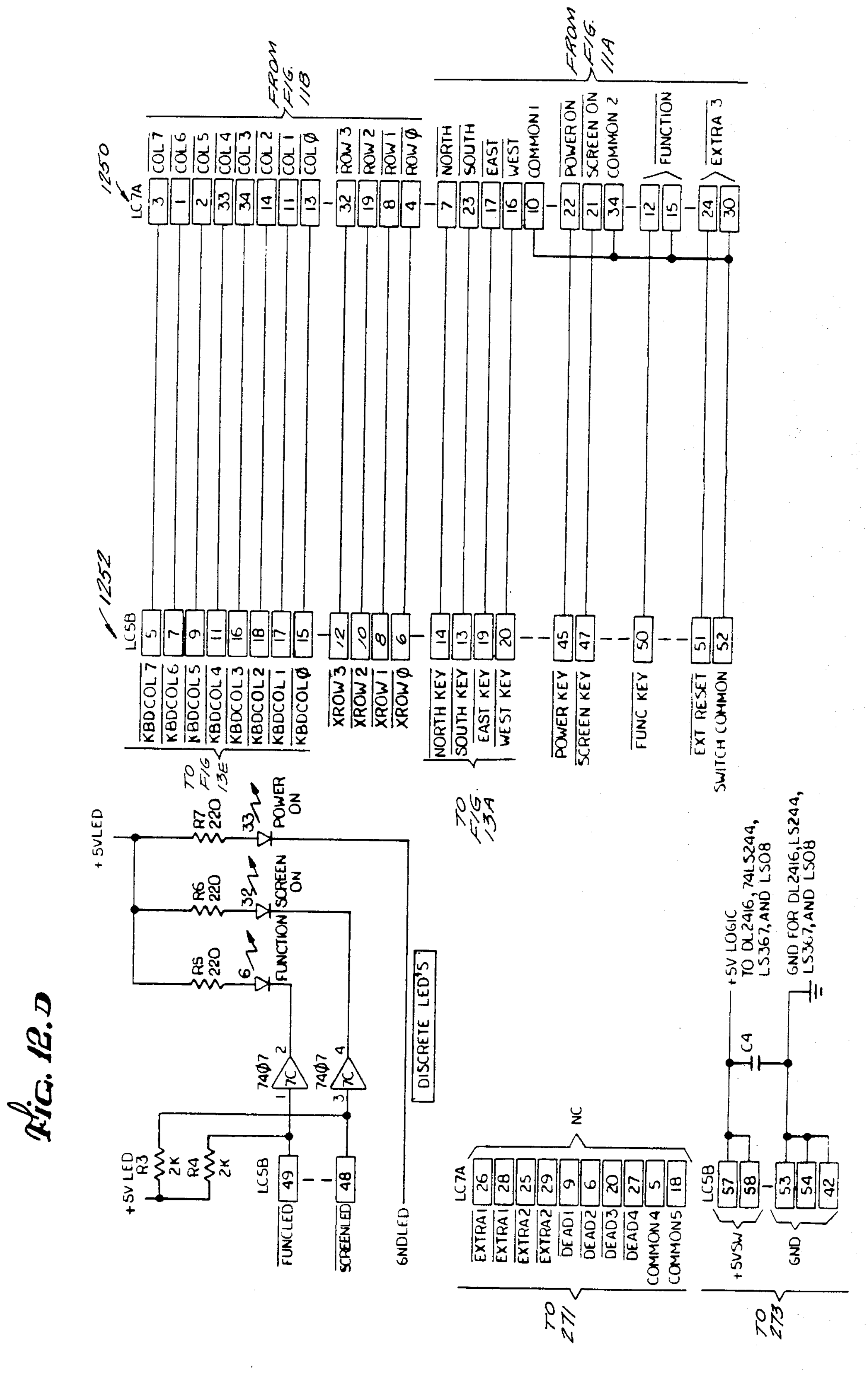
FIG. 12.D

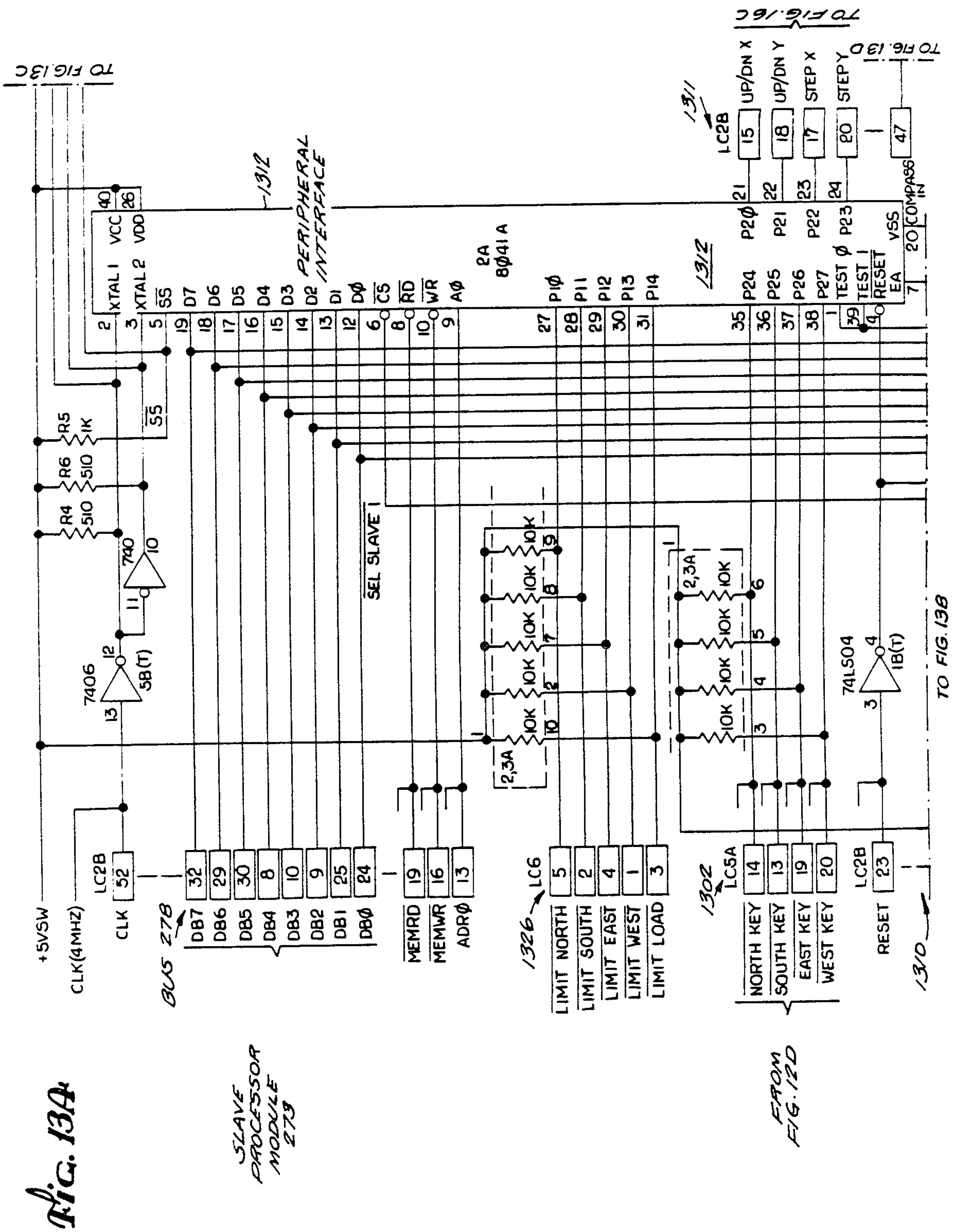
FIG. 13A
SLAVE PROCESSOR MODULE 273
PERIPHERAL INTERFACE
1312
2A
8041A
XTAL 1
XTAL 2
VCC
VDD
SS
D7
D6
D5
D4
D3
D2
D1
DØ
CS
RD
WR
AØ
P1Ø
P11
P12
P13
P14
P2Ø
P21
P22
P23
P24
P25
P26
P27
TEST Ø
TEST 1
RESET
EA
VSS
COMPASS IN
TO FIG. 13C
TO FIG. 13D
TO FIG. 13B
LC2B
1311
UP/DN X
UP/DN Y
STEP X
STEP Y
R5 1K
R6 510
R4 510
740
7406
5B(T)
SEL SLAVE 1
10K
2,3A
74LS04
1B(T)
+5VSW
CLK(4MHZ)
CLK
BUS 278
DB7
DB6
DB5
DB4
DB3
DB2
DB1
DBØ
MEMRD
MEMWR
ADRØ
1326
LC6
LIMIT NORTH
LIMIT SOUTH
LIMIT EAST
LIMIT WEST
LIMIT LOAD
1302
LC5A
NORTH KEY
SOUTH KEY
EAST KEY
WEST KEY
FROM FIG. 12D
RESET
1310

FIG. 30.

TASK:

SECTION: ____________
SUBSECTION: ____________
LABEL: ____________

REQUIREMENTS:

INPUT CONDITIONS:

(A case statement)
CASE of IGNATZ

| | |
|---|---|
| 63 | (This done if IGNATZ = 63) |
| 5 | (This done if IGNATZ = 5) |
| 25 | (This done if IGNATZ = 25 and IGNATZ = 63) |
| ELSE | (This done in all other cases) |

DO CNT = 5 to -25 by -5

(Stuff done 7 times while CNT = 5, 0, -5, -10, -15, -20, and -25. There could be exit conditions in this loop as well.)

OUTPUT CONDITIONS: (Conditions guaranteed met by this task.)

FIG. 31.

SECTION: Steppers
SUBSECTION:
LABEL: INIT

TASK: Initialize slave stepper hardware and software

REQUIREMENTS: Stepper hardware

INPUT CONDITIONS:

Initialize status registers; reset manual move flag, automove flag, and eject flag

OUTPUT CONDITIONS: Fall through to EXEC

FIG. 32.

SECTION: Steppers
SUBSECTION:
LABEL: EXEC

TASK: Wait for a command to be issued

REQUIREMENTS: Communication hardware

INPUT CONDITIONS:

| | | | |
|---|---|---|---|
| LOOP | Automove flag | Go to service routine | → ATOMV |
| | Manual Move flag | Go to service routine | → MANMV |
| | Eject flag | Go to service routine | → EJECT |

OUTPUT CONDITIONS: No ordinary exit

FIG. 33.

SECTION: Steppers
SUBSECTION:
LABEL: ATOMV

TASK:
Service the automove command

REQUIREMENTS:
Communication hardware, Stepper hardware

INPUT CONDITIONS:
DELTA X and DELTA Y set to number of steps to be moved

| | | | |
|---|---|---|---|
| LOOP | DELTA X ≠ O | DELTA X < O | Move one step in −X direction<br>DELTA X = DELTA X + 1 |
| | | ELSE | Move one step in +X direction<br>DELTA X = DELTA X − 1 |
| | ELSE | DELTA Y = O | Quit this loop |
| | DELTA Y ≠ O | DELTA Y < O | Move one step in −Y direction<br>DELTA Y = DELTA Y + 1 |
| | | ELSE | Move one step in +Y direction<br>DELTA Y = DELTA Y − 1 |

OUTPUT CONDITIONS:
Normal return, movement complete

FIG. 34.

TASK:
Move chart as dictated by closure of N, S, E, and W keys

SECTION: Steppers
SUBSECTION:
LABEL: MANMV

REQUIREMENTS:
Steppers hardware, KBD

INPUT CONDITIONS:

| | | | |
|---|---|---|---|
| 1 | N key active | DELTA Y = 1 | |
| 2 | S key active | DELTA Y = -1 | |
| 3 | E key active | DELTA X = 1 | |
| 4 | W key active | DELTA X = -1 | |
| 5 | move as dictated by DELTA X and DELTA Y | | ATOMV |
| 6 | | | |
| 7 | | | |
| 8 | | | |
| 9 | | | |
| 10 | | | |
| 11 | | | |
| 12 | | | |
| 13 | | | |

OUTPUT CONDITIONS:
Return

FIG. 35.

TASK: Accept a byte coming from the master, either a command or data

SECTION: Steppers
SUBSECTION:
LABEL: DATAIN

REQUIREMENTS: Communication hardware

INPUT CONDITIONS:

| | | | | |
|---|---|---|---|---|
| 1 | Incoming byte is data | Incoming data expected | Pass the byte to routine requiring input | |
| 2 | | ELSE | Ignore data | |
| 3 | ELSE (byte is a command) | CASE of command | | |
| 4 | | Set Cursors | Go to service routine | → SC |
| 5 | | Auto Move | Go to service routine | → AM |
| 6 | | Read Cursors | Go to service routine | → RC |
| 7 | | Manual Move | Go to service routine | → MM |
| 8 | | End Manual Move | Go to service routine | → EM |
| 9 | | Eject | Go to service routine | → EJ |
| 10 | | ELSE | Ignore byte | |
| 11 | | | | |
| 12 | | | | |
| 13 | | | | |

OUTPUT CONDITIONS: Return

FIG. 36.

TASK: Eject chart from cabinet.

SECTION: Steppers
SUBSECTION:
LABEL: EJCT

REQUIREMENTS: Stepper hardware

INPUT CONDITIONS:

| | | | |
|---|---|---|---|
| Move the chart to the north west extreme (motion will be stopped by the north and west limit switches) | | | ATOMV |
| LOOP | load limit switch engaged | EXIT | |
| | Move one step west | | |

OUTPUT CONDITIONS: Return

FIG. 37.

SECTION: Steppers
SUBSECTION:
LABEL: SC

TASK: Read two numbers from the master and set the current absolute chart coordinates to that position REQUIREMENTS: Communication hardware

INPUT CONDITIONS:

| | |
|---|---|
| 1 | Read X position from master |
| 2 | read Y position from master |
| 3 | set current absolute coordinates to those values |
| 4 | |
| 5 | |
| 6 | |
| 7 | |
| 8 | |
| 9 | |
| 10 | |
| 11 | |
| 12 | |
| 13 | |

OUTPUT CONDITIONS: Return

FIG. 38.

| | |
|---|---|
| TASK: Read an absolute position from the master and move to it | SECTION: Steppers<br>SUBSECTION:<br>LABEL: AM |
| REQUIREMENTS: Communication hardware, stepper hardware | |
| INPUT CONDITIONS: | |

| |
|---|
| read X position from master |
| read Y position from master |
| compute DELTA X and DELTA Y from current absolute position from master |
| set automove flag |
| |

OUTPUT CONDITIONS: Return

FIG. 39.

SECTION: Steppers
SUBSECTION:
LABEL: RC

TASK:
Transfer the coordinates of the absolute chart position back to the master REQUIREMENTS:
Communication hardware

INPUT CONDITIONS:

| | |
|---|---|
| 1 | Transfer the absolute X position to the master |
| 2 | Transfer the absolute Y position to the master |
| 3 | |
| 4 | |
| 5 | |
| 6 | |
| 7 | |
| 8 | |
| 9 | |
| 10 | |
| 11 | |
| 12 | |
| 13 | |

OUTPUT CONDITIONS:
Return

FIG. 40.

| | |
|---|---|
| TASK: Put the system into manual move mode (i.e., enable cursor movement by the keyboard) | SECTION: Steppers<br>SUBSECTION:<br>LABEL: MM |
| REQUIREMENTS: | |
| INPUT CONDITIONS: | |

| | |
|---|---|
| 1 | Set the manual move flag |
| 2 | |
| 3 | |
| 4 | |
| 5 | |
| 6 | |
| 7 | |
| 8 | |
| 9 | |
| 10 | |
| 11 | |
| 12 | |
| 13 | |

OUTPUT CONDITIONS: Return

FIG. 41.

TASK:
End the manual move mode (i.e., disable cursor movement by the keyboard)

SECTION: Steppers
SUBSECTION:
LABEL: EM

REQUIREMENTS:

INPUT CONDITIONS:

1 Reset the manual move flag

2

3

4

5

6

7

8

9

10

11

12

13

OUTPUT CONDITIONS: Return

FIG. 42.

| | |
|---|---|
| TASK: Eject the chart | SECTION: Steppers<br>SUBSECTION:<br>LABEL: EJ |
| REQUIREMENTS: | |
| INPUT CONDITIONS: | |

| | |
|---|---|
| 1 | Set the eject flag |
| 2 | |
| 3 | |
| 4 | |
| 5 | |
| 6 | |
| 7 | |
| 8 | |
| 9 | |
| 10 | |
| 11 | |
| 12 | |
| 13 | |

OUTPUT CONDITIONS: Return

FIG. 43.

SECTION: Knot, Cmp, Clock
SUBSECTION: Main
LABEL: BEGIN

TASK: Initialize Slave processor knot meter, clock, and compass (KCC) hardware and software REQUIREMENTS: KCC hardware, communication hardware

INPUT CONDITIONS:

| | | |
|---|---|---|
| 1 | Initialize KCC I/O | |
| 2 | Initialize communication hardware | |
| 3 | Go to Read Clock Process | → RCP |
| 4 | | |
| 5 | | |
| 6 | | |
| 7 | | |
| 8 | | |
| 9 | | |
| 10 | | |
| 11 | | |
| 12 | | |
| 13 | | |

OUTPUT CONDITIONS: No ordinary exit

FIG. 44.

SECTION: KCC
SUBSECTION:
LABEL: RCP

TASK: Read 13 nibbles from the clock calendar chip and pack them into 7 bytes

REQUIREMENTS: Clock chip

INPUT CONDITIONS:

| Step | Condition | Action | Exit |
|---|---|---|---|
| 1 | | Initialize pointer to temporary buffer | |
| 2 | | Read and pack first two nibbles | |
| 3 | | Read and pack 3rd, 4th nibbles | |
| 4 | | Read and pack 5th, 6th nibbles | |
| 5 | | Read and pack 7th nibble | |
| 6 | | Read and pack 8th, 9th nibbles | |
| 7 | | Read and pack 10th, 11th nibbles | |
| 8 | | Read and pack 12th, 13th nibbles | |
| 9 | | Transfer temporary buffer to clock calendar buffer | |
| 10 | Read Compass is next process | Go to read compass process | → RCOP |
| 11 | ELSE | Go to read knot meter process | → RKP |
| 12 | | | |
| 13 | | | |

OUTPUT CONDITIONS: No ordinary exit

FIG. 45.

TASK: Read digital compass (i.e., count pulses in one burst)

SECTION: KCC
SUBSECTION:
LABEL: RCOP

REQUIREMENTS: Compass Hardware

INPUT CONDITIONS:

| | |
|---|---|
| Compass not present | Fill compass buffer with FFH |
| ELSE | Wait for end of current burst |
| | Wait for beginning of next burst |
| | Start counter |
| | Wait for end of this burst |
| | Transfer count to compass data buffer |
| Wait for interrupt | |

OUTPUT CONDITIONS: No ordinary exit

FIG. 46.

SECTION: KCC
SUBSECTION:
LABEL: RKP

TASK: Read the knotmeter (i.e., count the length of time two pulses takes)

REQUIREMENTS: Knotmeter hardware

INPUT CONDITIONS:

| | | |
|---|---|---|
| 1 | Fill knotmeter buffer with FF'S | |
| 2 | Knotmeter present | Wait for low to high transition |
| 3 | | Start timer |
| 4 | | Wait for high to low transition |
| 5 | | Wait for low to high transition |
| 6 | | Store timer count in knotmeter buffer |
| 7 | Wait for interrupt | |
| 8 | | |
| 9 | | |
| 10 | | |
| 11 | | |
| 12 | | |
| 13 | | |

OUTPUT CONDITIONS: No ordinary exit

FIG. 47.

TASK: Accept a byte of data coming from the master to the KCC section, either a command or data

SECTION: KCC
SUBSECTION:
LABEL: DATAIN

REQUIREMENTS: Communication hardware

INPUT CONDITIONS:

| | | | |
|---|---|---|---|
| Incoming byte is a command | CASE of command | | |
| | Read command | Branch to read all routine | → RA |
| | Write clock | Branch to write clock routine | → WC |
| | ELSE | Do nothing | |
| | Read instruments again, start with clock | | → RCP |
| ELSE | Incoming data expected | Pass data to write clock routine | |
| | ELSE | Ignore incoming data | |

OUTPUT CONDITIONS: Sometimes a return

FIG. 48.

SECTION: KCC
SUBSECTION:
LABEL: RA

TASK: Transfer the current knotmeter, clock, and compass data to the master processor.

REQUIREMENTS:
Communication hardware

INPUT CONDITIONS:

1 For X=address of beginning of buffer to address of end of buffer

2 Transfer byte at X to master processor

3 Read instruments again: start with clock → RCP

4

5

6

7

8

9

10

11

12

13

OUTPUT CONDITIONS:
No normal exit

FIG. 49.

SECTION: KCC
SUBSECTION:
LABEL: WC

TASK: Set the clock chip based on 7 bytes to come from the master

REQUIREMENTS: Communication hardware, clock chip.

INPUT CONDITIONS:

| | | |
|---|---|---|
| 1 | For X = 1 to 7 | |
| 2 | Accept a byte from the master and put it into a temporary buffer | |
| 3 | Unpack the first byte and send 2 nibbles to clock | |
| 4 | Unpack the second byte and send 2 nibbles to clock | |
| 5 | Unpack the third byte and send 2 nibbles to clock | |
| 6 | Unpack the fourth byte and send 1 nibble to clock | |
| 7 | Unpack the fifth byte and send 2 nibbles to clock | |
| 8 | Unpack the sixth byte and send 2 nibbles to clock | |
| 9 | Unpack the seventh byte and send 2 nibbles to clock | |
| 10 | Read the instruments: start with clock | → RCP |
| 11 | | |
| 12 | | |
| 13 | | |

OUTPUT CONDITIONS: No ordinary exit

FIG. 50.

SECTION: Loran
SUBSECTION: Pre-init
LABEL: START

TASK: Pre initialize Loran

REQUIREMENTS: NONE

INPUT CONDITIONS: Reset from master

| | | |
|---|---|---|
| 1 | Initialize stack pointer | |
| 2 | Close shared memory master access | |
| 3 | Clear RAM | |
| 4 | Initialize status port | |
| 5 | Initialize hardware -- idle mode | |
| 6 | EXIT | → MAIN LOOP |
| 7 | | |
| 8 | | |
| 9 | | |
| 10 | | |
| 11 | | |
| 12 | | |
| 13 | | |

OUTPUT CONDITIONS: Cleared RAM, shared memory closed, cleared status port, idle hard ware

FIG. 51.

TASK: Main program loop

SECTION: Loran
SUBSECTION: Main
LABEL: MAINLP

REQUIREMENTS:

INPUT CONDITIONS: Pre initialize executed

| | | | |
|---|---|---|---|
| LOOP | Enable master interupt of slave | | |
| | Open shared memory | | |
| | Int master -- task done | | |
| | Wait for master command issued | | |
| | Close shared memory | | |
| | Clear mode bits in state vector | | |
| | Clear error byte | | |
| | Read masters command | | |
| | Valid command issued | Call command subroutine | INITIALIZE or DIAGNOSTIC or ACQUIRE |
| | ELSE | Set error byte | |

OUTPUT CONDITIONS: No exit from this loop

FIG. 52.

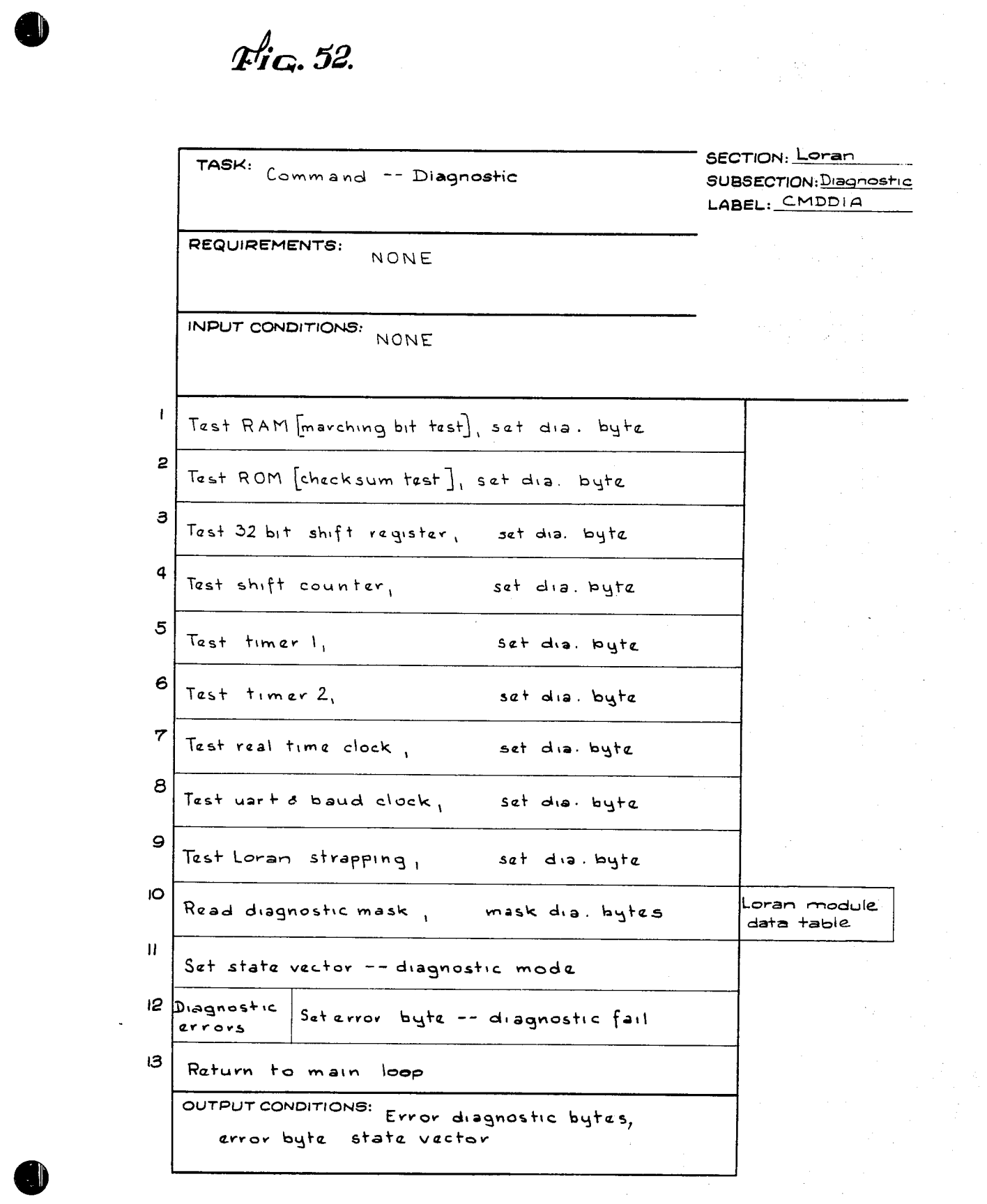

SECTION: Loran
SUBSECTION: Diagnostic
LABEL: CMDDIA

TASK: Command -- Diagnostic

REQUIREMENTS: NONE

INPUT CONDITIONS: NONE

| | | |
|---|---|---|
| 1 | Test RAM [marching bit test], set dia. byte | |
| 2 | Test ROM [checksum test], set dia. byte | |
| 3 | Test 32 bit shift register, set dia. byte | |
| 4 | Test shift counter, set dia. byte | |
| 5 | Test timer 1, set dia. byte | |
| 6 | Test timer 2, set dia. byte | |
| 7 | Test real time clock, set dia. byte | |
| 8 | Test uart & baud clock, set dia. byte | |
| 9 | Test Loran strapping, set dia. byte | |
| 10 | Read diagnostic mask, mask dia. bytes | Loran module data table |
| 11 | Set state vector -- diagnostic mode | |
| 12 | Diagnostic errors: Set error byte -- diagnostic fail | |
| 13 | Return to main loop | |

OUTPUT CONDITIONS: Error diagnostic bytes, error byte state vector

FIG. 53.

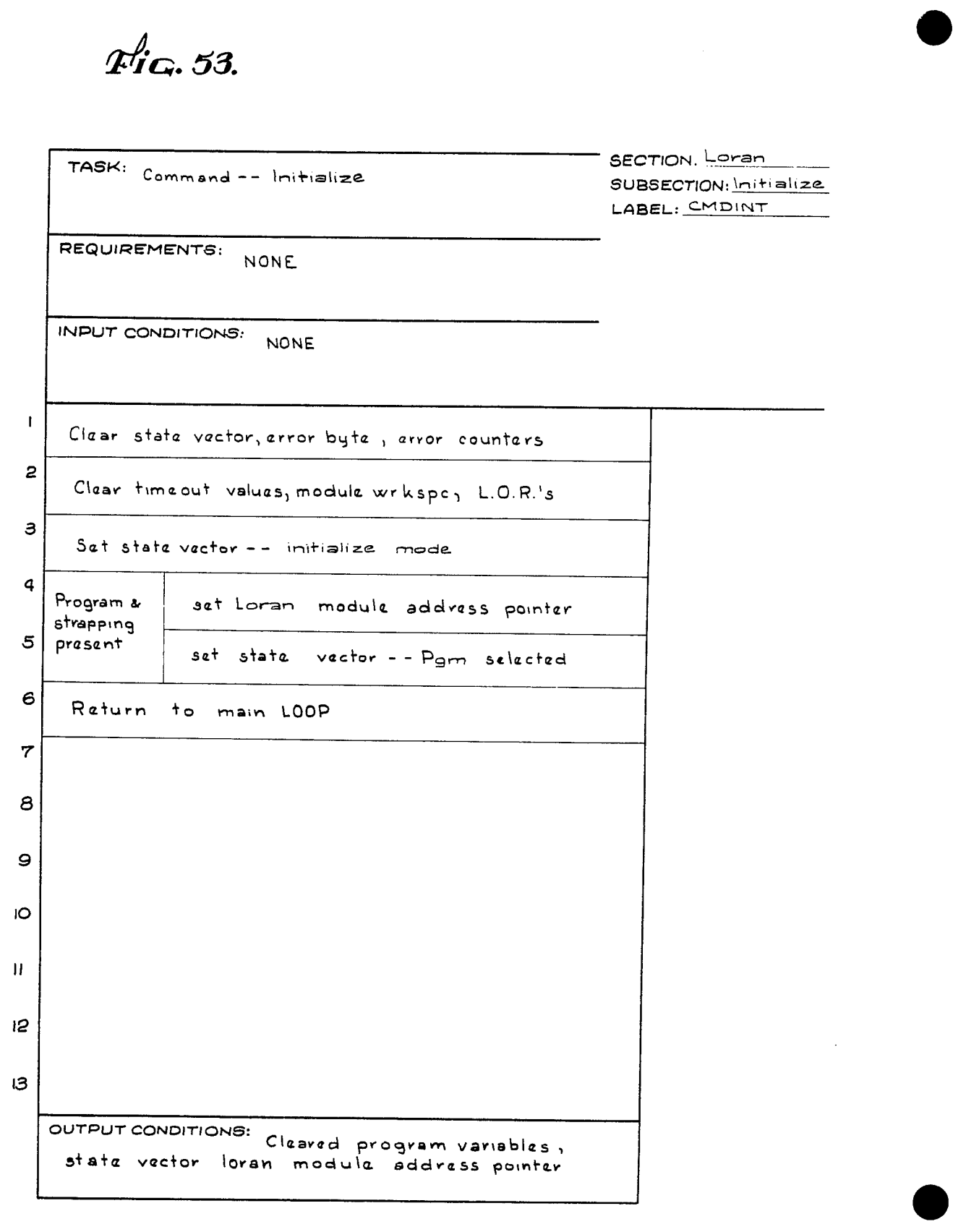

SECTION. Loran
SUBSECTION: Initialize
LABEL: CMDINT

TASK: Command -- Initialize

REQUIREMENTS: NONE

INPUT CONDITIONS: NONE

| | | |
|---|---|---|
| 1 | Clear state vector, error byte, error counters | |
| 2 | Clear timeout values, module wrkspc, L.O.R.'s | |
| 3 | Set state vector -- initialize mode | |
| 4 | Program & strapping present | set Loran module address pointer |
| 5 | | set state vector -- Pgm selected |
| 6 | Return to main LOOP | |
| 7 | | |
| 8 | | |
| 9 | | |
| 10 | | |
| 11 | | |
| 12 | | |
| 13 | | |

OUTPUT CONDITIONS: Cleared program variables, state vector loran module address pointer

FIG. 54.

TASK: Command --acquire

SECTION: Loran
SUBSECTION: Acquire
LABEL: CMOAQR

REQUIREMENTS: NONE

INPUT CONDITIONS: NONE

| | | | |
|---|---|---|---|
| 1 | Set state vector --acquire mode | | |
| 2 | Program not selected | Set error byte | |
| 3 | ELSE | Clear L.O.R.'s | |
| 4 | | Clear module wrkspc | |
| 5 | | Clear error byte, error counter data age, status port, time out counters | |
| 6 | | Read hardware control bytes from selected Loran module | Loran module data table |
| 7 | | Program hardware for selected Loran | |
| 8 | | Start Loran module timer | |
| 9 | | Acquire Loran data | Loran specific pgm module |
| 10 | | Update state vector, error byte | |
| 11 | Return to main LOOP | | |
| 12 | | | |
| 13 | | | |

OUTPUT CONDITIONS: State vector, L.O.R.'s, error bytes

FIG. 55.

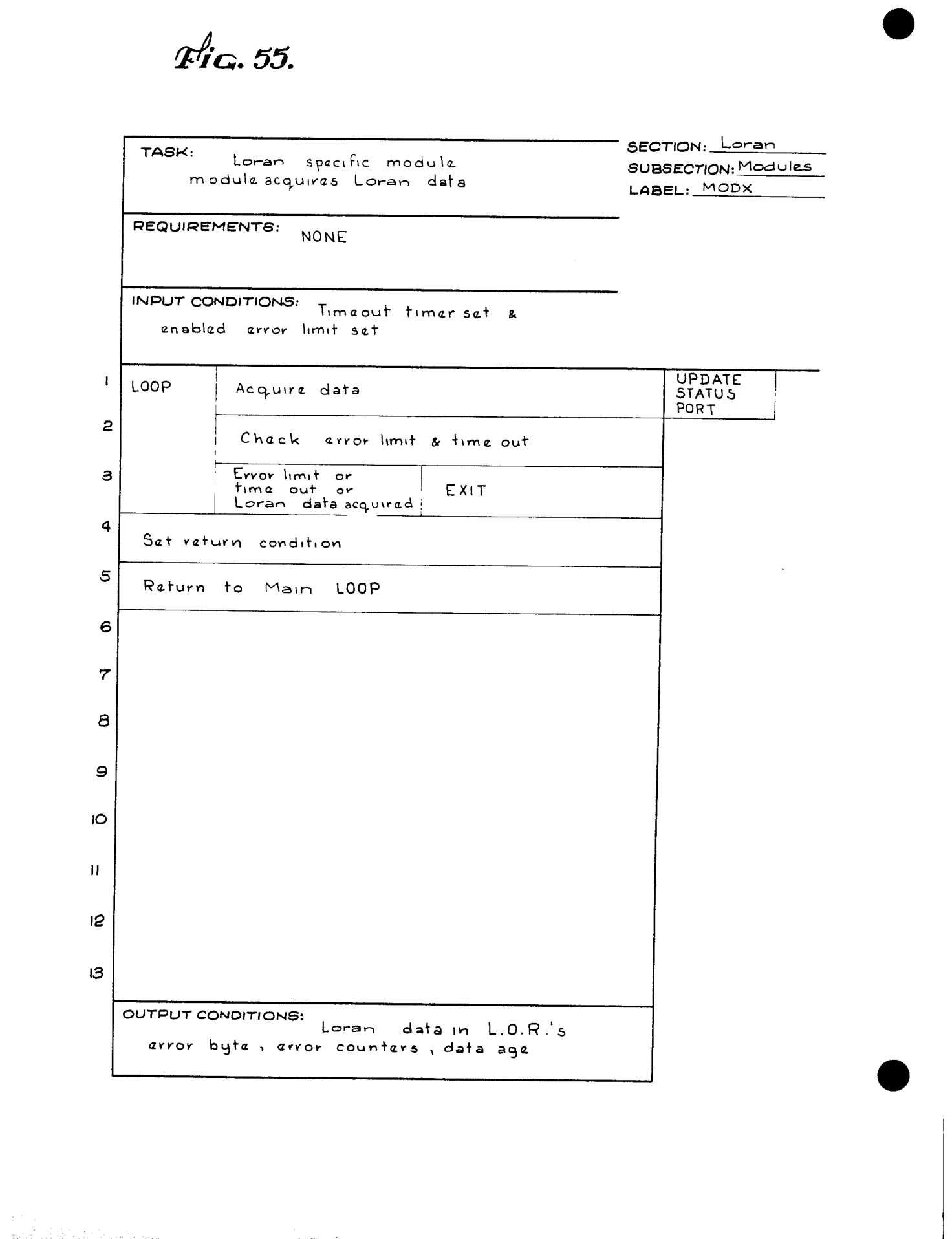

SECTION: Loran
SUBSECTION: Modules
LABEL: MODX

TASK: Loran specific module
module acquires Loran data

REQUIREMENTS: NONE

INPUT CONDITIONS: Timeout timer set & enabled error limit set

| | | | |
|---|---|---|---|
| LOOP | Acquire data | | UPDATE STATUS PORT |
| | Check error limit & time out | | |
| | Error limit or time out or Loran data acquired | EXIT | |
| Set return condition | | | |
| Return to Main LOOP | | | |

OUTPUT CONDITIONS: Loran data in L.O.R.'s error byte, error counters, data age

FIG. 56.

SECTION: Main
SUBSECTION: V01
LABEL: INIT

TASK: Decide if battery protected memory has been preserved or not and initialize the hardware REQUIREMENTS: I/O devices to be initialized

INPUT CONDITIONS:

| | |
|---|---|
| 1 | Test for battery low voltage. Checksum RAM. |
| 2 | Initialize 8259 PIC to all interrupts masked. |
| 3 | Initialize 8253 CTC: counters 0,1 to divide 4MHz down to 10Hz for real time interrupt, counter 2 to generate 9600 baud clock. |
| 4 | Initialize the 8279 KBD display chip. |
| 5 | Initialize the 24-character display (2416's) to all blanks with no cursors. |
| 6 | Initialize the printer and serial channel UARTs. |
| 7 | Initialize the slave processors. |
| 8 | Initialize the Loran drivers. |
| 9 | |
| 10 | |
| 11 | |
| 12 | |
| 13 | |

OUTPUT CONDITIONS:
Hardware initialized
Go to MAIN with power-fail flag set as per line 1

FIG. 57.

SECTION: Main
SUBSECTION: Sys
LABEL: MAIN

TASK: Initialize the relevant memory location - vectors, variables, and flags.

REQUIREMENTS: User I/O (KBD, KBD LED's, Display, Cursor)

INPUT CONDITIONS: Power-fail flag (PF)

| | | | |
|---|---|---|---|
| 1 | Set interrupt vectors. | | |
| 2 | Power-fail? PF? | Initialize permanently stored values to defaults. | |
| 3 | Initialize operating flags to default operating state. | | |
| 4 | Initialize general use variables to default. | | |
| 5 | Enable interrupts | | |
| 6 | Power-fail? PF? | Do memory maintenance | MEM MAINT |
| 7 | | | |
| 8 | | | |
| 9 | | | |
| 10 | | | |
| 11 | | | |
| 12 | | | |
| 13 | | | |

OUTPUT CONDITIONS: System initialized
Fall through to DR MODE

FIG. 58.

SECTION: Main
SUBSECTION: Sys
LABEL: DR MODE

TASK:
Repeatedly poll for service whatever may be needed

REQUIREMENTS:
User I/O

INPUT CONDITIONS:
System initialized

| | | | | |
|---|---|---|---|---|
| LOOP | OPR MODE = Loran ? | Branch to Loran mode | → | LORAN MODE |
| | Poll for function requests and input requests | | POLL FUNC-INP | |

OUTPUT CONDITIONS:
No normal exit occurs
(Return or fall through)

FIG. 59.

SECTION: Main
SUBSECTION: Sys
LABEL: LORAN MODE

TASK: Initialize Loran process and repeatedly poll for service

REQUIREMENTS: User I/O

INPUT CONDITIONS: System initialized

| | | | | |
|---|---|---|---|---|
| 1 | Initialize Loran variables | | | |
| 2 | Input GRI | | | DO INPUTS |
| 3 | LOOP | Valid GRI not yet selected? Input GRI | | |
| 4 | | OPR MODE=DR Branch to DR MODE | | → DR MODE |
| 5 | | Time since triad selected? ≥ 10 mins. or no triad selected? | Select or re-select Loran triad | LRN SEL-PR |
| 6 | | Time since Loran fix ≥ 1 min.? | Do a Loran fix | LRN FIX |
| 7 | | | | |
| 8 | | | | |
| 9 | | | | |
| 10 | | | | |
| 11 | | | | |
| 12 | | | | |
| 13 | | | | |

OUTPUT CONDITIONS: No normal exit occurs

FIG. 60.

SECTION: Main
SUBSECTION: Sys
LABEL: POLL FUNC INP

TASK: Service any outstanding function or INPUT requests.

REQUIREMENTS: User I/O

INPUT CONDITIONS: OPR and INPUTS contain any requests to be serviced.

CASE of OPR FUNC

| | | |
|---|---|---|
| (No funcs requested) | Poll for input requests | DO INPUTS |
| A numbered function | Do a numbered function | FUNC NUM |
| Destina-tion function | Do destination function | FUNC DEST |
| Bearing Fix function | Do bearing fix function | FUNC BRG-FIX |
| Manual move function | Do manual move function | FUNC MANL |
| Load chart function | Do load chart function | FUNC LOAD |

OUTPUT CONDITIONS: Return

FIG. 61.

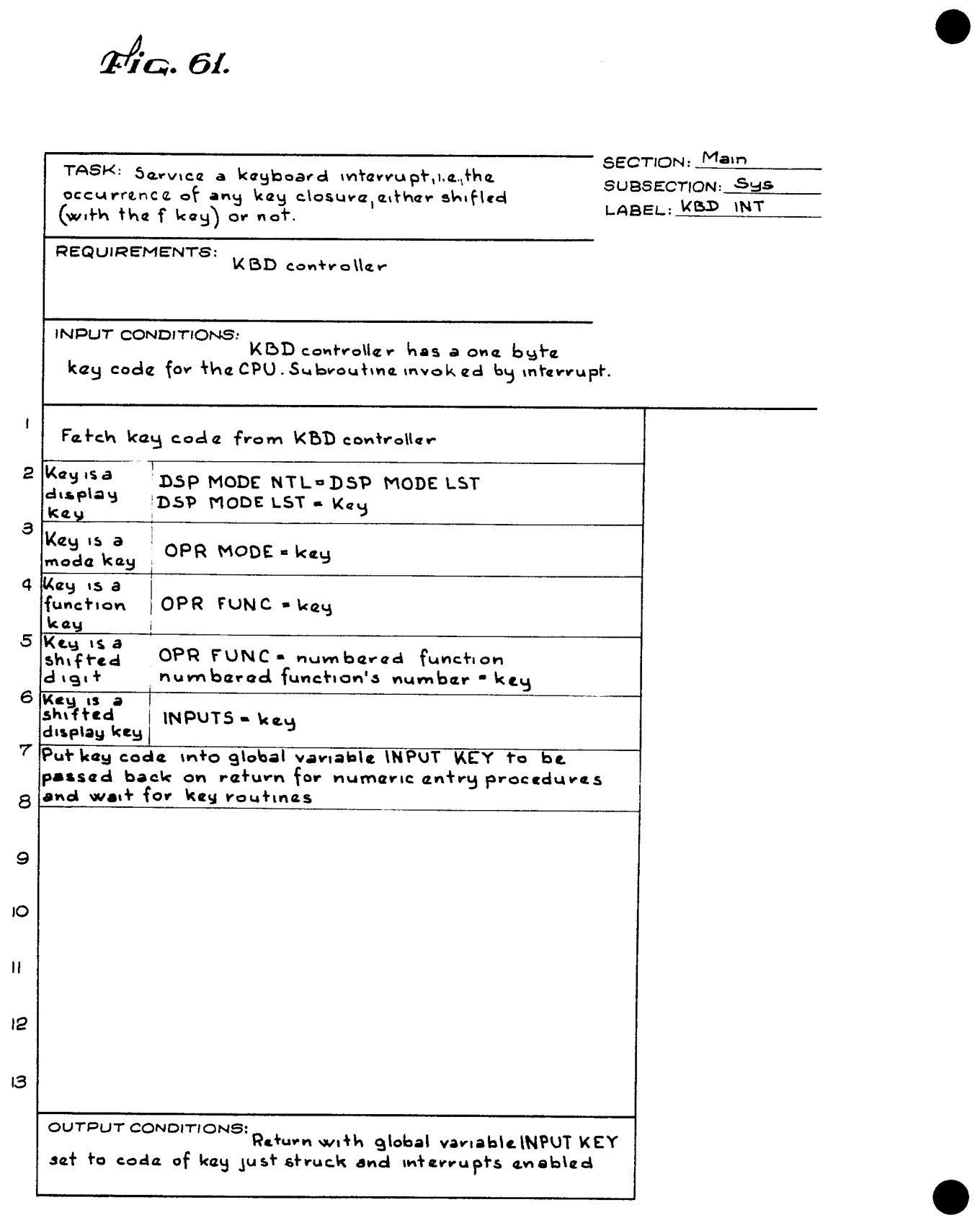

SECTION: Main
SUBSECTION: Sys
LABEL: KBD INT

TASK: Service a keyboard interrupt, i.e., the occurrence of any key closure, either shifted (with the f key) or not.

REQUIREMENTS: KBD controller

INPUT CONDITIONS: KBD controller has a one byte key code for the CPU. Subroutine invoked by interrupt.

Fetch key code from KBD controller

| | |
|---|---|
| Key is a display key | DSP MODE NTL = DSP MODE LST<br>DSP MODE LST = Key |
| Key is a mode key | OPR MODE = key |
| Key is a function key | OPR FUNC = key |
| Key is a shifted digit | OPR FUNC = numbered function<br>numbered function's number = key |
| Key is a shifted display key | INPUTS = key |

Put key code into global variable INPUT KEY to be passed back on return for numeric entry procedures and wait for key routines OUTPUT CONDITIONS: Return with global variable INPUT KEY set to code of key just struck and interrupts enabled

FIG. 65.

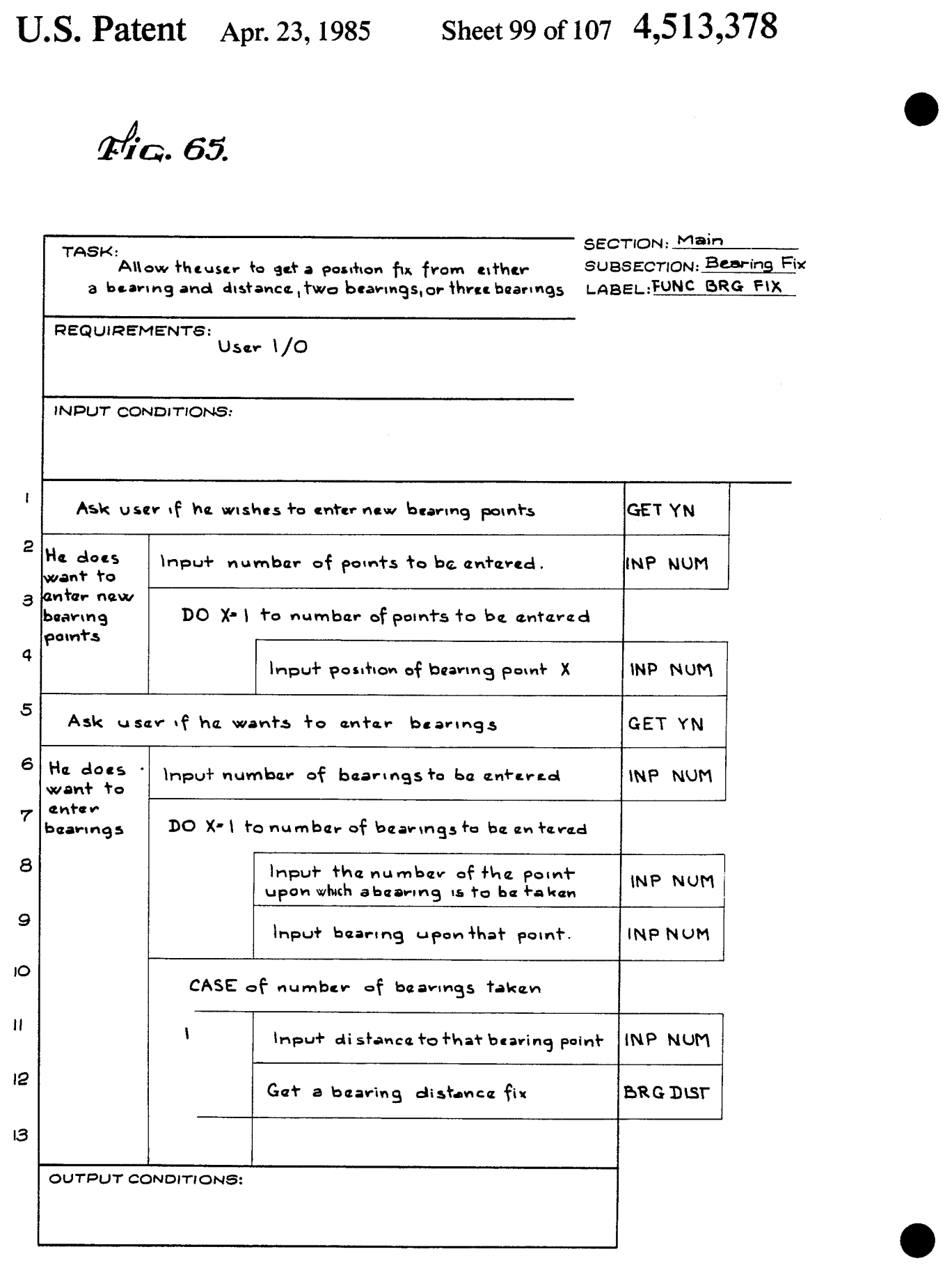

SECTION: Main
SUBSECTION: Bearing Fix
LABEL: FUNC BRG FIX

TASK:
Allow the user to get a position fix from either a bearing and distance, two bearings, or three bearings REQUIREMENTS:
User I/O

INPUT CONDITIONS:

| | | | | |
|---|---|---|---|---|
| 1 | Ask user if he wishes to enter new bearing points | | | GET YN |
| 2 | He does want to enter new bearing points | Input number of points to be entered. | | INP NUM |
| 3 | | DO X=1 to number of points to be entered | | |
| 4 | | | Input position of bearing point X | INP NUM |
| 5 | Ask user if he wants to enter bearings | | | GET YN |
| 6 | He does want to enter bearings | Input number of bearings to be entered | | INP NUM |
| 7 | | DO X=1 to number of bearings to be entered | | |
| 8 | | | Input the number of the point upon which a bearing is to be taken | INP NUM |
| 9 | | | Input bearing upon that point. | INP NUM |
| 10 | | CASE of number of bearings taken | | |
| 11 | | 1 | Input distance to that bearing point | INP NUM |
| 12 | | | Get a bearing distance fix | BRG DIST |
| 13 | | | | |

OUTPUT CONDITIONS:

FIG. 66

SECTION: Main
SUBSECTION: Bearing Fix
LABEL: FUNC BRG FIX

TASK:

REQUIREMENTS:

INPUT CONDITIONS:

| | | |
|---|---|---|
| 2 | Get a two bearing fix. | TWOPOINT |
| 3 | Get a three bearing fix. | THREEPOINT |

OUTPUT CONDITIONS:

FIG. 67.

| | |
|---|---|
| TASK: Perform the destination function | SECTION: Main<br>SUBSECTION: SP<br>LABEL: FUNC DEST |
| REQUIREMENTS: User I/O | |
| INPUT CONDITIONS: | |

| | | | |
|---|---|---|---|
| INPUT the number of the current way point to be used | | | INP NUM |
| LOOP | ENT key struck | EXIT | |
| | Poll for requested INPUTS | | DO INPUTS |

OUTPUT CONDITIONS: Return

FIG. 68.

SECTION: Main
SUBSECTION: SP
LABEL: FUNC NUM

TASK:
Support the number functions

REQUIREMENTS:
User I/O, instrument I/O

INPUT CONDITIONS:

| | |
|---|---|
| Input the number of the function | INP NUM |
| Call the appropriate number function support routine | Numbered function support routine |

OUTPUT CONDITIONS: Return

FIG. 69.

SECTION: Main
SUBSECTION: Input
LABEL: DO INPUTS

TASK:
Service the Inputs request flag INPUTS based upon current OPR FUNC

REQUIREMENTS:
User I/O

INPUT CONDITIONS:

CASE of INPUTS

| | | | |
|---|---|---|---|
| GRI TD | OPR FUNC = DEST or MANL | Set cursor (if MANL) or current way point (if DEST) to location of inputed TD's | INP NUM |
| | ELSE | Input current GRI | INP NUM |
| | | selected Loran not in personality PROM: Display "INVALID GRI" for 2 secs. | |
| LAT LONG | | Input a Latitude and Longitude | GET POS |
| | | set cursor (if OPR FUNC=MANL), current way point (if OPR FUNC=DEST) or present position to that location | |
| SET DRIFT | | Input the Set and Drift | INP NUM |
| DIR SPD | | Input the vessel's direction and speed. | INP NUM |

INPUTS = No Input requested

OUTPUT CONDITIONS:
INPUTS done, return

FIG. 70.

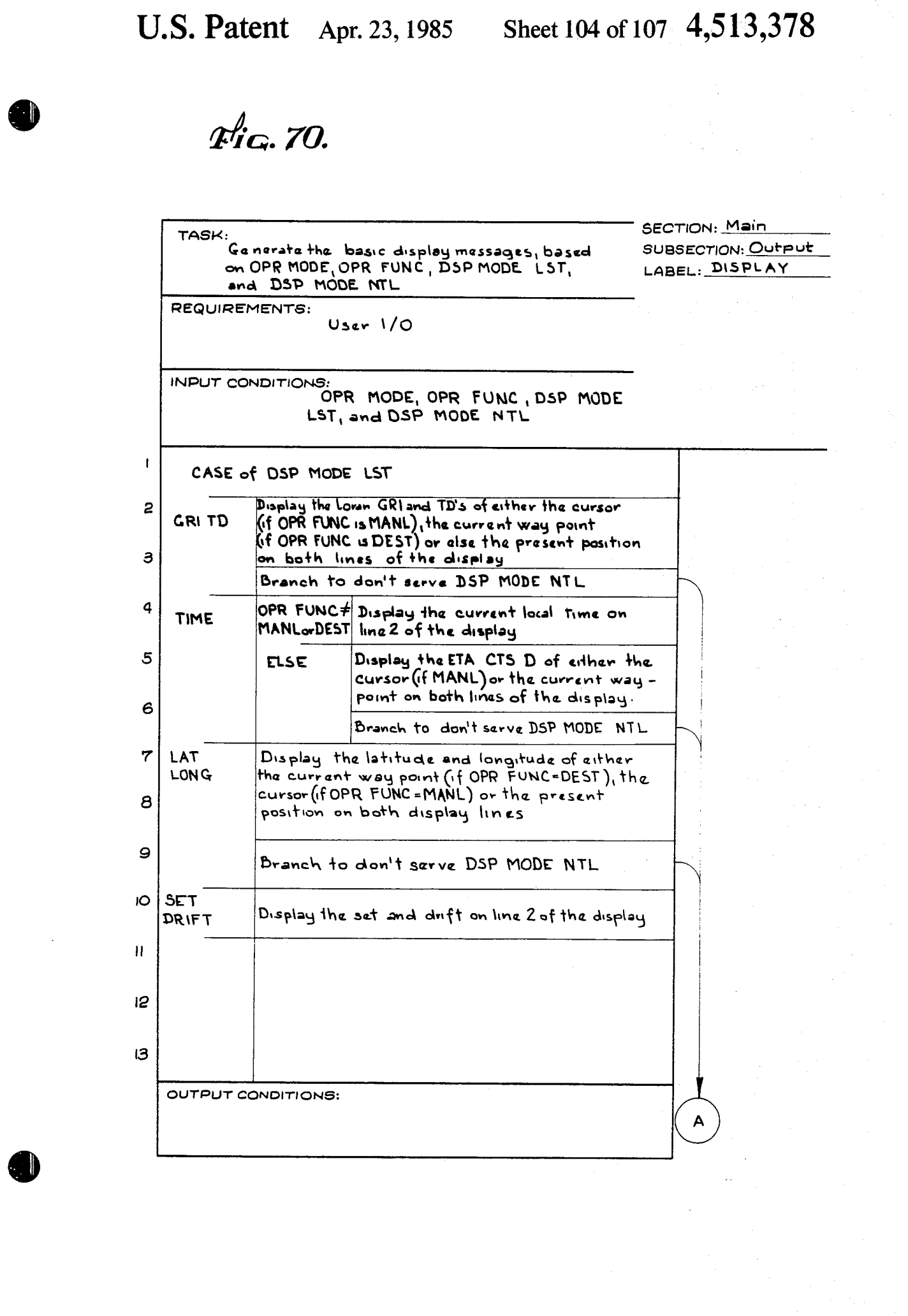

SECTION: Main
SUBSECTION: Output
LABEL: DISPLAY

TASK:
Generate the basic display messages, based on OPR MODE, OPR FUNC, DSP MODE LST, and DSP MODE NTL REQUIREMENTS:
User I/O INPUT CONDITIONS:
OPR MODE, OPR FUNC, DSP MODE LST, and DSP MODE NTL CASE of DSP MODE LST

| | | |
|---|---|---|
| GRI TD | Display the Loran GRI and TD's of either the cursor (if OPR FUNC is MANL), the current way point (if OPR FUNC is DEST) or else the present position on both lines of the display | |
| | Branch to don't serve DSP MODE NTL | |
| TIME | OPR FUNC ≠ MANL or DEST | Display the current local time on line 2 of the display |
| | ELSE | Display the ETA CTS D of either the cursor (if MANL) or the current way-point on both lines of the display. |
| | | Branch to don't serve DSP MODE NTL |
| LAT LONG | Display the latitude and longitude of either the current way point (if OPR FUNC=DEST), the cursor (if OPR FUNC=MANL) or the present position on both display lines | |
| | Branch to don't serve DSP MODE NTL | |
| SET DRIFT | Display the set and drift on line 2 of the display | |

OUTPUT CONDITIONS:

Figure 71:
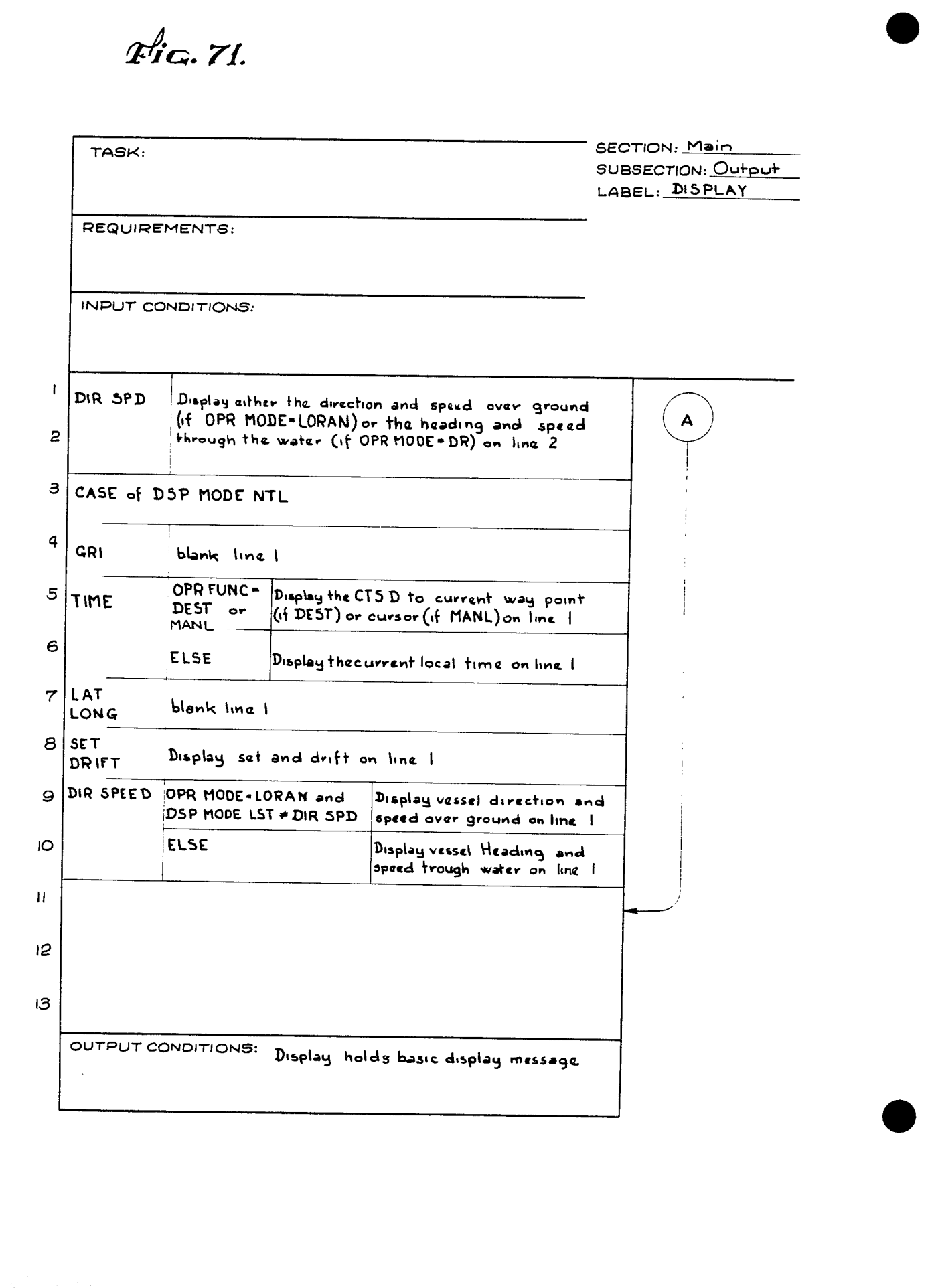

TASK:

SECTION: Main
SUBSECTION: Output
LABEL: DISPLAY

REQUIREMENTS:

INPUT CONDITIONS:

| | | | |
|---|---|---|---|
| DIR SPD | Display either the direction and speed over ground (if OPR MODE=LORAN) or the heading and speed through the water (if OPR MODE=DR) on line 2 | | |
| CASE of DSP MODE NTL | | | |
| GRI | blank line 1 | | |
| TIME | OPR FUNC= DEST or MANL | Display the CTS D to current way point (if DEST) or cursor (if MANL) on line 1 | |
| | ELSE | Display the current local time on line 1 | |
| LAT LONG | blank line 1 | | |
| SET DRIFT | Display set and drift on line 1 | | |
| DIR SPEED | OPR MODE=LORAN and DSP MODE LST ≠ DIR SPD | Display vessel direction and speed over ground on line 1 | |
| | ELSE | Display vessel Heading and speed trough water on line 1 | |

A

OUTPUT CONDITIONS: Display holds basic display message

FIG. 72.

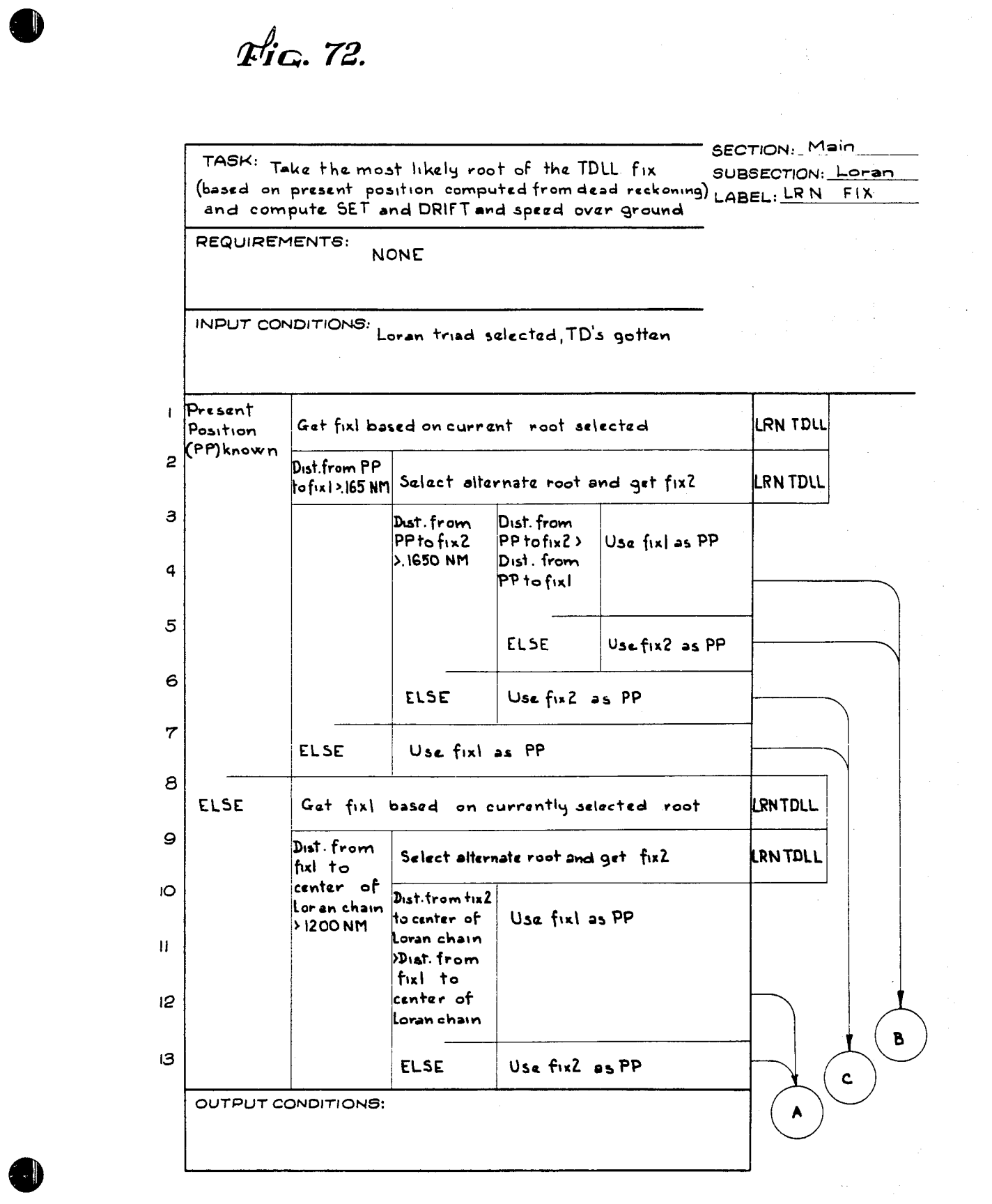

SECTION: Main
SUBSECTION: Loran
LABEL: LRN FIX

TASK: Take the most likely root of the TDLL fix (based on present position computed from dead reckoning) and compute SET and DRIFT and speed over ground

REQUIREMENTS: NONE

INPUT CONDITIONS: Loran triad selected, TD's gotten

- Present Position (PP) known
  - Get fix1 based on current root selected — LRN TDLL
  - Dist. from PP to fix1 >.165 NM
    - Select alternate root and get fix2 — LRN TDLL
    - Dist. from PP to fix2 >.1650 NM
      - Dist. from PP to fix2 > Dist. from PP to fix1
        - Use fix1 as PP
      - ELSE
        - Use fix2 as PP
    - ELSE
      - Use fix2 as PP
  - ELSE
    - Use fix1 as PP
- ELSE
  - Get fix1 based on currently selected root — LRN TDLL
  - Dist. from fix1 to center of Loran chain >1200 NM
    - Select alternate root and get fix2 — LRN TDLL
    - Dist. from fix2 to center of Loran chain >Dist. from fix1 to center of Loran chain
      - Use fix1 as PP
    - ELSE
      - Use fix2 as PP

B C A

OUTPUT CONDITIONS:

FIG. 73.

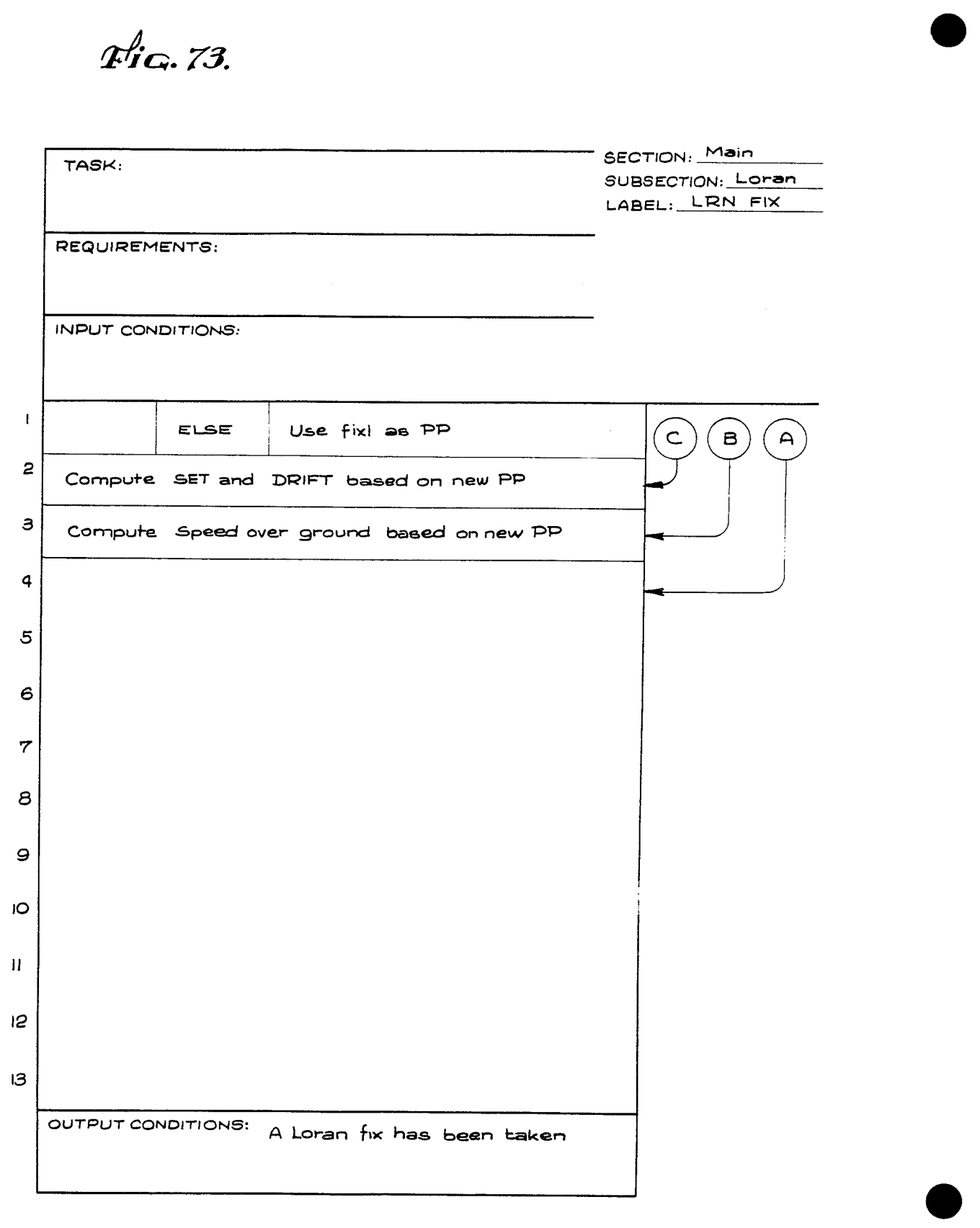

SECTION: Main
SUBSECTION: Loran
LABEL: LRN FIX

TASK:

REQUIREMENTS:

INPUT CONDITIONS:

| | | | |
|---|---|---|---|
| 1 | | ELSE | Use fix1 as PP |
| 2 | Compute SET and DRIFT based on new PP | | |
| 3 | Compute Speed over ground based on new PP | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |

C → 2
B → 3
A → 4

OUTPUT CONDITIONS: A Loran fix has been taken

HIGH-ACCURACY NAVIGATING APPARATUS WITH STEP-DRIVEN PROJECTED CHART

BACKGROUND

1. Field of the Invention

This invention relates generally to instruments for use in navigating, and more particularly to automatic devices for determining and pictorially displaying the position and related dynamic parameters of a traveling craft—and for guiding or helping to guide such a craft upon a straight track to desired destinations or way points, practically independent of current.

2. Prior Art

One of the earliest sophisticated systems for automatically producing a pictorial representation of craft position is disclosed in U.S. Pat. No. 1,701,582 to Georges Mengden. Mengden's paper map was presented directly in a movable case, with a wind-up mechanism for strip maps covering the anticipated terrain of a long journey. Input information was derived by cable drives from a compass repeater and from a speed sensor—namely, a ship's "speed log" in the case of a water craft, anemometer in the case of an airplane, or odometer in the case of a land vehicle.

Mengden relied upon an ingenious mechanical system—a rubber ball suspended between two drive rollers and four driven rollers, with axis of rotation of the drive rollers controlled by the compass repeater—to resolve the scaled-down craft motion into cartesian components to drive the map in the "up and down" and "side to side" directions respectively. For water and air craft Mengden provided drift correction in the form of a duplicate motion-resolving system, complete with six rollers and rubber ball, in which the drive rollers were oriented and motor-driven at appropriate angle and velocity to approximate the known set and drift of the medium through which the craft was moving. These parameters of course had to be determined or estimated by the operator and set up at the controls of the device.

Such analog mechanical systems received extensive elaboration. U.S. Pat. No. 3,160,851 to Karel Ramsayer was addressed to the problem of limited area coverage of maps in devices such as Mengden's, and the inherent difficulty of using strip maps of a preselected itinerary for general navigation. Thus Ramsayer's device "presupposes the employment of a navigation computer delivering the map track components as the angle of rotation of two output shafts (see e.g. W. H. Coulthard: Aircraft Instrument Design, p. 163, Sir Isaac Pitman and Sons, Ltd., London." Ramsayer prepared multiple map strips, covering adjacent portions of a conventionally shaped navigational chart, but with overlap areas along both edges. Such strips he connected end-to-end to make a roll, and the roll was mounted on and driven by platens within his mechanism.

Ramsayer's platen drive mechanism responded to two different kinds of situations: (1) it operated at speed proportional to north-south components of craft motion, to reproduce such components as motion of the map strip past a horizontal hairline; (2) it stepped from one strip to the next, at a rapid slewing rate, to accommodate motion of the craft past the left- or right-hand (that is to say, western or eastern) edges of a particular map strip. Meanwhile a traveling spot of light (or a traveling pen) operated from left to right to pinpoint the present east-west position of the craft on the map strip currently displayed. An analog electronic limit system used master and slave potentiometers, and/or stepping switches with fixed resistances, to respond to motion of the light spot or pen into the overlap areas along the edges, by initiating a map-strip change to keep the right map sections on display.

To minimize the problem of continuous map shifts when the craft moved in a meandering course that generally followed the edge of the displayed region, the permissible incursion of light spot or pen into the map overlap areas was adjustable. A small-scale map was interspersed into the roll of strip maps every so many panels, to permit the navigator to readily call up a view of a larger area; when these particular map strips were displayed the apparatus automatically switched-in a correspondingly different set of scale-determining potentiometers.

While Ramsayer directed his efforts to minimizing the problems of navigators whose craft were to range over a wide area along unpredicted routes, others addressed the opposite problem of the relatively small scale available when using even large-scale maps, in systems such as Mengden's and Ramsayer's. U.S. Pat. No. 3,725,919 to Jerry Jones reflects such a concern, in the context of a pipelaying barge, whose mission includes adhering as closely as possible (in the range of feet or yards) to a preselected route, and producing a precise record (in the range of feet or yards) of the deviation from that route, for future purposes of pipeline maintenance.

Since the preselected route is not generally straight north-and-south, the Ramsayer system is not readily adapted to provide very high-resolution display of such a route, and in the Ramsayer system the resultant record would in general consist of pen markings spanning several map strips. Worse yet, since the preselected route is not generally straight at all, even a strip map specially prepared to show the route would have to be wide enough to accommodate the entire curvature of the route and thus would be severely limited in resolution. Jones' solution to this problem was to dissect the course into plural segments, each at least nearly rectilinear, and to lay out each segment of the course along the center of a long, narrow chart segment. Jones' chart strips, unlike Mengden's and Ramsayer's, were not aligned north-and-south (i.e., parallel to meridians), but rather each employed grid bearings different, in general, from those of the previous or subsequent segment.

Jones' system is more modern than Ramsayer's in that Jones employs a radio ranging system—two shore-based transponders interacting with a shipboard transceiver/computer unit—and also in that Jones uses a general-purpose digital computer (such as the Hewlett Packard Model No. 2115A) to determine the coordinates of the barge position, and from these coordinates then to generate control signals for stepping motors that drive the chart platen and pen. Jones' system, however, is limited to the presentation of position on specially prepared paper maps. It is further limited by the use of a general-purpose computer, complete with peripheral devices (card, tape, or the like). It thus by size, power requirements, and necessary operating skill is unsuited for operation in general navigation by nontechnically trained personnel aboard small craft. Moreover, by its use of a single computer for all functions, it requires a computer of unnecessarily great computing capability and therefore inappropriately high price.

Perhaps the most striking limitation of Jones' system is its restriction to near-shore areas, a restriction that arises from its dependence upon dedicated shore-based transponders. The Jones system, however, also has a less apparent limitation in that it is not designed to make or use dead-reckoning calculations. Although it is perhaps conventional wisdom to think of radio-fix technology as more sophisticated, more powerful and more modern than dead-reckoning technology, there is—as will be explained below—a generally unrecognized advantage that accrues from combining the two capabilities in a single navigating instrument.

Many inventions have been directed to minimizing the various difficulties of map handling and display for different applications. For instance, U.S. Pat. No. 3,299,539 to H. Leiber employs a "lost motion" effect to avoid the problem of repetitive map exchange when a craft wanders back and forth along the edge of one map. U.S. Pat. No. 2,857,234 to T. Murray discloses a plurality of maps, showing either nested areas at different scales or adjacent areas. Each map has its own indicating or recording apparatus. With this system there is relatively less delay and confusion when the indicator leaves one map and the motion continues to be indicated on another, but the additional equipment complexity and space requirements are obviously acceptable only in unusual situations.

Perhaps the most elaborate effort at solution is the closed-circuit television approach typified by U.S. Pat. No. 2,836,816 to J. Allison. An "optical computer" and amplifying components are located in a part of an aircraft remote from the cockpit, but are linked by closed-circuit television transmission to an optical display at a small cathode-ray tube in the cockpit. The automatic remote equipment comprises a reel of charts on motion-picture film, with automatic selection of frames and analog "computer" equipment for determining position and applying automatic correction for the earth's curvature.

Some workers have hit upon the idea of using a film transparency chart directly in a display unit, in the wheelhouse or cockpit, with a relatively small portion of the total transparency projected on a screen for viewing. The reported applications of this idea, however, have not been adapted for practical use in general navigation of medium-small civilian craft. For example, U.S. Pat. No. 2,814,199 to A. Waldorf discloses an air navigation system in which a strip map is projected onto a screen for comparison with a radar or optical image of nearby terrain. The navigator adjusts the equipment to bring the two superimposed images into alignment, thereby permitting both altitude determination and determination of map location. Besides requiring relatively sophisticated users and an elaborate dual display system, this system may be of marginal usefulness over open sea, or in any area where landmarks producing distinct radar images are absent.

While Waldorf's system relies upon the human operator to interpret radio signals in terms of a projected map, others have attempted to automate this interpretation and matching function. U.S. Pat. No. 3,475,754 to Royal Scovill discloses a projected-map system that relies upon two omni-bearing receivers to automatically position the map relative to the projection system. Scovill's device finds position relative to two omni-bearing transmitters of known location, by independent operation of two omni-bearing receivers, and in effect locates the craft at the intersection of two bearing lines from the two known station locations. In an alternative operating mode, Scovill's device finds position relative to one omni-bearing transmitter at a known location, by independent operation of one omni-bearing receiver in conjunction with a distance-measuring equipment receiver—thus in effect locating the craft at the intersection of a bearing line and a distance circle from the same station.

Scovill's analog system "duplicates in miniature the space relationship of the radio navigation aids, simulated by [omni-bearing] locator discs, and the vehicle, simulated by one follower related to each locator disc. . . . The instantaneous intersection of the bearing lines from the two reference omni radio stations in the simulation is sought out by [servo-controlled mechanical] followers mounted on the film carriage. Thus . . . the film is continuously driven to project the location of the vehicle at the center mark of the screen." A similar operation occurs in the mode that combines distance measurement with one bearing measurement.

Scovill's apparatus is subject to several sources of very large imprecision and inaccuracy. First, the omni-bearing signals are themselves unreliable. The bearings found in dependence upon these signals are often indeterminate to any better than plus or minus fifteen degrees—due to diffusion of the radiated field pattern by atmospheric diffraction, multiply reflection at topographic features or large buildings, and scattering from a great variety of objects (including other craft). All of these distortions are variable, in dependence upon numerous unknown factors, thus precluding meaningful efforts to compensate by showing the direction and magnitude of distortion on standard charts. The intersection of two such highly inaccurate and imprecise bearing fixes is of course little more than a stab in the dark at a very large area on the charts; yet the Scovill device would yield a deceptively authoritative-seeming map position.

Second, the interpretive electronics of the Scovill system operate entirely on an analog basis, and so are subject to variable and unknown imprecisions and nonlinearities (inaccuracies) that are not reproduced in the charts. Moreover, the charts themselves are normally Mercator, Lambert, or other projects, constructed on the basis of earth-surface dimensions as convoluted with a mathematical function of latitude. Scovill mentions (at his FIG. 13 and columns 36 through 38) applying a compensation for chart curvature due to the Lambert projection, but does not actually disclose how this might be accomplished.

Assuming that he has in mind compatible electronic systems—namely, analog systems, perhaps involving nonlinearly wound slidewires or the like—it will be apparent that such systems will be relatively inaccurate, besides being cumbersome and expensive. Moreover, since Scovill's system operates on an analog basis, overall, it would be necessary to adjust the Lambert compensators for known latitude. Yet the operator of the Scovill system presumably is reliant upon the Scovill system to determine latitude, so it would appear that some iterative operations by the operator are required to bring the system into even approximately Lambert-corrected balance.

This subject leads to a third major source of difficulty with operation of the Scovill unit, namely, the fact that latitude and longitude apparently are derived from the chart markings as a result of the readout process. This is a serious limitation, for it implies that only when the chart transport mechanism and the projection system are both operational can the operator obtain latitude and longitude readings. When any part of those subsystems is turned off, malfunctioning, or in a transitional condition (e.g., during an automatic change of charts), no latitude and longitude readings are available.

Although there is some indication in the Scovill disclosure that a separate display of latitude and longitude may be provided by counters gear-driven from the transport servomechanism, it would appear that even these counters would require at least a fully operational (and nontransitional) transport servo for operation. Further, the latitude and longitude outputs would be disabled whenever the transport was used for another purpose-such as to manually control the chart display to make preliminary observations of a portion of the charts other than that in which the craft is currently located, or to examine reference data tabulated on other frames in Scovill's film magazine. Similar limitations may be found in Scovill's provision of displayed heading and speed of craft, and bearing and distance to navigation station, way station, or destination.

Finally, Scovill's unit—like the systems of Waldorf, Jones, and others who disclose radio-fix systems—does not appear to make any provision for incorporation of dead-reckoning computation. As previously noted, this limitation forecloses enjoyment of a particularly useful mode of operation. Scovill's disclosure indicates the unfortunate consequences of this limitation, when he describes (at his column 22) the connection of his navigating device to control an autopilot: "The signals thus made available will indicate left or right off course movement of the aircraft with respect to a fixed course on the bearing line indicated to the way station or destination point with no further adjustment of bearing indication."

The Scovill system may "indicate" off-course movement, but can do so only through continued observation by the operator, who is thus implicitly placed back in the control loop, like the operator of Waldorf's system. Scovill's apparatus apparently does not read out, use, or determine the magnitude of the heading error. As will be seen, the present invention obviates this limitation.

Other radio navigation systems that are in regular use include Loran (long-range navigation) and—in short-range air navigation—two-station DME (distance-measuring equipment, similar to the single unit employed by Scovill's alternative system). Most use that is made of these navigational aids involves manual plotting of position on paper charts. Loran, for example, involves a sizable number of publicly operated radio transmitters, broadcasting position-fix signals that are separated from one another by certain time differences. Specialized receivers are used that are capable of receiving three or four such signals, comparing two of them to obtain one received time difference, and comparing another two of the signals to obtain a second received time difference.

A navigator reads these two received time-difference values from his radio equipment, and he refers to specially prepared charts on which lines of constant Loran time difference appear. By visual interpolation on his charts the navigator finds his present position as the intersection of two time-difference lines. Unfortunately, compounding the delay and inaccuracy in such plotting and interpolation, substantial inaccuracies in the charted Loran time-difference lines have been reported. Even though the Loran radio signals (and the known positions of the Loran transmitters) provide adequate information to calculate latitude and longitude directly, such calculation is generally beyond the ability of small-craft navigators, and commercially available equipment, at least, does not provide such direct readout. The charted time-difference lines offer no suggestion that correction may be required, and certainly do not hint what the direction or magnitude of such correction should be.

Two-station DME fixes are considerably more straightforward and sometimes more accurate, though they too require manual plotting on a chart. The area coverage of the DME transmitter system, however, is not as extensive as might be desired. As with Loran, the DME devices do not read out latitude and longitude directly; such position coordinates may be obtained only through the added step of manual plotting on a chart, and then reading the latitude and longitude from the chart itself.

Even these plotting procedures leave yet additional effort to be expended if the navigator wishes to compute a "course to steer." This effort may be particularly complex on long trips, for which apparently straight lines on the charts are not really straight; rhumb-line corrections are required. Moreover, even when the navigator has set his course, vigilance is required to avoid missing his destination because of motion of the medium through which his craft is moving—that is, in maritime parlance, "set and drift."

It goes without saying that each of these navigating systems serves a good purpose, within its limitation. These systems are the best that have been available—clearly far beyond the capabilities of primitive navigating systems of only fifty years ago. It is not the pupose of the foregoing comments to derogate these systems, but only to indicate certain particulars in which the present invention is believed to improve upon them.

SUMMARY OF THE INVENTION

The present invention has among its objects (1) the provision of a map display that is quite high-resolution—in other words, a display that is capable of showing craft position precisely on a large-scale chart—and yet that covers a relatively large area without change of chart; (2) the provision of direct readout of position coordinates even when the chart display or positioning mechanism is disabled, turned off, or in some transitional condition; (3) the provision of position fixes that are independent of imprecisions or nonlinearities caused by omnibearing signal ambiguities, analog signal-processing idiosyncrasies, chart curvatures, erroneous charting of radio-beacon (Loran) time differences, and the tedium and inaccuracies of manual plotting; and (4) the provision of a single instrument that is capable of both displaying and setting a "course to steer" that is automatically compensated for set and drift.

In accordance with one aspect of the present invention, a transport mechanism receives an optically projectable map, and controllably effects relative movement between the map and an optical projection system in accordance with the transport control signals applied to the transport mechanism. The map includes a scaled representation of a geographical area and at least one calibration indicium at a position on the map corresponding to predetermined known coordinates. Calibration input signals indicative of the known coordinates are generated, and the known coordinates are coordinated with the position of the transport mechanism associated with the map calibration indicia. Indicia of the present geographic position of the craft is stored, and thereafter updated in accordance with data input signals indicative of either craft movement or craft geographic position. Transport control signals are generated in accordance with the updated stored position to vary the map position relative to the projective means in accordance with the instantaneous position of the craft.

In accordance with another aspect of the invention, a mechanism is provided for selectively generating transport control signals to effect relative movement between the map and projection system until the map assumes a position corresponding to a desired geographical point represented on the map, and the coordinates of the desired geographic point are calculated from the transport control signals. A course to steer is then generated from the craft present position and coordinates of the desired point. Signals indicative of the course to steer can then, if desired, be applied to an autopilot.

In accordance with a further aspect of the invention, the optically projectable map is formed of a high resolution film transparency. At least one pair of calibration indicia are provided at diagonal corners of the transparency. The film transparency is received between first and second outer frame panels of a film mount. Each of the panels includes a cut-out portion and a recessed portion about the periphery of the cut-out. A glass sheet is received in the recessed portion, and a plurality of projecting pins are disposed to align the film transparency in the cut-out portion so that it is viewable through the glass sheets. A plurality of bores are disposed to receive the projecting pins from the other panels. A closure mechanism effects a secure coupling between the respective panels.

BRIEF DESCRIPTION OF THE DRAWING

A preferred exemplary embodiment will hereinafter be described in conjunction with the appended drawing, wherein like numerals denote like elements and:

FIG. 10 is a block diagram of the electronic system of the embodiment shown in FIGS. 1 through 5;

FIGS. 11A and 11B are a schematic block diagram of the keyboard module of FIG. 10;

FIGS. 12A–12D are a schematic block diagram of the display module of FIG. 10;

FIGS. 13A–13J are a schematic block diagram of the slave processor module of FIG. 10;

FIGS. 29 and 30 are format samples, explaining the format of the Chapin diagrams that make up all the remaining drawings;

FIGS. 31 et seq. are Chapin diagrams showing the structure of the programming for the four microprocessors in the electronic system of FIGS. 1 through 19 and 24, as follows:

FIGS. 31 through 42—map transport-mechanism "slave processor" in FIG. 13A;

FIGS. 43 through 49—calendar-clock and input-sensor "slave processor" in FIG. 13A;

FIGS. 50 through 55—Loran Interface "slave processor" in FIG. 14;

FIGS. 56 through 73—central processor unit in FIG. 18A.

DETAILED DESCRIPTION OF A PREFERRED EXEMPLARY EMBODIMENT

Figure 1:
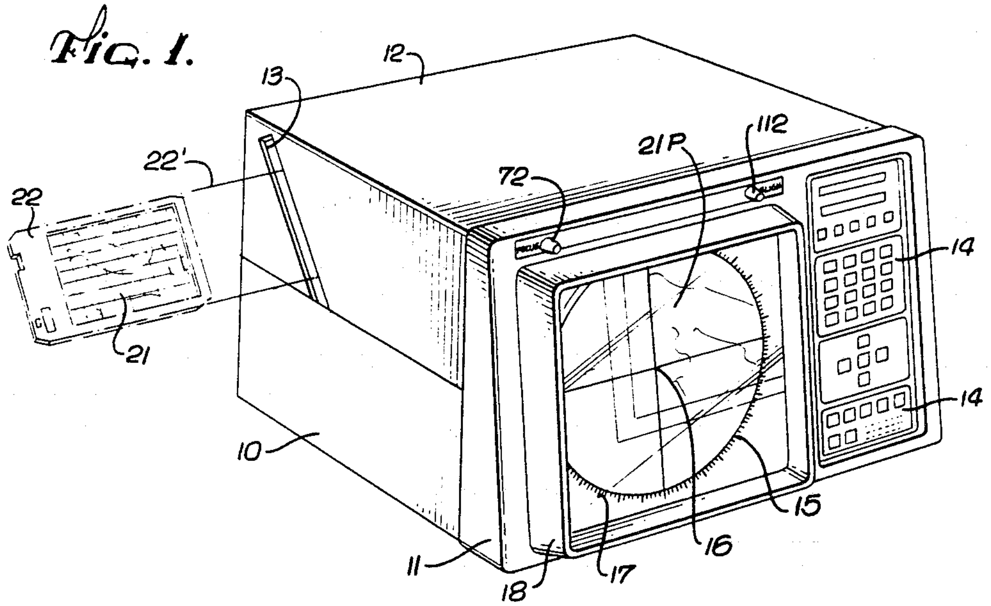
FIG. 1 is a perspective view illustrating generally a preferred embodiment of the present invention completely assembled, and showing particularly the case exterior, control panel, viewing screen, and map access slot.

In a preferred embodiment of the invention as here disclosed, a self-contained instrument apparatus is provided for use aboard a craft—i.e., a water craft such as a ship or large boat, or an aircraft such as an airplane, or a land vehicle such as a military tank. The preferred embodiment, as here described, is particularly adapted for maritime applications; however, it is to be understood that the same device with minor modifications (primarily in the types of speed and heading sensors and radio receivers employed) is useful in air or land applications.

The apparatus is particularly useful for use aboard a craft that is adapted for widely ranging motion—that is, one that has the capability of significantly changing its own position with respect to latitude and longitude or other earth-surface position coordinates.

The apparatus is designed to accept a miniaturized optically projectable map (or "chart") of portions of the earth's surface to be traversed by the craft, including particular fixed points of interest such as origin, destination, and way stations. The map also, of course, includes what may be defined here as points of interest that are variable—the craft's present (or "instantaneous") position. The map is advantageously a projection transparency on high-resolution film.

The apparatus includes a carriage for receiving and movably supporting such maps. When a map is supported in the carriage, the apparatus displays selected portions of the map for viewing by a human operator. The display is accomplished by provision of an optical projection screen, and an optical projection system for projecting an image of those selected portions of the map onto the screen.

The screen is provided with a position-marking indicium that is fixed with respect to the screen. Such an indicium may be simply a crosshair-type marking that is engraved, painted, or otherwise marked directly on the surface of the screen; or it may be provided in the form of a pointer or crosshairs adjacent the screen, or an image projected onto the screen; or it may be provided in any other suitable manner.

The apparatus of the preferred embodiment that is here disclosed also includes a transport mechanism for moving the map carriage relative to the projection system. This transport mechanism is powered by a precision stepping drive, which is in turn controlled in such a way as to selectively move particular displayed points of interest on the map (and especially the dynamically variable point of interest that is the craft's current position) into alignment with the indicium mentioned above. When this is done, of course, areas of the map surrounding the point of interest are thereby incidentally "selected" for display on the screen.

Furthermore, the apparatus of the disclosed preferred embodiment includes a dedicated digital electronic computer that is adapted and programmed to perform several functions:

1. reception and storage of data relating to the map, and relating to the various kinds of "particular points of interest" mentioned earlier, and also relating to the craft's motion relative to earth-surface position coordinates.

2. reception from the human operator of information signifying the operator's selection of a single point of interest for alignment with the indicium;

3. computation of earth-surface position coordinates for particular points of interest, subject of course to the accuracy of the data received;

4. computation of a position for the transport mechanism at which the displayed single point of interest selected by the operator is aligned with the screen indicium; and 5. generation, and direction to the transport mechanism, of stepping control signals to cause the transport mechanism to move to the position computed in point 4 above.

As to selection of a single point of interest for alignment with the crosshairs or other indicium (point 2 above), it should be explained that the operator's most obvious choice will normally be the craft's present position; however, that is not the only particular point of interest which the operator may wish to select during routine operation. In particular, the operator may wish to operate the mechanism so as to place his destination point, or any one of several way stations, or in some cases the known location of a radio beacon, at the crosshairs.

These choices may arise because the apparatus has the capability of automatically deriving the position coordinates of one of these locations from having them placed at the crosshairs, so that the operator does not have to manually key in such position coordinates. Alternatively, the operator may simply wish to move such other points of interest onto the screen—and perhaps near the crosshairs—merely to examine the chart in the area of the point of interest.

As to computing earth-surface position (point 3 above), the computer may compute position coordinates (e.g., latitude and longitude) in a great variety of ways and for various purposes. In particular it is capable of computing position coordinates by dead reckoning from an initial set of coordinates. It may also compute position coordinates by (1) receiving time-difference signals from an external Loran receiver, through an electronic interface internal to the apparatus of the present invention, and (2) calculating the position coordinates that geometrically must correspond to the combination of time-difference signals received.

Similarly the apparatus may derive position coordinates using data either manually entered or (with suitable interfacing) automatically received from certain radar units, or in aerial navigation from certain DME receivers, or even (though at the cost of incurring considerable inaccuracy) from "radio direction-finder" receivers. The term "radio equipment" and like terms as used herein are intended to be understood generically—that is, to encompass all four of these systems that have been mentioned, and any other radio-based systems as well.

One of the most important single aspects of the computation of position coordinates is simply that the calculation is advantageously done directly from data—not derived from the chart position. The chart position, in fact, is best derived from the position coordinates. It will be understood that, while it is preferred to have the apparatus calculate, accept data, and display data in terms of the usual latitude and longitude values, any system of earth-surface position coordinates may be used instead, without departing from the scope of the present invention.

It is also of particular importance that the apparatus is capable of obtaining position coordinates either from radio fixes or through dead reckoning because one of the most useful modes of operating the apparatus is to use both these computational modes simultaneously. By comparing the results of the two computations over a period of time, the apparatus is able to measure with reasonable accuracy the discrepancy between the craft's course as steered and the craft's course as actually "made good" over the bottom (in the case of ships or boats) or the earth's surface (in the case of airplanes and the like).

This discrepancy of course arises primarily because of currents in the water or air (respectively)—what is, for instance, in the maritime field referred to as "set and drift" of the water. Such currents are often relatively uniform over fairly broad areas; consequently, knowing the set and drift permits automatic compensation of the steered course so that the course "made good" is the actual desired course to a destination or way station.

A similar but only semiautomatic set-and-drift compensation is advantageously provided, if automatically interfaced radio navigational-aid equipment is unavailable, by periodically comparing dead-reckoning calculations with manually taken bearing fixes. This system performs all of the necessary calculations automatically, but is less convenient than the radio-fix system, due to the necessity of manually taking frequent bearing fixes to obtain reliable set-and-drift data.

Although a great deal more will be disclosed about the calculations to be performed by the computer, at this point it will be helpful to understand preliminarily that the computer may also generate signals for operating an autopilot, and in particular for setting a course automatically. By making simultaneous dead-reckoning and radio-fix position determinations, and compensating the "course to steer" based on the discrepancy to allow for set and drift, the apparatus is capable of directing an autopilot to steer straight for a destination or way station, without the kind of intervention by the operator (navigator, pilot) required by the Scovill apparatus discussed earlier. Many of the advantages of the present invention may be characterized as improvements in operational convenience, or in measurement precision and accuracy. The operation just described, however, is a qualitatively new capability.

As to control of the transport mechanism (point 5 above), it has been found that all of this function is best performed by a separate subunit within the computer—that is to say, a separate dedicated microprocessor that relieves the master processor in the computer of the necessity to time-share these relatively lower-level functions. This system is more economical because the master processor must be capable of relatively sophisticated operations, and a great deal of this expensive capability is wasted on relatively rote operations—in addition to unduly complicating the programming—unless these lower-level or rote functions are split off for separate performance.

A similar division of work is advantageous for certain of the data mentioned in respect of and storage of extrinsic data (point 1 above)—in particular, the reception of data relating to the craft's position when these data are input from automatic sensors such as compass and ship's log. A microprocessor dedicated to these peripheral translation and traffic tasks can also advantageously be assigned the chore of reading and interpreting a solid-state digital "calendar clock" that is internal to the apparatus.

These specializations have been found to permit use of a smaller master processor, with simpler programming, while at the same time allowing the processor to accept quite complex and sophisticated mathematical and coordination assignments that significantly enhance the overall capability and utility of the apparatus.

At any rate, the five computer functions mentioned above combine to automatically and continuously hold the displayed single point of interest selected by the operator at the fixed crosshairs or other indicium on the screen, even if that point of interest is the craft's variable position.

As previously suggested, the apparatus is adapted and programmed to receive at least some of its data and instructions through manual entry by the operator. For this purpose the apparatus includes a specialized keyboard for manual entry of numerical data. The keyboard also permits for manual direction of the map transport mechanism—to slew the mechanism to any desired position, to display any mapped point of interest on the screen or, if desired, at the crosshairs. A key on the keyboard is provided for signifying to the apparatus that the point on the map that is currently aligned with the crosshairs is in fact a particular point of interest.

It is also desirable to provide a separate display system, apart from the projection screen, for verifying the operator's numerical entries and for otherwise communicating with the operator. The display, ideally a low-power unit such as a bank of light-emitting diodes (LEDs), may be used to present numerical values of position coordinates to the operator, with or without Loran time-difference values, and whether calculated by dead reckoning or radio fix.

Because position coordinates are found directly, not from the chart position, they can be shown at the low-power display even when the projection system and map transport are (1) turned off or (2) in use for loading a chart or examining a portion of the chart far from the craft's present position. The display also is useful to inform the operator of a calculated "course to steer," either corrected or uncorrected for set and drift as previously suggested. The display may also be used to prompt the operator as to information that is to be entered or operations that are to be performed.

By means of the division of labor within the dedicated computer's subunits as mentioned earlier, it is possible economically to provide programming and memory capacity to apply corrections for magnetic deviation and variation errors that would otherwise interfere with accuracy of bearings and headings taken from a craft's magnetic compass. The computer also is programmed to compute and display distance to—and estimated arrival time for—destination or way stations, a further convenience to the operator.

The computer is further programmed to select combinations of Loran transmissions from the several that are available in certain geographic areas, to make use of those pairs of transmissions that yield the best position-fix accuracy. This selection can be of great benefit since in some particular areas the relative locations of some of the available Loran transmitters—although the transmitters are nearby and very powerful—gives certain combinations extremely unfavorable geometry for accurate fixes. This problem is sometimes referred to as the "Loran baseline extension" problem; it is virtually eliminated as a source of inaccuracy by the preferred embodiment here disclosed.

The preferred embodiment herein disclosed is also compatible with separate digital printers or "x-y" plotters, to make a permanent record of various characteristics of a craft's operation.

1. EXTERNAL FEATURES

Referring now to FIG. 1, a system in accordance with the present invention is suitably enclosed in a case consisting of a lower section 10; a forward section 11, permanently secured to lower section 10; and an upper section 12, removably fitted to the lower and forward sections 10 and 11.

Lower section 10 supports most of the hardware within the case. The forward section 10 provides a conveniently sloping control panel 14, a rear-illuminated projection screen 15, and a bezel or shade 18 to enhance daytime viewing. The projection screen advantageously bears an engraved or silk-screened central crosshair-type indicium 16 and a likewise engraved or silk-screened compass rose 17. Both these features may be provided as pointers or otherwise separately from the screen if desired. Forward section 10 also carries a focusing control 72 and an alignment control 112.

Upper section 12 is formed with an access slot 13 for insertion and removal of map 21, which is in the form of a full-color projection transparency on special microfiche-quality (that is to say, extremely high-resolution) photographic film. The chart or map 21 is enclosed in a special film mount 22, adapted to be manually inserted along a line of motion 22' through slot 13 and into a map carriage within the upper case section 12. When map 21 is properly inserted (and when the apparatus is connected to draw electrical power from the craft's power system and is turned on), suitable manipulation of the keys at the control panel 14 produces on the screen 15 a projected image 21P of a small portion (approximately five percent of the linear dimension) of map 21.

Figure 2:
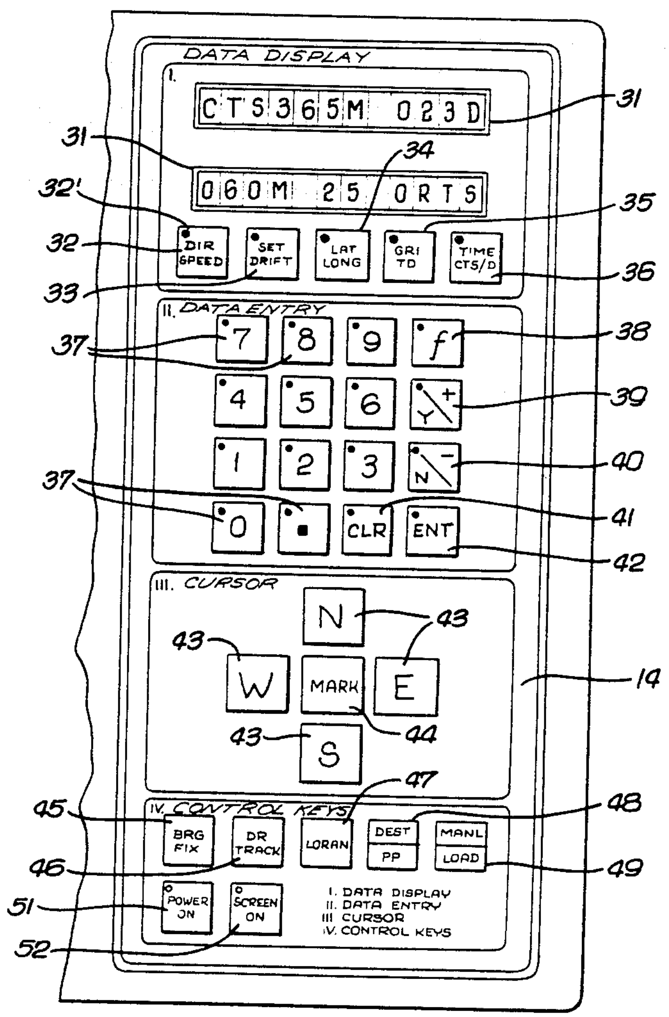
FIG. 2 is an enlarged, straight-on view of the control panel of the FIG. 1 embodiment, showing particularly the separate display mentioned earlier, and the keyboard.

FIG. 2 shows the details of control panel 14, namely, a pair of twelve-character light-emitting-diode displays 31 and thirty-three control keys, here identified by reference numerals 32 through 52. Key 32 carries in its upper left-hand corner a small indicator light 32', furnished as a light-emitting diode. For simplicity of discussion, this description refers to the key 32 as the "DIR/SPEED key," and to the indicator light 32' as the "DIR/SPEED light." Each of the other keys 33 through 52 likewise carries a small indicator light in the upper left-hand corner. To avoid cluttering the drawing in FIG. 2, these lights are not identified with reference numerals, but it is to be understood that, for example, the "W light" refers to the indicator light in the upper left-hand corner of the "W key" 43.

It is helpful in understanding the apparatus to think of it as having a hierarchy of capabilities—"modes" of operation, and within each of the modes a variety of possible "functions." Some of the functions are unique to particular modes, or used in unique ways in particular modes; others are not. The three primary modes—dead-reckoning, bearing-fix, and Loran—are initiated by use of keys 45, 46 and 47 near the bottom of the control panel. Most of the other keys are used to perform or initiate functions: display, data entry, chart motion, or other operations.

As a general rule, mode operation does not stop when a function is selected and executed. The screen and keyboard display may be in use performing the function and so unavailable to show mode data; however, when performance of the function is complete the apparatus resumes showing current mode data as though no interruption had occurred.

Functions are initiated in two ways. Those that are often used have specific keys for the purpose; these keys and their functions are described immediately below. Those functions used less often are initiated by pressing the "f" (for "function") key 38, followed by specific other keys—particularly numeric keys 37; these functions are described in subsection 4 below, "Operation."

Keys 32 through 36 are grouped with the displays 31 in a section of the control panel that is identified (by indicia at the upper left corner of the section) as section "I. DATA DISPLAY". (Legend shown at lower right of section 4.) When the DIR/SPEED key 32 is touched, one of the two displays 31 indicates values of the craft's direction and speed, as computed within the apparatus—or as entered by the operator at the control panel. When the apparatus is performing a function that involves entry of data, the displays 31 "prompt" the operator by displaying questions to guide him or her in operating the equipment. This prompting makes it unnecessary to memorize complex sequences of operations. Further, a "prompter" character (*) is shown to indicate character positions that are ready to accept data. All required data characters have been entered when the prompter no longer appears in the display. This assures correct format for use in the computer—for example, entry of the zeroes and decimal point in "041 27.50 W," for forty-one degrees, twenty-seven and a half minutes west longitude, rather than "41 275 W." (Operating procedures are detailed in subsection 4, below, of this Detailed Description.)

When the SET/DRIFT key 33 is touched, the two displays 31 respectively indicate values of the set (that is to say, direction) and drift (velocity) of currents in the body of water (or, in aeronautical applications, in the air) through which the craft is moving. These values may be as computed within the apparatus or as entered by the operator at the control panel.

Similarly, touching the LAT/LONG key 34 causes the displays 31 to indicate respectively latitude and longitude, either calculated or entered. The values so indicated may represent position coordinates for a destination (or one of several way stations, which are for this purpose regarded as destinations), or for the craft's present position, or for a bearing point (to be explained shortly). The "f" key 38, DEST/PP key 48, and BRG FIX key 45 are used (as described below) to indicate which of these interpretations is to be applied to the indicated position coordinates.

Likewise, touching the GRI/TD key 35 causes the displays 31 to indicate respectively certain parameters related to the "Loran" ("long-range aid to navigation") system. The upper display reads the "group repetition interval" (GRI) for the craft's present operating area. This parameter simply represents a constant value that is characteristic of the Loran transmissions for the particular geographic area, and that must be supplied to the apparatus in order for it to properly decode the information from the Loran receiver. The lower display indicates two "time differences" (TDs) that are received from the Loran receiver, related to the selected GRI.

Some Loran receivers provide up to five TDs; the apparatus of the present invention automatically selects the two TDs that yield a position fix of greatest accuracy, and indicates only those two. Like position coordinates, the GRI and TDs displayed may be for a destination, present position, or bearing point, depending upon the implication selected by the "f," DEST/PP, and BRG FIX keys 38, 48 and 45.

Touching the TIME/CTS/D key 36 causes one of the displays 31 to indicate the date, time, and time zone for the craft's present location. If the DEST/PP key 48 is touched just before or after the TIME/CTS/D key, one of the displays gives the same group of data for the next way station or destination. In addition, if the apparatus has been provided or has calculated adequate data regarding speed and location, one of the displays 31 will shift from indication of local data, time and zone to indication of a "course to steer" to make good the planned itinerary, and the distance to the next way station or destination.

Keys 37 to 42 are identified by indicia on the control panel as "II. DATA ENTRY" keys. The numeral and decimal-point keys, indicated generally at 37, are used for entry of numerical data.

The "f" (function) key 38 may be analogized to the shift key on a typewriter, or more closely to the "2d" key on many calculator keyboards: touching it changes the implication of touching certain other keys on the panel. For example, touching the "f" key and then certain numeral keys causes the apparatus to interpret the numerals not as data but rather as the numbers of certain operations—functions—for which specific, dedicated control keys are not provided. Touching the "f" key 38 and then any of the data display keys 32 through 36 prepares the apparatus to accept and display (rather than calculate and display) the particular type of information indicated by the data-display key used. The many different uses of the "f" key are detailed in subsection 4, "Operation," below.

The Y/+ key 39 is sometimes used for entry of numerical data—as when it is necessary to indicate that a particular value is positive. This same key 39 is, however, also used in some parts of the operating procedure to respond in the affirmative ("yes") to an inquiry (or "prompting") that is automatically presented at displays 31. The N/− key 40 is similarly used to indicate negative algebraic sign of a quantity or negative response to a query, depending on the context.

The CLR ("clear") key 41 is used in the customary way to correct an entry that has been begun erroneously. The ENT ("enter") key 42 is used to finalize entry of a parameter or response that has been provisionally entered (or, to put it more conventionally, "keyed but not entered") using keys 37, 39 and 40. The ENT key also has certain other uses in special situations to be described later.

Keys 43 and 44, designated "III. CURSOR" by indicia on the control panel, do not actually move the crosshairs (or "cursor") on the screen, but rather move the map, within the apparatus, relative to the projection system so that the projected image moves with respect to the crosshairs on the screen. For instance, touching the "W" key moves the map image to the right, so that points further toward the west come under the vertical crosshair; touching the "N" key moves the map image downward to bring points further toward the north under the horizontal crosshair; and so forth.

If the operator touches one of the N, S, E and W keys 43 only briefly, the stepping drive system will advance only one step, but if the operator touches the key continuously the drive will advance continuously, at a rapid stepping rate—thus providing both fine adjustment of position and coarse or "slewing" adjustments using only the four keys. The N, S, E and W keys are also used as data-entry keys, to indicate the compass direction when entering latitude and longitude of bearing points, present position, way points, or destination.

Touching the MARK key 44 indicates to the apparatus that the map location that is aligned with the crosshairs, at the time the key is touched, is a destination (or way station), or the craft's present position, or the location of a bearing point (see below)—depending upon use of the "f," DEST/PP, and BRG FIX keys 38, 48 and 45. The MARK key also has certain other uses in special situations, to be described shortly.

Keys 45 through 52 are identified by indicia on the panel as "IV. CONTROL KEYS". As mentioned earlier, keys 45–52 select basic operating modes for the instrument. The BRG FIX key 45 alerts the apparatus to receive two kinds of data: (1) numerical entries, or "mark" entries (mentioned just above with regard to the MARK key 44), specifying the position of a bearing (BRG) point—that is, the position coordinates, or map position as such, of a visible object, radio source (other than loran transmitters, whose locations are stored within the apparatus), or other reference point relative to which bearings are to be taken; and (2) numerical entries for the actual bearing and distance measurements taken from the craft by radar, pelorus, compass, sextant, rangefinder, etc. Operation in the bearing-fix mode is described in detail in subsection 4, below.

The DR TRACK key 46 directs the apparatus to apply dead reckoning (DR) to repetitively calculate and display (using both the projection screen 15 and the displays 31) the present position of the craft. This calculation is automatically performed once per second based on the most recently furnished heading and speed data—whether from automatic sensors or manual entry—and on the most recently entered or calculated set and drift data.

If automatic speed and heading sensors are not provided, the displays 31 prompt the operator to enter course and speed data manually. If the sensors are provided, the system automatically accommodates magnetic compass deviations and variations, and excessive fluctuations in the signals from either the compass or the speed log, as described below in subsection 4, "Operation."

In this DR mode the instrument will itself calculate set and drift, and compensate for them, if bearing fixes are periodically supplied by the operator to support determination of set and drift from the discrepancy between positions found by fix and by DR.

The LORAN key 47 directs the apparatus to repetitively calculate and display the present position of the craft based on Loran fixes, and to compare the progressive changes in Loran fix with the results of dead reckoning to find current set and drift of the water through which the craft is moving—and from this comparison to determine a set-and-drift-compensated "course to steer" for display and for direction to an autopilot (if available).

In its "normal" condition the apparatus displays calculated position coordinates, or GRI and TDs, or local time and date, for the craft's present position. Likewise, manually entered position coordinates, GRI and TDs, or local time and date, are interpreted as for the craft's present position. Touching the DEST/PP key 48, however, advises the apparatus to accept and/or display data for the craft's destination (or a way point instead. Touching the "f" key 38 and then the DEST/PP key 48 advises the apparatus to return to its normal condition—accepting and/or displaying data for the present position.

Touching the MANL/LOAD key 49 prepares the unit to accept manual instructions at the N, S, E and W keys 43 for motion of the map image, as mentioned above with regard to those keys. This mode of operation, as distinguished from the bearing-fix mode, or the destination-locating or present-position-locating mode, merely moves the chart for the user's convenience in viewing areas of the chart that are not currently displayed. While such viewing is going on, the basic operating mode of the apparatus that was last previously in progress continues "in the background"—without affecting the chart position. When such manual direction of the displayed chart has been completed, touching the MARK key 44 returns control of the map position to the automatic operating mode that has continued during viewing, and the map automatically moves to the appropriate present position for that mode.

Touching the "f" key 38 and then the MANL-/LOAD key 49 causes the map carriage within the apparatus to move to a position adjacent the slot 13 (FIG. 1) in the upper case section 12, for purposes of changing maps. When a new map is in place, touching the ENT key 42 informs the apparatus that the necessary procedure for accepting a new map is to be begun.

Touching the POWER ON key 51 has the effect of turning the instrument power on or off, depending on whether it is initially off or on respectively. The SCREEN ON key 52 has the same effect fo the projection lamp within the apparatus. During extended times when it is not desired to view the map display of present position, approximately half the operating power for the apparatus can be conserved by operating it with the screen dark.

The small indicator lights in the upper corners of the keys 32 through 52 are automatically illuminated by the apparatus during operation, to indicate what mode the device is in, what is being displayed, or what data or other control keys are "live" as a group—that is, which keys can be used by the operator to enter information or instructions. Some of these indications will be mentioned below.

2. MECHANICS AND OPTICS

Figure 3:
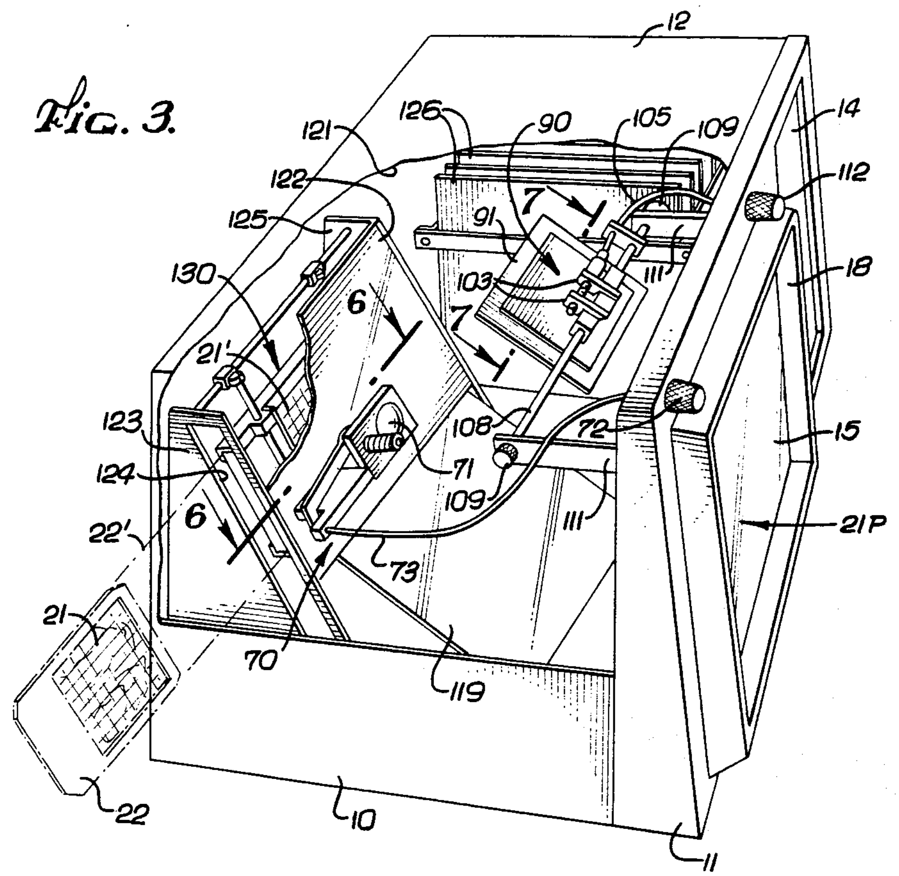
FIG. 3 is a perspective view of the interior of the FIG. 1 apparatus, showing generally the location and arrangement of its various subsystems.

In FIG. 3 the upper section of the instrument case 12 is broken away at 121 to show the general internal layout of equipment. Supported from internal side bulkheads 123 and 125 is a map transport mechanism 130, forward internal bulkhead and optical barrier 122, projection lens 71 and focusing mechanism 70, and large "folding mirror" 119. A slot 124, aligned with the slot 13 (FIG. 1) in the upper case section, permits a film-transparency map 21, in a film mount 22, to be inserted into and removed from the position 21' in the transport mechanism, along a line of motion shown at 22' in FIGS. 1 and 3.

Suspended behind the map transport mechanism 130 and not visible in FIG. 3 are a projection lamp, a "cold" collecting mirror, a collimating (or "condensing") lens, and various other elements to be discussed shortly. At the rear of the case, also not illustrated, are heat sinks to dissipate lamp heat, and removable access panels for lamp replacement and other servicing.

A small "folding mirror" 91 and its alignment mechanism 90 are suspended above and forward of the large "folding mirror" 119, upon a support rod 108 that is in turn held by brackets 111 anchored to the case front section 11. Three optical adjustments are provided for: (1) focusing of the projection lens, via knob 72, cable 73 and mechanism 70—which is detailed in FIG. 6; (2) rotational alignment of the projected map with the compass rose 17, via knob 112, cable 105 and mechanism 90—which is detailed in FIG. 7; and (3) up-and-down alignment of the projected map with the screen, via knobs 109—which simply rotate the support rod 108 relative to the brackets 111. The first two of these adjustments are accessible with the upper case section 12 in place.

Electronic circuit boards providing the display, map transport-mechanism control, logic, and computing functions required for an operational apparatus are housed generally at 126, in the right end of the case, and also just behind the control panel 14.

Figure 4:
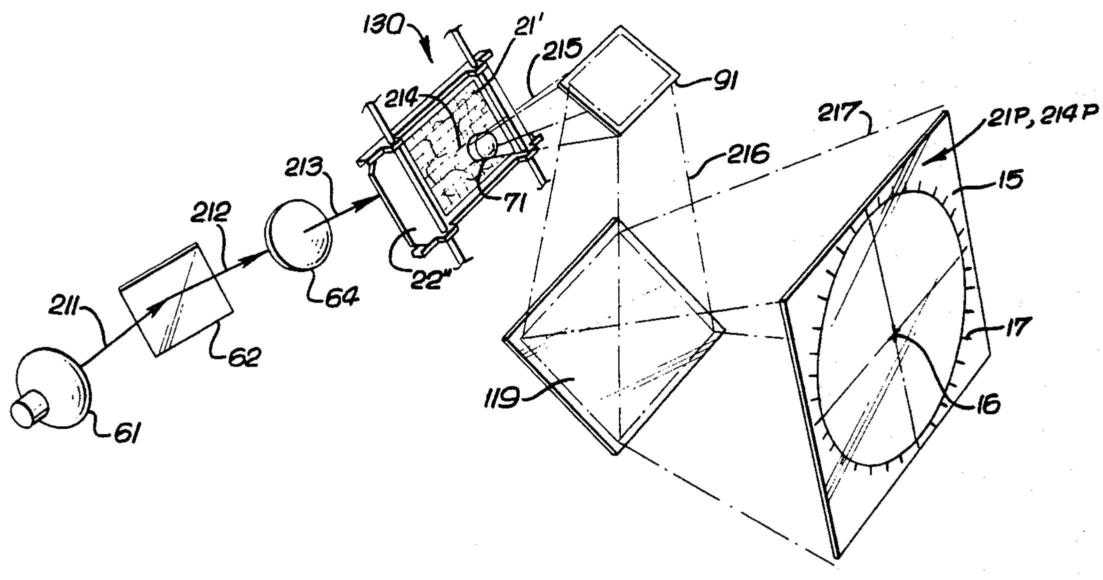
FIG. 4 is a perspective representation of the optical system of the FIG. 1 apparatus.

FIG. 4 illustrates the optical elements in their mutual relationship. Light 211 from a thirty-watt tungsten-halogen lamp 61 irradiates a flat dichroic collector mirror 62, which transmits lamp heat (that is, the infrared component of the radiation from the lamp) away from the film-transparency map, while turning the visible components 212 of the beam toward the map. This configuration permits enclosure of the lamp conveniently within the case below and to the rear of the transport mechanism 130 (FIG. 3), without the necessity of extending the case or using a collimating lens 64 of impractically short focal length. The redirected diverging beam at 212 from collector mirror 62 is defocused by a 50.8 mm condenser lens 64, providing generally parallel rays at 213 for illumination of a small portion section 214 of the map 21', here shown with mount 22" held firmly in the transport mechanism 130.

The map is a twelve- or thirteen-times reduction of the original standard NOAA (or foreign) chart. A six-element, 25 mm focal-length projection lens 71 forms a fourteen-times magnified image of the map section 214 at 214P (or 21P, as with reference to the entire map 21 per FIGS. 1 and 3) at a louvered nine-by-nine-inch screen 15.

The image distance is the sum of the distances from lens 71 to small "folding mirror" 91, thence to large "folding mirror" 119, and thence to the screen (center-to-center distances being the nominal ones). If folding mirrors 91 and 119 were omitted, and the image distance was established by the physical separation of lens 71 and screen 15 by the most direct center-to-center path, the optical system would require an unacceptably long case 10, fore-to-aft, and would in addition require that the map 21 and projection lens 71 be oriented parallel to the screen 15—that is, almost vertically—further interfering with the convenient space-saving placement of the lamp 61, collecting mirror 62 and collimator 64 below and behind the tilted transport mechanism 130. The two first-surface-coated "folding mirrors" 91 and 119 are therefore provided to "fold" the optical path into a more compact physical arrangement: the projected beam at 215 is deflected (at adjustable angles) by small "folding mirror" 91 along a downward path 216, leading the beam to large "folding mirror" 119, which deflects the beam forward at 217 to the screen. The mirrors are positioned and aligned so that the centerline of the projected beam strikes the crosshairs 16 normal to the screen surface 15, thereby imaging the plane of the map 21' upon the plane of the screen 15, to minimize nonuniformity of focus across the screen 15.

Figure 8:
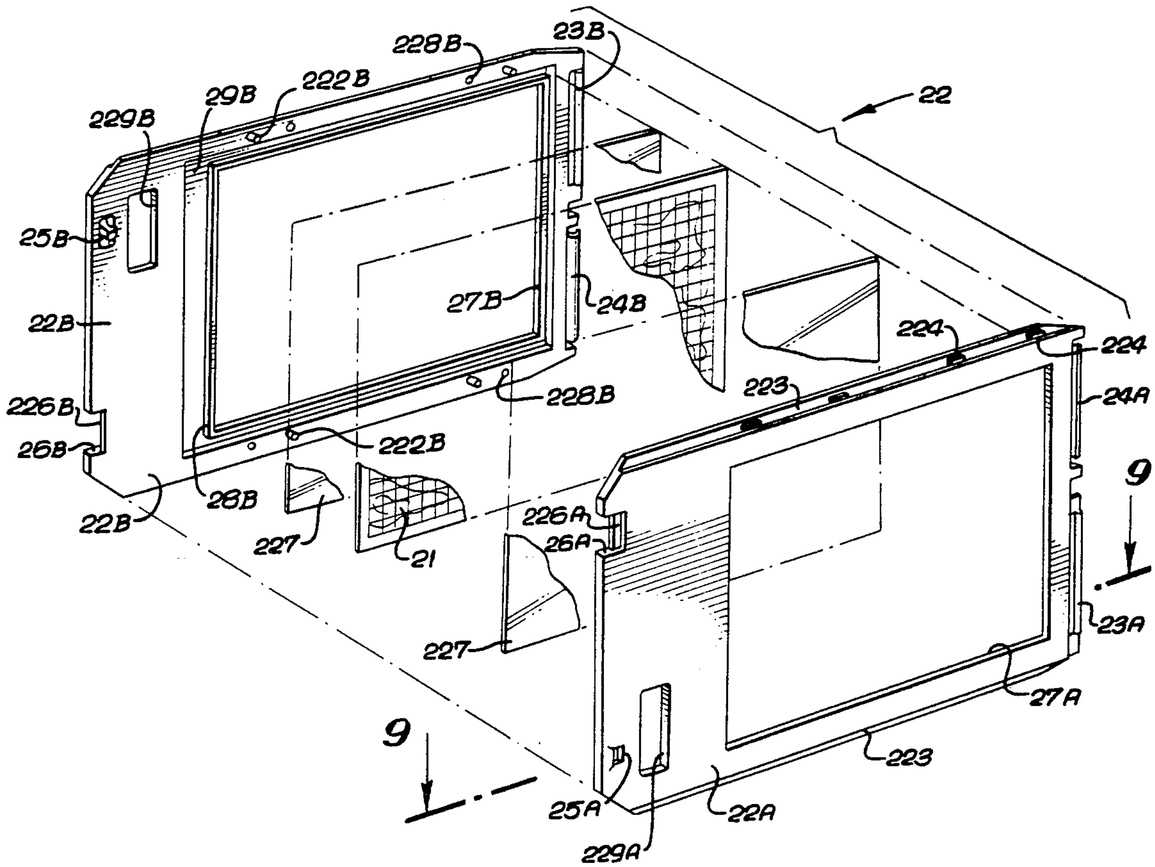
FIG. 8 is an exploded perspective view of a film mount used to retain and protect a film-transparency map, in conjunction with the apparatus of FIGS. 1 through 7, also showing—partly in phantom line—the map itself.
Figure 9:
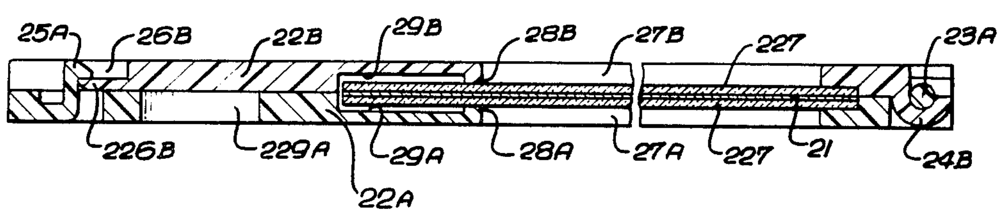
FIG. 9 is a section view, partly broken away, of the film mount and map of FIG. 8 as assembled for use.

When a map 21' and film mount 22" are properly oriented in the transport mechanism 130, the map image 21P, 214P is right-reading—that is to say, neither upside-down nor inside-out (like a mirror image). The film transparency 21' is prepared from north-up charts, so the image 21P, 214P is likewise generally north-up, and the compass rose 17 that is fixed with respect to the screen 15 is therefore generally correct-reading with respect to the projected chart image. By adjustment of the alignment control 112, the operator can bring the chart image into precisely north-up alignment with the compass rose, as will be explained in detail with reference to FIG. 7 below. These relationships, of course, require stable correct placement of the film in the film mount 22", and of the mount 22" relative to the transport mechanism 130; this requirement is satisfied by the design of the transport mechanism (to be described next) and film mount (FIGS. 8 and 9).

Figure 5:
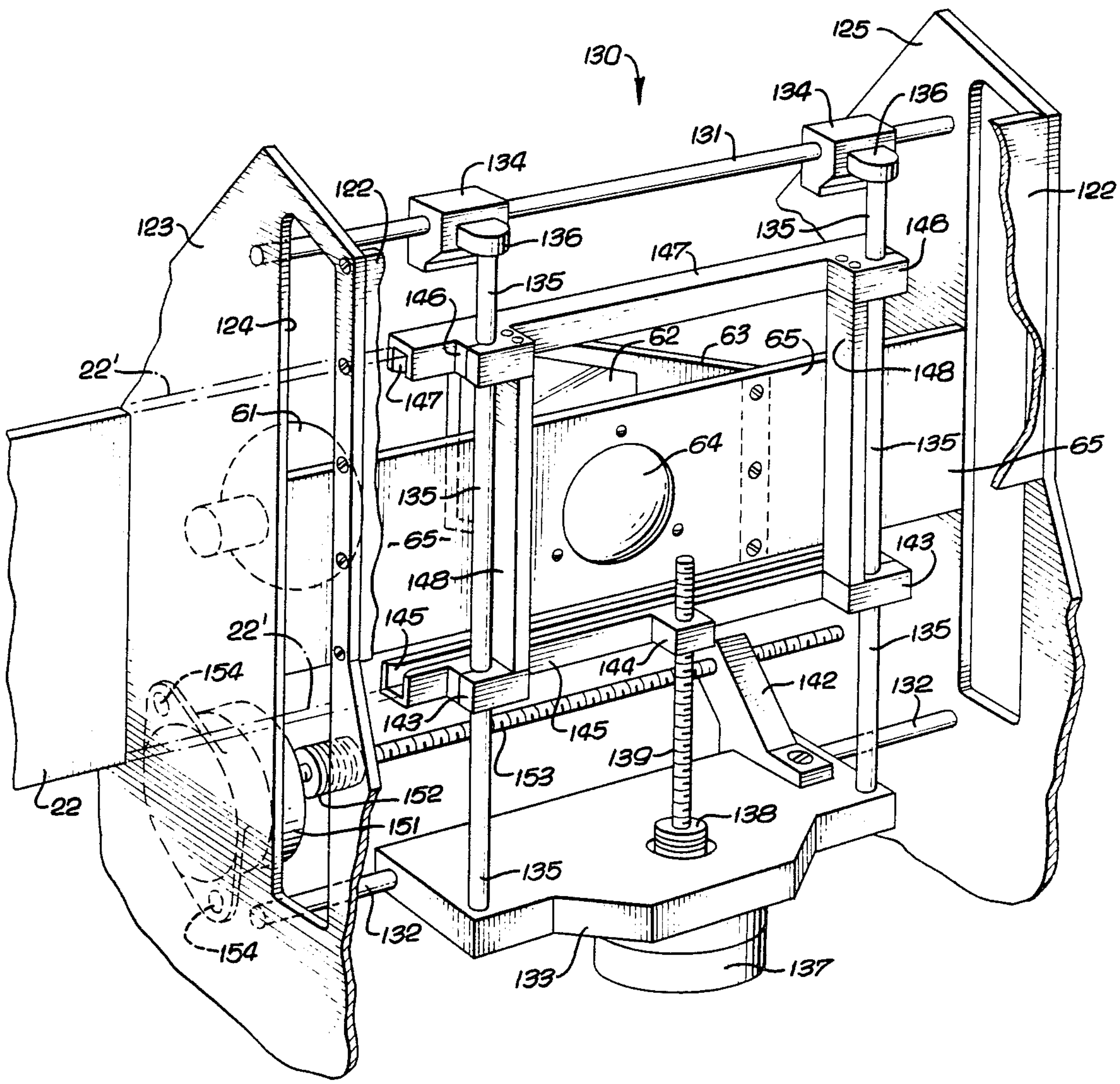
FIG. 5 is a perspective view, partly cut away, showing the map transport mechanism of the FIG. 1 embodiment, viewed from a forty-five degree angle to the vertical (so that the up-and-down tracks of the mechanism appear to be standing vertically while actually being inclined at an angle of approximately forty-five degrees)

FIG. 5 shows the map transport mechanism and certain elements of the optical system, previously mentioned, that are positioned behind and below the transport mechanism—namely, the lamp 61, collector mirror 62, and collimator lens 64. Suspended between the left and right bulkheads 123 and 125 is a heat-absorbing panel and light barrier 65, which in turn supports the collimator lens 64 and an angled, apertured support bracket 63 for collector mirror 62. The lamp 61 is supported by a socket and brackets that are not illustrated. The aperture (not shown) in the support bracket 63 permits heat transmitted by the dichroic collector mirror 62 to escape toward the right end of the case, for dissipation (along with other heat from the lamp) by heat sinks (not illustrated) at the back of the case.

The map transport mechanism 130 is suspended from the bulkheads 123 and 125. Precision rods 131 and 132, accurately parallel and horizontal, are each secured at both ends to the bulkheads. These two rods 131 and 132 form horizontal tracks upon which move the lower carriager block 133 and the upper carriage bearings 134. The block 133 and bearings 134 are all fitted internally with linear ball bearings, for smooth motion along the horizontal rods 132 and 131—which are hardened and ground to function effectively as part of the bearing races. The block 133 and bearings 134, together with all of the components which interconnect them and which they support, may be regarded as the horizontal carriage. Secured to the lower carriage block 133 is a lead-screw follower 142, which is threaded for operative engagement with a precision horizontal lead screw 153.

The horizontal lead screw 153 in turn is coupled at 152 to the drive shaft of a precision stepping motor 151, which is secured at 154 to the left bulkhead 123. The coupling 152 between the motor 151 and the lead screw 153 is of a type which accommodates minor misalignment of the lead screw 153 relative to the horizontal track 132. The order of magnitude of misalignments so accommodated is not such as would introduce binding or significant inaccuracies in map position, but rather is of a substantially smaller magnitude that would interfere with attainment of an absolute minimum of friction reflected back into the operation of the stepping motor 151. It has been found that failure to provide friction relief at this point can sometimes lead to the motor's dropping steps, and thus a cumulative unknown error in map position.

Respective precision rods 135 are each journaled at their lower ends into the horizontal carriage block 133 and at their upper ends into journals 136 that are fixed to the upper carriage bearings 134. Rods 135 are disposed accurately parallel to each other and normal to rods 131 and 132. In practice, rods 135 (and mechanism 130, in general) are inclined at an angle roughly forty-five degrees (45°) from vertical. For simplicity, however, the mechanism is shown in FIG. 5 (and referred to) as vertically disposed. Rods 135 thus form "vertical" tracks upon which moves a vertical carriage (sometimes referred to herein as the "map carriage"), composed of elements numbered 143 through 148.

More particularly the vertical carriage or map carriage is made up of essentially four pieces: an upper (downward-facing) slotted or "U" rail 147, with extensions 146 that carry linear ball bearings for smooth motion along the hardened, precision-ground vertical track rods 135; a lower (upward-facing) slotted or "U" rail 145, with similar extensions 143 that carry linear ball bearings for smooth motion along the track rods 135, and an additional extension 144, precision threaded for operative engagement with a precision vertical lead screw 139; and two vertical spacer bars 148, which interconnect the upper and lower rails 147 and 145 and hold the rails apart at a predetermined distance to accommodate the film mount 22.

The vertical lead screw 139 is coupled at 138 to a precision stepping motor 137, which is mounted to the lower horizontal carriage block 133. Because the travel of the vertical carriage is somewhat less than that of the horizontal carriage, and because the motor 137 that drives the vertical carriage is mounted vertically and so is less likely to shift in position after adjustment, and because that motor 137 is somewhat more readily acessible for shimming adjustment than the horizontal drive motor 151, there is a substantially less severe potentiality for misalignment of the vertical lead screw 139 than the horizontal one 153. Accordingly an ordinary thrust bearing 138 may be adequate for the vertical drive, rather than a coupler of the type described above, and shown at 152, for the horizontal drive.

It should now be apparent that when the map 21 (FIGS. 1, 3 and 4) in its film mount 22 is inserted, as along line of motion 22', into position within the map carriage or vertical carriage 143–148, then suitable precision electrical stepping pulses applied to the motors 154 and 137 will respectively shift the map 21 horizontally and vertically. By virtue of this motion relative to the projection system (FIG. 4)—and particularly relative to the projection lens 71—the displayed map image 21P, 214P is shifted horizontally and vertically relative to the screen 15 and its crosshairs 16.

It should further be clear now that the relationship between (1) the map scale and (2) the angular value of each motor step, as translated by the pitch of the lead screws 139 and 153 into linear motion, establishes a fixed calibration for the system in terms of mapped distance per motor step for any specified latitude. It must be borne in mind, however, that the map scale and therefore this calibration vary with latitude, in accordance with the principles of the Mercator (or other) projection system used in preparation of the chart from which the film transparency 21 is made. This latter variation must therefore be taken into account in the derivation of drive signals to the motors from latitude and longitude data.

Figure 6:
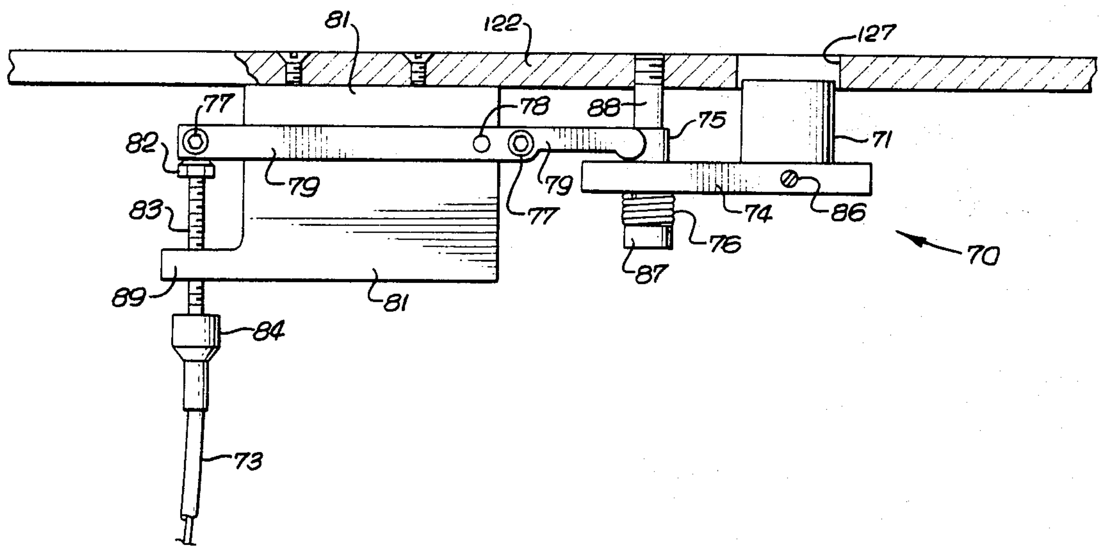
FIG. 6 is an elevation, partly in section and taken along line 6—6 of FIG. 3, of a focusing mechanism used in the FIG. 1 embodiment.

FIG. 6 illustrates the details of the focusing system indicated generally at 70 in FIG. 3. The projection lens 71 is disposed in or adjacent an aperture 127 formed in the forward bulkhead 122 (see FIG. 3 for orientation). Motion of the lens 71 along its longitudinal axis (that is, along the center line of the circular aperture 127) moves the plane of focus of the map image 21P, 214P normal to the plane of the screen 15, thus permitting the map image 21P, 214P to be focused on the screen 15. Such motion is effected by operating control knob 72 (FIG. 3), which in turn via a conventional cable termination (not illustrated) rotates the cable 73 about its own axis. The cable 73 rotates termination 84 (FIG. 6), which in turn is secured to and rotates an adjusting screw 83. The latter is threaded through an extension 89 of the focusing-mechanism mounting block 81, which is firmly fixed to the forward bulkhead 122.

The adjusting screw 83, through a force-transmitting bearing 82 which is rotatably secured to the end of the screw 83, engages one of the crosspins 77 of a dual (see FIG. 3) lever 79. The two arms (one on each side of the mounting block 81) of the dual lever 79 are both pivoted at 78, and forceably engage a lens-support bar 74—to which the projection lens tube 71 is pinned at 86. The lens-support bar has press-fitted within it a bushing 75, which is internally dimensioned for sliding motion upon stud 88. The stud is threaded into the forward bulkhead 122, has a retaining head 87 at the end remote from the bulkhead, and carries a spring 76 between the retaining head 87 and the lens-support bar 74. The spring 76 urges the lens-support bar 74 (and with it the projection lens 71) toward the bulkhead 122 and thus into firm engagement with the level 79.

Thus if the control knob 72 (FIG. 3) is operated in the direction that advances the adjusting screw 83 toward the bulkhead 122, then the lever 79 forces the lens-support bar 74 away from the bulkhead, against the action of the spring 76, and the corresponding motion of the projection lens 71 away from the bulkhead 122 shifts the plane of focus of image 21P, 214P forward relative to the plane of the screen 15. If the control knob 72 is operated in the opposite direction, the consequent removal of force upon the screw-driven end of the lever 79 enables the spring 76 to force the lens 71 toward the bulkhead 122, shifting the plane of focus of the image rearward relative to the plane of the screen.

Figure 7:
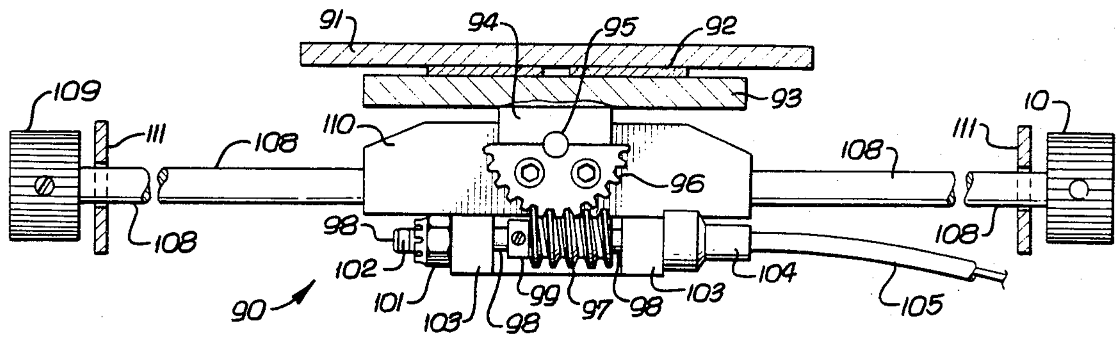
FIG. 7 is an elevation, partly in section and taken along line 7—7 of FIG. 3, of a small "folding mirror" alignment mechanism used in the FIG. 1 embodiment.

FIG. 7 illustrates the details of the alignment mechanism indicated generally at 90 in FIG. 3. The small "folding mirror" 91, discussed earlier, is rotatable in two orthogonal directions by means of this mechanism. The support bar 108 is itself pivotable in brackets 111 by operation of knobs 109, to effect rotation about a horizontal axis that is parallel to the plane of the screen 15. This rotation moves the image 214P, 21P up and down relative to the screen, and so permits adjustment of the image to fill the screen—but more importantly permits bringing the plane of focus of the image 214P, 21P into vertical parallelism with the plane of the screen 15. The rest of the mechanism shown in FIG. 7 is provided to rotate the image on the screen, so as to bring the projected grid lines of the chart into parallelism with the crosshairs on the screen 15.

The mirror 91 is affixed by double-sided tape 92 or equivalent adhesive to a mirror mounting plate 93, which is secured to a mirror yoke 94. The latter is rotatably pinned at 95 to a support block 110, firmly secured to the support rod 108 for rotation with that rod about its own axis as explained in the preceding paragraph. The angle of pivot of the mirror 91, mounting plate 93, and mirror yoke 94 about pivot pin 95 is controlled by the action of worm 97 and worm gear 96, which are in turn manipulated by means of the control knob 112. While the sector worm gear 96 is pinned firmly to the yoke 94, the worm 97 is held rotatably in place relative to the support block 110—by a worm yoke 103 (see also in FIG. 3). The worm is pinned at 99 to a shaft 98 that is formed integrally with a cable termination 104, and rotatably secured to the worm yoke 103 by means of the larger diameter of the cable termination 104 at the right of the yoke and a self-locking nut 101 threaded onto threads 102 formed in the shaft 98 at the left of the yoke.

If the control knob 112 is rotated clockwise, it operates through a conventional cable termination (not illustrated) to rotate the cable 105, which in turn rotates the cable termination 104 upon whose shaft the worm is pinned. The worm has, as drawn, a right-handed thread, and accordingly rotates in such a direction that the thread pattern shifts rightward in FIG. 7, rotating the sector worm gear 96 counterclockwise in FIG. 7. By reference to FIGS. 4, 6 and 7 it may be seen that this rotation causes the right side of the small "folding mirror" 91 to dip, and the left side to rise.

This clockwise (as viewed from the front of the apparatus) rotational motion of the mirror 91 in turn has three effects. The effect for which the control is provided is to rotate or "twist" the projected beam at 216 and 217 (FIG. 4), and thus rotate the image 21P, 214P counterclockwise on the screen. The three effects are as follows.

Clockwise rotation of the mirror 91 shifts the projected beam at 216 and 217 (FIG. 4) leftward on the large "folding mirror" 119 and on the screen 15. Thus clockwise rotation of the control knob (1) moves the image to the left on the screen, and moreover (2) foreshortens the optical path for that part of the projected beam that reaches the right side of the screen while lengthening the path to the left side of the screen. These alterations in path length within the case 11 cause the horizontal dimension of the plane of focus of the image 21P, 214P to be rotated clockwise about the vertical crosshair on the screen—moving the plane of focus forward (toward the operator) along the right side of the screen and rearward (toward the inside of the case 11) along the left side. This defocusing of the image along the left and right edges of the screen is generally—given the limited "travel" of the alignment mechanism 90—imperceptible.

The leftward shifting of the beam, however, is greater at the edge of the mirror 91 that is closer to the projection lens 71, where the mirror has greater optical-path "leverage," than at the edge of the mirror 91 that is closer to the screen 15. Therefore, (3) the upper part of the image on the screen moves further to the left than the lower part, and this differential effect appears as a counterclockwise rotation of the image on the screen.

Conversely, counterclockwise rotation of the control knob 112 of course (1) shifts the image to the right, (2) rotates the plane of focus counterclockwise about the vertical crosshair, and (3) differentially rotates the image clockwise on the screen.

Since the image rotation on the screen is a differential effect, however, adverse effects upon the left-right alignment of the image on the screen, and upon the horizontal parallelism of the focal plane with the screen plane will result if the vertical grid lines on the film map as installed in the apparatus are not very close to parallelism with the vertical crosshair on the screen. As suggested earlier, these adverse effects can be kept insignificant by limiting the travel of the alignment mechanism 90. This seeming solution, however, is illusory—for it may only result in a range of adjustment that is too small to compensate for rotational misalignment of the film map relative to the apparatus. The foregoing discussion serves to highlight the importance of providing a film mount that facilitates alignment of the film transparency in the apparatus in an orientation very close to the nominal one—that is, very close to north-up.

FIGS. 8 and 9 show the film transparency map or chart 21 in conjunction with a custom mount that is designed to permit firm, reproducible location of the map in the map carriage 143–148 (FIG. 5), at very close to the nominal north-up orientation, while protecting the film from damage and promoting its dimensional stability. It will be understood that motion of any part of the film relative to the map carriage 143–148 will produce a positional error that can be very significant in terms of corresponding distance on the earth's surface—the relationship, of course, being determined by the effective map scale on the film.

The effective scale on the film is some fourteen times smaller than the scale at the screen display—which is slightly larger than the scale marked on the original chart from which the film was made. Hence a chart drawn to show a nautical mile as four inches will, when reduced to film, show a nautical mile as about a third of an inch; a positional error of only one hundredth of an inch at the film consequently would correspond, for such a chart, to nearly a thirtieth of a nautical mile, or some sixty yards. Such error sources can of course be minimized by use of large-scale charts when maneuvering in close quarters relative to shoals, narrow channel limits, and so forth. The point nonetheless remains that successful practice of the subject invention requires careful steps to minimize dimensional instability and gross motion of the film-transparency chart after the chart has been positioned in the apparatus and the apparatus has been "informed" of the chart position (as will be described in subsection 4, below).

Some precaution along these lines is represented by the heat-barrier plate 65 (FIG. 5), previously mentioned, which helps retard heating of the film by the lamp 61. Another precaution must reside in the selection of film that not only has good color fidelity and microfiche quality capability as to high resolution, but also is of the utmost high quality in dimensional stability— particularly relative to temperature change. A third group of precautions is embodied in the design of the film mount 22 (FIGS. 8 and 9).

The film mount 22 is made up of two identical molded-plastic panels 22A and 22B. Also part of the assembly, in addition to the film transparency 21 itself, are two protective glass sheets 227. The latter must be strong and of good optical quality. The plastic panels 22A and 22B are shown from opposite sides in FIG. 8, and since they are identical the details of both sides of both panels may be gleaned from this single exploded view, with some additional clarity as to their interconnection added by FIG. 9.

The two plastic panels 22A and 22B are hinged together at the right end (as drawn), each panel carrying a hinge pin 23A, 23B, and a linear hinge hook 24A, 24B. The hinge pin 23A of the nearer plastic panel (as drawn) 22A engages the linear hook 24B of the rearward panel 22B, as illustrated at the right end of FIG. 9. At the same time the hinge pin 23B of the rearward panel 22B engages the linear hook 24A of the forward panel 22A, and the two panels may then be brought together by rotation upon these hinges to the parallel relationship shown in FIG. 9. In this relationship the hook 25A of the nearer panel 22A engages the lip 226B formed in the notch 26B of the rearward panel 22B. Likewise the hook 25B of the rearward panel 22B engages the lip 226A formed in the notch 26A of the nearer panel 22A, and the two hooks and lips thus hold the panels firmly together.

Pins such as 222B projecting from the forward face of the rearward panel 22B fit into mating holes (not visible, but similar to those shown at 228B) in the nearer panel 22A, to minimize torsional distortion of the assembled mount. Similarly pins (not visible, but similar to those shown at 222B) projecting from the rear face of the forward panel fit into mating holes 228B in the rearward panel. Apertures 229A and 299B are finger holes facilitating application of force to separate the two panels 22A and 22B when disassembly is desired—as, for example, to change charts while reusing a particular mount.

The aperture or sight of the mount 22 is defined by aligned cutout edges 27A and 27B, through which shows the entire useful projectable area of the chart. Relieved areas 29B (and similar areas not visible on the backside of the nearer panel 22A in FIG. 8, but shown at 29A in FIG. 9) serve to accommodate cement used to secure the one-millimeter glass sheets 227 to the panels 22A and 22B. The dams 28B (and 28A in FIG. 9) prevent the cement, before it has solidified, from oozing out onto the "sight" portion of the glass. The relieved areas 29B, 29A also tend to accommodate any burrs, or other defects that may be present or may develop through accidents of handing, along the outer edges of the glass sheets.

The relieved areas 29B, 29A are sized to allow at most a very minimal rotational misalignment of the film map 21 relative to the mount panels 22B and 22A. In addition, the overall height of the panels 22B and 22A is controlled so that the flanges 223 slide smoothly into the channels or slots formed in rails 145 and 147 of the map carriage 143–148 (FIG. 5)—but with an absolute minimum of vertical play. These two constraints together ensure that rotational misalignment of the film relative to the optical system will neither exceed the adjustment range of the alignment control 112, nor require such a large adjustment range as to permit the adverse optical effects mentioned earlier to become significant.

Small bosses 224, projecting outward from the flanges 223, provide a snug but sliding press fit against the mating inner slot surfaces of the rails 145 and 147. Because of their small size the bosses 224 are slightly deformable—decreasing in their "height" by expanding slightly in their "width"—in response to pressure from the mating slot surfaces. This deformation provides a press fit that remains snug over many repeated insertions and removals.

This latter feature ensures that the map once inserted into the transport mechanism will not shift during operation. Such a precaution is crucial to maintaining "calibration" of the apparatus to the map—that is, correspondence between the fixed registration points on the film and the stepping-system step numbers identified with those registration points when the map is inserted into the mechanism. (This calibration process is described in subsection 4, "Operation," below.)

3. ELECTRONICS

FIG. 10 illustrates the overall scheme of operation of the preferred embodiment of the present invention, in its interaction with other equipments (ouside the dashed boundary 270) as well as its internal functioning. "Input" devices and stages are arrayed along the left side of the drawing, both inside and outside the boundary 270 of the self-contained unit, and "output" devices and stages are arrayed along the right side of the drawing, both inside and outside that boundary 270.

It will be helpful to understand from the outset, however, that toward the central areas of the drawing it is progressively more difficult to make meaningful characterizations of the operating modules as "input" or "output." Rather, as is the case with most modern modular self-managing electronic systems, the hardware simply establishes usable channels of communication (such as bus 278 of FIG. 10) between the several modules. One or more of the hardware modules are impressed with an operating protocol (i.e., "program"), under which these modules control themselves and other units to transfer information and directives among themselves, along the established channels, as required. These transfers of information and directives flow in multiple directions and according to multiple patterns that constantly shift during operation of the apparatus.

In fact, even as to some of the devices that are customarily thought of as clearly "input" or "output" in character, such as a Power Control & Monitoring Module 289 within the subject apparatus, or an autopilot 263 outside the apparatus, feedback paths of various kinds exist. Such feedback paths may be purposely provided, as for example the power-shutdown path 305 that controls the Power Module 289 in event of various kinds of improper operating circumstance, or a return signal (not illustrated) from the autopilot 263 to the subject apparatus to acknowledge completion of a commanded operation.

Some feedback paths are present that are not "purposely provided" but rather are inherent in the character of the system. For example, a human operator who reads the "output" devices, such as the alphanumeric display 272 or chart display 306, and manipulates the keys at 271 and the ship's wheelhouse controls, directly exerts an effect upon the fundamental navigating parameters that are measured by the "input devices," namely the speed log 251, compass 252, or Loran-C receiver 253—or even upon ship's power supply 254. The same is true of an autopilot 263 responding to electrical signals at 303 and automatically manipulating ship's rudder 264 through mechanical connection 304.

Preeminent among the input devices is a Keyboard Module 271, which corresponds to the keys 32 through 52 (FIG. 2) on the control panel 14, discussed earlier in subsection 1, "External Features." Information from the Keyboard Module 271 passes at 286 (actually via the Display Module 272, but without any signal processing in that module) to the Slave Processor Module 273.

With the exception of the ship's power supply 254 connected at 284 to energize the invention apparatus 270, all of the external devices 251, 252, 253, 261, 262, 263 are optional; the invention apparatus functions very satisfactorily without them. Addition of these "input" and "output" devices, however, greatly diminishes the amount of data to be estimated and/or manually entered, as well as the amount of data to be manually recorded—and implemented through manual control of the craft. Beyond the convenience factors, addition of a Loran receiver increases both the accuracy with which "course over ground" can be determined and (through interaction of DR and Loran computations as previously mentioned) the accuracy of calculated "course to steer."

If a speed log 251 is present and is a paddlewheel or equivalent type, and if a compass 252 is present and is a magnetic type, their respective signal lines 281 and 282 may be connected as at 281B and 282B directly to the Input/Output Module 277 within the apparatus. That module, as will be seen from FIGS. 16A and 16B, includes circuits for suitable processing of such signals. If the speed log 251 is a Doppler or electromechanical type, however, it must be connected instead at 281A to a separate Speed Log and Gyrocompass Interface 275, which supplies the special circuitry for processing signals from such speed-log types; and similarly if the compass 252 is a gyroscopic type it must be connected at 282A to such a special interface 275. In such instances the interface 275 passes the preprocessed signal(s) on at 287 to the bus 278 mentioned earlier, from which the necessary information can be picked off by any of the primary information-handling modules 279, 273, 277.

The allocation of interfacing circuitry as between the Input/Output Module 277 and the separate Speed Log and Gyrocompass Interface 275 is a mere matter of engineering convenience and choice. The configuration illustrated reflects the particular balance of conveniences and choices adopted in my preferred embodiment of the invention.

Signals from a Loran receiver 253, if present are applied at 283 to a Loran Interface module 274, which is designed in such a way that it can be quickly configured for virtually any make and model of Loran receiver. Over three dozen types of Loran receiver are now commercially available, and the interface 274 advantageously accommodates as many as possible of these different types. The interface selects from the time-difference (TD) signals made available by the receiver 253 those two signals that provide the best position-fix accuracy, sorts out various other data provided by the receiver 253, and converts the conventional sequential data format of the signal 283 to a parallel format for application at 288 to the bus 278. (In some Loran receivers data is available in parallel format, and the interface is simply configured to omit this step.)

Another device that may be regarded as an "input" device, although it is typically passive after initial installation of the apparatus 270 in a particular craft, is the so-called Personality Module 276. This device adapts the entire operation of the apparatus 270 to the "personality"—that is, operating region, type of speed log, etc.—of the craft in which it is installed. If a particular craft periodically moves from one operating region to another, then more than one corresponding Personality Module can be obtained, and easily interchanged in the apparatus as required.

Ship's power supply 254 provides electricity at 284 to the preferred embodiment 270. The power provided at 284 first enters a Power Control & Monitoring Module 289. This module permits switching the power to the rest of the apparatus (at 291) on and off by touch-type keys 51 and 52 (FIG. 2). Control signals from these keys and associated low-level logic circuitry are fed back at 305 to control the module 289. The signals at 305 also incorporate decision making within the Input/Output Module 277, by circuits that sense destructively high or low levels of the voltage supplied from ship's power 254. Thus the Power Control & Monitoring Module 289 also operates to interrupt power to the apparatus when necessary to prevent damage to the equipment or loss of stored information.

On the output side is the Alphanumeric Display Module 272, whose function is to illuminate the displays 31 (FIG. 2) and all of the lights, similar to 32', in the upper left-hand corners of the keys 32 through 52 (FIG. 2), based on specific instructions received at 294 from the Slave Processor Module 273. Also in the output column are the stepper motors (137, 151 (FIG. 5), which by respective mechanical connections 297 and 298 operate the rest of the visual chart-display system previously discussed in subsection 2, Mechanics and Optics, and here designated very generally at 306.

Optional external devices include two whose purpose is to produce permanent records of location and other operating parameters—a chart recorder 261, receiving x- and y-drive signals respectively at 299 and 301 from the preferred-embodiment apparatus 270; and a logging printer 262, receiving data at 302 from the apparatus 270. It would normally be contemplated that a particular section of chart corresponding to the area of travel would be fixed in the recorder—or would be understood to correspond to a piece of blank recording paper in the recorder—and the x-y recording mechanism of the recorder would make a permanent record of the craft's travel on a particular journey through that area. Similarly a logging printer can be useful in preparing a permanent ship's log addendum showing position, heading, speed, set and drift if desired, and possibly other parameters, for a multiplicity of times during a trip.

The function of the optional autopilot 263 is apparent, but it should be noted that when such a device is present and interconnected for control at 303 by the subject apparatus 270, there is a conceptually and significantly different result. Under these circumstances the computations and information-handling procedures carried on by the apparatus 270 directly control the gross physical position of the entire craft, its speed, heading, and "future history"—and those of all the people and goods aboard.

The allocation of functions of the remaining three modules 279, 273, 277 within the apparatus 270 is difficult to discuss meaningfully in the abstract—partially because the separation of functions as between these modules is not truly conceptual but to a degree arbitrary, being dictated in part by space limitations on various circuit boards, and like considerations. Moreover, as between the various modules certain functions may be regarded as split up, with "higher-level" portions of a given function occurring in one place, "lower-level" portions of the same function in another place, and "intermediate-level" portions of the same function in yet a third place. A very general introduction to the allocation of functions in these three modules will, however, be offered.

The Master Processor Module 279 generally manages the operation of the entire system, calling up the various functions of the many components within itself and in the other modules at the appropriate times. The Master Processor Module 279 also organizes the reaction of the entire system to demands for system "attention" created externally—as, for example, by operator commands at the Keyboard Module 271, or by drastic changes in voltage at 284 from the ship's power 254. The Master Processor Module 279 also contains most of the generalized memory banks in the apparatus 270, storing both the general system program and the necessary data for its implementation.

The Slave Processor Module 273 performs more specialized, repetitive tasks of interpretation and interfacing—but tasks still complex enough to require the power of a programmable microprocessor unit. Module 273 decodes the entries made at the Keyboard Module 271 and formats the decoded information for use by the various modules 279, 273, 277. The Slave Processor Module 273 also performs a similar function for speed-log and compass data, converting (where necessary) serially presented data to parallel data and reformatting the data for use throughout the system. Module 273 also contains a continuously operating "calendar clock," providing the system 270 with all necessary time data. Slave Processor Module 273 itself manages the reading of the calendar clock, performing decoding and reformatting functions analogous to those it performs for the keyboard, speed log and compass.

On the output side the Slave Processor Module 273 also sorts out, organizes and formats data for display in the Alphanumeric Display Module 272. The Slave Processor Module 273 also manages the operation of stepper motors 137 and 151, translating between the stepping-system position information (in terms of step count) manipulated within the Master Processor Module 279, and the actual serially presented stepping pulses at 295 and 296. The Slave Processor Module 273 performs this function even when the stepper motors are directed manually through the entry of commands at the Keyboard Module 271. It is the Master Processor Module, however, which deals with the relationships among the Mercator (or other) projection function, the map scale, and the present position of the map carriage.

The Input/Output Module 277 performs interfacing tasks of a lower order than those handled by the master and slave processors: voltage and impedance transformations (as, for example, to generate the higher-power signals 295 and 296 required to operate the stepper motors 137 and 151), analog-to-digital transformations (as for the sensing of overvoltage and undervoltage in the ship's power at 291, and the input of signals at 281B from a paddlewheel-type ship's log 251), low-level logic buffering, and some intermodule connections that require no signal processing at all.

Indicated generally at 278 are the composite of a Bus Module (illustrated in FIG. 17) with a data bus that consists essentially of cabling between and within the various modules as indicated. A few active circuit components have been placed on the Bus Module—a warning buzzer and its power circuit, a five-to-twelve-volt DC-to-DC converter, and others that will be mentioned later. FIGS. 11A and 11B show a suitable Keyboard Module (271 in FIG. 10 cooperating with control panel 14 in FIG. 2). As can be seen, Keyboard Module 271 comprises switch closures (32–49, 51, 52, 1102–1108) and cable connections. The switch closures are all provided in the form of touch-type normally-open "keys," disposed, e.g., in control panel 14 (FIG. 2), and the cable connections are all through a common cable to the Display Module (FIG. 12, and 272 in FIG. 10).

The keys are nominally divided in two groups: "individual" keys and a keyboard array. Respective "individual" keys are depicted in FIG. 11A, some (e.g., key 38) having individual connections at both sides of the switch closure, and some (e.g., keys 43) being wired in groups of two or four to a common point at one side of the switch but having separate individual lines at the other side. Twenty-six keys (32–37, 39–42, 44–49) are disposed in an eight-column, four-row array, as shown in FIG. 11B. All the keys in each row of the array have one side wired to a common terminal for that row, and all the keys in each column have the other side wired to a common connector terminal for that column. By this means all twenty-six keys in the array are wired through only twelve connector pins—the sorting out of the information from the keys being performed, of course by logic elements elsewhere in the system.

FIGS. 12A, 12B, 12C and 12D show the details of the Display Module, corresponding generally to the Alphanumeric Display Module 272 of FIG. 10 but also incorporating certain other elements to be desribed.

Figure 12A:
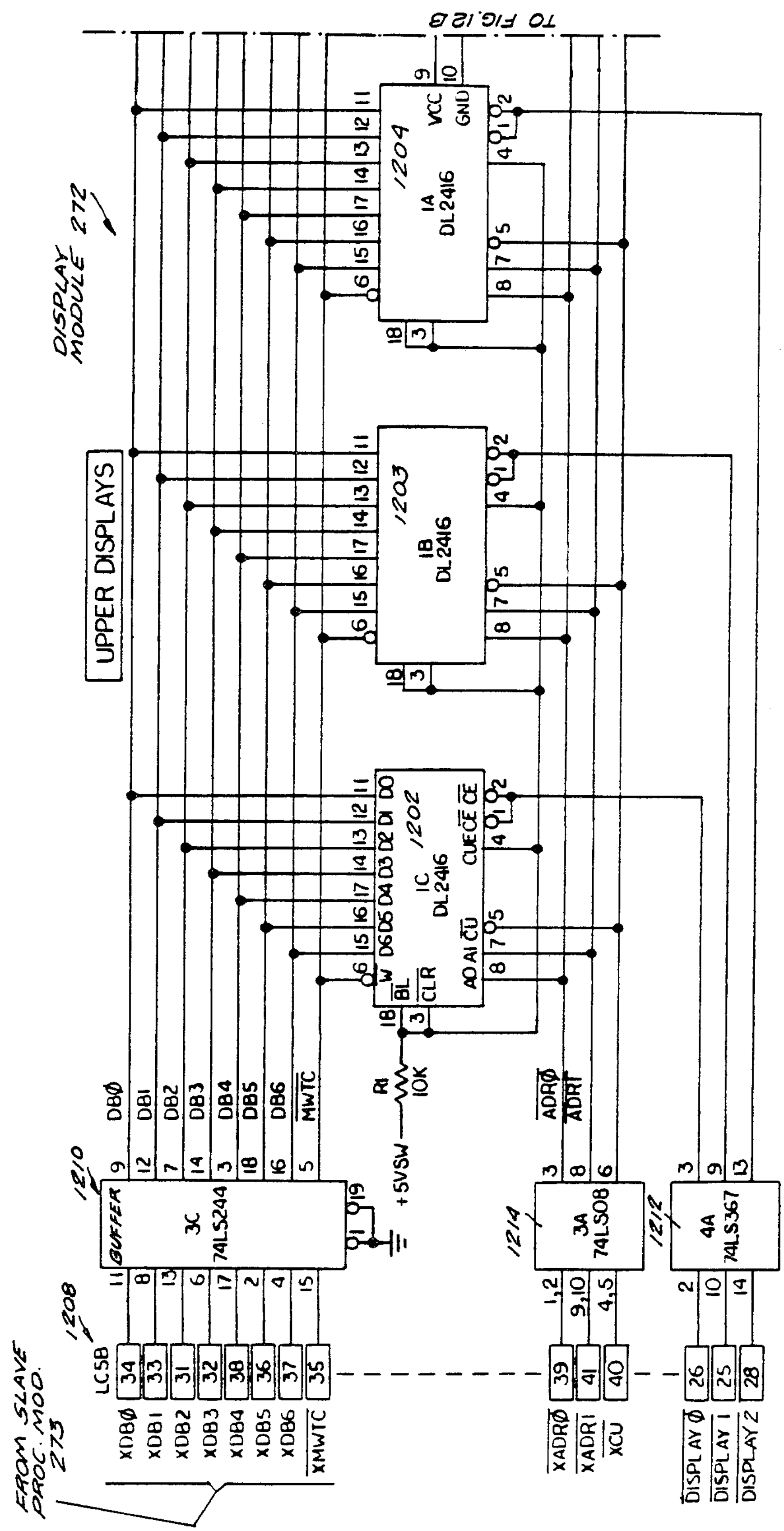

Referring now to FIGS. 12A and 12B, the LED displays 31 (FIG. 2) and closely associated circuitry will be described. Respective convention display driver circuits, 1202–1207, such as, e.g., DL2416 display units, each provides four display digits, and include the logic circuits to translate binary information into an alphanumeric character for those four places. In other words, the display units 1202–1207 are of the so-called "intelligent display" type. Thus DL2416 units 1202–1204 make up the upper one of the two displays 31 (FIG. 2, and DL2416 units 1205–1207 make up the lower one of the twodisplays 31—each with twelve characters.

Binary data is provided from the Slave Processor Module 273 (FIG. 10) through a connector 1208 (e.g., a LC5B connector) to a suitable buffer and line driver unit (such as an 74LS244), and are applied to all six DL2416 display units 1202–1207 in parallel. Only one of the DL2416 character of only one display units 1202–1207, however, responds to any given binary data group. This selection is made on the basis of control information from the Slave Processor Unit 273. A first set of control signals from Slave Processor Module 273 is provided, in binary form, on the six "DISPLAY" signal lines (pins 25 through 30), indicating which display unit 1202–1207 is to be actuated to accept data, is applied to two display-select decoder Buffer Units 1212–1213. Display select buffers 1212 and 1213 suitably comprise conventional hex buffer integrated circuit chips (ICs), such as 74LS367 integrated circuits. The two decoders 1212, 1213 provide high-low actuating signals to pins 1 and 2 of each display unit 1202–1207. A second set of control signals, provided at pins 39, 40 and 41 of connector LC5B to a suitable decoder 1214 indicate which character position is to be actuated. Decoder 1214 suitably comprises a 74LS08 quad 2-input AND gate integrated circuit.

Figure 12C:
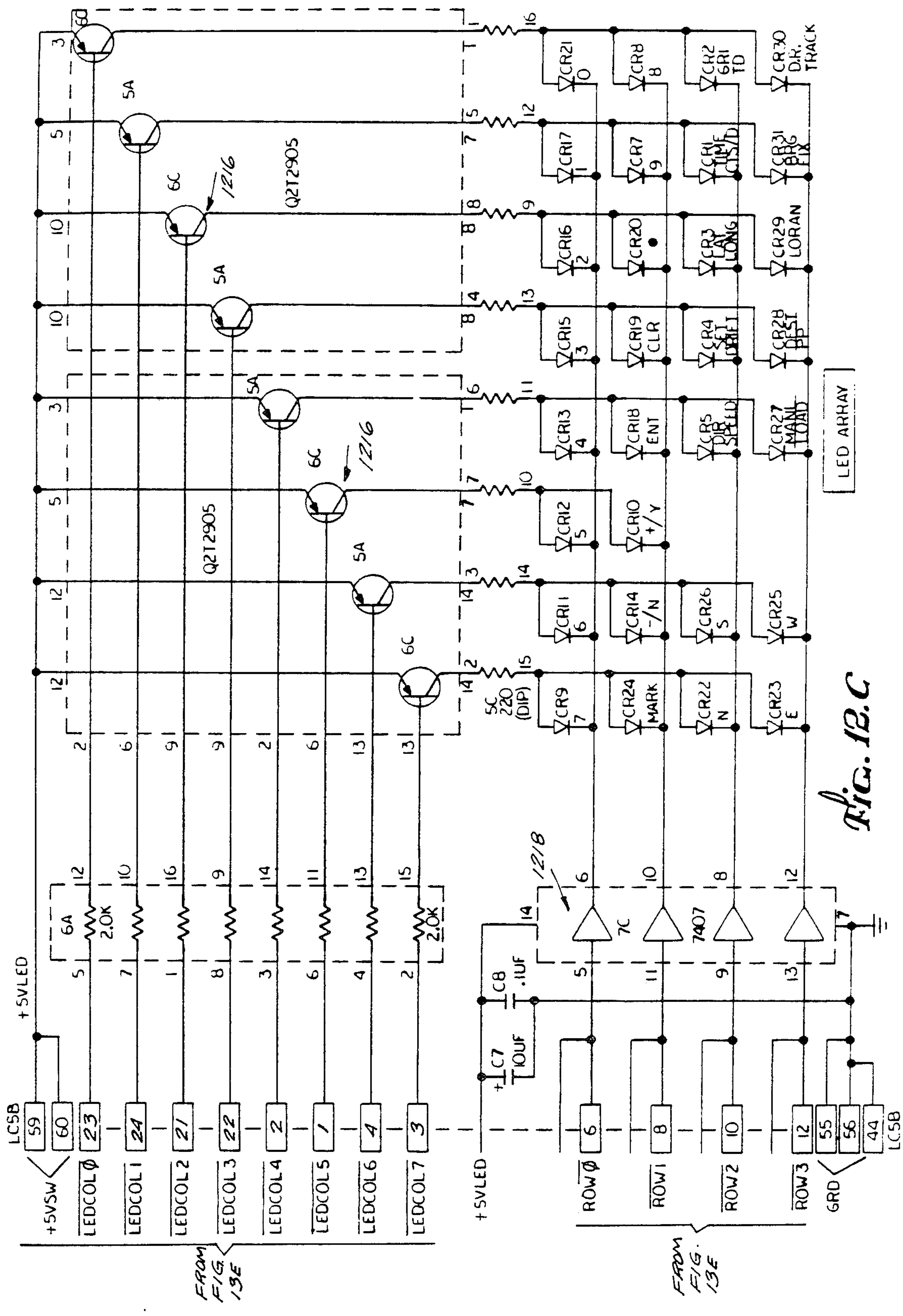

Referring now to FIGS. 12C and 12D, light-emitting diodes 6, 32, 33 (FIG. 12D) and CR1–CR30 (FIG. 12C), which provide the small indicator lights, such as 32' (FIG. 2), in the upper left-hand corners of the keys 32 through 52. LEDs 6, 32 and 33 are treated as "discrete'-'—though they are operated from a common five-volt supply—and the other thirty-one LEDs (RR1–CR30) are actuated in an array (lower left) analogous to the keyboard array discussed earlier. All the LEDs in each column of the array have their positive sides connected to a respective common power switch 1216 for that column (suitably one transistor in respective quad-switching units Q2T2905). Similarly, all of the LEDs in each row have their negative sides connected to a respective common switching buffer 1218 for that row (suitably comprised of four-channel buffer unit 7407). The column and row drivers 1216 and 1218 are of course in turn actuated by logic elements—to be described—in the Slave Processor Module.

With reference now to FIG. 12, respective through-connections between the Keyboard Module 271 (LC7A connector 1250) and the Slave Processor Module 273 (LC5B connector 1252), are provided.

Figure 13B:
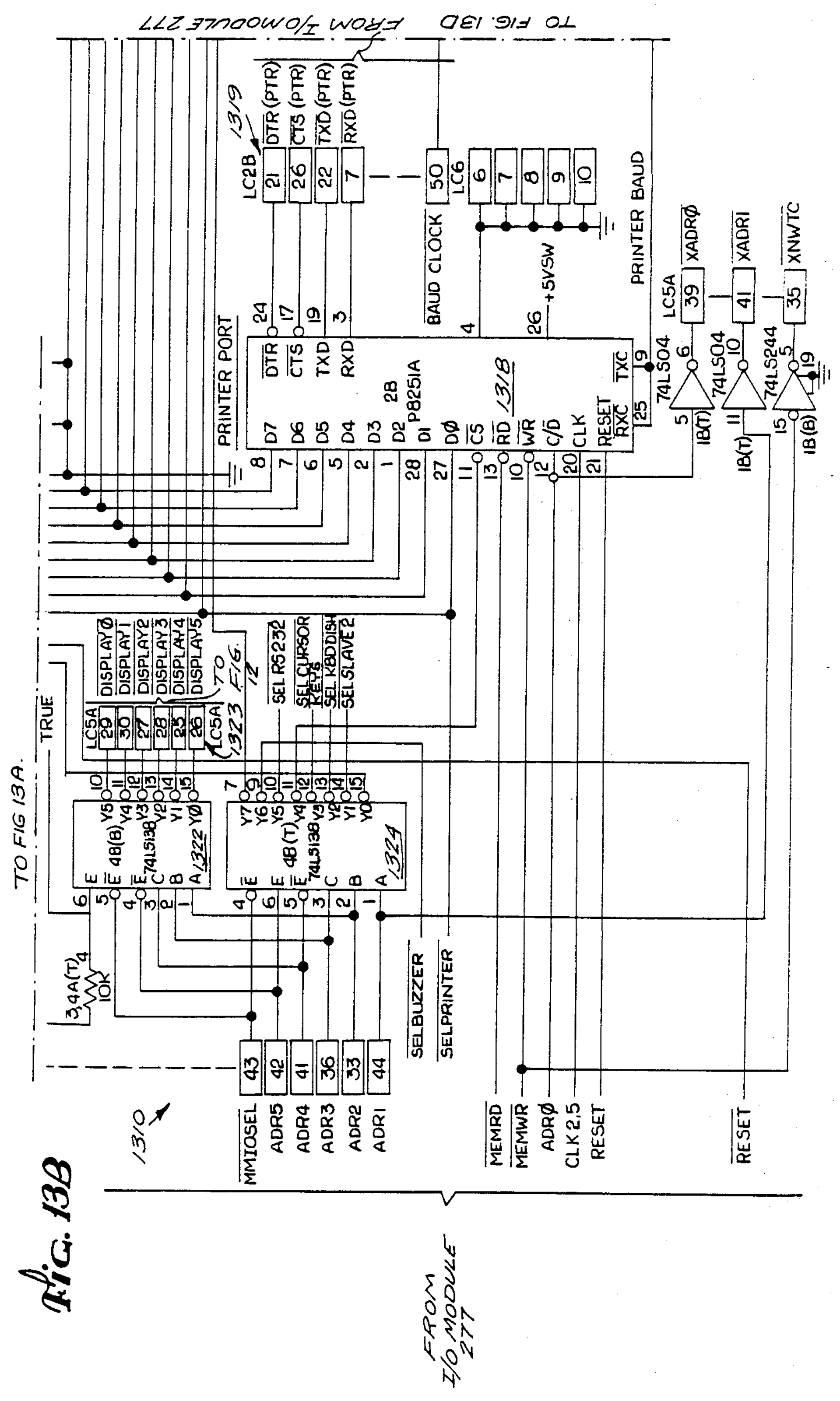

FIGS. 13A–13J show the details of the Slave Processor Module, 273 in FIG. 10. Referring now to FIGS. 13A and 13B, the inputs from the Keyboard Module 271 and data and address outputs to the Display Module 272 just discussed appear at the pins of respective connectors 1302 (FIG. 13A) and 1304, respectively. Connectors 1302 and 1304 suitably comprise a LC5A connector, connector 1304, in turn, variously effects connections to a buffer unit 1306 (suitably a 74LS244), and a suitable decoder unit 1308, such as a P8279.

Buffer 1306 and decoder 1308 are connected to data BUS278. BUS278 is comprised of lines DB0 through DB7, which form an eight-wire data and command bus that runs throughout the Slave Processor Module 273 and is cabled to other modules in the system. Within certain other parts of the system this data bus becomes part of a sixteen-line bus. As previously noted, information on the bus is simply presented to each of the several processors, decoders and the like in parallel, and separate address or command lines provide the directives to those same components—indicating which components units should use (or emit) information on the data lines, and when.

As can be seen here, however, the same eight lines DB0 through DB7 that carry data as such to the buffer 1306 for transmission to the "intelligent displays," 1202–1207 (FIGS. 12A, 12B) and from the decoder 1308, upon entry of data at the keyboard 271, also double as control lines to the decoder 1308, for selection of the LEDs and displays to be actuated. Due to such complexities it is not feasible to trace the information to and from the decoder 1308 completely, but a conceptual tracing can be suggested here, and more complete information is embedded in the programming section that follows (subsection 5).

Control of the decoder 1308 is provided by control signals applied it at pins 10, 11, 22, 21, 3, and 9—signals that are part of a control bus which enters (from the Input/Output Module 277) at connector 1310, such as an LC2B (FIGS. 13A, 31B), and which is applied to various other components, in parallel with the decoder, to ensure that those components will all operate in synchronism to perform the various indicated functions, such as reading or writing to memory, selecting a particular keyboard display, and so forth.

Figure 13C:
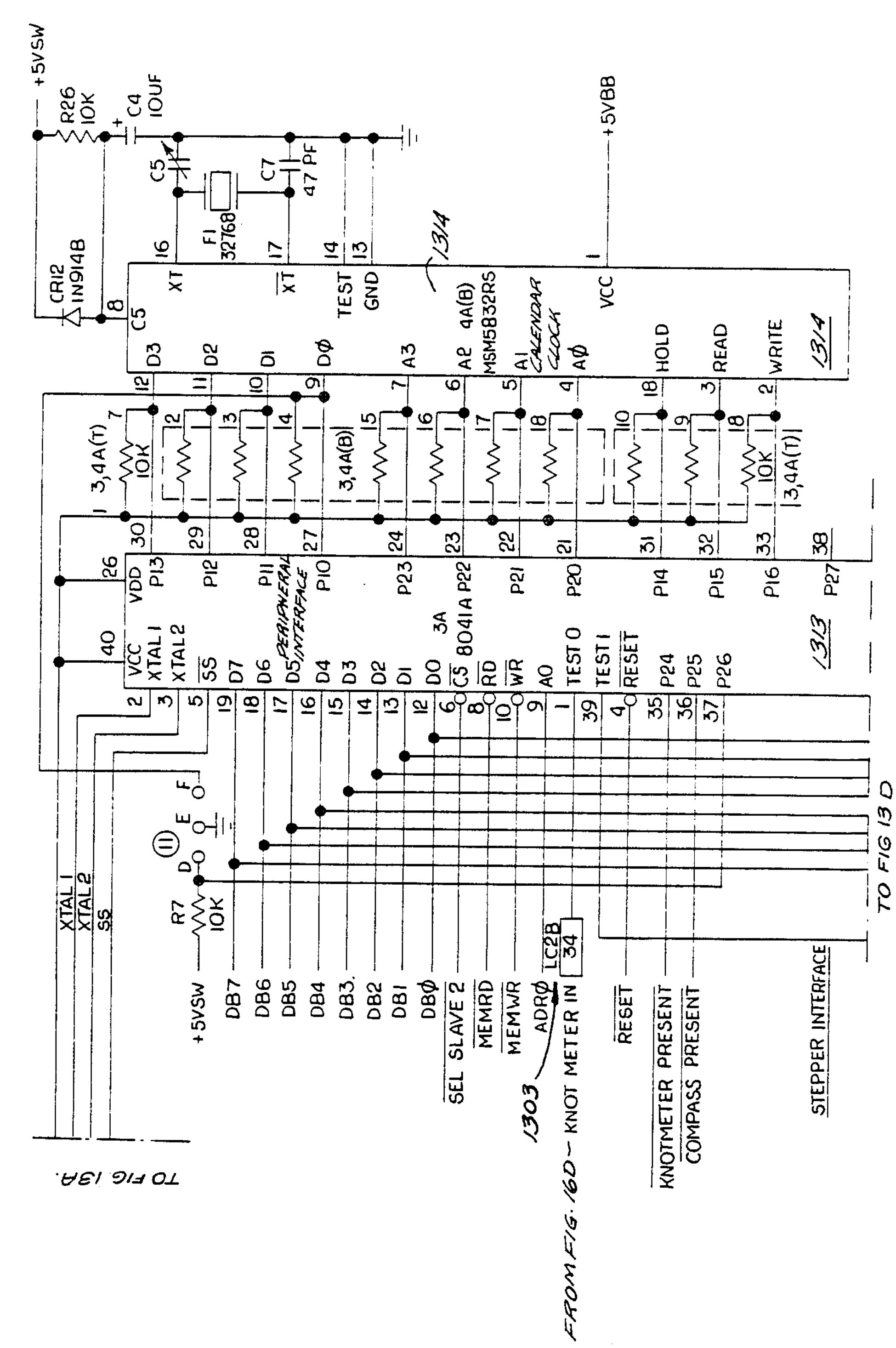

Referring to FIGS. 13A, 13B and 13C, Slave processor Module 273, includes two slave processor units, 1312 (FIG. 13A) and 1313 (FIG. 13C). Slave processor units 1312 and 1313, suitably comprise universal peripheral interface integrated circuits (IC) such as 8041A ICs. Processor 1312 is utilized to control stepper motors 137 and 151 (FIGS. 5 and 10), and the processor 1313 is used to control the decoder 1308 and buffer 1306, to receive and send data and control signals from and to the keyboard (271) and display (272) units as just described.

Slave processor 1313 controls the formatting and the timing of incoming and outgoing data, fitting the information transfers into the overall schedule of uses of the data bus. A clock calendar IC1314, suitably a MSM5832RS (FIG. 13C) is held to a fixed time base by a 32,768 kHz crystal F1 calendar IC1314. The calendar emits serial clock pulses that are received by slave processor 1313, which accumulates and interprets the clock signal to develop usable time data for the overall system operation. Slave processor 1313 also receives serial data from the compass 252 (FIG. 10) and speed leg 251, generally via the Input/Output Module 277, and accumulates and interprets these data to present speed and heading values to the data bus for use in the Master Processor Module 279.

Figure 13D:
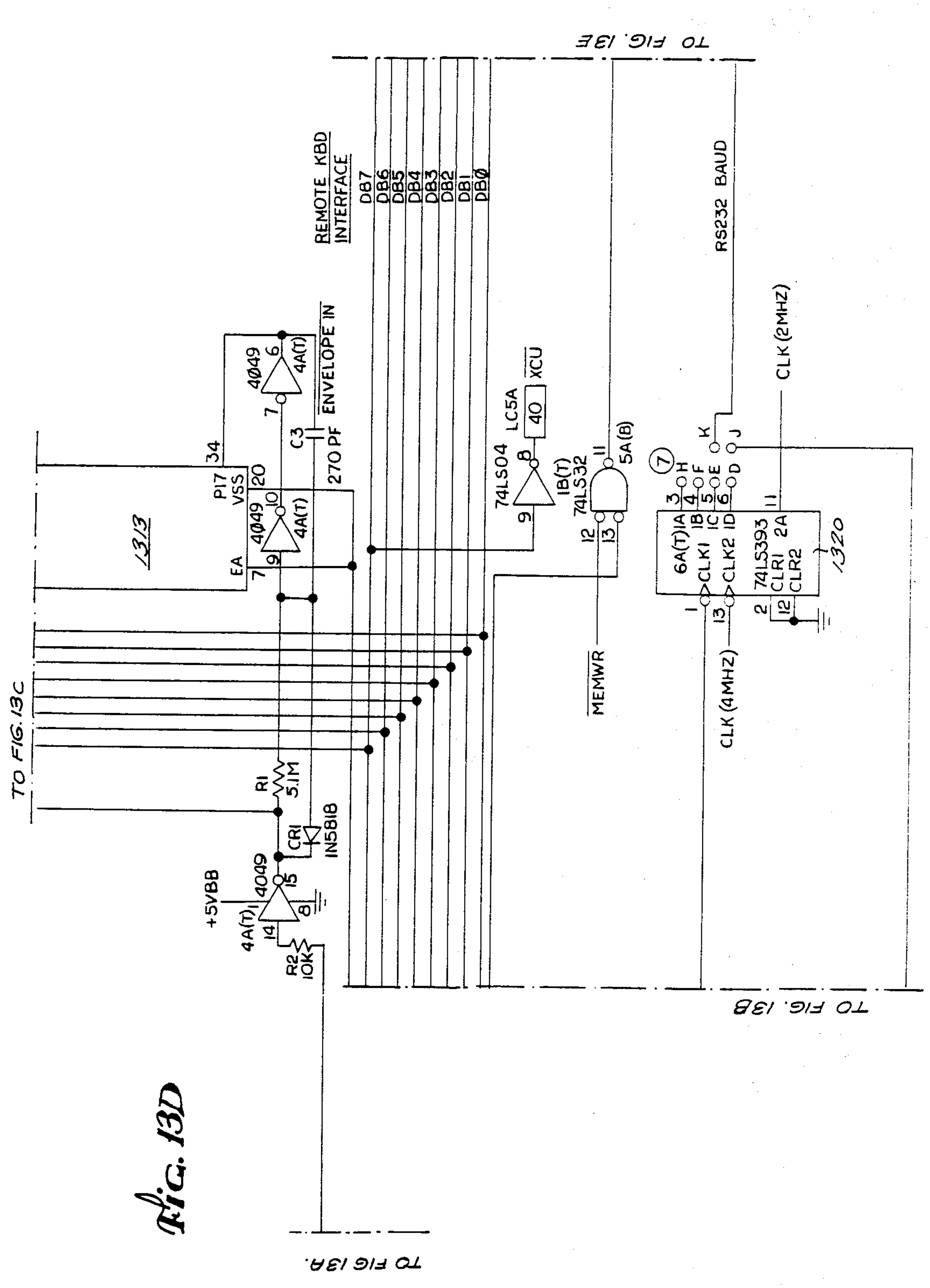
Figure 13E:
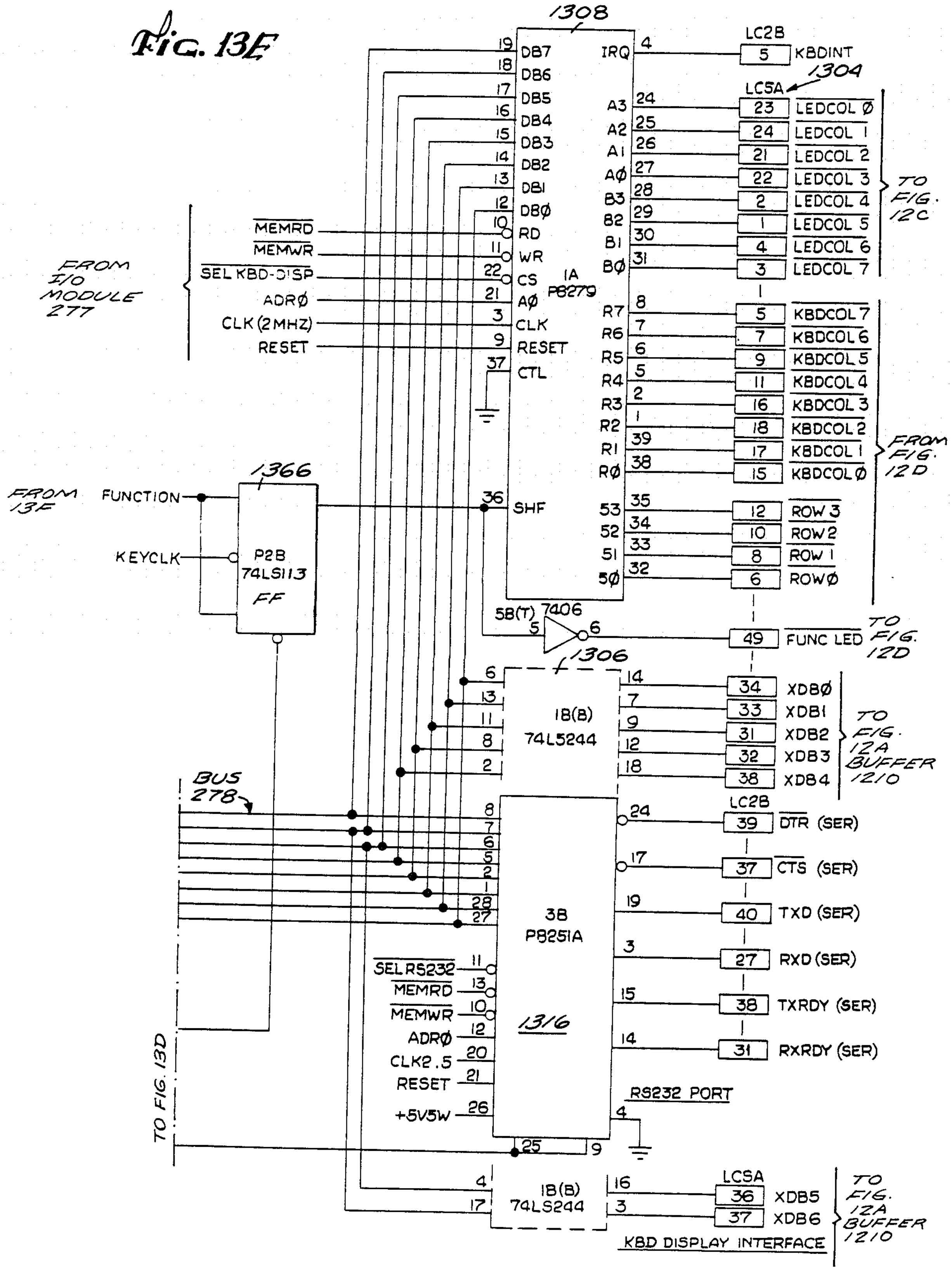

A comparable function, but at a lower level, is performed by a port control unit 1316 (FIG. 13E). Port control unit 1316 suitably comprises a standard universal synchronous/asynchronous receiver/transmitter IC (USART), such as a P8251A in FIG. 13E. Port control unit 1316 reformats outgoing data for use (after impedance adjustment and the like in the Input/Output Module) by a general-purpose two-way communication interface—advantageously an A.N.S.I. standard RS232 interface—which can accommodate an x-y plotter, a fuelmeter for performance monitoring, or an autopilot. The port control unit 1316 also reformats incoming data from any of such devices in the nature of "ready" or "acknowledge" signals, and, upon command, places such information on the data bus.

Figure 16A:
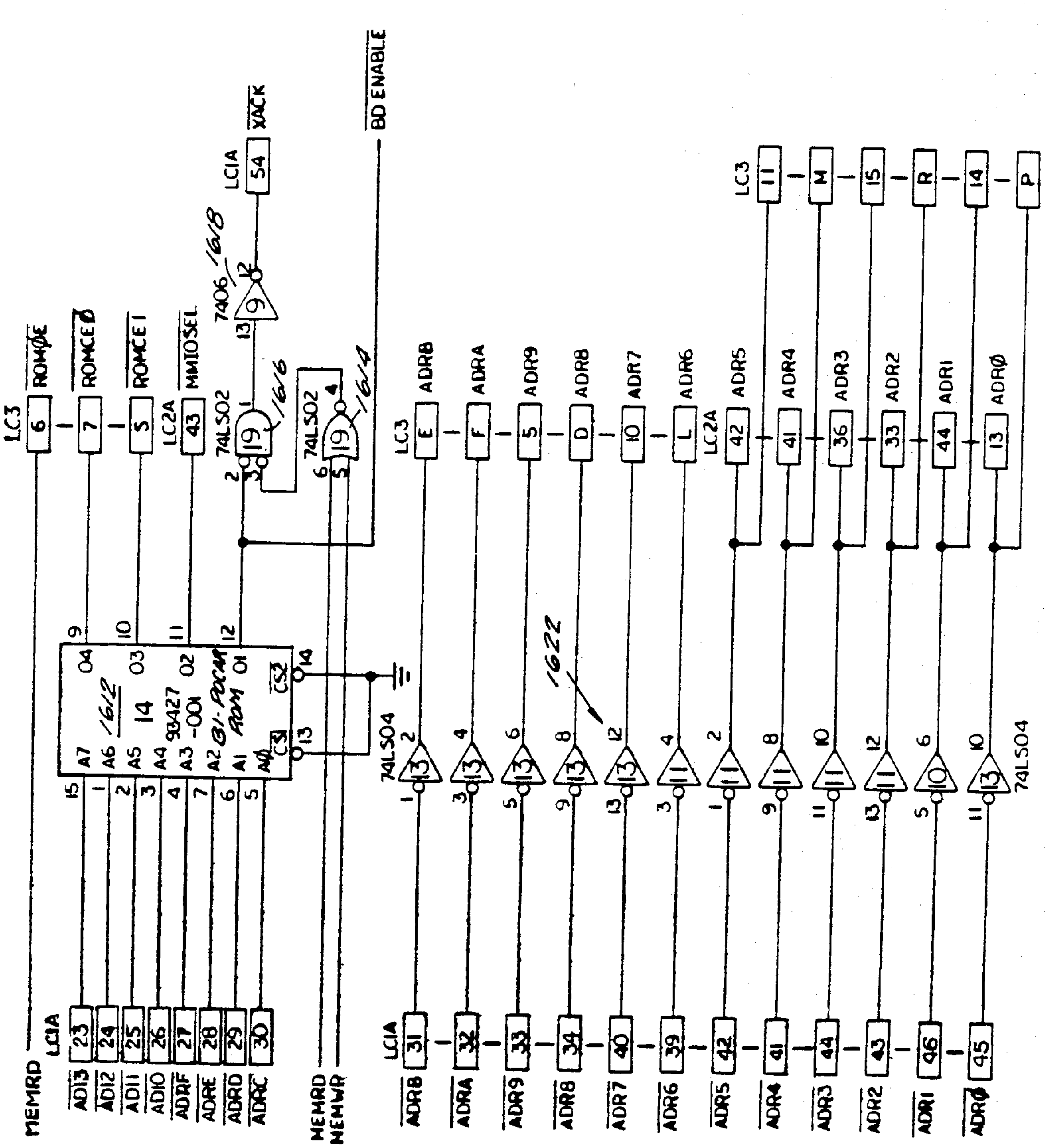
FIGS. 16A–16H are a schematic block diagram of the input/output module of FIG. 10.
Figure 16B:
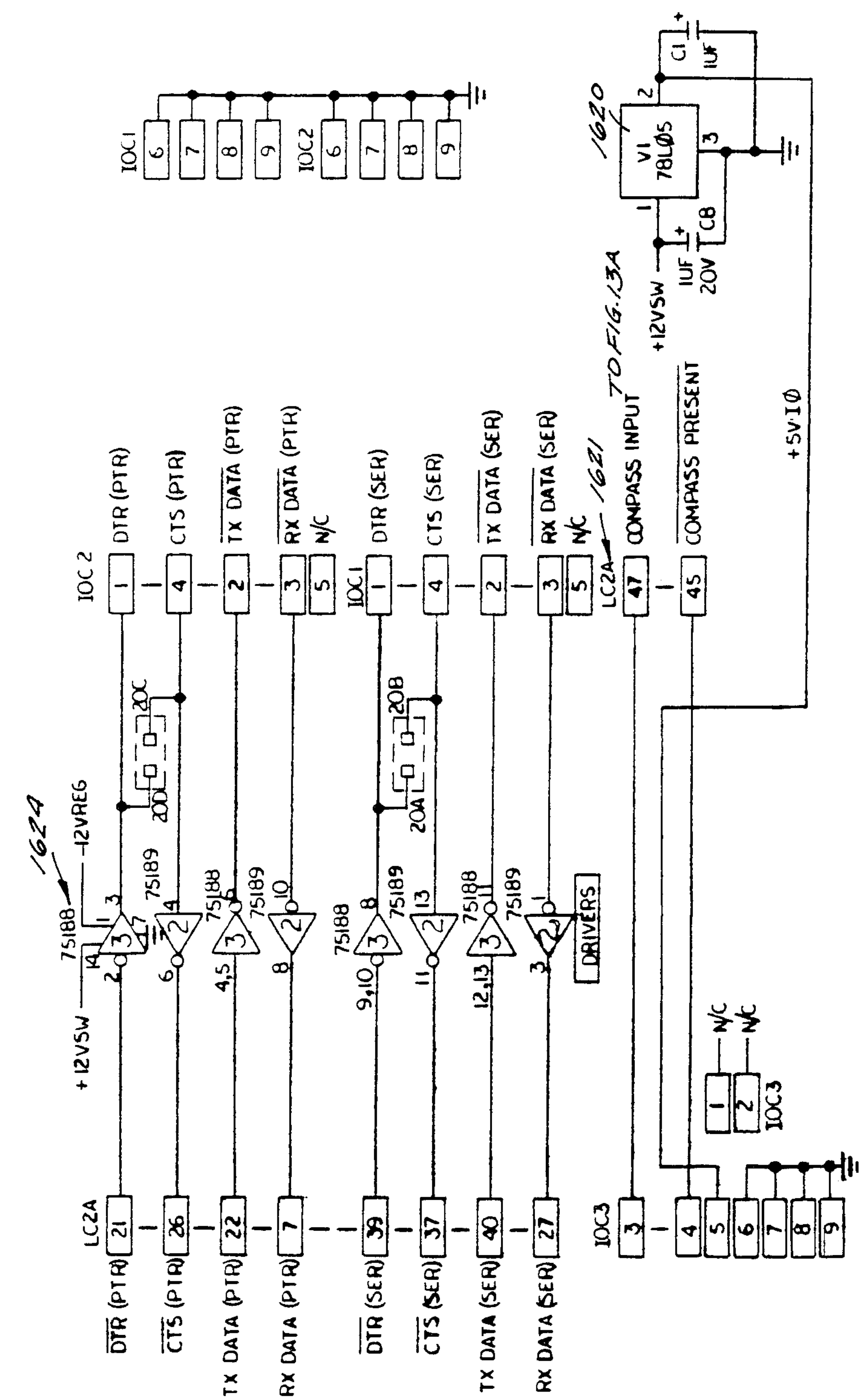
Figure 16C:
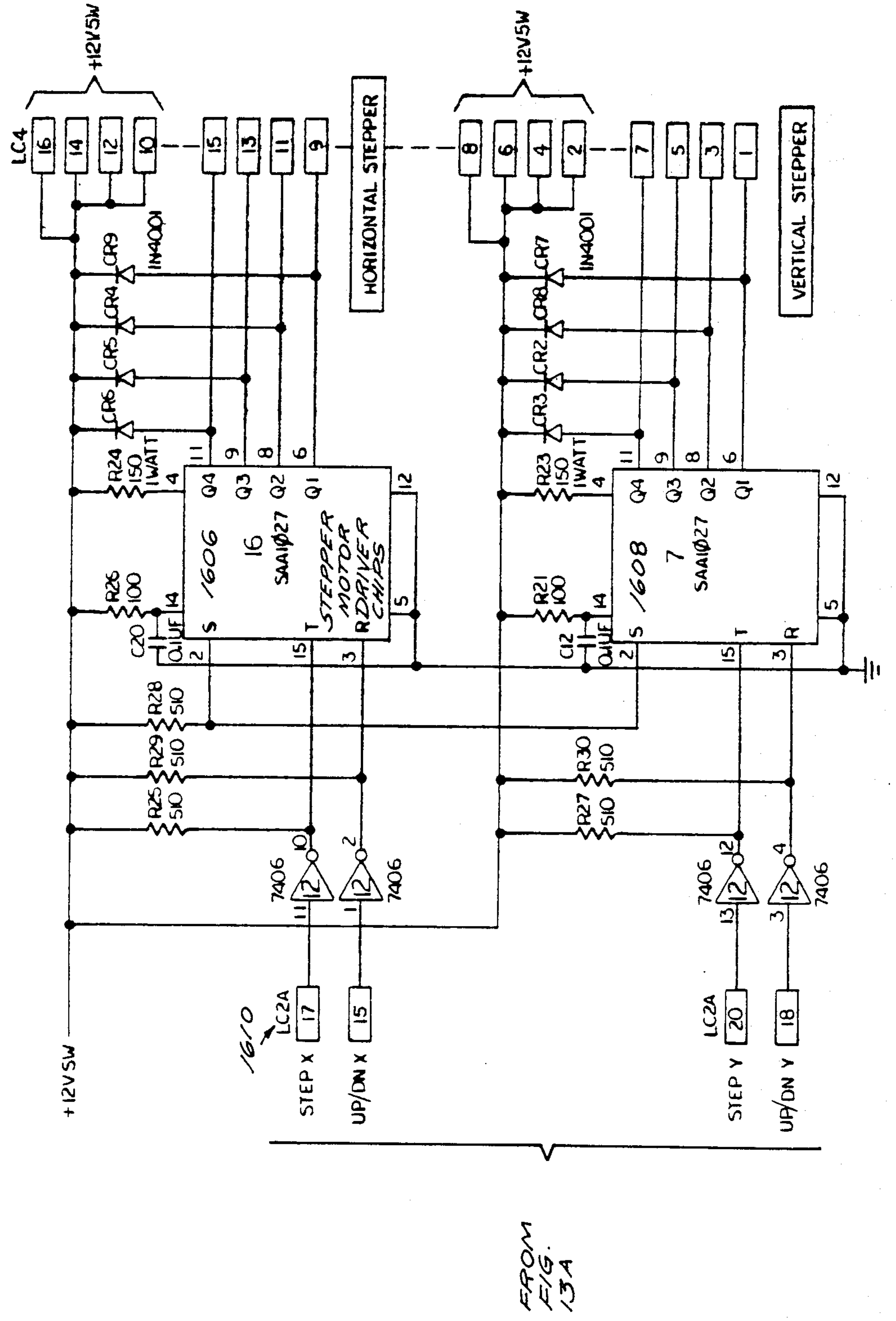
Figure 18A:
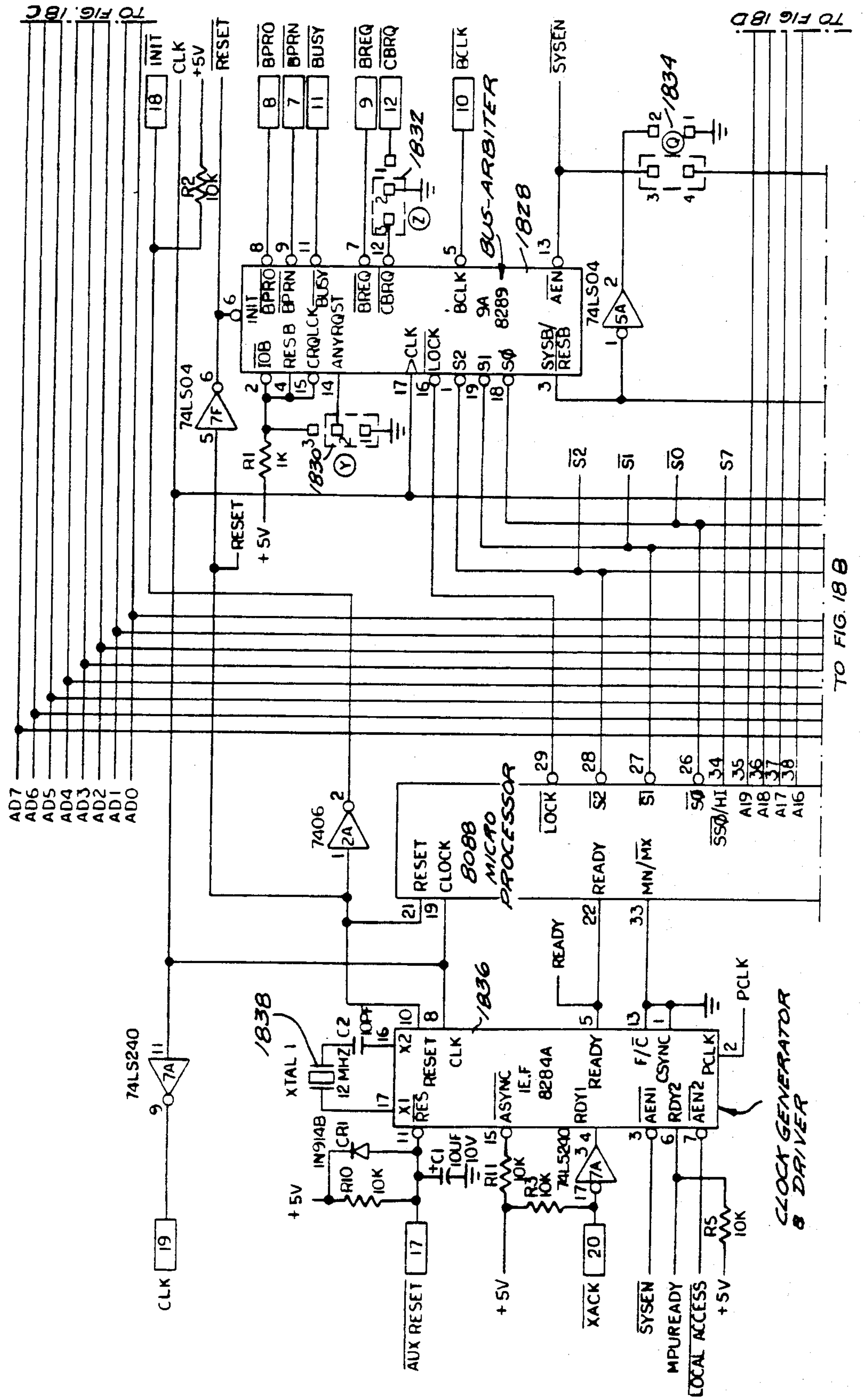
FIGS. 18A–18M are a schematic block diagram of the master processor module of FIG. 10.

Port control unit 1316 may be helpfully conceptualized as permitting the processors to treat any of the external otuput devices as if it were an address in the internal memory of the apparatus (FIG. 18A). An equivalent job is done for an external logging printer by a "printer port" control unit 1318 (FIG. 13B). Printer control unit 1318 also suitably comprises a conventional USART, such as a P8251A. Control units 1316 and 1318 operate at a baud-rate established by master processor 279. A suitable baud-rate pulse from master processor 279 is provided at pin 50 of a connector 1319 (e.g., LC2B type) via Input/Output Module 272 (FIG. 16G). The baud-rate signal is applied to a divider 1320, suitably a conventional dual 4-bit binary counter, such as a 74LS393.

Similarly, with reference to FIG. 13B, the master processor is permitted to operate as if it were simply writing into its own internal memory in selecting the particular (DL2416) display unit 1202–1207 (FIG. 12) to which to write, by means of a first decoding unit 1322 (FIG. 13B). Decoder 1322 suitably comprises a conventional 1 of 8 decoder/demultiplexer IC, such as 74LS138. Decoding unit 1322 is connected to the Display Module 272 by pins 25 through 30 of a connector 1323 (suitably an LC5A connector). Specifically, the YØ, Y1 and Y2 outputs of decoder 1322 are applied to display select buffer 1212 (FIG. 12A), and the Y3, Y4 and Y5 outputs are applied to display select buffer 1213 (FIG. 12B).

In just the same way a lower decoding unit 1324 (also suitably a 74LS138) permits the master processor to "think" that it is merely writing into its own internal memory when it is actually generating signals to select the general-purpose interface, the printer, or other units for exchange of information. It is also by use of lower decoder 1324 that the master processor generates selection signals enabling it to communicate with one or the other of the slave processors 1312 or 1313, or with the display module 272 considered as a unit, or with the direction keys ("cursor keys") 43, 44 (FIG. 2) as a unit, or with warning-buzzer circuitry (to be described).

Referring again to FIG. 13A, the 8041A slave processor 1312 manages the operation of the stepper motors. It translates numerical instructions, received in terms of binary-coded stepper-motor position (that is to say, step number), into properly timed and ramped serial pulses to the motors, via the Input/Output Module 277. "Ramping" is provided to accomodate the inertial characteristic of the drive system. In addition to data-bus connections and output connections to the stepper motors, 8041A slave processor 1312 also receives various control bus signals. Such signals include the selector signal from the lower 74LS138 decoder 1324 (FIG. 13B) just discussed, as well as read, write, and address signals from the control bus 278, and, from LC6 connector 1326, signals from limit switches installed (though not illustrated in FIG. 5) on the map transport mechanism 130.

In addition, 8041A slave processor 1312 receives directly from the keyboard and display board, at pins 13, 14, 19 and 20 of LC5A connector 1302, direction signals (NORTH KEY, SOUTH KEY, EAST KEY, WEST KEY) for manual control of the stepping system. These same direction signals are also connected to another memory port unit 1330, suitably an octal inverting bus/line driver such as a 74LS240, shown on FIG. 13H, which permits the master processor to read the status of the direction signalling keys 43 (FIG. 2) as if they were internal memory locations.

Several components on the Slave Processor Module 273 receive a "reset" signal, which is generated by the Master Processor Module 279 to pin 23 of LCB2 connector 1310 (FIG. 13A) when the system is first turned on—so that all components "power up" in a systematic controlled fashion.

Figure 13F:
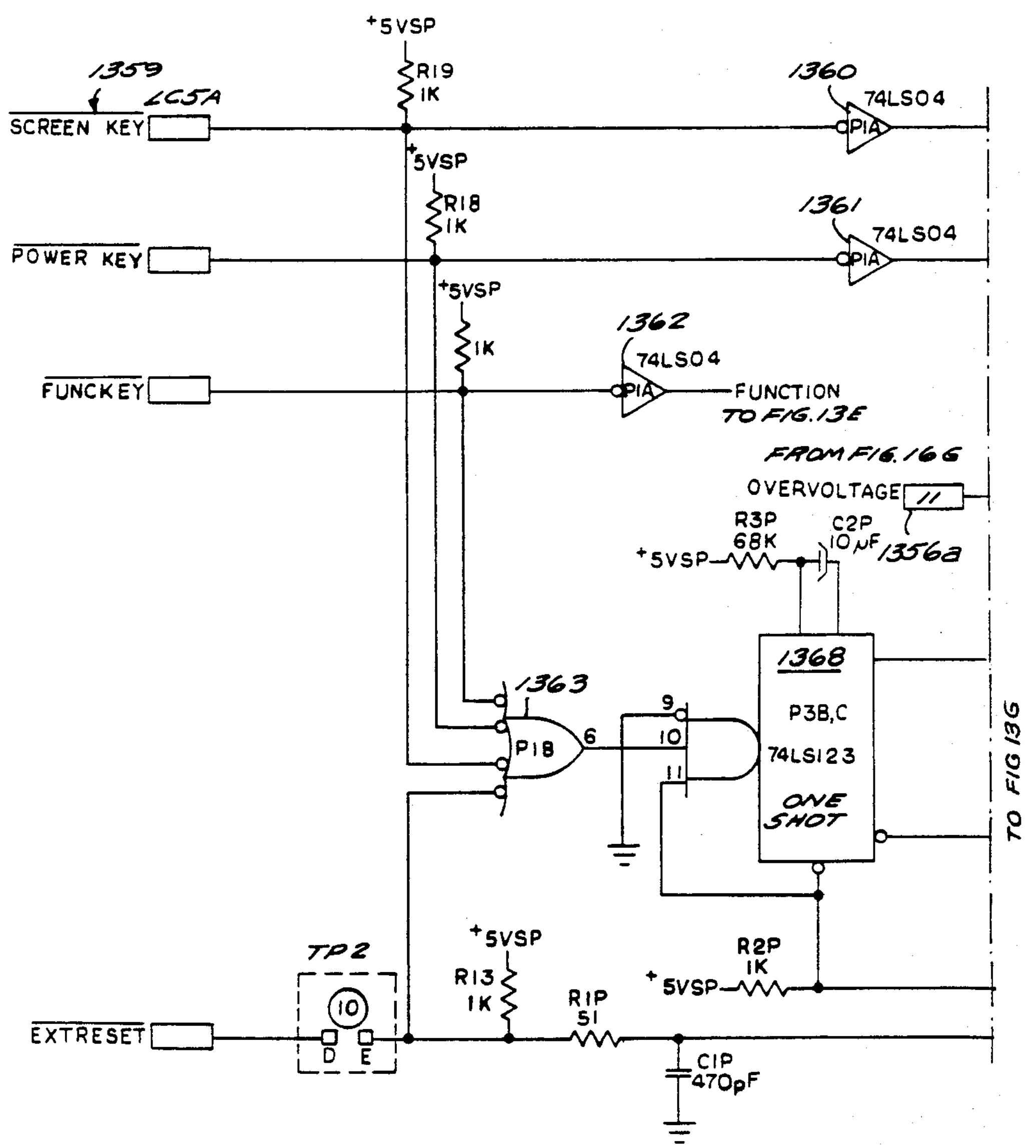

FIGS. 13F–J depict further portions of the Slave Processor Module 273. With specific reference to FIG. 13J, a regulated voltage supply as required by certain circuits will be described. The ship's power entering at pins 55 and 56 of connector 1350 (suitably a conventional LC2B connector) is first regulated by a conventional fixed voltage, 3-terminal regulator device 1352, such as a 78L05 device, and filtered by the network C28, CR9, R15, C31, C30, CR8 and C29. This relatively coarse regulation furnished by the commercial 78L05 regulator 1352 is sufficient as a supply to relay logic, as indicated in FIG. 13F and in FIG. 19.

Figure 13G:
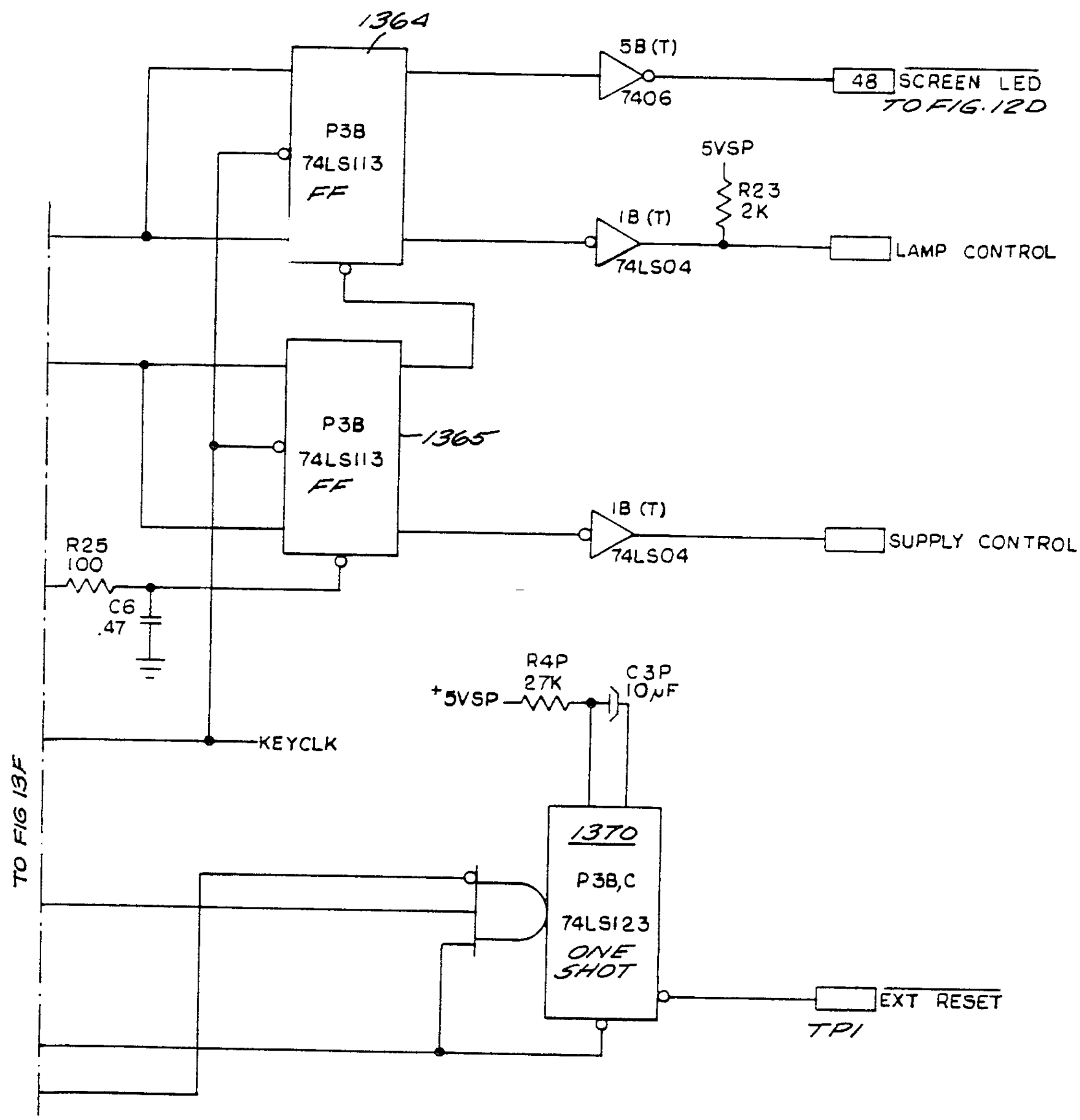

Additional, finer regulation, however, is required to supply a reference voltage for use in the power-fail logic circuits in the Input/Output Module 277. Such fine regulation is supplied by the circuit 1354 that includes transistors Q1 and Q2 in FIG. 13J, and the resulting very stable voltage level is transmitted to the Input-/Output Module via pins 53 and 54 of connector 1356 (suitably a LC2B connector) (FIG. 13I).

Figure 13H:
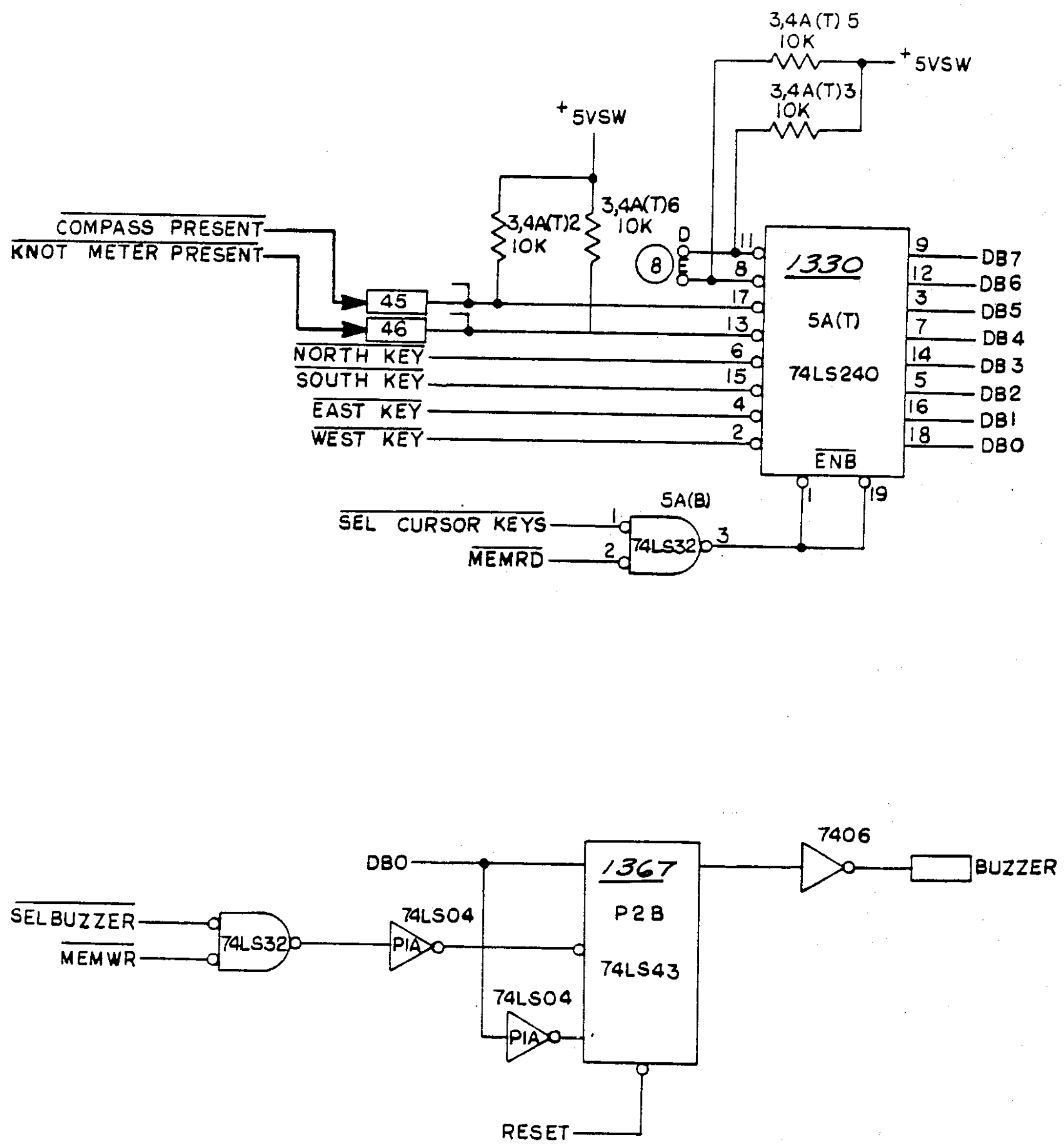
Figure 13I:
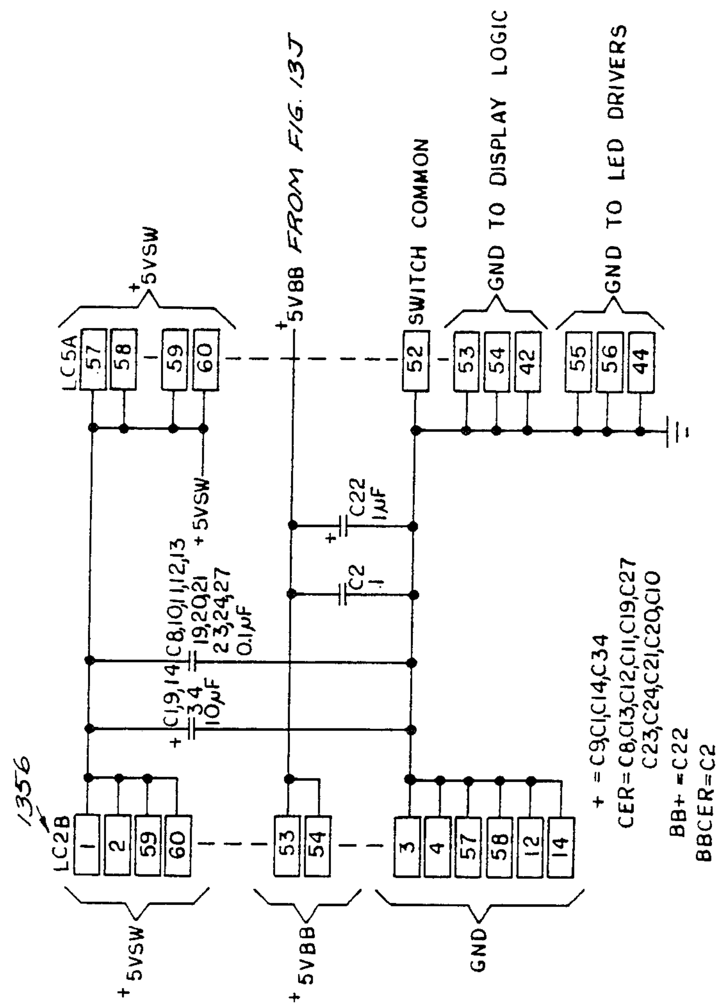
Figure 13J:
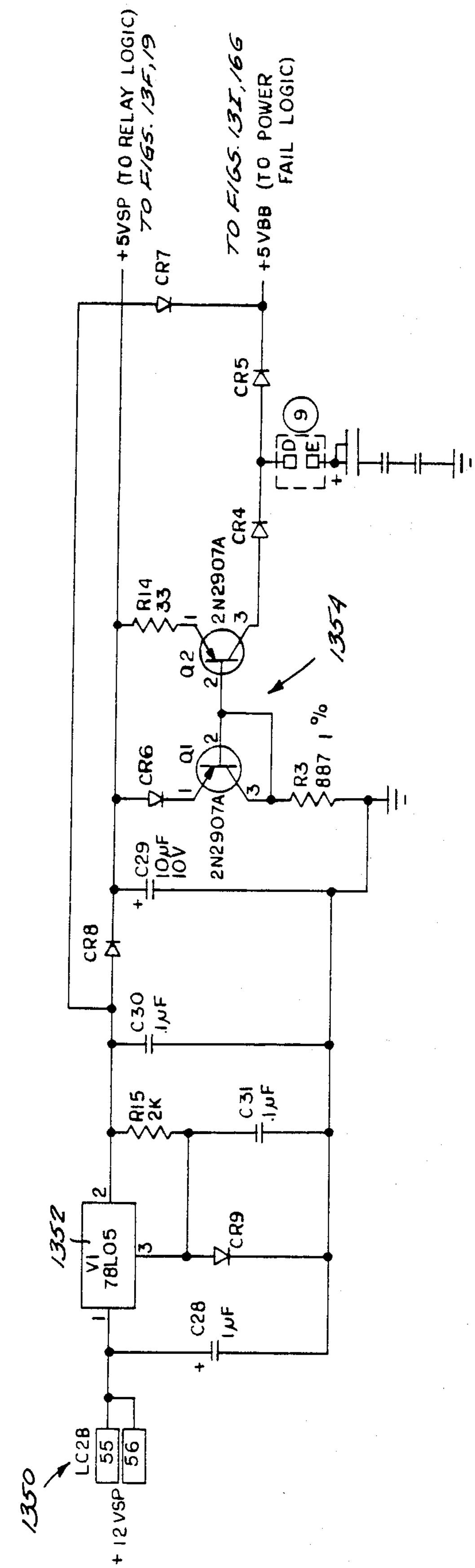

Referring now to FIG. 13H, memory port 1320 (e.g., 74LS240), mentioned earlier, permits the master processor to treat signals from the direction keys 43 (FIG. 2) as arising in memory locations. When any one of the direction keys 43 is in use to direct the map transport mechanism manually, 74LS240 memory port 1330 permits notification of the master processor 279 that the direction keys—as a group—are in use, so that the 8041A slave processor 1312 (FIG. 13A) can take control.

The memory port 1330 also, however, accommodates the dual use of the direction keys: when they are used to indicate a coordinate direction for the keying of latitude and longitude, their individual status is significant to the master processor. The memory port 1330 also receives signals indicating whether a compass (terminal 45) or knotmeter (terminal 40) is present in the system, and permits this information to be transmitted, as a bit in memory, to the master processor.

Referring now to FIG. 13F, three inverters, 1360, 1361, 1362, such as 74LS04N gates, and a single dual 4-input NAND gate 1363, such as a 74LS20 gate, cooperate as a "debounce" circuit: they eliminate erraticisms in the switch-closure resistance when the corresponding control keys (POWER ON key 51, SCREEN ON key 542, and "f"—function—key 38) are touched by the operator (see FIG. 2 for keyboard locations).

Referring now to FIG. 13G, three flipflops, 1364, 1365 (FIG. 13G) and 1366 (FIG. 13E), suitably commercial dual JK edge-triggered flipflops, such as 74LS113 respectively provide toggling or latching action for the same three control keys, so that when any of these keys is touched the resulting pulse generates a status signal that continues after the key is released. The resulting status signals generate buffered control signals for passage to the indicator lights on the Display Module (FIG. 12), the power relay circuits on the Power Control & Monitoring Module (FIG. 19), and the P8279 decoder 1308 in FIG. 13E.

The three 74LS113 flipflops, 1364, 1365 (FIG. 13G) and 1366 (FIG. 13E), are reset (turning off the power to the system or to the projection lamp, and cancelling the "shift key" effect of the function key) by various conditions. The lamp-control flipflop 1364, is reset when the power control flipflop 1365, is reset. Thus the lamp power is turned off when the logic circuits are turned off.

In addition, the lamp-control flipflop 1364 is reset when the SCREEN ON key 52 is touched while the lamp-control flipflop 1364 is already set—subject to an inhibit signal applied from a debounce one-shot 1368 (FIG. 13F), suitably a dual retriggerable monostable multivibrator, such as a 74LS123. Debounce one-shot 1368 introduces a fraction of a second's delay, established by R3 and C2 as a minimum interval between actuations of the SCREEN ON key 52 that will produce a response. Thus, touching the SCREEN ON key 52 several times in succession will alternately switch the projection lamp on and off, but not if the key is touched at too short intervals.

Similar operation is provided for the POWER ON key 51 and the "f" key 38, except that the power-control 74LS113 flipflop 1365 is also resettable by a signal from the overvoltage circuitry on the Input/Output Module (FIGS. 16A–16H, and 277 on FIG. 10), via pin 11 of LC2B connector 1356A (FIG. 13F), if the supply voltage to the system rises above seventeen volts; and the function-control 74LS113 flipflop 1366 (FIG. 13E) is also resettable from the master processor. It may be noted that the toggling action of the function-control flipflop permits the operator to reverse his own error if he accidentally touches the "f" key when he really does not want the results of doing so.

Referring now to FIG. 13H, a 74LS113 flipflop 1367 latches the warning buzzer on and off in response to control signals from the master processor.

The external-reset one-shot 1370 (FIG. 13G), suitably a 74LS123, provides "debounce" action for an additional key on the control panel 14—one that is not labeled, but rather is camouflaged and intended only for use by a qualified serviceman. This key is shown as the "EXTRA 3" key 1104 on FIG. 11, wired through pin 51 of LC5B connector 125A (FIG. 12D) and LC5A connector 1359 (FIG. 13F) to test point TP2 (FIG. 13F). The output status signal from the debounce 74LS123 one-shot 1370 provides an external-reset signal at test point TP1 that is suitable for application to the logic circuit.

This system is used by the serviceman in the event that unforeseen operational procedures have somehow caused the system to stop out of sequence and therefore to "lock up." The external-reset signal resets the entire logic system to an initialized condition, while preserving most of the information in the system's memory, and initiates a test routine. The 74LS123 one-shot 1368 is necessary to complete the debounce circuit. For all the other debounce circuits shown in FIGS. 13E, 13F and 13G, this latter function is performed in common by the 74LS123 one-shot 1368, but the serviceman's hidden key requires a separate unit—because the rest of the system (including the common debounce flipflop) is assumed to be "locked up."

Figure 14A:
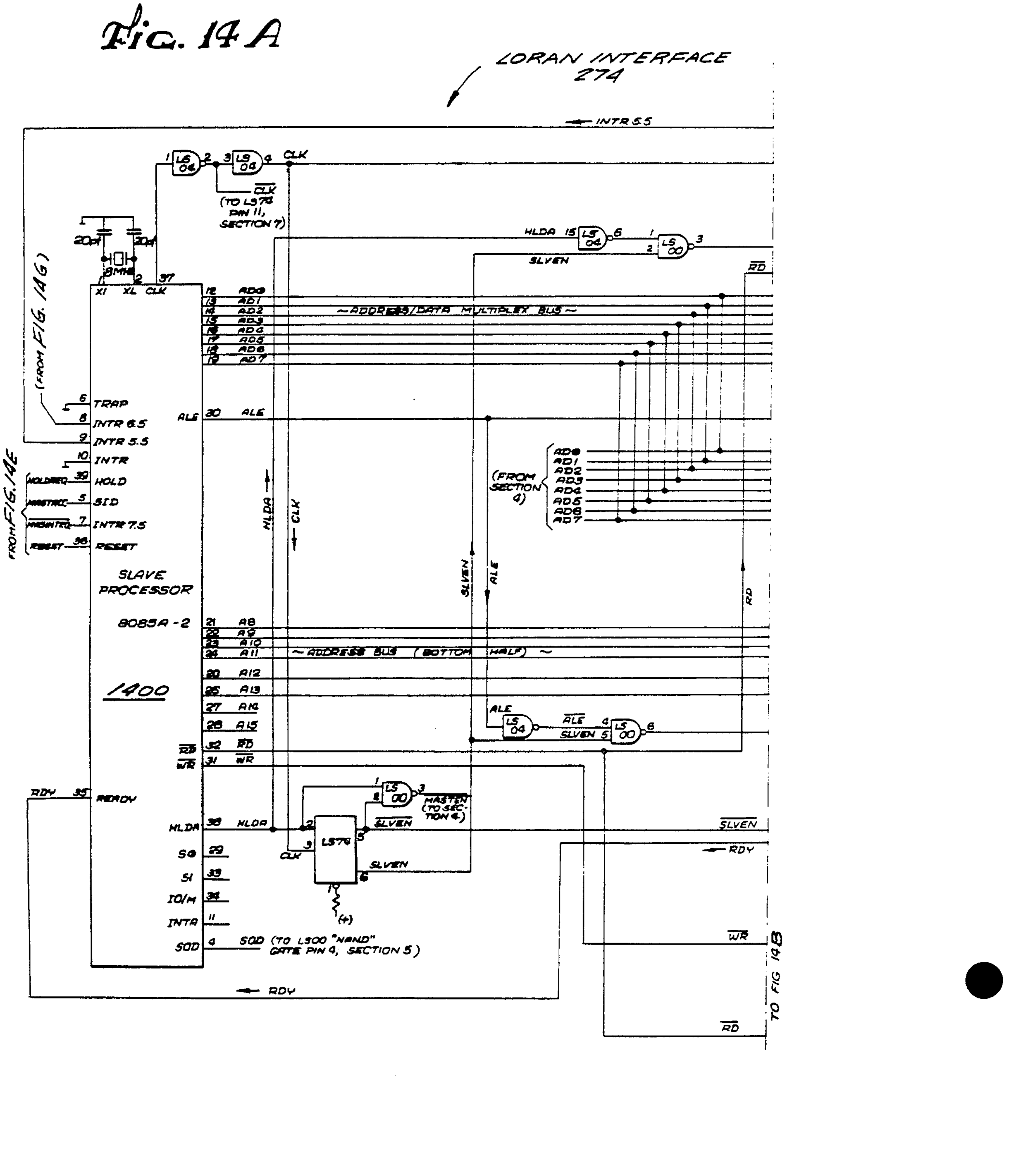
FIGS. 14A–14H are a schematic block diagram of the Loran interface of FIG. 10.

FIGS. 14A–14H illustrate the circuitry of the Loran Interface 274 (FIG. 10). In FIG. 14A is the heart of the interface, a slave processor 1400, suitably an 8085A-2 microprocessor, which decodes data obtained from the Loran receiver, screens the data and selects the best data for use in the rest of the apparatus 270 (FIG. 10), and reformats the selected data for passage on busses 288 and 278 (FIG. 10) to the Master Processor Module 279 (FIG. 10). Program storage for the 8085A-2 slave processor 1400 is provided in memory unit 1402 (FIG. 14B), suitably a 2732 programmable read only memory (PROM), and data storage is provided in two random-access memories (RAMs) 1404, 1405 (FIG. 14C), suitably 2114 RAMs.

Figure 14B:
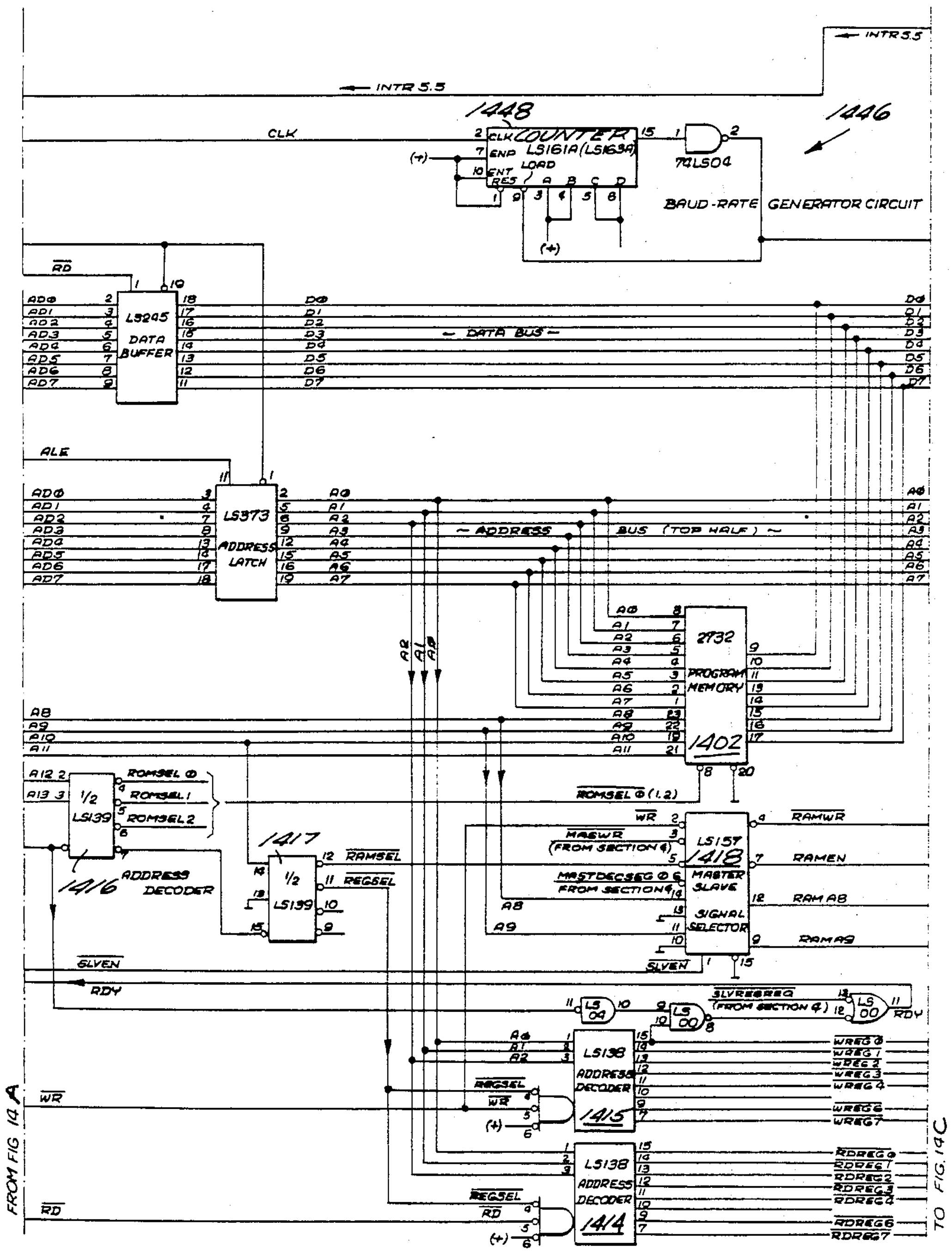
Figure 14C:
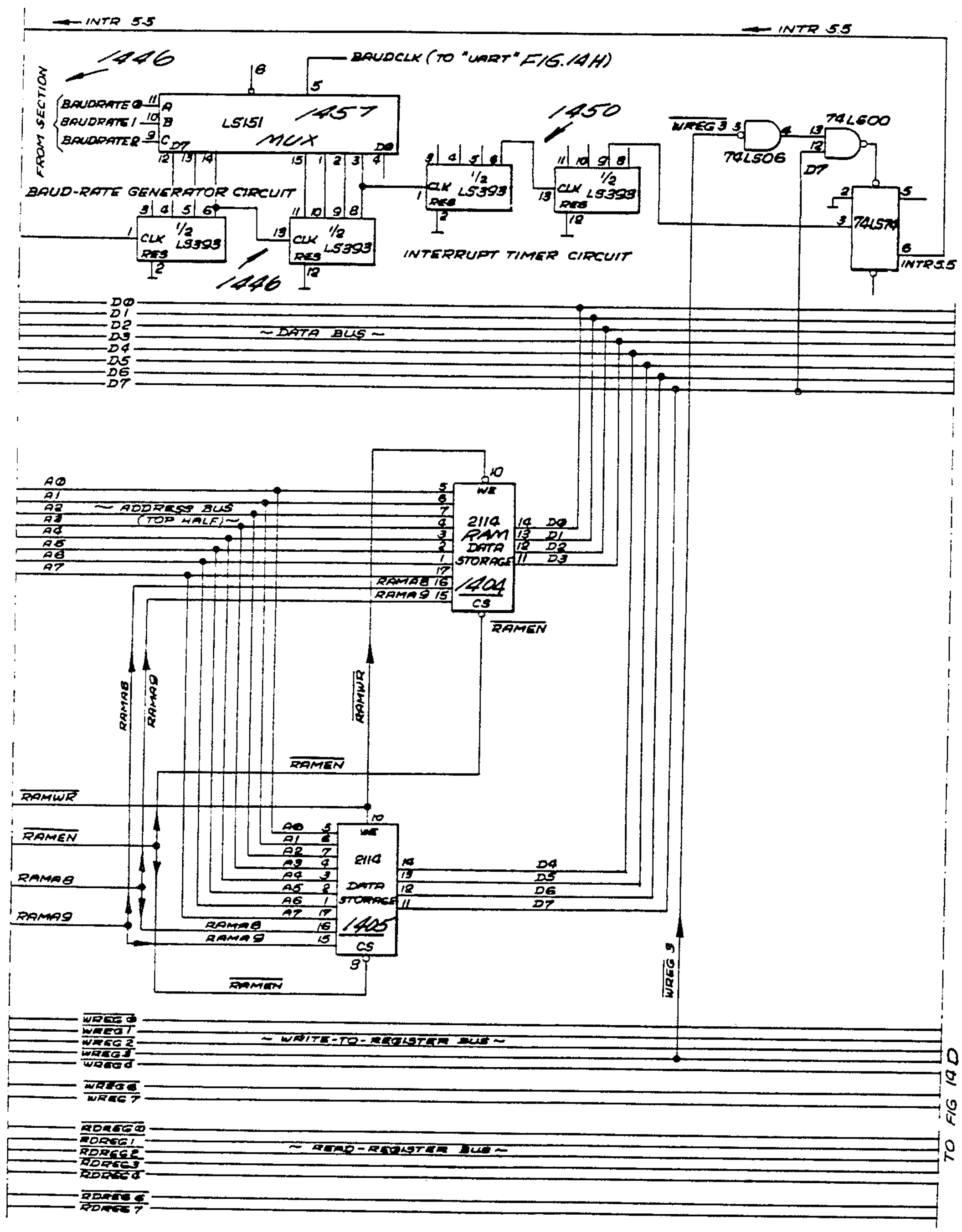
Figure 14D:
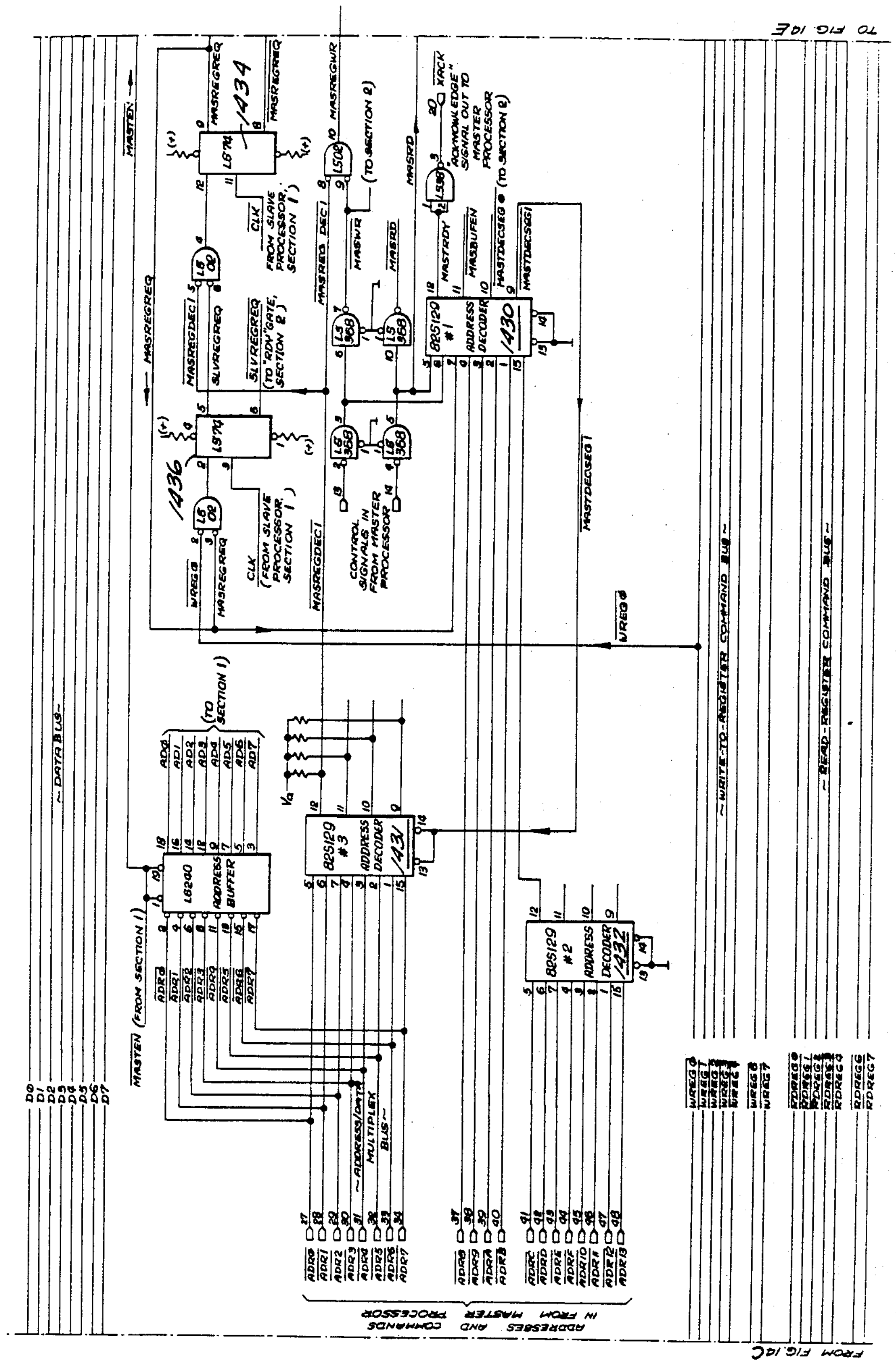
Figure 14E:
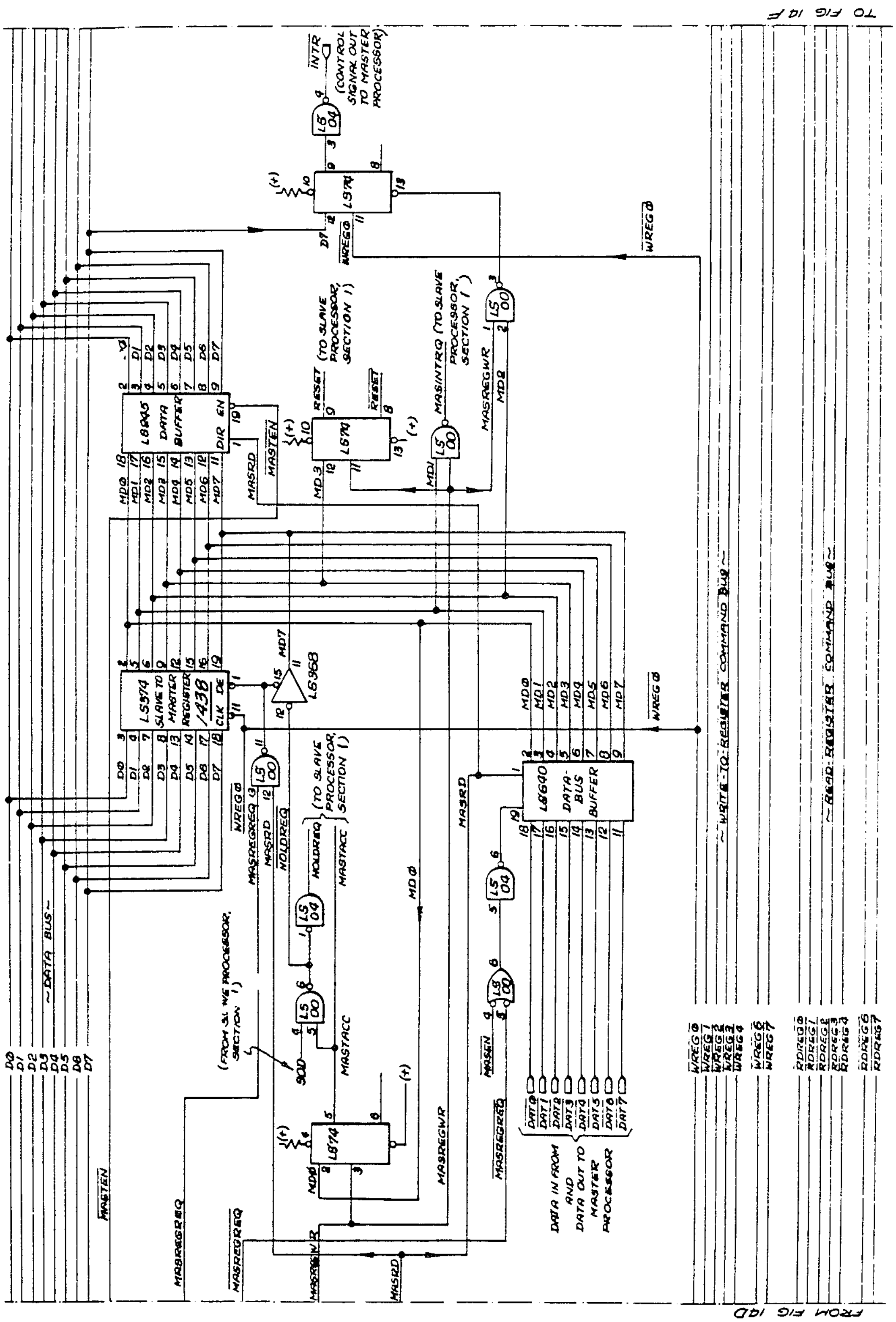
Figure 14F:
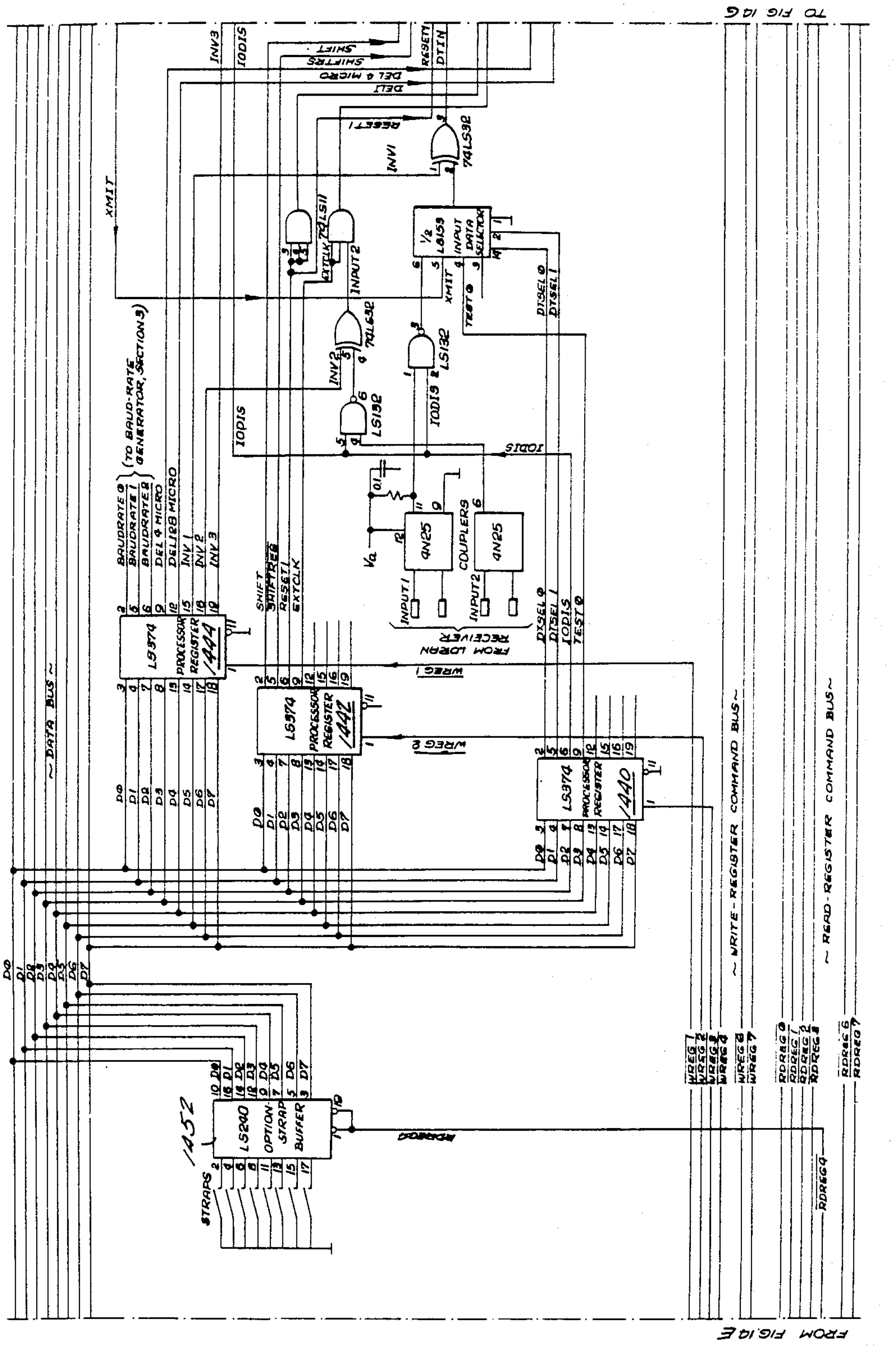
Figure 14G:
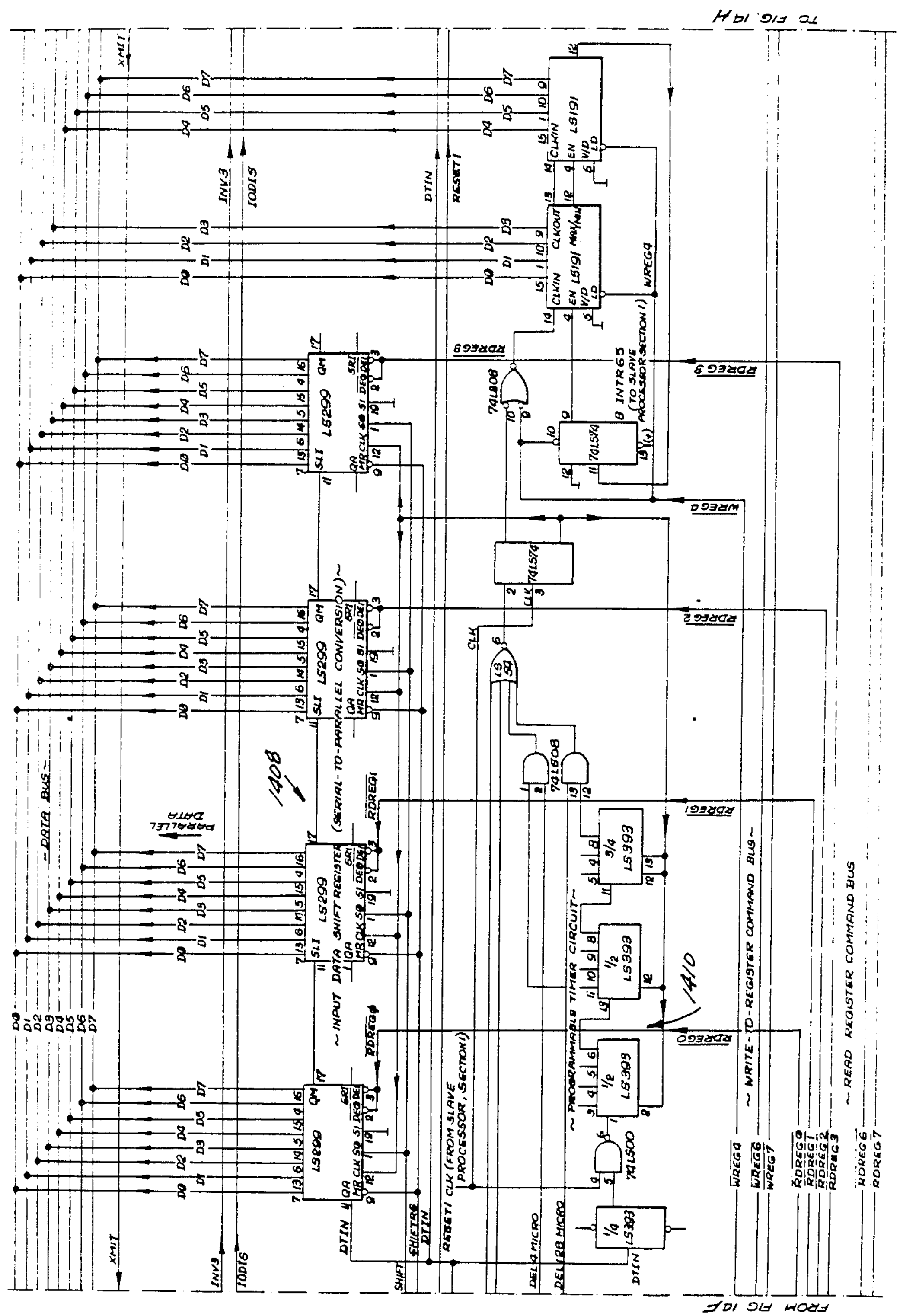
Figure 14H:
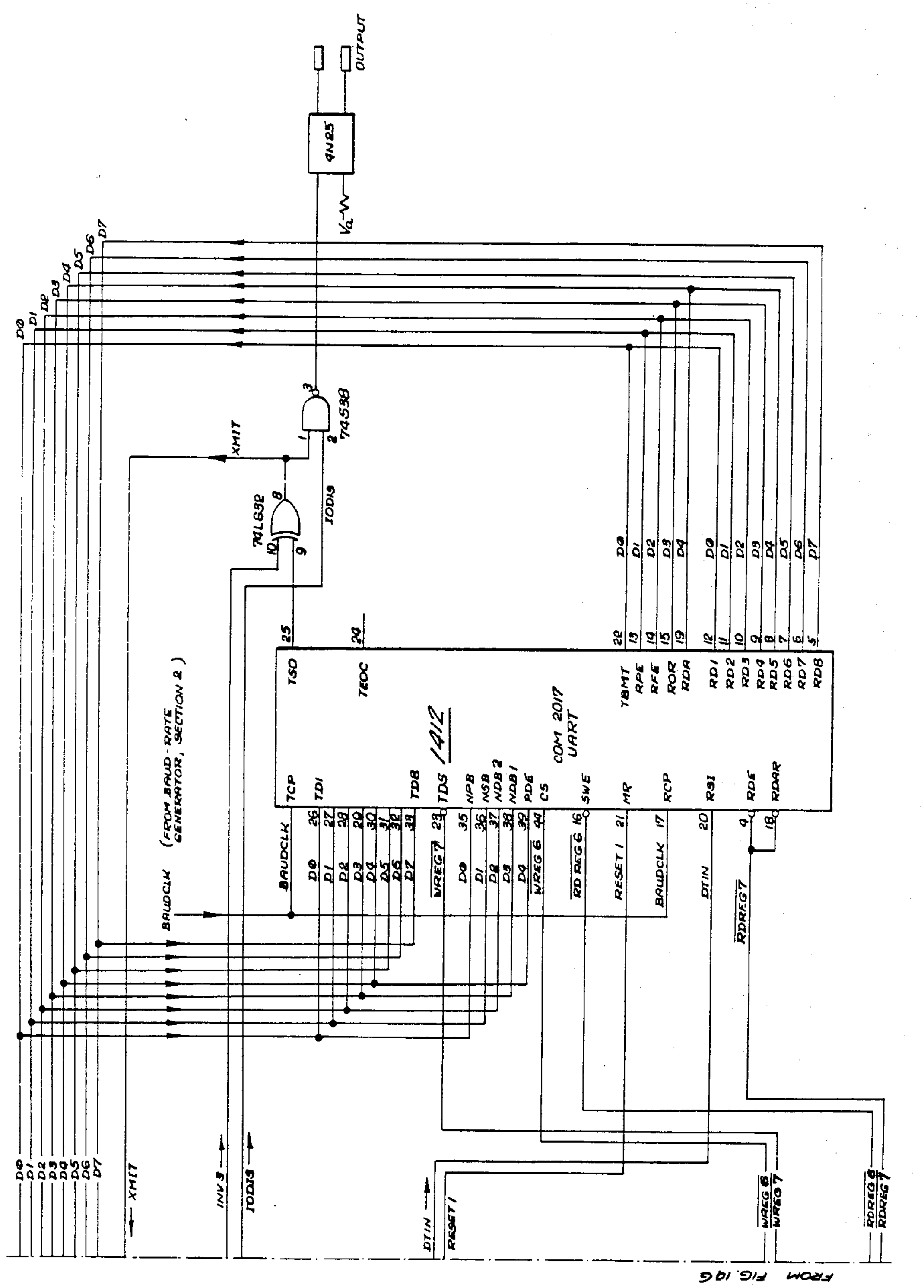

Before reaching the 8085A-2 slave processor 1400, however, incoming data received as serial pulses from the Loran receiver are converted to parallel binary presentation in a shift register 1408, suitably comprising four LS299 shift register circuits (FIG. 14G). A programmable timer circuit 1410 (FIG. 14G), suitably formed of respective LS393 counter circuits, permits generation of a local clock signal to accommodate the operating rate of the Loran receiver, thereby synchronizing operation of the receiver and the interface 274. A conventional universal asynchronous receiver/transmitter unit (UART) 1412 (FIG. 14H), such as a COM2017, manages the coordination of the Loran receiver's internal logic circuits and their timing with the internal logic and timing of the interface 274.

Referring now to FIG. 14B, various address decoders 1414, 1415 (suitably LS138 1 of 8 decoder/demultiplexer circuits) and 1416 (suitably an LS139 dual 1 of 4 decoder/dimultiplexer circuits) and master-slave signal select device 1418 (suitably an LS157 quad 2-input multiplexer) permit information transfer between the memory units V1402, 1404 and 1405, mentioned above and the 8085A-2 slave processor 1400 (FIG. 14A), and between the Master Processor Module 279 (FIG. 10) and the 8085A-2 slave processor 1400. Referring to FIG. 14D, three address decoders, 1430, 1431, 1432, suitably formed of 82S129 bipolar memory circuits, decode addresses received from the master processor, and a LS74 flipflop 1434 (the upper right corner of FIG. 14D) synchronizes the master processor in module 279 with the Loran interface. The master-to-slave register LS74 flipflop 1436 and related circuitry and an LS374 slave-to-master register 1438, respectively, provide repositories of information to be transferred between the two processors, so that neither processor is required to wait for the other to be ready to use or supply information.

Three LS374 processor registers, 1440, 1442, 1444 (FIG. 14F), store intermediate data and control signals generated and reused during operation of the interface 274. A baud rate generator 1446, suitably comprising an LS151 multiplexer 1447 (FIG. 14C), LS161A synchronous counter 1448 (FIG. 14B), and a LS393 decoder binary counter 1449 (FIG. 14C) divide down the clock pulse train from programmable timer 1410 (FIG. 14G), to derive a suitable character transfer ("baud") rate. The interrupt timer, consisting of LS393 decode binary counter 1450, further counts down the baud clock train to generate a Loran signal interrupt, which is periodically directed to the Master Processor Module 279. The Loran signal interrupt occurs roughly every five minutes, and causes the Master Processor Module 279 to interrupt its other processes when next possible, and to receive a current set of Loran time differences (TDs).

An LS240 option-strap buffer 1452 (FIG. 14F) is wired to terminal straps that are to be suitably jumpered to cause various features of the interface 274 to come into operation—to accommodate the Loran receiver 253 commercial type that is in use. The various other buffers in the Loran receiver FIGS. 14A through 14H are utilized conventionally.

Figure 15:
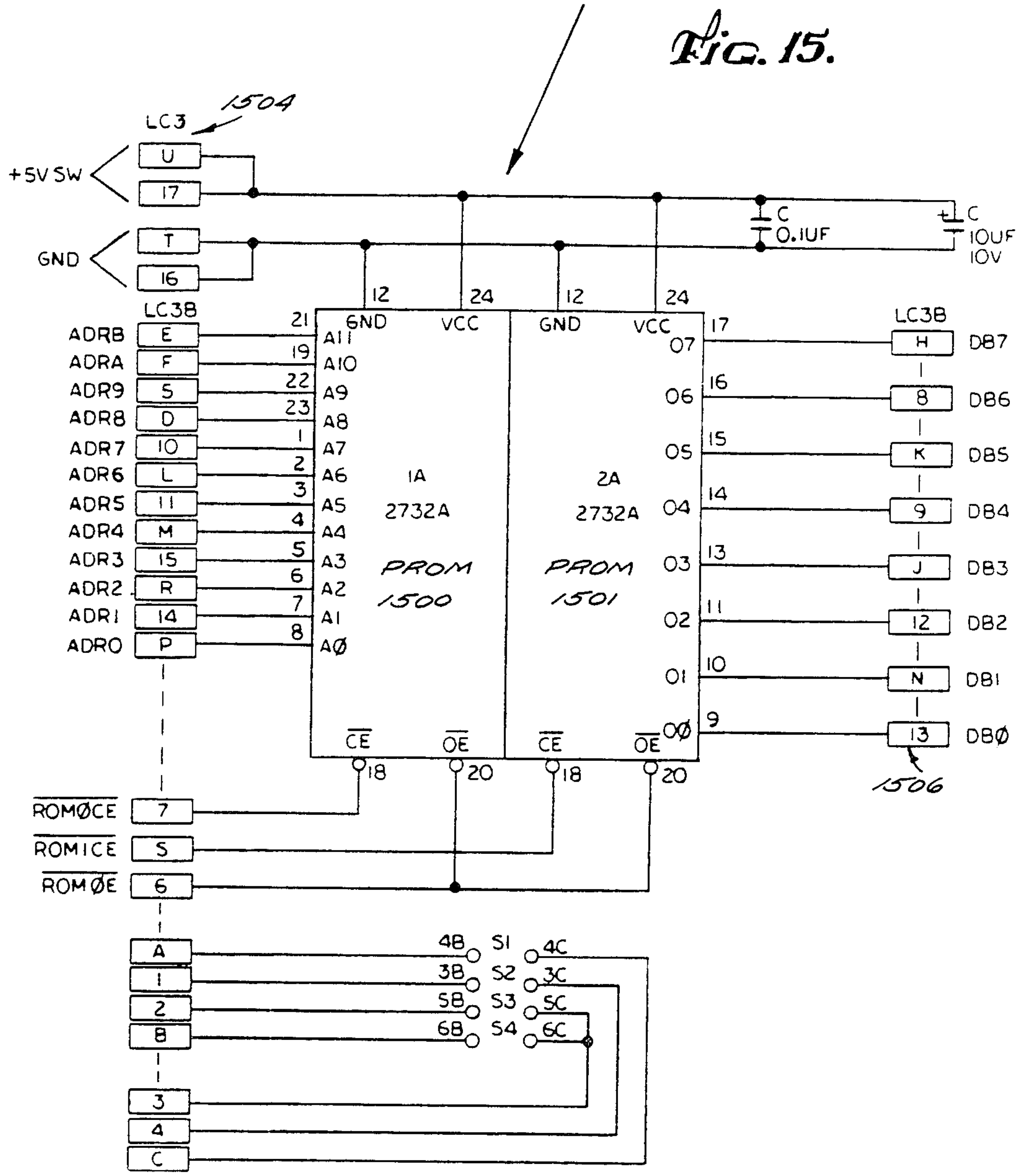
FIG. 15 is a schematic block diagram of the personality module of FIG. 10.

FIG. 15 shows the Personality Module 276. This unit contains a dual 2732A read-only memory (ROM) 1500, 1501, in which are stored regional geographic data, Loran transmitter locations for the operating region(s) of interest, and certain constants used in computations. The information in this dual memory is selected—as between respective two halves 1500, 1501 of the memory—by the two signal lines at pins 7 and S of an LC3B connector 1504, and by address signals at the twelve pins shown just above those. Actuation of a ROM select line and an address select line causes binary data to appear on the data bus 1506 (DB0-DB7), for transmission to the Input/Output Module 277 (FIG. 16A-16H).

Also shown in FIG. 15 is a set of wiring terminals S1 through S4, for hand-jumpering to tailor the voltage levels of the signal from the particular type of speed log 251 (FIG. 10) in use to the speed-sensing circuitry in the Input/Output Module 277.

Figure 16D:
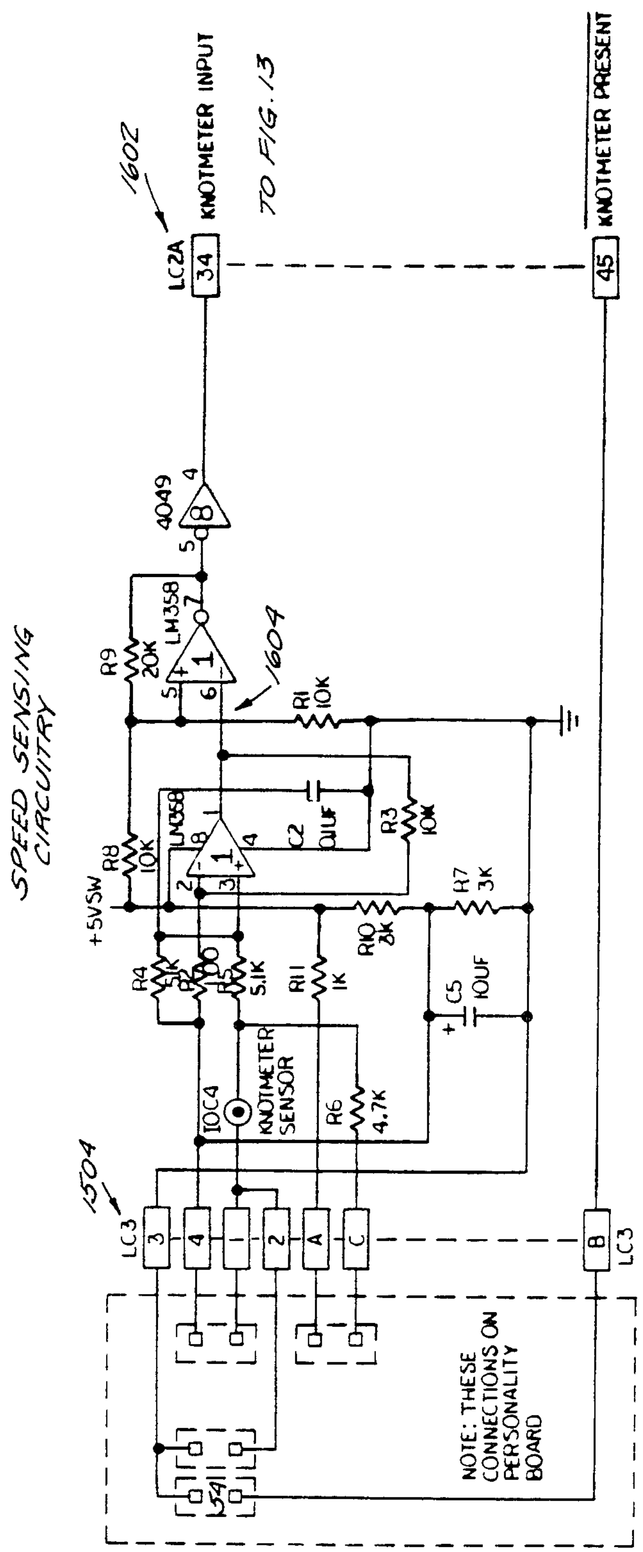
Figure 16E:
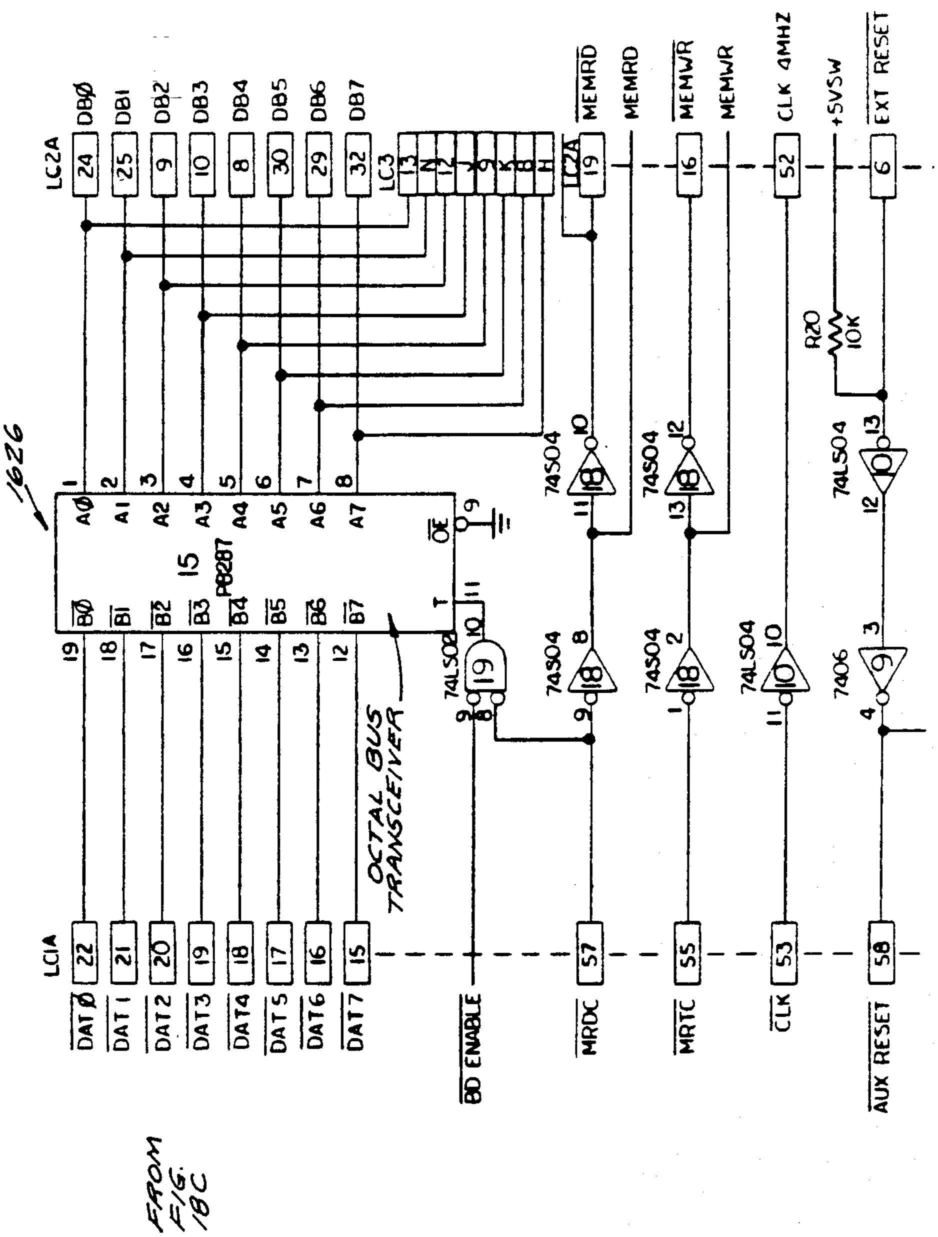

This last point may be better understood with reference to the speed-sensing circuitry where it appears at the lower right-hand corner of FIG. 16D. FIGS. 16A-16H present the electronics of the Input/Output Module, block 277 in FIG. 10. As seen in FIG. 16D, pin 3 of LC3 connector 1504 is grounded within the Input-/Output Module, and pin B is connected to a logic signal line at pin 45 of an LC2A connector 1602; when these two lines are wired together by jumpering directly across at S4 (FIG. 15), the Slave Processor Module 273 (and particularly the right-hand 8041A slave processor 1313, shown in FIG. 13C) receives a "low" signal indicating that a knotmeter is in use—and therefore that dead-reckoning calculations should be based on the knotmeter output signals rather than on numerical entries at the keyboard.

Various other possible combinations of jumpers have the effect of applying various degrees of attenuation or division of the voltage from the knotmeter sensor for presentation to the circuitry in the Input/Output Module. The first stages of that circuitry, including LM358 analog operational amplifiers 1604, square off the typically sinusoidal signal from the knotmeter to provide a pulse stream at terminal 34 of LC2A connector 1602, for application to the slave processor via pin 34 of LC2B connector 1303 FIG. 13C.

Referring now to FIG. 16C, SAA1027 twin stepper controllers 1606, 1608, service, respectively, the horizontal and vertical stepper motors. These controllers receive directional control status signals at, respectively, pins 15 and 18 of LC2A connector 1610, and receive serial drive pulses at, respectively, pins 17 and 20. Each of the two controllers, in turn, produces at its four output terminals a pattern of four voltages which shifts with each successive step input pulse; when these four output lines are connected to the four coils of the four-phase stepping motor 137 or 151 (FIG. 10), the result is a rotating pattern of voltages at the motor coils—and hence a rotating magnetic field that precisely positions the rotor of the motor, and rotates the rotor in precise synchronism with the step pulses applied to the controller inputs. These controllers may if preferred be placed with power-level translators (from logic levels to drive levels) in a separate circuit module adjacent to the motors.

Referring now to FIG. 16A, an address decoder 1612, suitably a 93427-001 bipolar ROM, translates the system of memory-selection address lines in the Personality Module (FIG. 15) ROMs into address locations of the Personality Module as "seen" by the Master Processor Module. That is to say, a range of address locations as called out by the Master Processor Module is translated into the addressing system of the Personality Module. In addition, respective 74LS02 gates 1614, 1616 and 7406 inverter 1618 provide a signal (XACK) that—in combination with control signals from the master processor—generates an acknowledgement signal to the master processor, indicating that the Personality Module ROM is ready to be read.

Referring now to FIG. 16B, a voltage regulator circuit, that includes 78L05 regulator 1620 and that provides a regulated voltage to an external magnetic compass, 252 in FIG. 10. This regulated voltage is used by the compass repeater to provide a compass-input signal at pin 47 of LC2A connector 162, for passage to the Slave Processor Module 273 (FIG. 10), and particularly to the right-hand 8041A slave processor 1313 (FIG. 13C, 13D) in that module.

The compass signals so produced are generally in the form of a series of pulse bursts, the number of pulses in each burst representing a compass heading, in degrees and fractional degrees. When received at pin 47 of LC2B connector 1311 on the Slave Processor Module, FIG. 13A, the pulse burst is applied directly to pin 39 of the right-hand slave processor 1313 (FIGS. 13D, 13C) and is also applied with a short time delay to pin 34 (FIG. 13D). The signal at pin 39 directs the processor to prepare to start counting the pulses in the burst, and the signal at pin 34 then provides the pulses to be counted.

Returning to FIGS. 16A-16D, twelve 74LS04 buffers 1622 (FIG. 16A) operate conventionally to buffer signals from the Master Processor Module 279 (FIG. 10) in passage to control addressing within the Slave Processor and Personality Modules 273 and 277. Respective 75188 and 75189 drivers, generally indicated at 1624 (FIG. 16B), lower signal impedance for transmission to and from output devices such as the logging printer (the upper four drivers) and a recorder, autopilot, or fuelmeter (the lower four drivers).

Other Input/Output Module 277 components appear in FIGS. 16E-16H. In particular, referring to FIGS. 16E and 16F, buffering of additional signals between the Master Processor Module and the Slave Processor Module is provided by circuitry generally indicated as 1626. Terminal lugs 1628 (FIG. 16*f*) are provided for manual jumpering to permit custom tailoring of the response of the unit to the timing requirements of external output devices such as a logging printer 262 (FIG. 10), autopilot 263, or fuelmeter or the like (not shown).

The input signals to this manual-jumpering "interrupt matrix" 1628 are "KBDINT" or "keyboard interrupt," which is generated by P8279 keyboard decoder 1308 (FIG. 13E); and "TXRDY (SER)" and "RXRDY (SER)" or "ready to transmit serial data" and "ready to receive serial data," which are generated by the P8251A port control 1316 (FIG. 13E). The relative prioritization of these signals relative to each other, and relative to the other priorities among the many operations carried on by the apparatus 270, can vary with the character of the particular commercial output units 262, 263, etc., employed.

The Master Processor Module 279 operates on a well-defined system of priorities, in which each device that must communicate with the master processor 279 or send or receive information over the bus 278—whether it be the P8279 keyboard decoder 1308 in the Slave Processor Module (FIG. 13E), responding to actuation of keys at the control panel 14 (FIG. 1), or the Loran Interface (FIG. 14), responding to its own internal interrupt clock (LS393 decode binary counter 1450 in FIG. 14C)—generates an "interrupt" signal, announcing to the master processor that it is prepared for a communication.

If all of these "interrupt" signals had the same priority, of course, the apparatus would rely upon chance to avoid interference between communications from more than one source at a time, and such operation would be unfeasible. Consequently all of the "interrupt" signals, or, more concisely, all of the "interrupts," are assigned specific priorities, and any that can possibly occur simultaneously with each other are assigned priorities that are different from each other. The interrupt signal lines, designated "INT0" through "INT7," are given priorities in the Master Processor Module 279, as will be noted later in conjunction with FIG. 18.

"Interrupt matrix" 1628 (FIG. 16F) thus permits the keyboard interrupt, the serial-data-transmission interrupt, and the serial-data-reception interrupt to be appropriately assigned to "interrupt levels"—that is, to priority levels—that are appropriate for the types of external equipment involved. This hand-jumpering must of course be performed in accordance with adequate insights into the structure of the priority levels assigned to all the operations in the system, and the significance of that structure.

Referring now to FIG. 16G, protective circuitry 1630 is provided to shut down the system systematically and safely, with a minimum of memory loss, when general supply voltage "+12VSP" rises above seventeen volts or memory voltage "+12VSW" falls below nine. The voltage line "+5VBB" appearing at upper left in this quadrant of FIG. 16G is the fine-regulated reference voltage developed in the regulator circuitry 1354 (FIG. 13J), discussed previously. Respective LM358 comparators 1632, 1634 compare the two supply voltages, respectively divided down by R13 and R15 (for the general supply) and by R14 and R12 (for the memory supply) against a reference voltage—further well defined by application to an LM236A zener diode 1636.

If either comparator detects unacceptable supply voltage levels it triggers 4001 "NOR" gate 1638, resulting in initiation of a systematic power-down routine. In addition, in the case of overvoltage, output signal of comparator 1632 is applied directly to one input of a two-input NOR gate 1640 to generate an overvoltage signal at pin 11 of an LC2A connector 1642. That signal becomes the power reset signal applied to terminal 10 of the power-control flipflop 1365 (FIGS. 13F, 13G). When flipflop 1365 is set, the input ship's power is immediately interrupted to protect the lamp and all other systems from sustained overvoltage.

When NOR gate 1638, mentioned just above, is triggered, it immediately produces a power-disable ("PWRDIS") signal, which is latched by a MC14528 flipflop 1644. This power-disable signal resets a 4013D type flipflop 1646 generating a memory-disable signal at pin 52 of an LC1A connector 1647 that immediately operates to prevent any further transfer of information into or out of the memories in the Master Processor Module—thus preserving all the information in those memories as well as conserving the power required to continue any information transfer that may be in progress.

The output of the NOR gate 1638 is also applied to a MC14528 monostable multivibrator 1648, which initiates a "power-failure in" ("PFIN") signal to the master processor 279. Referring briefly to FIG. 18, this signal is applied to a 8088 central processor unit 1800 via an input terminal 17 ("NMI," for "nonmaskable interrupt") which is separate from the terminal ("INTR," for "interrupt") to which all the other interrupts are applied. Thus the "power-failure in" signal has a priority that cannot be masked by appearance of any other interrupt signal, a priority that is higher than that of any of the "INT" signals in FIG. 16F. The PFIN signal initiates a five-millisecond countdown in the central processor, during which time certain critical data and partial results of certain computations are stored in MSM5114-3 working memory units 1802, 1804 (FIG. 18G) of the Master Processor Module—which are CMOS-type low-power-drain memory units.

These data are preserved in the CMOS memory 1802, 1804, by power from a small backup battery (not illustrated), for a number of hours. During this time the power problem should if possible be corrected. The battery is normally recharged by a few milliamperes of trickle current from ship's power. This current bypasses the input power-switching circuitry in the apparatus, and so is maintained whenever ship's power is available to the apparatus. When ship's power is interrupted the battery can maintain data in the CMOS memory for about ten hours without recharging.

Figure 16F:
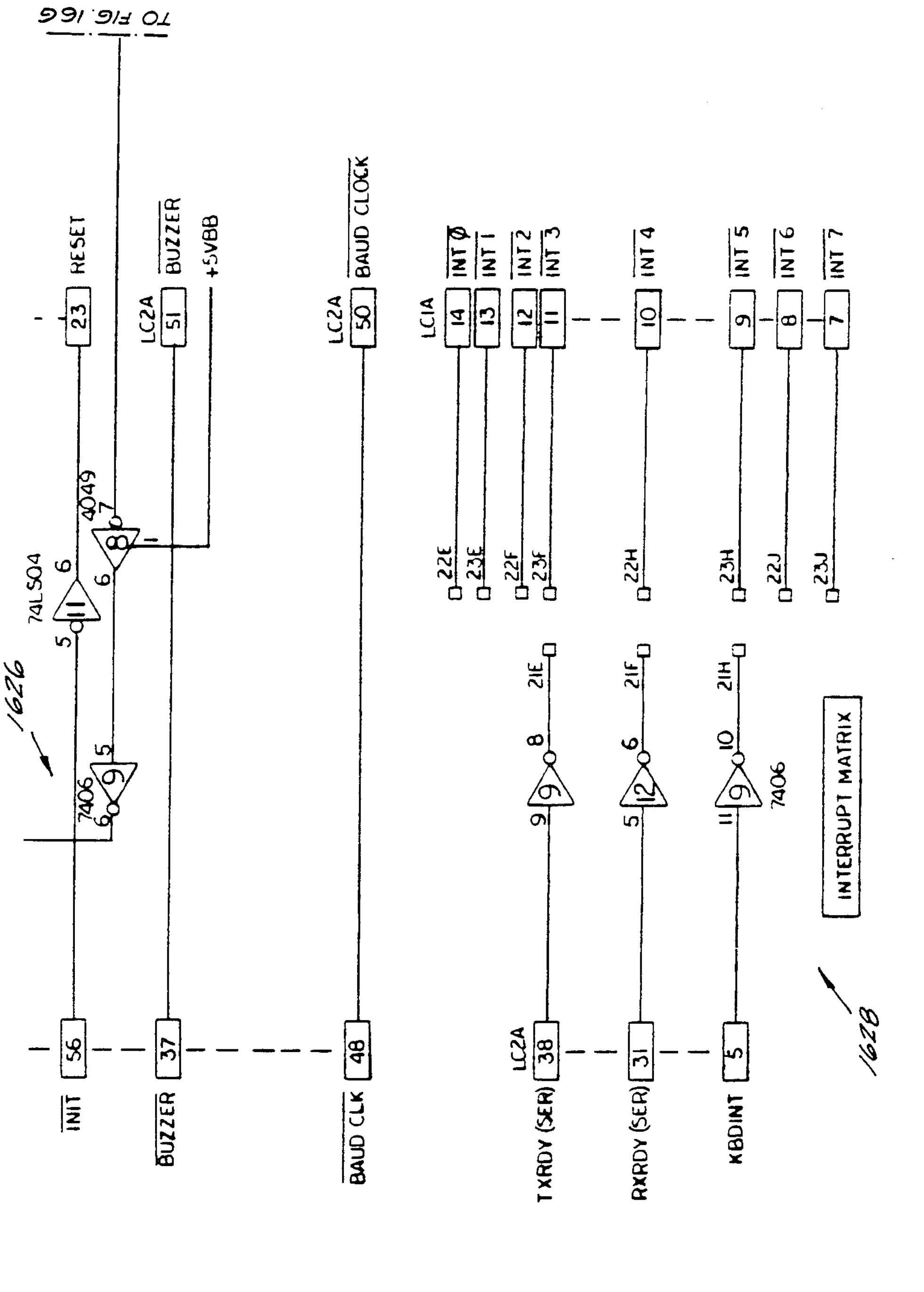
Figure 16G:
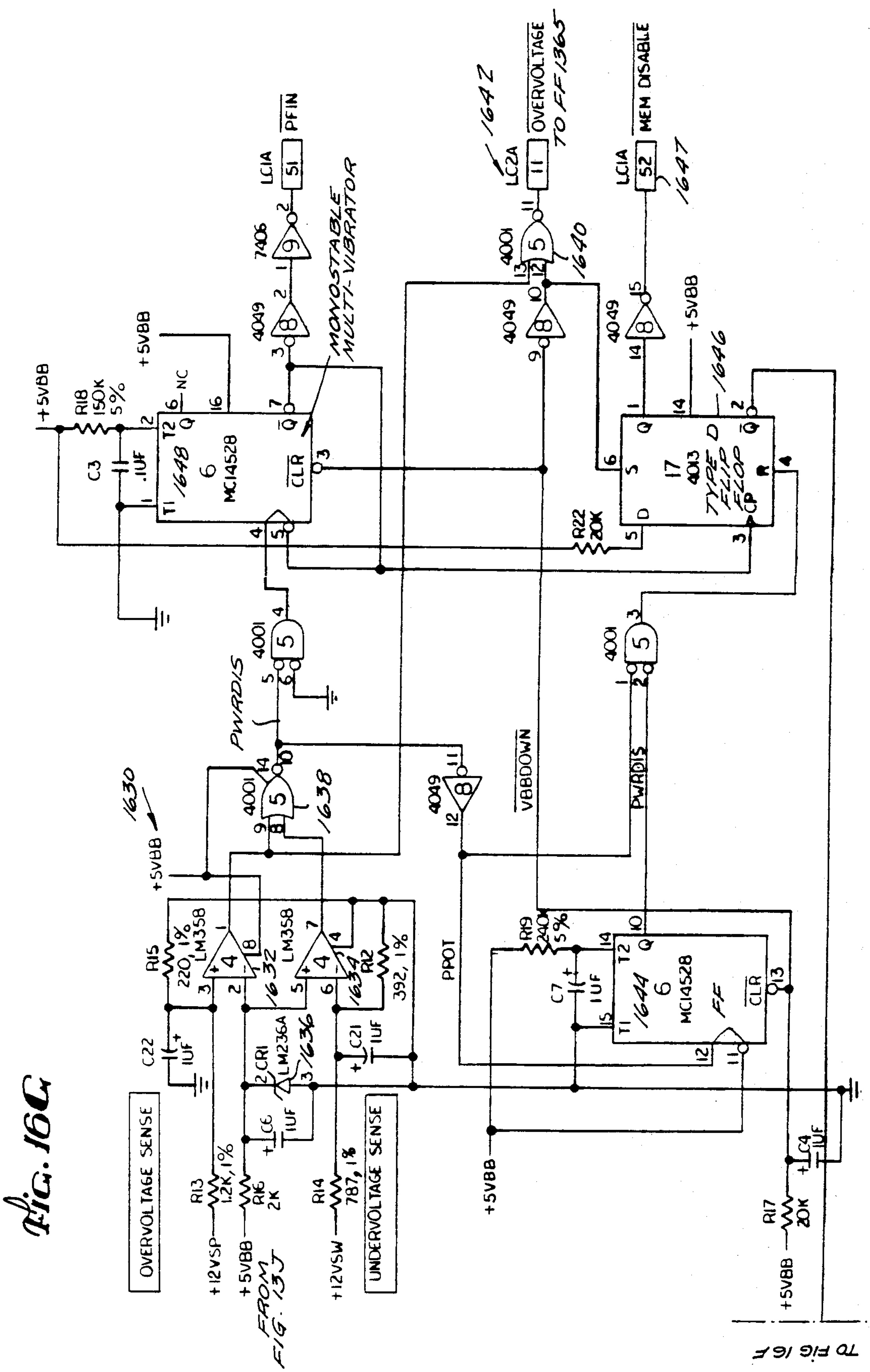
Figure 16H:
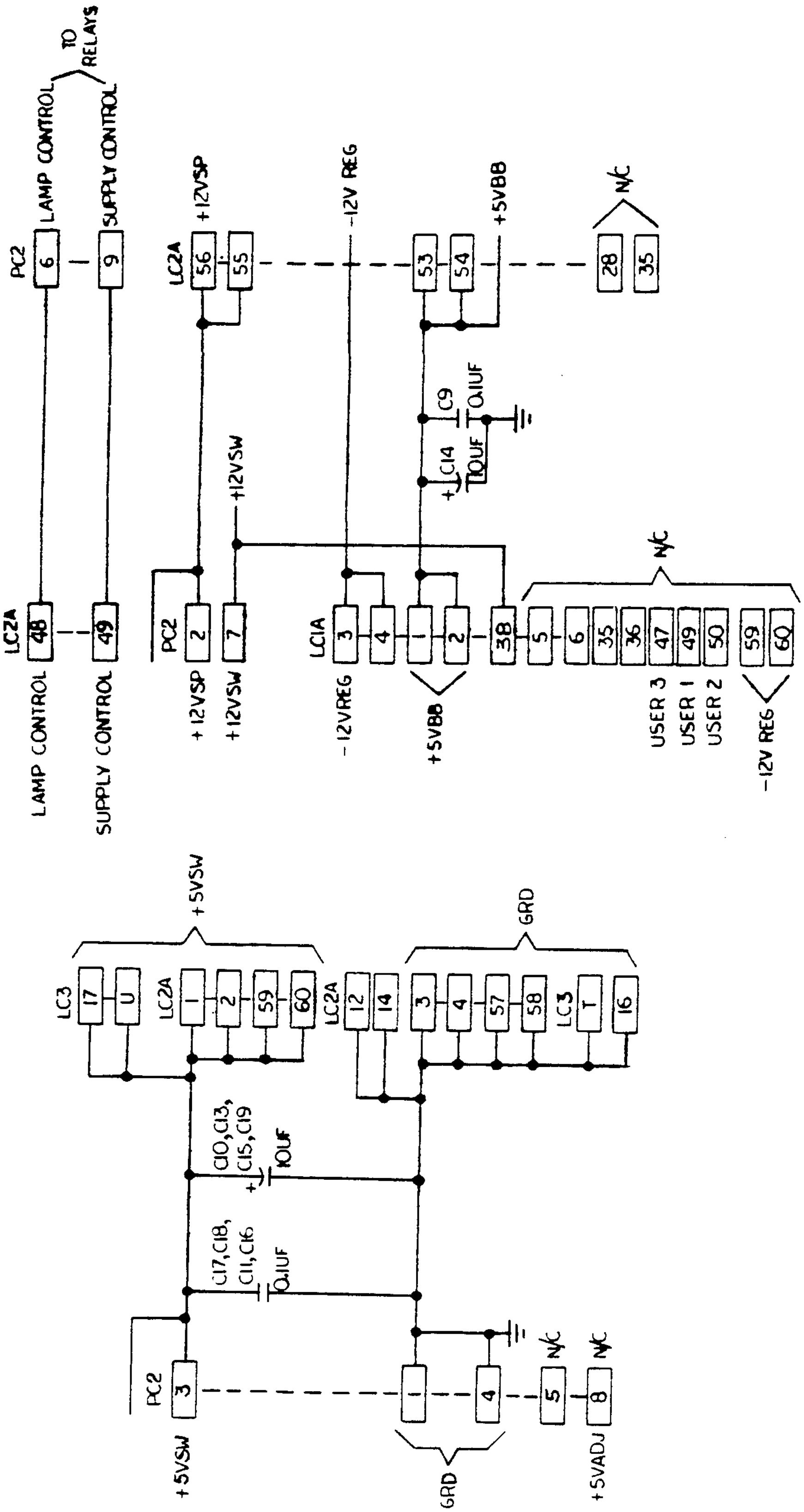

FIG. 16H simply shows through-cable connections, between the Personality Module, Slave Processor Module, Bus Module, and Power Control & Monitoring Module.

FIG. 17A–17D represents a Bus Module 1700, which with the data and control bus segments previously discussed (in connection with FIGS. 13A through 13J, and FIGS. 15, 16A through 16H) and other segments to be discussed shortly (in connection with FIG. 18) makes up the bus system 278 of FIG. 10. The Bus Module shown in FIG. 17 is of a type sometimes referred to as a "backplane"—that is, a circuit board that is positioned at right angles to the other boards in a card cage, and that carries soldered-on connectors into which the other circuit-board modules are inserted, thereby completing interconnections among the other boards.

Most of the present Bus Module 1700 is unused, being reserved for system expansions as they may be conceived and brought into use. Each column of pads 1702 indicated on the Bus Module schematic (FIG. 17) represents, in effect, a connector set to which a circuit board can make connections. The terminal pins 1704 provided for manual jumpering (FIG. 17A), permit future use of multiple additional processor modules. The bus priorities among the several processors will be established by a unit provided for that purpose in the Master Processor Module 279—under control of the jumpers manually installed here. The Bus Module 1700 as presently used makes connections only between two units—the Input/Output Module 277 (FIGS. 16A–16H), to which it makes contacts through conventional LC1B connector 1706; and the Master Processor Module 279 (FIGS. 18A through 18M), to which it makes connection at column J1.

Figure 17A:
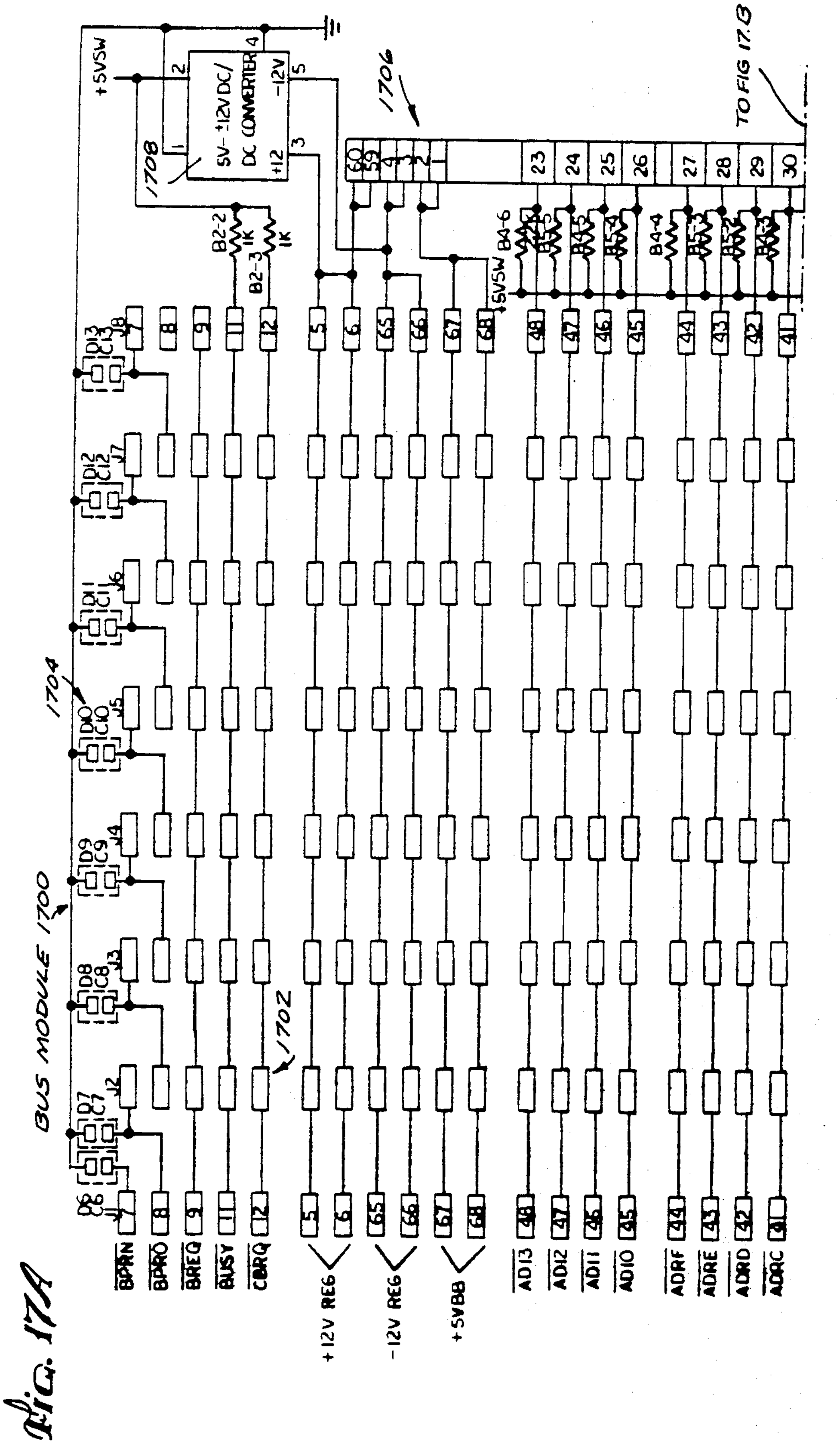
FIG. 17A–17D are a schematic block diagram of the bus module of FIG. 10.
Figure 17B:
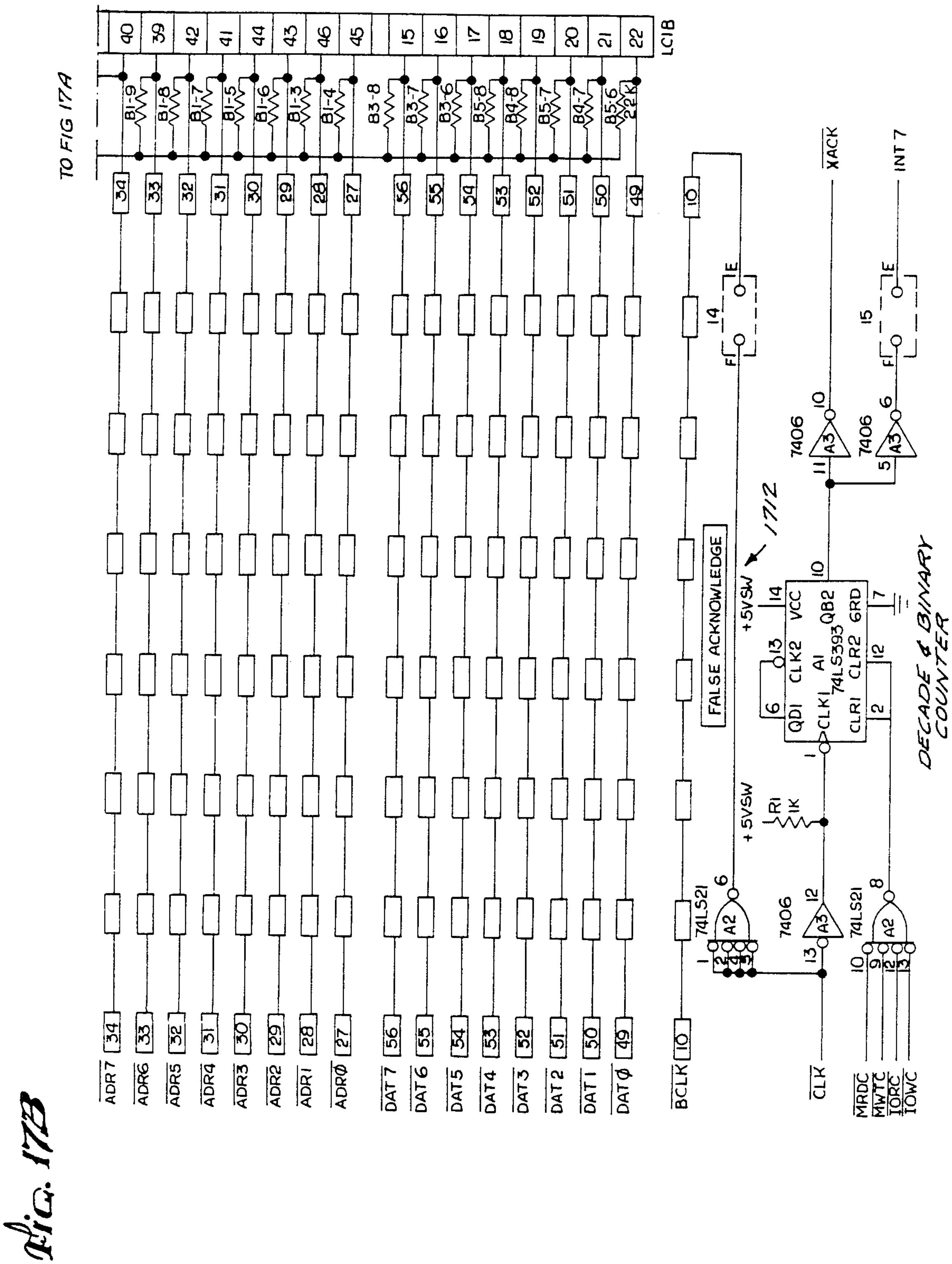
Figure 17C:
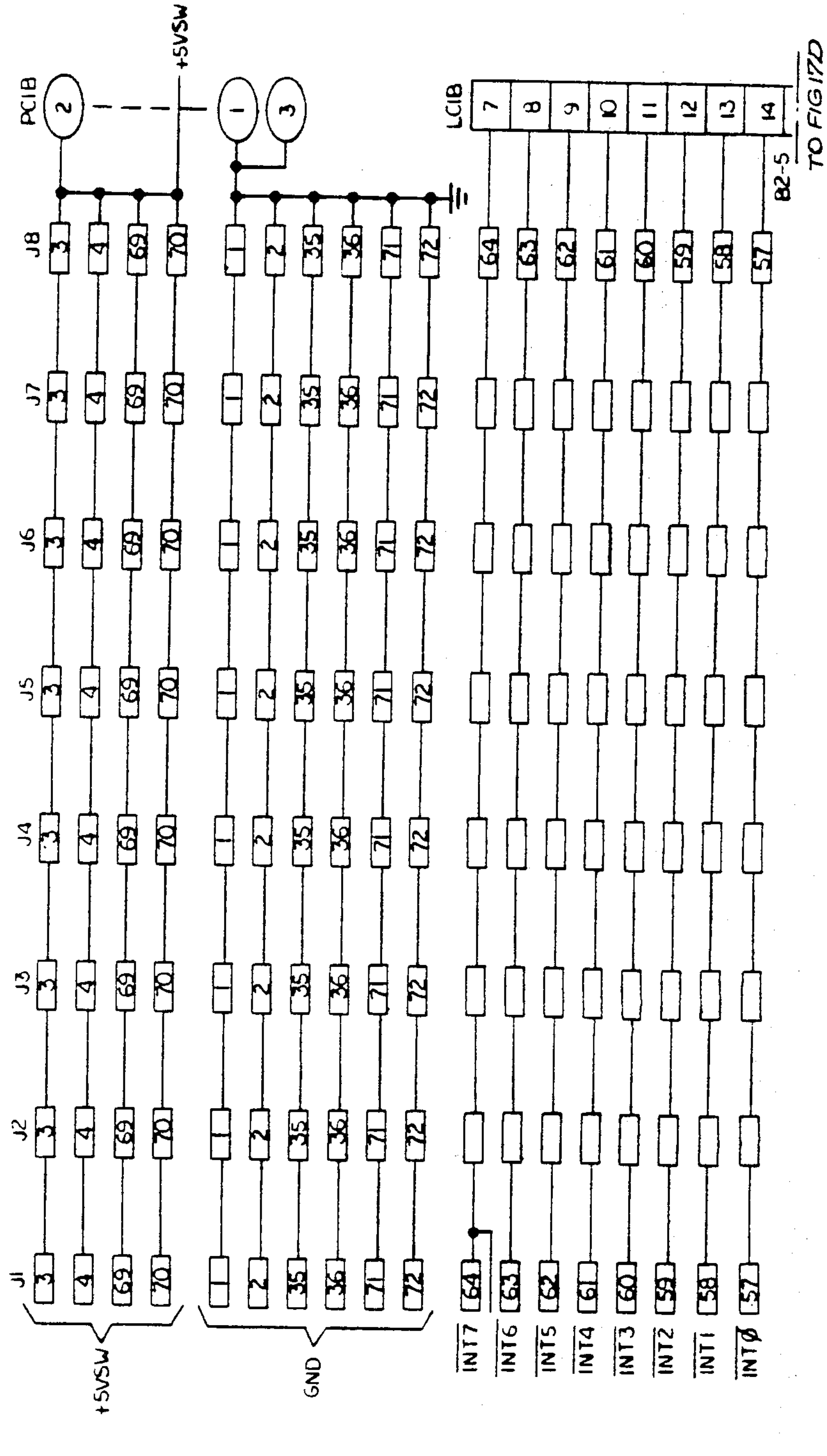
Figure 17D:
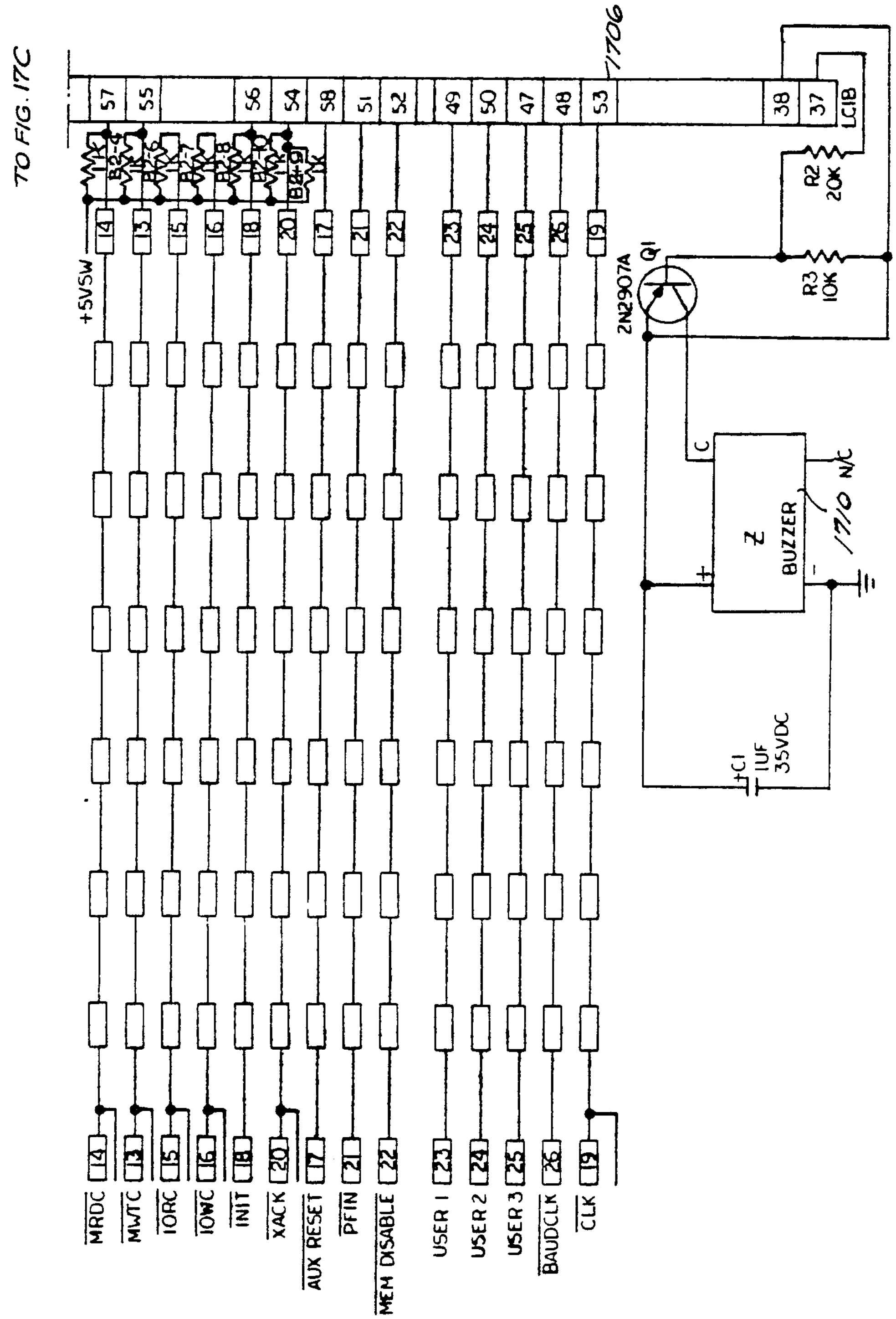

In addition, the Bus Module carries a few circuit components itself. Referring to FIG. 17H, a DC-to-DC converter 1708, provides regulated positive and negative twelve-volt power to the Master Processor Module from the five-volt logic supply. (The latter supply is conventional, and located on a separate power-supply board cabled to a PC1B connector—see FIG. 17C. The five-volt supply itself is not illustrated.) In FIG. 17D is a buzzer 1710, power transistor Q1, and connections to the buzzer control circuit, previously discussed, on the Input/Output Module 277. A "false acknowledge" circuit 1712 shown in FIG. 17B is provided primarily for troubleshooting purposes—to simulate acknowledge signals from external output devices 261, 262, 263, etc., and thereby to determine whether a fault is in one of those devices or is internal to the apparatus 270.

The Master Processor Module 279 (FIG. 10) is detailed in FIGS. 18A through 18M. The data bus that was discussed to some extent in connection with the Slave Processor Module (FIGS. 13A–13J) may now be seen to be an extension of half of the data and control bus system that is internal to the Master Processor Module 279. The "address/data" (AD0 through AD7) bus lines, appearing in FIGS. 18A and 18C, are "multiplex" lines that carry either data or addressing information, at various times, from the 8088 central processor unit 1800 (FIGS. 18A, 18B) to numerous other components within the module.

Figure 18B:
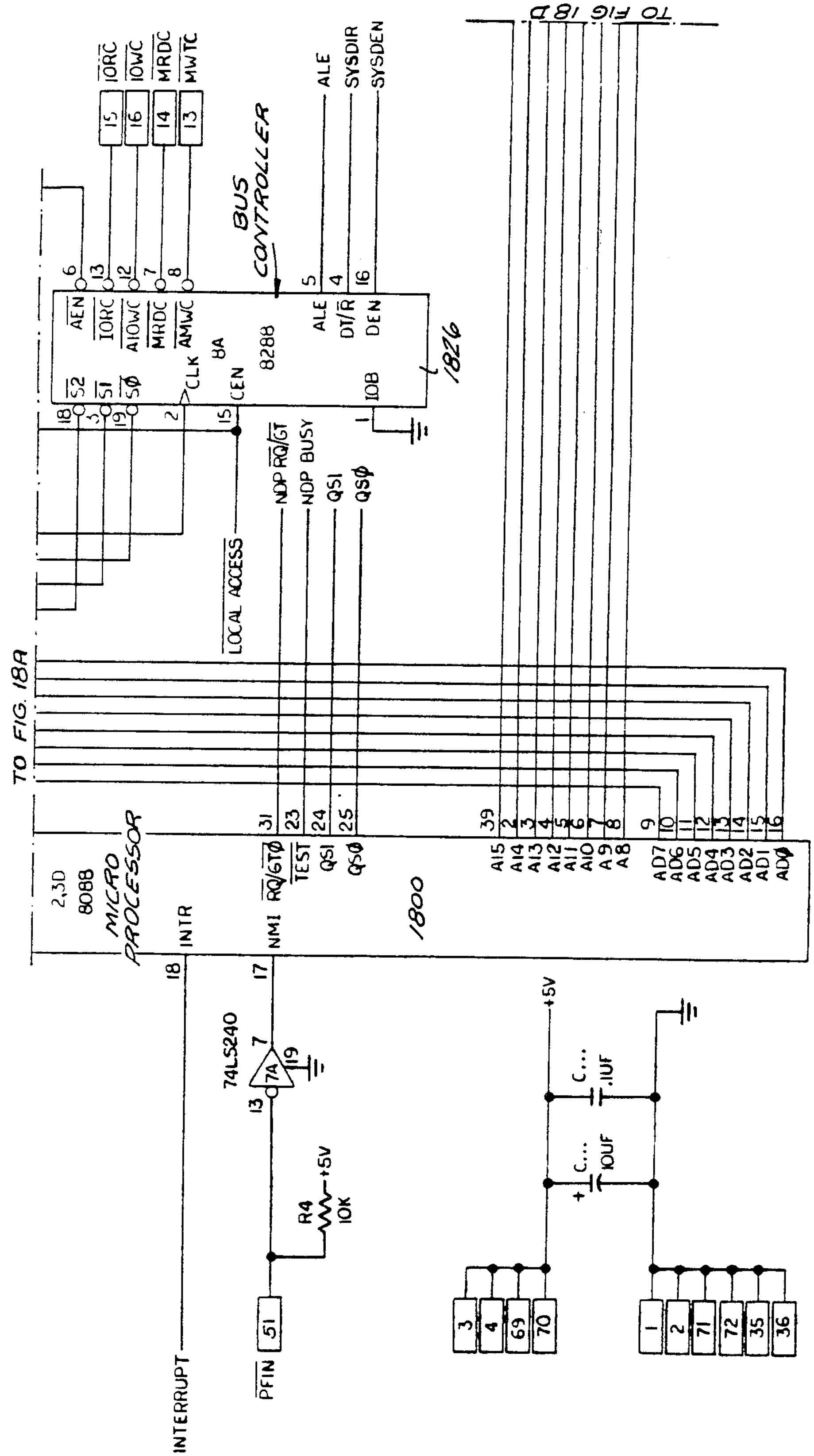
Figure 18C:
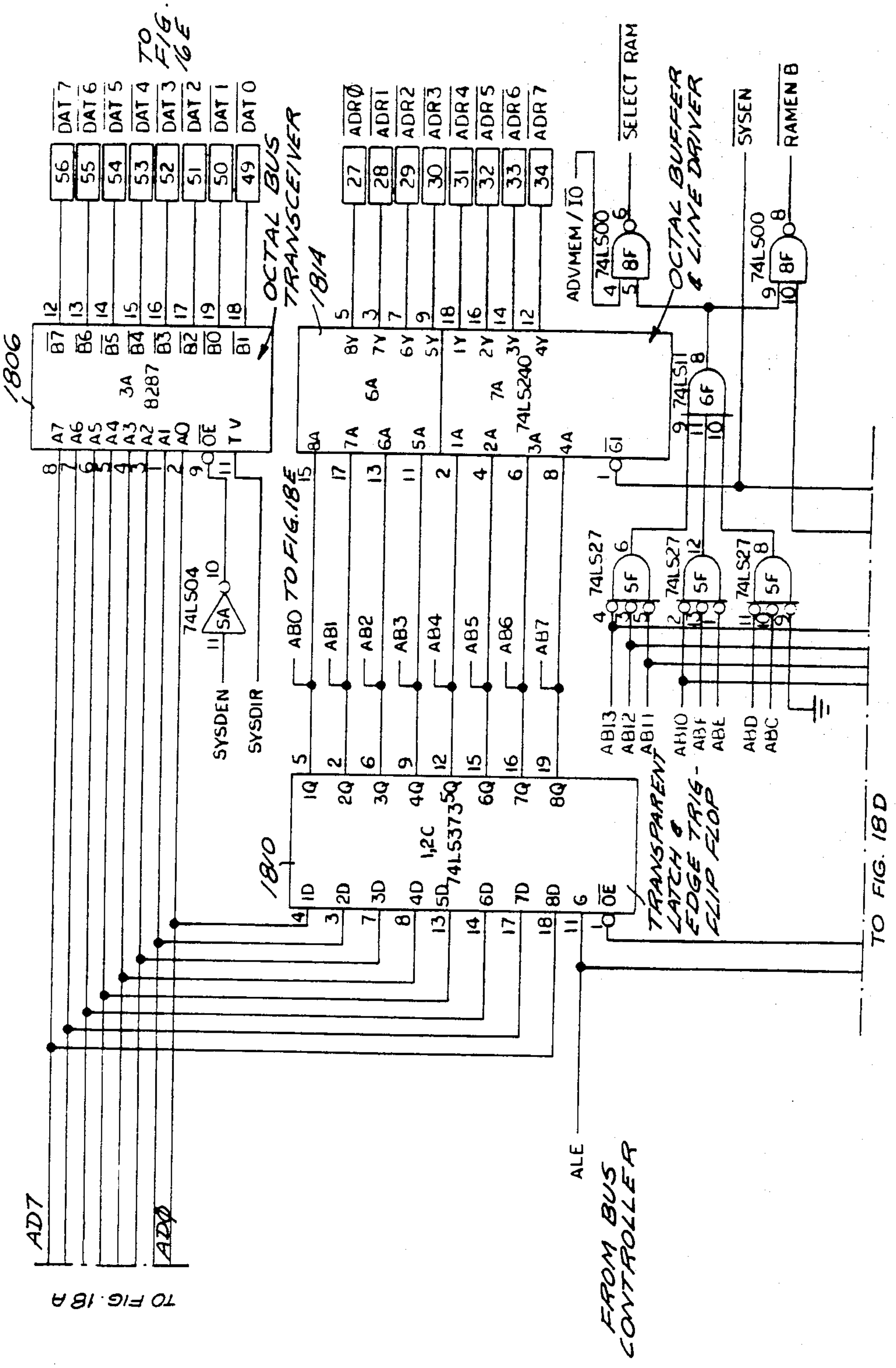
Figure 18D:
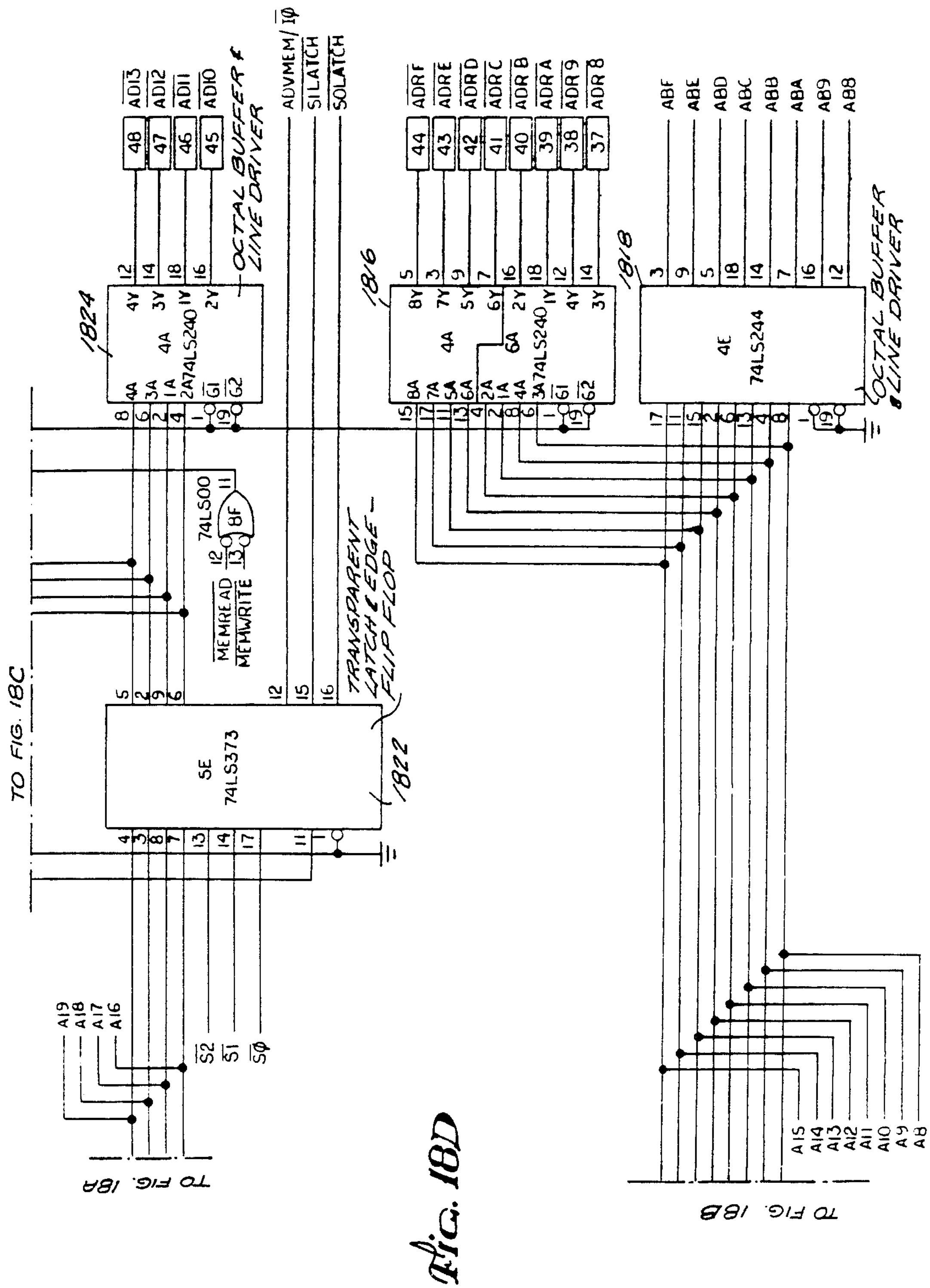

Data on these eight lines of the bus system are applied to an 8287 data-bus buffer 1806, shown in the upper right-hand corner of FIG. 18C, and then transferred via the Bus Module 278 (FIG. 17B) to the Input/Output Module 277, where they appear in the upper left-hand corner. The data are again buffered there in the P8287 unit 1626 before passage to the Slave Processor Module 273, and—after decoding—to the Display Module 272 and the Keyboard Module 271, as previously described. The address/data bus is also connected to an 8286 data buffer 1808, shown in the lower right-hand corner of FIG. 18M, forming a local "data bus" DB0 through DB7 that services the components shown in FIGS. 18E–18F. It must be understood, however, that data can flow both ways along the paths just recited, and in particular data from the Personality Module (FIG. 15), or from the 74LS240 memory port 1330 in the Input-/Output Module (FIG. 13H), can flow back to the central processor unit 1800 in the Master Processor Module (FIGS. 18A, 18B).

Similarly, the same signal lines may at different times be used to carry address or control signals—but in this mode of operation the flow is generally unidirectional, the address or control signals being provided by the central processor unit 1800 to other units in the system. When addresses or control signals are carried on this (multiplex) half of the bus, they are generally followed by data; thus it is necessary to provide a "latching" action for the address information so that it is retained and operative upon its target components after the address signals have been removed from the bus itself. This action is provided by 74LS343 address latch 1810 (FIG. 18C). The latched address bits AB0 through AB7 are held available for whatever components they are intended for, freeing the multiplex half of the bus to carry data.

The multiplex half-bus within the Master Processor Module is also connected to a 8087 mathematical processor 1812. This math processor is not in use, in the present preferred embodiment, having been supplanted by expanded mathematical processing within the central processor unit 8088.

Figure 18E:
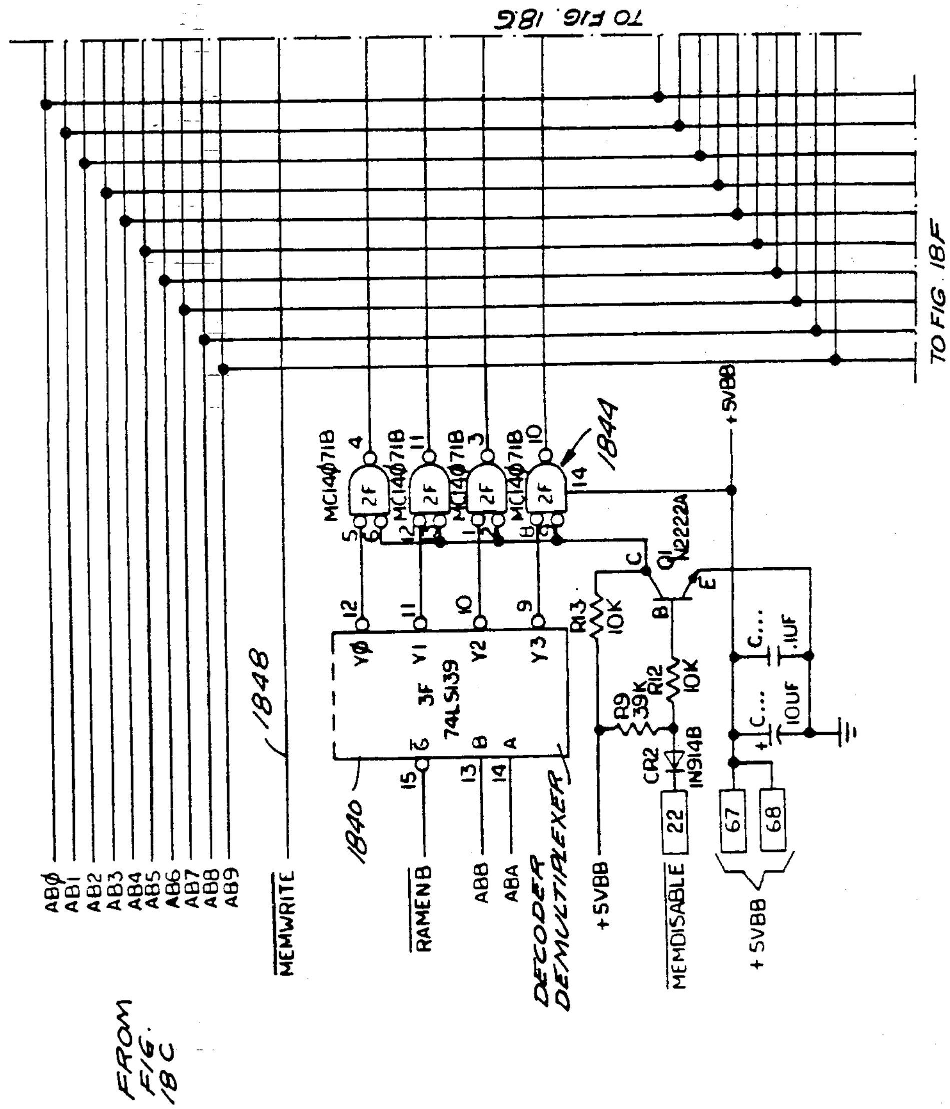

The address bit lines AB0 through AB7, just mentioned, pass through a 74LS240 address-bus buffer section 1814 (at the right end of FIG. 18C), to become ADR0 through ADR7 complement signal lines, which perform the address-bus functions previously noted for the displays and the ROM on the Personality Module. Meanwhile the address bit lines AB0 through AB7 also branch and are shown in FIGS. 18E and 18G as applied to the address terminals of the several memory sections appearing in FIG. 18G.

The other half of the bus system originating within the Master Processor Module starts at output lines A8 through A15 of the 8088 central processor unit 1800 (FIG. 18B). These eight lines are usable for addresses only. In addition to branching for connection to the math processor 1812, now unused, these eight lines are applied to another 74LS240 address-bus buffer 1816 (FIG. 18D), forming complement signal lines ADR8 through DARF, which with the eight output lines of buffer 1814 (FIG. 18C) complete a sixteen-line intermodule address bus. In addition, the eight addresss output lines A8 through A15 of processor 1800 are applied to a 74LS244 internal buffer 1818, forming address signal lines AB8 through ABF for control of the 2732A or 2764 programmable read-only memories (PROMs) 1820, shown in FIG. 18H. These lines in effect, in combination with the eight complement signal lines ADR0 through ADR7, also complete a sixteen-line address bus.

Eight status signal lines from the central processor 1800 unit are directed to a 74LS373 CPU status latch 1822—(FIG. 18D)—which performs for the status lines a function similar to that performed for the multiplex bus lines by the upper latch, as previously described. In this instance, however, the signals for which the status lines are freed are not data signals but simply other status signals. The latched signals are used to generate other complex status signals (utilizing respective 74LS27, 72LS11, and 74LS00 gates, just to the right and up from CPU status latch 1822). The latched signals are also applied to a third 74LS240 addressbus buffer 1824 (FIG. 18D), where they are buffered and passed on to the Slave Processor and Display Modules.

Some of these eight signal lines from the central processor 1800 are passed onto 8288 bus controller 1826, which produces appropriate signals when the central processor is reading or writing via the bus. Some of the same signals also are passed to a 8289 "multiple-processor bus arbiter" 1828, not in use in the present preferred embodiment but provided—as the extra channels in the Bus Module discussed earlier—for system expansion by addition of other functional microprocessor units. In the event such units are added, the multiple-processor bus arbiter 1828 will resolve priorities as between them—-based in part on additional manually applied jumpers 1830, 1832, 1834 between the wire-wrap terminals marked "Y," "Z" and "Q" in FIG. 18A.

An 8284A ready generator 1836, at left in FIG. 18A, functions in cooperation with a 12 MHz crystal 1838 shown just above it to provide clock signals for use throughout the system, and also collects various "acknowledge" and "ready" signals from other parts of the Master Processor Module and constructs an overall "ready" signal for passage to the central processor 1800. This "ready" signal informs the central processor that the system has completed tasks it was previously instructed to perform, if any, and is now ready for reading or writing of the next item of data or address information on the data/address bus system or status lines.

FIGS. 18E–18H illustrate primarily the memory system of the Master Processor Module. Two banks of MSM5114-3 random-access memories (RAMs) 1802 and 1804, respectively, are provided (FIG. 18G), each bank having four memory chips. The system has already been described whereby the 8088 central processor unit 1800 (FIGS. 18A–18D) addresses the memories, but the address lines previously described all carry addressing information in numerical location form. Some of the signal lines carrying this data must be decoded to determine which chip is being addressed by the other address signal lines, and to generate high-low "strobe" or "command" signals to the individual chips. Thus, lines AB0 through AB9 call out memory locations in all of the MSM5114-3 RAM individual chips of RAMs 1802 and 1804 (FIG. 18G), without discriminating among them, and likewise as to the 2732A or 2764A PROM chips 1820 (FIG. 18H) (taking into account the additional bit lines ABA, ABB and ABC to the PROMs).

Figure 18F:
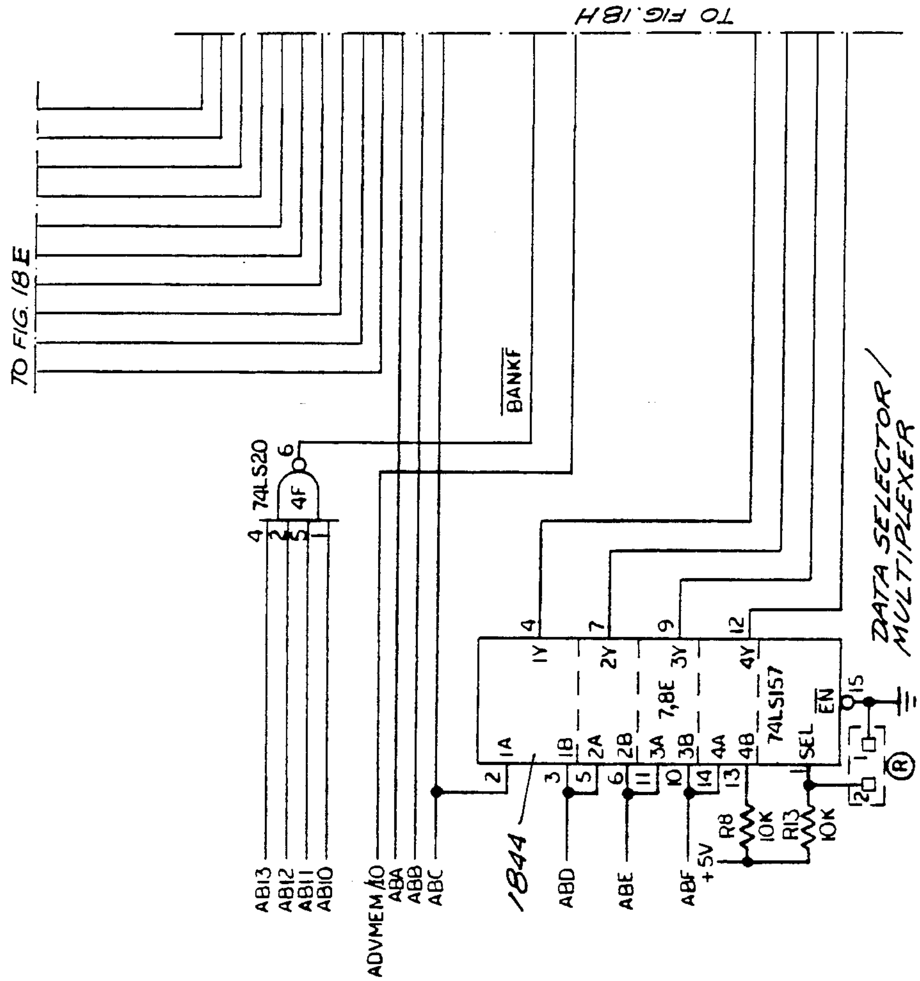
Figure 18G:
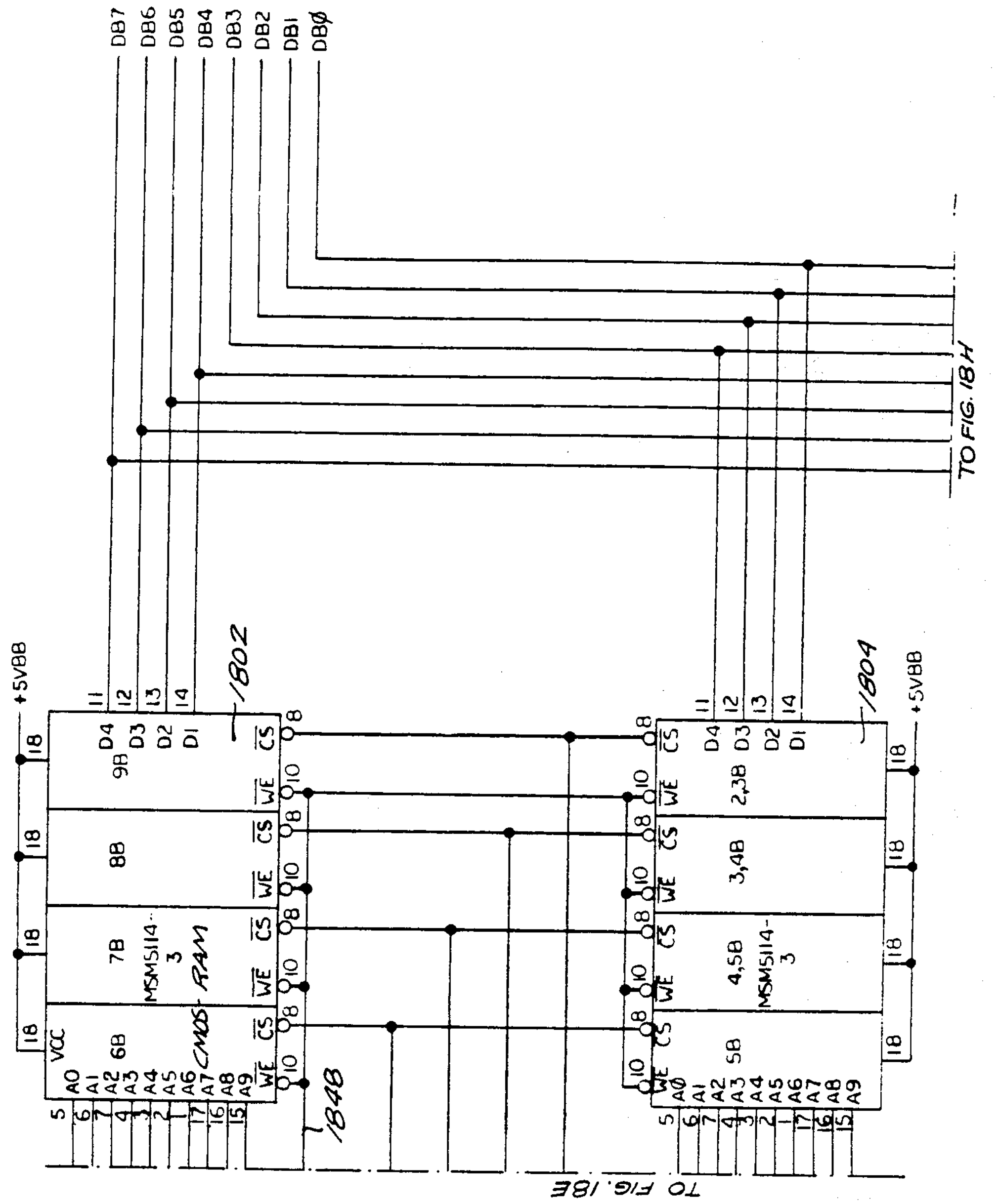
Figure 18H:
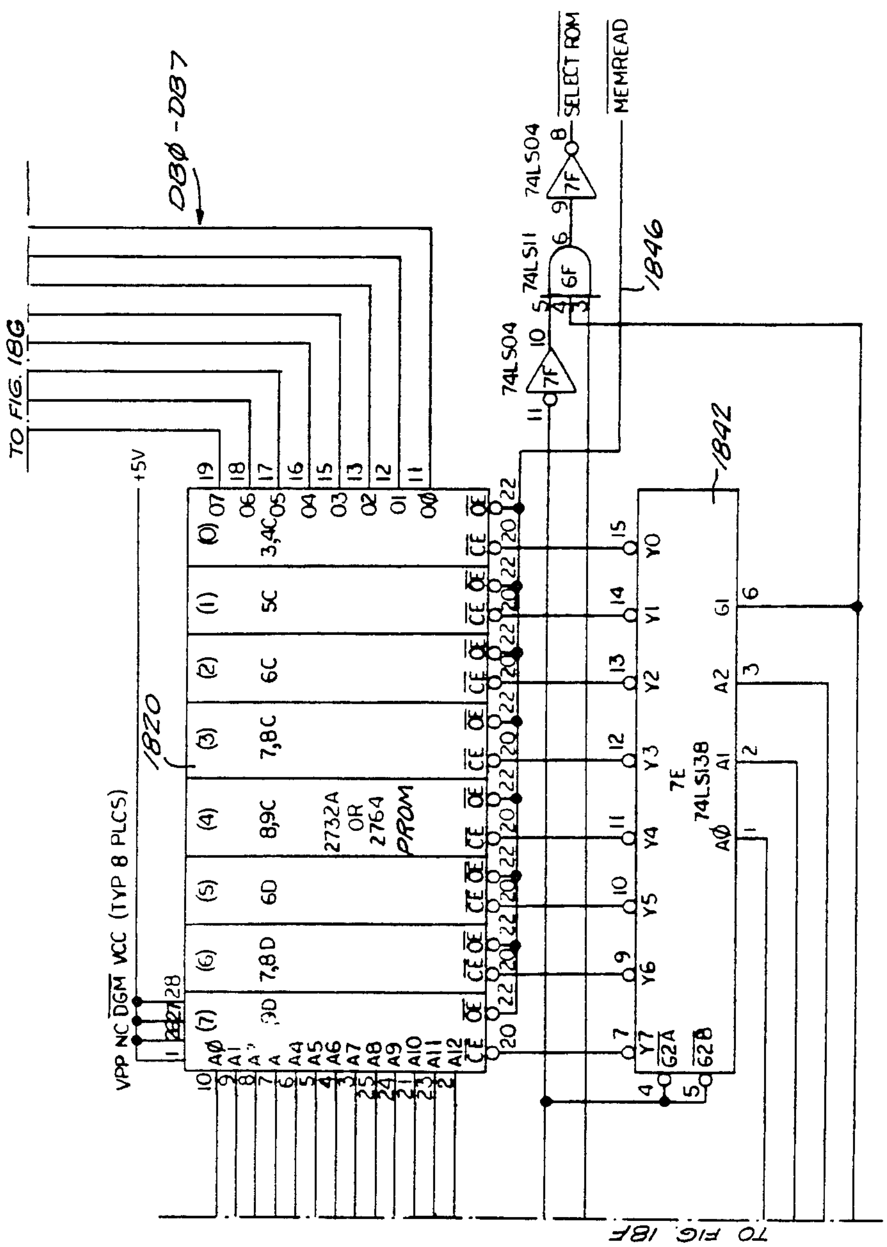
Figure 18I:
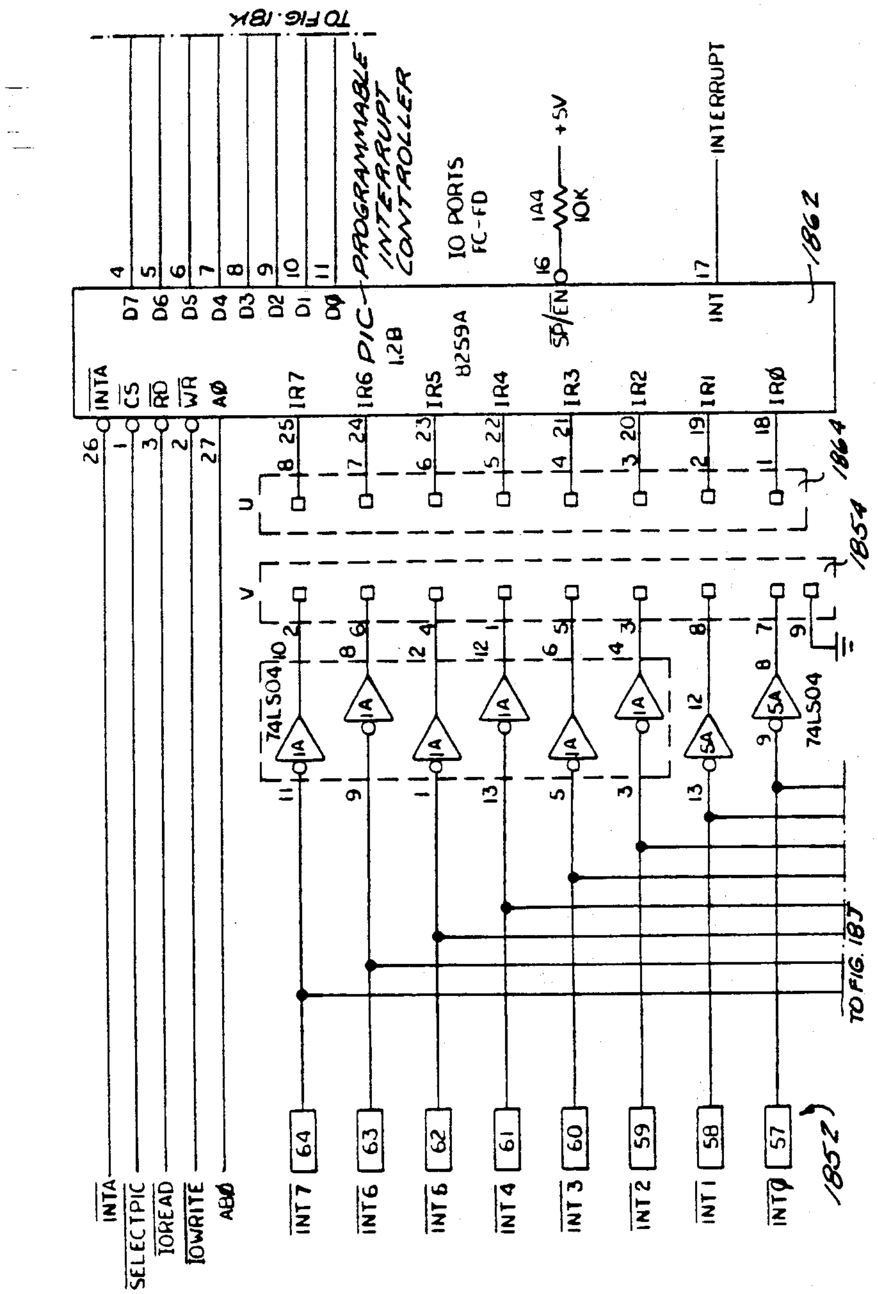

The additional decoding step is provided in 74LS139 RAM-select decoder 1840, at the left end of FIG. 18E, and in 74LS138 PROM select decoder 1842, at the bottom of FIG. 18H. PROM select decoder 1840 selects a RAM chip pair for actuation, subject to inhibition through four MC14071B "AND" gates 1844 when the RAM is in use (by the complement "ramenable" or "RAMENB" signal applied to the decoder) or when the power is too high or low (by the complement "memory disable" signal, at pin 22 of the connector, as discussed earlier in connection with the Input/Output Module, FIGS. 16E–16H). The two binary bits at lines ABA and ABB are sufficient to specify four conditions, corresponding respectively to establishment of a "high" logic level at any one of the four chip-select lines 4, 11, 3 or 10, from the four MC14071B "AND" gates.

Similarly the 74LS138 PROM select decoder 1842 receives three chip-select signals A0, A1 and A2—sufficient to specify a high logic level for any one of the eight PROM chips.

Depending upon the functional capacity demanded of the apparatus 270, in its various possible expanded applications, it may be desirable to use either a 32K capacity PROM chip in each of the eight positions—where diagrammed in FIG. 18H—or a 64K capacity PROM chip in each of those positions. A 74LS157 PROM "size" selector multiplexer 1844 (FIG. 18F), accommodates the resulting ambiguity in memory locations—and this is the reason for the added signal line to terminal G1 of the 74LS138 chip selector 1842.

Once the address of a memory location has been called out, the next step is to strobe the memory to read or write, as the case may be. In the case of the PROMs 1820, in which is stored the program for the 8088 central processing unit 1800, the strobe line is the complement "MEMREAD" line 1846 (drawn from the lower right of PROMs 1820). When the address has been established and the voltage on this line is lowered to strobe the PROMs, the next program instruction is read from the PROMs onto data bus DB0 through DB7, where it traverses the 8286 data buffer 1808C (FIG. 18M), and then joins the portion of the data bus previously discussed (AD0 through AD7) for transmission to the 8088 central processor unit 1800 on FIGS. 18A–18D.

In the case of the RAMs 1802, 1804 (FIG. 18G), the addressing operation and readout are substantially the same, except that the "read" strobe line is—as is conventional—omitted from the drawing. To write into the RAMs, the addressing is performed in the same fashion as for reading, but the complement "MEMWRITE" signal line 1848 (FIGS. 18E, 18G) rather than the "read" line, is brought low to enable writing into the RAMs; data from the same data bus is then applied to the RAMs for storage.

Most of the components shown in FIGS. 18I–18M are devoted to internal "housekeeping" functions, the only exceptions being 8286 data buffer 1808 (FIG. 18M) and an 8231 math processor 1850. Data buffer 1808, as previously mentioned, is positioned at a point where the multiplex half-bus AD0 through AD7 becomes devoted more exclusively to handling data. Math processor 1850 is provided to perform certain computations that require special machine-language programming for execution in reasonable time—such as small-argument arctangents and other transcendental functions.

Figure 18J:
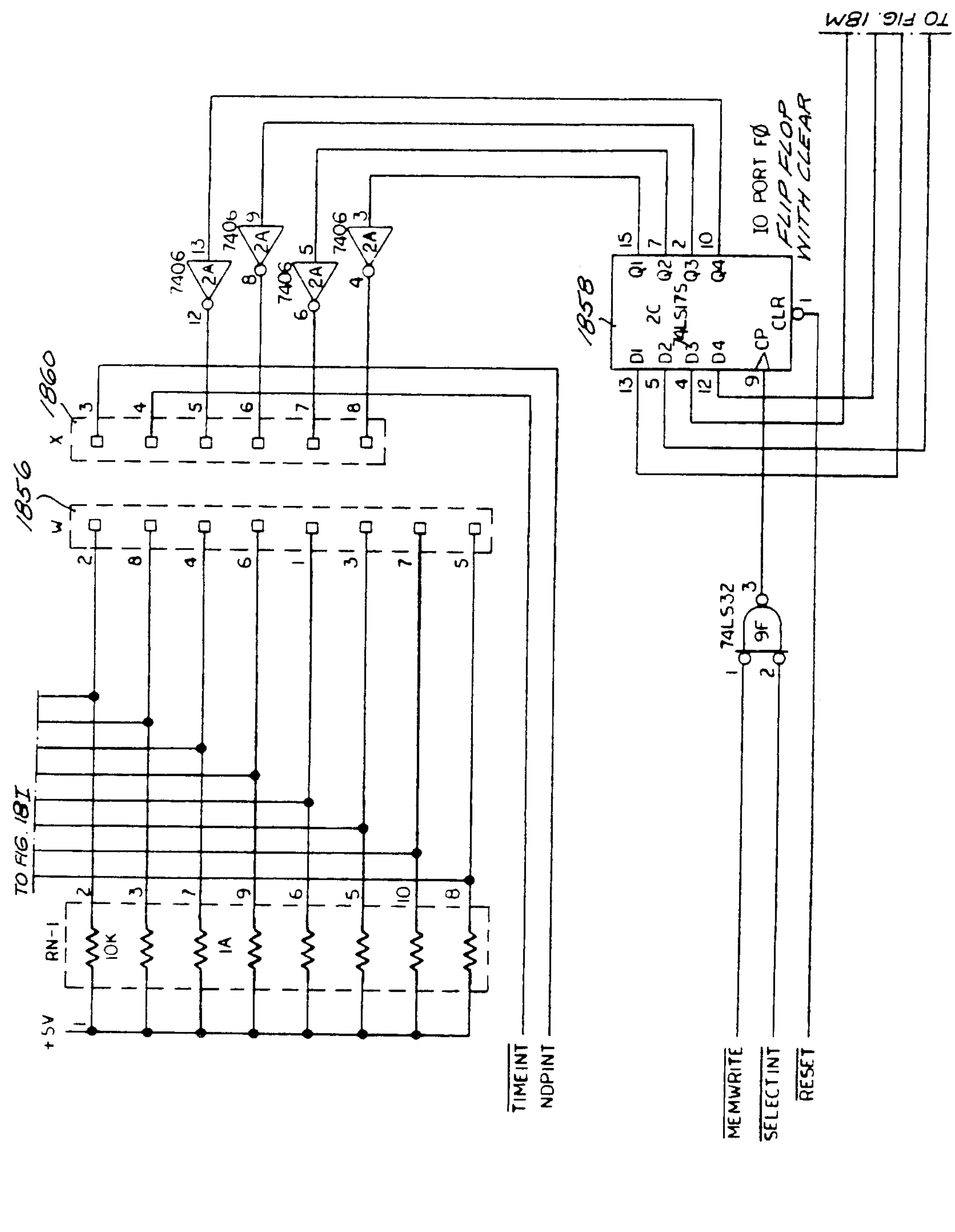
Figure 18K:
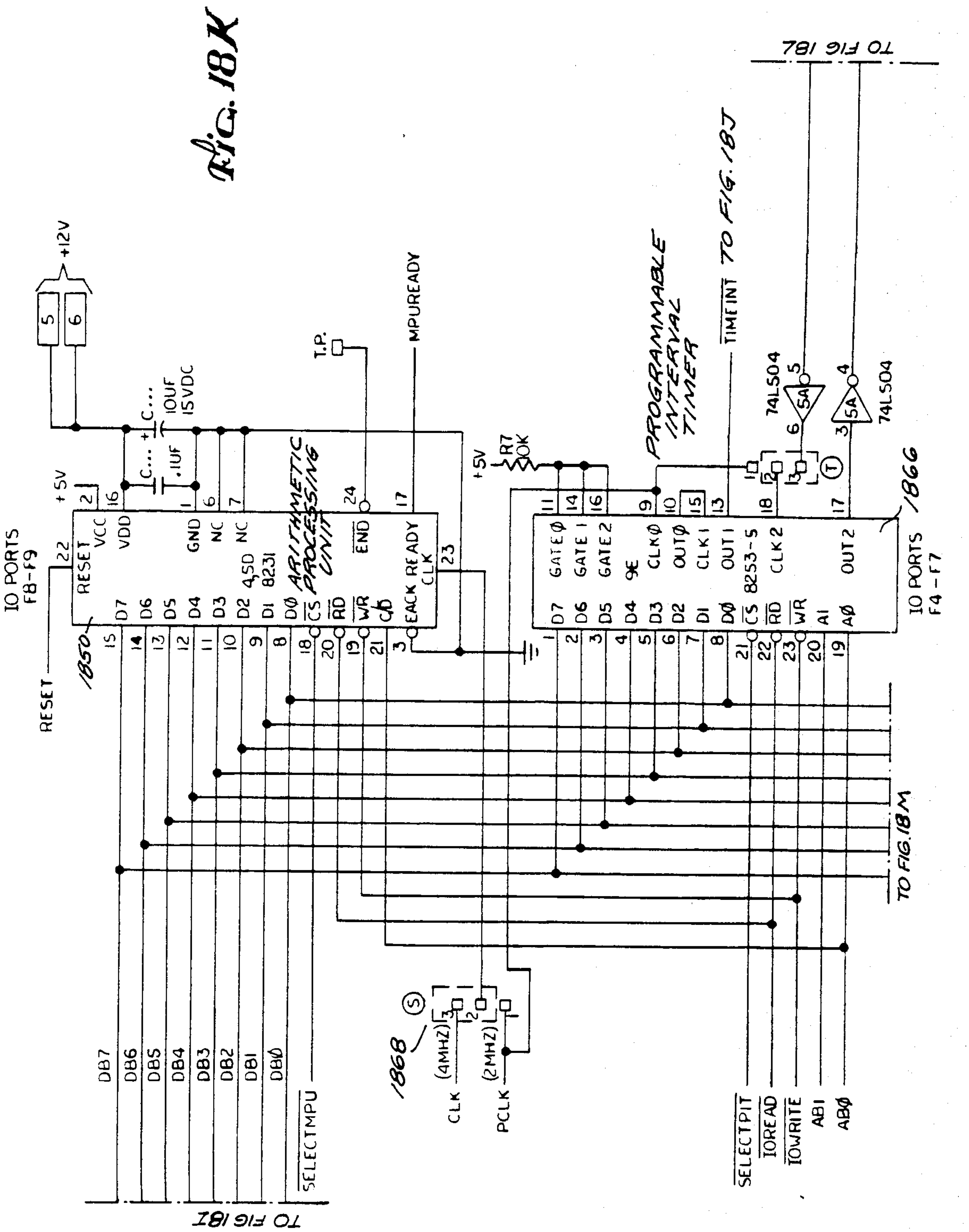

Most of the other circuitry shown in FIGS. 18I–18M is related to the prioritization and management of the "interrupts" mentioned earlier in connection with the Input/Output Module (FIG. 16F). The various externally generated interrupt signals are collected at pins 57 through 64 of the Master Processor Module connector strip 1852, along the left edge of FIG. 18I, and are inverted and applied to wire-wrap pins 1854 (V) (FIG. 18I) and 1856 (W) (FIG. 18J).

Other interrupts, generated internally by the program, are applied to a 74LS175 interrupt register 1858 (FIG. 18J), where one four-bit word represents the status of four interrupts. The bits in this register are simply held until used. The output lines from 74LS175 interrupt register 1858 are applied to wire-wrap pins in 1860 (X) (FIG. 18J), along with other interrupts from others points within the Master Processor Module, as shown.

An 8259A programmable interrupt controller (interrupt counter) 1862 (FIG. 18I) has as its inputs eight prioritized lines IR0 through IR7, and five other lines (INTA, CS, RD, WR, A.0) that also function as interrupts. Coordinating and prioritizing all of these inputs signals, interrupt counter 1862 generates an output "interrupt" signal only when no higher-priority interrupt is already in effect. The relative priority of the externally generated interrupts and the internal, program-generated interrupts mentioned previously is determined by manual strapping. The strapping is custom-applied between the previously mentioned wire-wrap pin sets V, W and X and the pin set 1864 (U) FIG. 18I) that is connected directly to the input terminals of the interrupt counter. Here again, of course, proper application of external jumpers at these terminals requires a thorough understanding of the significance of the interrupt structure and the requirements of the external apparatus involved.

As previously mentioned, the "interrupt" signal from the interrupt counter is applied to the 8088 master processor unit 1800 (FIGS. 18A, 18B), where any arriving interrupt signal is treated as a "maskable" interrupt—in that it may be overridden, or "masked," by an interrupt of higher priority as determined in the interrupt counter. Also applied to the master processor unit is a "nonmaskable interrupt" signal (NMI), which overrides any of the interrupts processed through the interrupt counter. As also previously mentioned, the NMI signal is generated by the overvoltage and the undervoltage sensing circuitry 1630 in the Input/Output Module (upper right in FIG. 16G).

An 8253-S programmable interval timer 1866 (FIG. 18F) (periodic interrupt timer) receives from the 8284A master clock 1836 8284A (left end of FIG. 18A) either a 4 MHz or 2 MHz clock signal (selected by manual strapping at wire-wrap pins (S), shown at left center of FIG. 18F), and generates periodically a complement "time interrupt" (TIME INT) signal. This signal, applied to terminal 4 in the wire-wrap pin set 1856 (X) (FIG. 18J), is used to announce when certain regularly scheduled processes should be initiated—such as, for instance, the updating of position by dead reckoning.

Such interrupts will generally be assigned a very low priority, since they can be effectuated a few milliseconds or even seconds late without adverse result. The periodic interrupt timer obtains its complement time-interrupt output signal (TIME INT) by dividing down the input clock signal; it is accordingly easy to use the same timer to produce another necessary divided-down signal, the complement "baud clock" signal at terminal OUT2, which establishes a character-transmission rate for communication of data between the apparatus 270 (FIG. 10) and external devices 251, 252, 253, 261, 262, 263, etc.

Figure 18L:
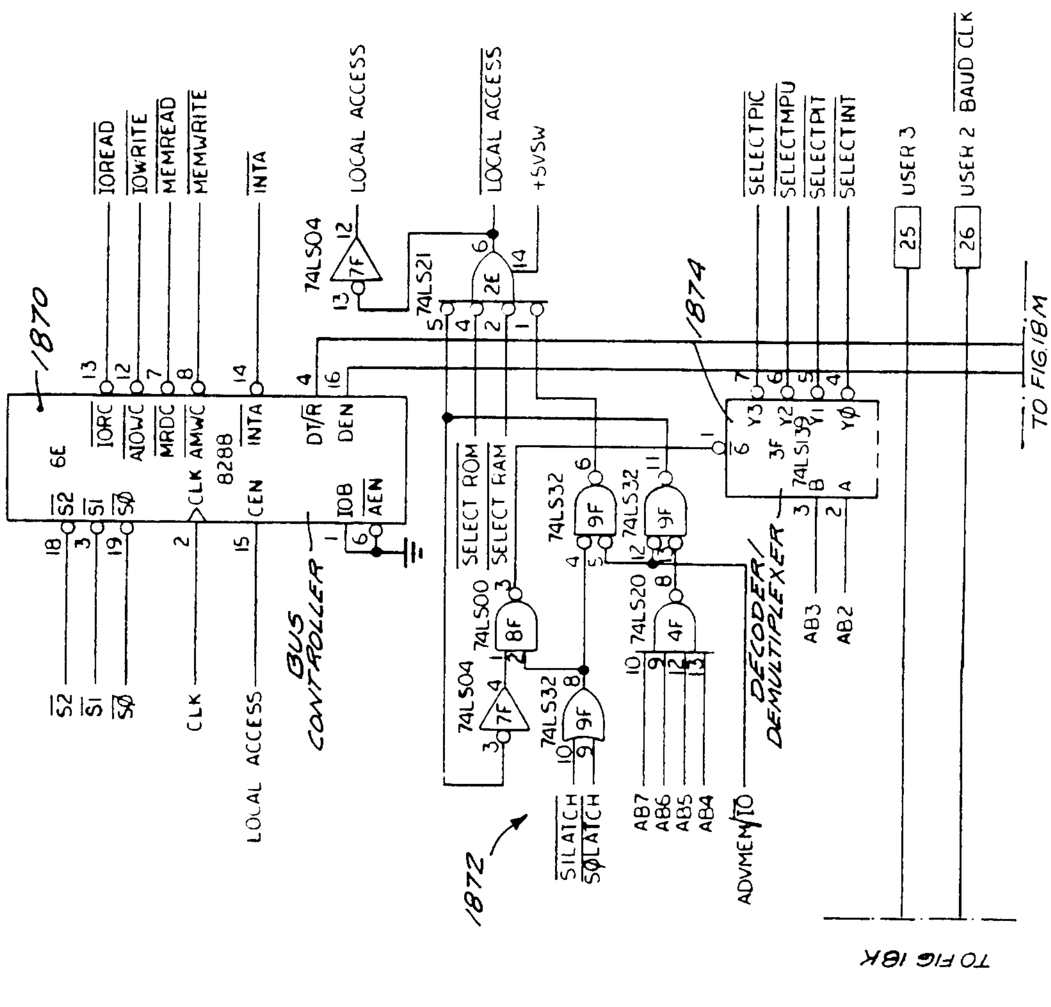
Figure 18M:
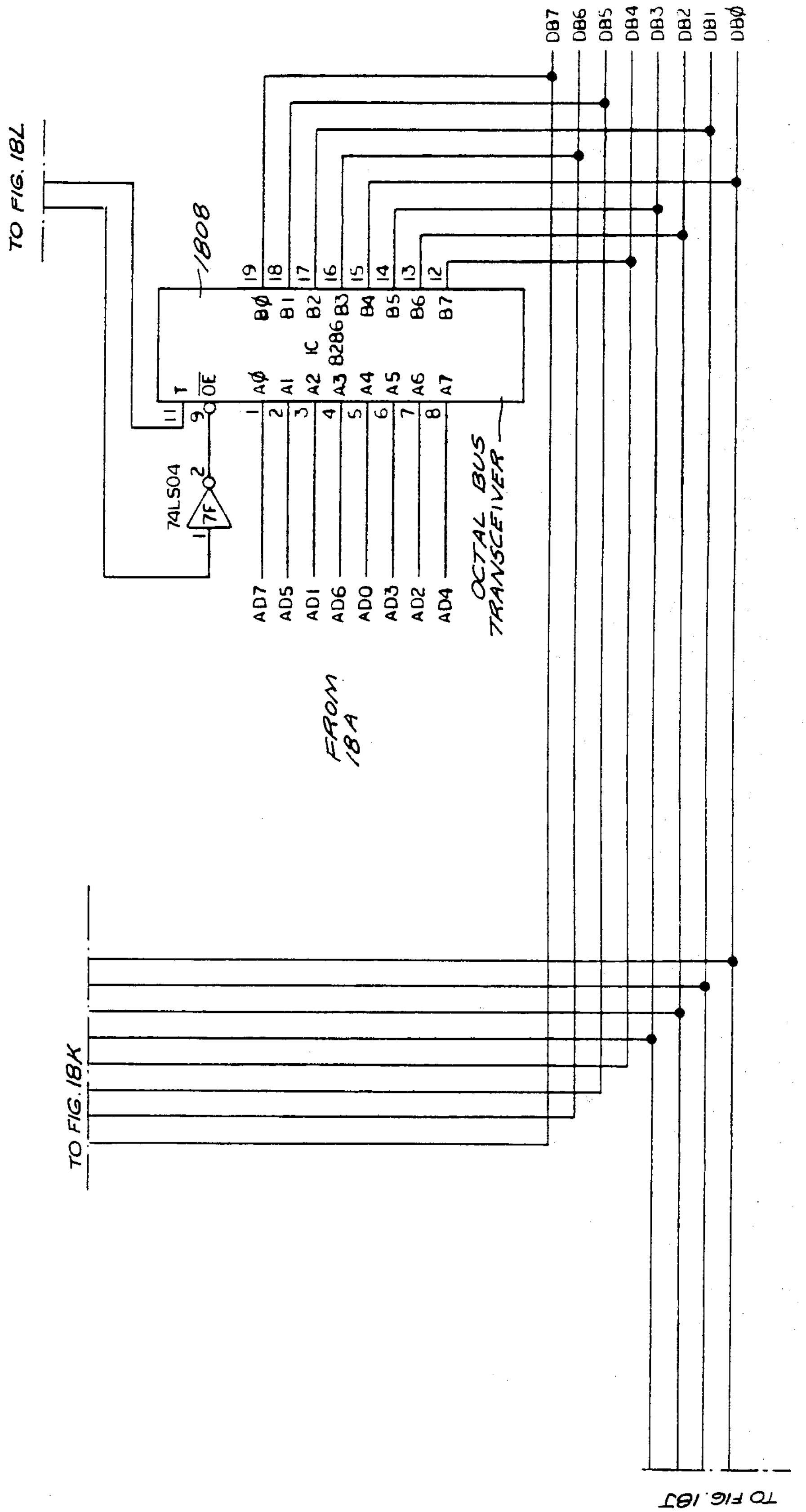

Referring now to FIG. 18L, an 8288 bus controller (system controller) 1870 receives various status signals from the central processor unit. Bus controller 1870 commands the other components in the Master Processor Module to read or to write into or from input or output devices (note the complement signals IOREAD and IOWRITE), or into or from memory (note the complement signals MEMREAD and MEMWRITE). Bus controller 1870 also generates a local interrupt (complement signal INTA) when required to avoid certain kinds of priority conflict not handled by the interrupt counter. In particular, the 8288 system controller 1870 receives a "local access" signal from a group of 74LS00, 74LS04, 74LS20, and 74LS32 gates, generally indicated as 1872, drawn just below it. These gates generate the local-access signal to inhibit operation of the system when conflicting uses of the bus would otherwise occur—such as, for instance, in using the bus to communicate with memory-mapped input-output devices and at the same time with the internal RAMs or PROM in the Master Processor Module.

A 74LS139 decoder/multiplexer (internal-memory-mapped-device selector) 1874 is also provided. Whereas the various input and output devices previously discussed are "mapped" into memory locations by "port control" units 1316 (FIG. 13E) and 1318 (FIG. 13B) in the Slave Processor Module (273), the apparatus also "maps" into memory locations the data terminals of certain components that are internal to the apparatus, but not actually memory modules as such. The 74LS139 internal-memory-mapped-device selector 1874 generates signals that select these internal nonmemory devices for communication on the data bus. The control signals for this purpose are shown at complement lines "SELECTPIC" (select 8259A programmable interrupt counter 1862), "SELECTMPU" (select 8088 master processor unit 1800), "SELECTPIT" (select 8253-A programmable interrupt timer 1866), and "SELECTINT" (select 74LS175 interrupt register 1858).

Figure 19:
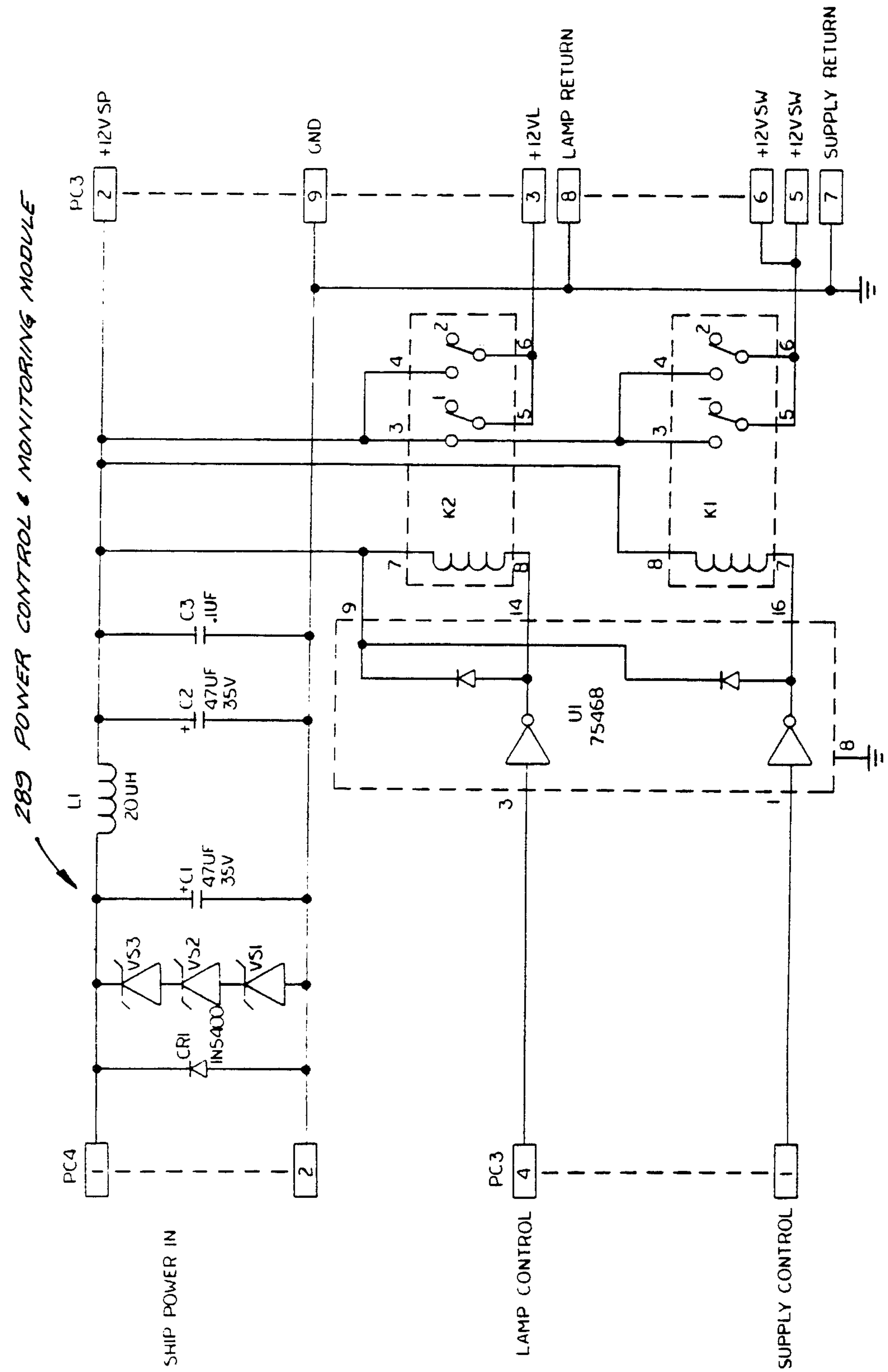
FIG. 19 is a schematic block diagram of the power control and monitoring module of FIG. 10.

FIG. 19 illustrates the circuitry in the Power Control & Monitoring Module, 289 in FIG. 10. Ship's power is first applied across diode CR1, provided to protect the apparatus by blowing a fuse if the supply voltage is of incorrect polarity. Zener diodes VS1, VS2, VS3, capacitors C1, C2 and C3 and inductor L1 form a spike filer, to protect the apparatus against high-voltage transients from the supply. A protected but unregulated twelve-volt supply is cabled to the Input/Output Module via pins 2 and 9 of connector PC3.

This voltage is also supplied to power switching relays K1 and K2, which respectively are controlled by signals at pins 4 and 1 from the previously discussed lamp- and supply-control circuits in the Slave Processor Module (FIG. 13G). The output voltages of these power relays are cabled at connector pins 3 and 8 to the projection-lamp socket, and at pins 5 through 7 to the regulating circuitry in the Slave Processor Module (FIG. 13J) and elsewhere in the system.

4. OPERATION

As pointed out above in detailed-description subsection 1, "External Features," the preferred embodiment of the present invention has a hierarchy of capabilities that are conveniently described as "mode" and, within each mode, "functions." Some characteristics of the modes and functions have already been presented in the earlier subsection, and the hardware required to implement the modes and functions has also been described, in subsections 1 through 3. Since parts of the hardware, however, are programmable microprocessors, much of the detailed implementation is embodied in programs. Subsection 5, which follows, presents the structure of the programming. This subsection 4 provides a bridge between the hardware and program structures, by describing some of the things that the apparatus is expected to do under various conditions.

a. Use of the "function" key

The "function" key 38 (FIG. 2), as noted earlier, changes the implication of most of the other keys on the control panel 14. These changes may be grouped into three categories: (1) changes in the functions produced by the MANL/LOAD and DEST/PP keys 49 and 48; (2) changes in the functions produced by the display keys 32 through 36; and (3) changes in the implication of the numeral keys 37.

The first of these categories has already been introduced, in subsection 1. To load a map, if the overall power to the apparatus and the power to the projection screen are both turned on, the operator presses the "f" key 38 and then the MANL/LOAD key 49—thereby calling up the "LOAD" function of the latter key. The displays 31 present the words "PLEASE WAIT" and the map transport mechanism moves the map carriage 143–148 (FIG. 5) toward its loading position, adjacent the slot 13 (FIG. 1) in the left side of the upper case section 12. The operator removes any map (in its mount) that may be in the carriage, inserts a desired map (in its mount) into the carriage, and presses the ENT key 42 (FIG. 2) to indicate that the new map has been loaded. The displays 31 then indicate "INITIALIZE CHART", and the N, S, E and W lights (on keys 43) all glow to indicate that manual direction of the map transport mechanism is enabled.

The operator touches the E key continuously, for about ten seconds, while the map moves well into the housing and until the left edge of the projected map appears on the screen. The operator then touches the S key continuously until the upper left corner of the map appears on the screen. By manipulating the direction keys 43 the operator positions a corner target on the map precisely under the crosshairs 16 on the screen, and then presses the MARK key 44. The operator then again touches the S key continuously until the lower left corner of the map appears on the screen, manipulates the direction keys 43 to position a second corner target in that corner precisely under the crosshairs, and again presses the MARK key.

The Master Processor and Slave Processor Modules 279 and 273 (FIG. 10) now have enough information to determine the chart's precise position—particularly including rotation relative to the vertical crosshair on the screen (which should be precisely parallel to the vertical tracks 135 of the transport mechanism, FIG. 5). The processors now should be able (with suitable programming, of course) to translate any latitude-longitude data into vertical and horizontal drive-motor (137 and 151 in FIG. 5) step numbers, and vice versa.

The display then indicates "CHART NO." and the numeral lights (on numeral keys 37) all glow, indicating that the apparatus is ready to accept numerical entries. The operator enters an identifying number for the map, reading the number from the lower left-hand corner of the screen. It is preferred to program the apparatus so that it recognizes the standard NOAA system of chart numbers, and a specially assigned six-digit number for foreign charts.

The procedure now branches, depending upon whether the particular map now in the apparatus has been used before, and on whether certain data are stored in the memory within the apparatus. If these data are not already stored, the display indicates "L1? DDD MM.MM". At the lower left corner of the chart, appearing on the screen, are four numbers labelled L1, L2, L3, and L4. These values are the latitude and longitude of the upper right and lower left corners of the chart, respectively, given in degrees, minutes and hundredths of a minute. The operator keys in the data for position L1—copying the degrees and minutes exactly as called for on the display. The operator then checks that the keyed-in data as displayed agree with the information on the chart—and, if not, touches the CLR key 41 and repeats the attempt.

When agreement is obtained, the operator touches the ENT key 42 to enter the keyed-in data in the portion of the apparatus memory reserved for chart data. The display then requests "L2? DDD MM.MM", and the operator responds similarly with the data for the second value. This cycle is repeated until the entire sequence of four points in sequence has been entered.

The display now indicates "CALIBRATED," and the mode lights (on keys 45 through 49) light, indicating that the apparatus is ready for the next procedure. The apparatus has stored the calibration points with their corresponding chart number for future reference. The apparatus stores data for up to ten charts. Therefore, as long as the backup battery has not run down, the operator will not have to enter the calibration data again—only the chart number. If the ten-chart memory is already full, the display indicates "TABLE FULL," but operation can proceed with this (eleventh) chart in a temporary memory position. Alternatively, the operator can substitute the data just entered in place of the data, already in the permanent memory, that correspond to another chart—one that will not be used soon. This procedure will be described shortly.

The display then indicates "VARIATION." The operator enters the degrees of magnetic variation (generally finding this information on the chart itself) for the operating area, and touches the ENT key 42. The display now indicates "EAST OR WEST", and the E and W lights glow, indicating that the E and W keys are active for keying-in of the direction of the variation. When this information has been keyed in correctly, as verified at the display, the operator again touches the ENT key. The variation information is stored with the other chart-calibration data corresponding to the chart now in the apparatus; however, the operator must take care to change the variation value if the craft moves to a part of the map where variation is significantly different. (This will of course be necessary only for relatively small-scale charts.)

If any calibration or variation data are entered incorrectly, and the error is such that the apparatus is unable to calculate the internally used constant values that it uses during operation, the message "CHART TOO BIG", or "OUT OF RANGE", or "VARIATION TOO BIG" appears on the display and the corresponding steps must be repeated correctly—by touching the "f" and MANL/LOAD and ENT keys in sequence and reentering the data without error. During all of these data-entry steps the apparatus continues to update the craft's present position in whatever mode was previously in operation, although of course the chart display is not visible.

Taking up the other branch of the map-loading procedure, if the calibration data for the map that is now in the apparatus have already been loaded into the memory, then the apparatus recognizes the chart number and skips all of the data-entry interrogations. The two branches of the procedure now reconverge.

If the apparatus was operating in a DR or Loran mode before the new chart was installed, and if less than ten minutes have elapsed during the chart installation, and if the present position is in fact on the new chart just loaded, then the operator can touch the DR track or LORAN key 46 or 47 to cause the apparatus to automatically position the new chart and continue tracking. If more than ten minutes have elapsed, the present-position track is cancelled and a new position must be established—either automatically by Loran fix or manually by entry of a bearing fix or the last available DR position.

Still within the first category of three "f" key uses enumerated above, the effect of touching the "f" key and then the DEST/PP key 48 has already been described adequately in subsection 1, "External Features."

The second category, use of the "f" key in conjunction with the display keys 32 through 36 has already been introduced in subsection 1, but some additional discussion will be presented here.

Under certain circumstances direction and speed, or set and drift, or both, must be entered manually. At this point the discussion will digress briefly to explain what determines the necessity for manual entry of these quantities. Generally, direction and speed need not be entered manually when automatic sensors for these quantities are attached; and set and drift need not be entered manually when a Loran receiver is attached. In addition, manual entry of set and drift can sometimes be avoided when bearings fixes are taken—to be used by the apparatus in calculating set and drift. The reasons for these statements may be understood from FIG. 20, which illustrates the relationship between three pairs of parameters: (1) direction (or "course" or "heading") steered, and speed through the water, (2) set and drift, and (3) course made good (CMG) and speed made good over the ground. (It is to be understood that this discussion applies equally well to aircraft, with the necessary minor changes in terminology.)

Figure 20:
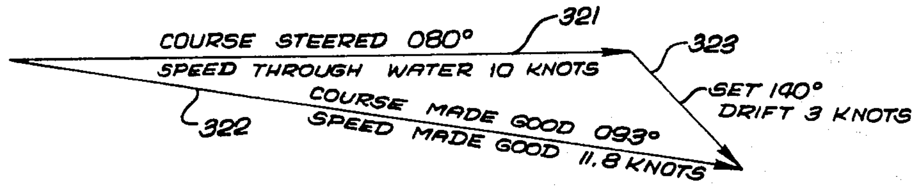
FIGS. 20–23 are simplified diagrams of craft location and dynamics, illustrating use of the embodiment of FIGS. 1 through 19 in certain practical navigating situations.

FIG. 20 represents each of these pairs of parameters as a vector quantity. The heading-and-speed vector 321 is a vector quantity whose magnitude is proportional to the craft's speed (e.g., as suggested in the drawing, 10 knots), and whose orientation is parallel to the heading (e.g., 80 degrees clockwise from north). This vector represents direction and speed of the craft relative to the body of water through which the craft is moving. The set-and-drift vector 323 is a vector quantity whose magnitude is proportional to the speed of the body of water (e.g., as shown, 3 knots), and whose orientation is parallel to the motion of the body of water (e.g., 140 degrees). This vector represents direction and speed of the water relative to the ground which is beneath the water. The vector sum is 322, which therefore represents the direction and speed of the craft relative to the ground—that is, the CMG, course made good (e.g., 11.8 knots) and speed made good (e.g., 93 degrees) over the bottom.

From any two of these vector quantities the third may be calculated—and such calculations are in fact performed by the apparatus when input information is sufficient to establish any two sets of values. (The necessary equations are set forth in subsection 5, below.) Five cases will be described.

1. If set-and-drift vector 323 and heading-and-speed vector 321 are both entered, the apparatus will calculate the CMG vector 322—and this quantity will be accumulated and output as the DR track, which controls the map transport mechanism to graphically display DR-computed present position.

2. If the heading-and-speed vector 321 is known and the CMG vector 322 is measured by the operator over a relatively short distance—by taking bearing fixes, and entering the bearing-fix data into the apparatus—the apparatus will compare (a) the dead-reckoning prediction from the heading-and-speed vector 321 with (b) the established CMG vector 322 to find (c) the discrepancy vector 323, which it will attribute to set and drift.

3. If the set-and-drift vector 323 is estimated and input to the apparatus, and the CMG vector 322 is measured over a short course by entering bearing-fix data as in the second example, the apparatus could in principle calculate the heading-and-speed vector 321. In practice this case would seldom be useful as such and is therefore not implemented.

4. If the course-made-good vector 322 is set equal to the desired track to a particular way point, the set-and-drift vector 323 is known, and the present speed is known, then the necessary heading-and-speed vector 321 is calculated by the apparatus and from that value the necessary heading is found. The heading is displayed (or directed to an autopilot) as "course to steer."

5. Combining calculations 2 and 4 above, if the set-and-drift vector 321 can be determined by measurements over a short distance, as in calculation 2, then the set-and-drift vector 321 can be regarded as known for the purpose of calculating "course to steer," as in calculation 4. If the two-step process is then repeated at regular intervals, continuously resetting the "course to steer" to accommodate changes in the short-distance determination of (1) set and drift and (2) speed, then the actual track will closely approach a straight line, approximating the desired course to be made good to the way point.

The closer together the bearing fixes are obtained, in the compound calculation 5, the more closely will the actual track approximate the desired course to be made good. It is for this reason that it was stated above that manual entry of set and drift can sometimes be avoided when bearing fixes are taken; the only constraint is the availability of bearing points on which to take fixes.

When a Loran receiver is attached and in use, within the part of the world where the Loran system is in place and operating, the constraint of bearing-point availability is removed. Loran fixes can be taken at very frequent intervals, permitting updating of the set-and-drift vector 323 and revising the desired course-to-be-made-good vector 322, so that the "course to steer" or heading aspect of the heading-and-speed vector 321 can be frequently reoriented and the actual CMG vector 322 will very closely approximate the desired one. It is for this reason that it was stated above that set and drift need not be entered manually when a Loran receiver is attached. This topic will be considered further in parts e and f below.

When only one of the three vectors is known, the other two are indeterminate. For example, suppose that bearing fixes are obtained over a short distance, to actually measure the CMG vector 322 for that distance, but that no set-and-drift or heading-and-speed data are provided to the apparatus. The CMG vector 322 calculated by the apparatus will then have incorporated within it the effects of both the set-and-drift vector 323 and the heading-and-speed vector 321, with no means of separating the two effects. This indeterminacy might at first seem unimportant, but it is actually very undesirable because it prevents determination of a "course to steer" that compensates for set and drift. Thus, even a rough estimate of one of the two vectors 321 and 322—whichever is available with greater accuracy—is somewhat preferable to none.

These relationships establish the circumstances under which heading-and-speed and set-and-drift information must be entered manually. With these relationships in mind, the discussion now returns to the mechanics of data entry. When course and speed are to be entered the operator touches the "f" key 38 and then the DIR/SPEED key 32, and the numeral lights (on keys 37) glow to indicate that the apparatus is ready for the entry of numeric data. Further, the displays 31 "request" course-and-speed data, indicating the necessary format, by the same sort of colloquy as described above for map-calibration data. When set and drift are to be entered, the operator similarly touches the "f" key 38 and then the SET/DRIFT key 33, and the numeral lights (on keys 32) glow while the displays "request" set-and-drift data.

Whenever the apparatus is relying upon the operator for either course and speed or set and drift, it is essential for the operator to be aware of the necessity to enter any changes in any of these four parameters—course and speed from his visually read compass and knotmeter, or from estimates; and set and drift from a chart or from estimates.

To enter latitude and longitude numerically, the operator touches the "f" and LAT/LONG keys 38 and 34 in that order, along with either the DEST/PP key 48 (to indicate that it is the coordinates of the destination that will be entered) or sometimes the combination of the "f" and DEST/PP keys in sequence (to indicate that it is the coordinates of the present position that will be entered). The latter keystrokes are unnecessary if the apparatus is already in its "normal" condition of displaying and accepting present-position data.

The displays 31 will then "request" the appropriate coordinates in format, by a series of indications analogous to that described above for map calibration. If the operator enters no direction for latitude or longitude, north and west respectively are entered automatically by the apparatus. If this results in a position that is incompatible with the chart in use, the display indicates "OFF CHART" to prompt the operator to correct the entry.

By numerical entry of latitude and longitude the operator can locate for the apparatus any point that is either on or off the currently loaded chart. Alternatively, for points that are on that chart, the direction keys can be used to align the point of interest directly at the crosshairs, and the MARK key 44 can be touched to identify the particular point for the apparatus—which can convert the position of the map transport mechanism to latitude and longitude.

The numerical entry method and the "mark" method are both available for entry of present position, way points, destination, or navigational bearing points such as buoys and lighthouses. Navigational bearing points (as explained in part d below) are entered only in the "bearing fix" mode, and are identified as such by the fact that the apparatus is being operated in that mode. It is therefore unnecessary to provide a "bearing point" function key as such. As will shortly be described, an entire table of coordinates for present position, destination, and way points can be entered into the apparatus for storage and for use in calculations; when this operation (function) is in progress, the distinctions between these various types of points are inherent in the procedure, and it is therefore not necessary to use the DEST/PP key to discriminate among them.

In Loran operation, the apparatus automatically calculates time-different (TD) equivalents for any latitude-and-longitude combination that is significant to the Loran calculations or is to be displayed. It is therefore usually unnecessary to enter TDs manually; however, in some situations the operator may know the TDs but not the latitude and longitude. Accordingly the apparatus is programmed to accepts the TDs instead of the coordinates, and perform the reverse translation to derive the coordinates where needed. In short, the apparatus is "fluent" in both coordinate language (when the LAT/LONG key 34 is touched) and TD language (when the GRI/TD key 35 is touched), and will either accept or display information (depending upon the function being performed) in either language.

To enter a new group repetition interval the operator touches the "f" key, then the GRI/TD key, and then the numeral keys as required—and as prompted by the displays 31, in a manner similar to that described earlier for map calibration. To enter TDs manually, when that is desired, the operator must identify the point as present position, destination, way point, or bearing point—either by use of the DEST/PP and "f" keys 38 and 48, or by entering the bearing-fix or destination-and-way-point-table function, as mentioned above for entry of latitude and longitude.

The third category of uses of the "f" key, as stated at the beginning of this part a, is changes in the implication of the numeral keys 37. When the operator touches the "f" key and then certain numeral keys, the apparatus initiates certain functions for which no specific display or control key has been provided. These functions are generally operations that are performed relatively infrequently, or in some cases operations that are actually a formatted series of suboperations (to obviate the necessity for the operator's memorizing an entire formatted series). The functions of this type that are used in the preferred embodiment of the invention are listed below, along with the numerals used to initiate them. It will be apparent that a great many variations on the listed functions—and of course on the numbers that call them up—can be conceived, without deparing from the spirit or scope of the invention.

Keying in "f," then "0" (zero), and then "ENT" initiates the "enter present position" function. (The key series may be specified more succinctly as just "f0 ENT"; this format will be used without explanation for the following functions described.) In this operation the operator enters present known position into the apparatus. The apparatus will use the entered value for future DR, for initial calculation of "course to steer," for calculation of estimated arrival time at and distance to the next way point, and for calculation of TD local error (as described below in regard to "f54").

Latitude is entered and displayed in this operation (and in the situations previously discussed) with two digits for degrees, and with two digits, a decimal point, and two more digits for minutes and decimal fractions of minutes. The display also includes an N or S for north or south; in entry of data these designations are keyed in using the direction keys 43. Longitude is entered and displayed similarly, except that three digits are presented for degrees, and of course an E or W for east or west. The numeral and direction lights (on numeral and direction keys 37 and 43) glow when the "f0" function requires their use to enter information. A prompter symbol (*) appears in the display to indicate digits called for but not yet entered.

If the present position is shown on the map that is in the apparatus, the operator touches "f0 ENT," then MANL/LOAD (the direction lights glow), and then the direction keys to move the present position directly behind the crosshairs on the screen. Then the operator touches MARK—and the apparatus records the corresponding latitude and longitude, identifying them with the craft's present position. If preferred (or if the present position is not on the map that is in the apparatus), the operator touches "f0 ENT," then LAT/LONG (the numeral lights glow), and then the appropriate numeral keys to enter latitude and longitude in format. The direction lights glow, and the operator touches N or S and E or W as appropriate to complete the data format. The operator then touches ENT to enter the keyed-in data, and proceeds to the next operation or to initiate a particular operating mode, as desired. (The same result can be achieved using the "f" and LAT/LONG keys, and if necessary the "f" and DEST/PP keys, as described earlier, but the "f0" function helps the operator to be certain that what is accomplished is what is intended.

Keying in "f1 ENT" initiates the "enter destination and way points" function. In this sequence the apparatus prompts the operator to enter locations for destination and/or as many as nine way points. The apparatus will use these data for calculation and updating of "course to steer," estimated arrival time and distance to the next way point. The latitude and longitude are entered either numerically (in the same format described for "f0") or by use of the MARK key, as before. Way points, in the order in which they will be traversed, are numbered from zero up, the destination being assigned the last number. For example, five way points would be numbered from zero to four, and destination would be point number five, the apparatus of course simply treating the destination as the sixth point. A way point or the destination is called out, in this function, by its assigned number when the operator wishes to display its latitude and longitude for any reason—including a decision whether to keep it or change it.

The procedure for use of this function is as follows: The operator touches "f1 ENT." The displays 31 indicate "WAY PT NO?" The operator keys in any numeral from 0 to 9 and then touches the ENT key. The displays 31 then indicate latitude and longitude for the correspondingly numbered point. To keep the same latitude the operator touches ENT; to keep the same longitude the operator touches ENT again. To change either figure by numerical entry, the operator keys in the data as described for the "f0" function, touching ENT to enter the new value in place of the displayed value (if any). If it is preferable, the operator can instead touch the GRI/TD key 35, and enter the Loran TDs for the point of interest. If the point is on the map that is in the apparatus, the operator can use the alternative procedure of touching MANL/LOAD, then the direction keys to register the point with the crosshairs, and then MARK to enter the location. The operator can then key in any other numeral from 0 through 9, followed by the ENT key, to review and/or revise any of the other stored points of interest, or to add new ones beyond the original table.

Keying in "f2 ENT" initiates the "current set and drift" function. In this operation the apparatus prompts the operator step by step through a procedure for entering set and drift—determined by the operator from charts or other sources external to the apparatus. The apparatus will apply these data as corrections to ship's heading and speed for accurate DR tracking, for advancing of lines of position (to be explained below) in the bearing-fix mode, and for calculating set-and-drift-compensated "course to steer."

Although usually described as the direction and velocity of currents in the medium (air or water) through which the craft is moving, set and drift in maritime applications should be described more precisely with reference to the combined effects of wind and current. If set and drift are calculated by the apparatus, from either Loran or bearing fixes or from known positions, the offsetting influences of wind and current cannot be separated in the resulting data. For manual entry, however, the operator should take account of both wind and current, using values obtained externally or estimated as accurately as possible.

The operator can obtain values of set and drift for tidal currents from tidal-current tables, diagrams and charts published by the National Ocean Survey; and for ocean currents from pilot charts and pilot-chart atlases published by the Defense Mapping Agency Hydrographic Center (DMAHC). In addition, the operator should consider abnormal tide and current conditions and of course local wind conditions in the entered set and drift values. Especially when entering or leaving tidal-current areas, it is essential to use updated values of set and drift to avoid gross errors in DR and in the advancing of bearing-fix lines of position. Drift is to be entered in knots; when using data from charts and atlases that show drift in nautical miles per day, the operator must divide such data by twenty-four before entry.

The procedure for function "f2" is as follows. The operator touches "f2 ENT," and the displays indicate "SET XXX," where "XXX" is the previously entered value, if any, of the set—in degrees clockwise from north. The operator either touches the ENT key to keep the value XXX, or touches the appropriate numeral keys 37 and then the ENT key to enter the direction of the known or estimated set. The displays 31 then indicate "DRIFT YYY," where "YYY" is the previously entered value, if any, of the drift—in knots. The operator touches ENT to keep the value YYY, or uses the numeral and ENT keys as before to enter updated value in knots; this use of the ENT key also completes the "f2" function and the operator can proceed to the next operation or mode desired. (The same result can be achieved using the "f" and SET/DRIFT keys 38 and 32, but the "f2" function helps the operator to be certain that what is accomplished is what is intended.)

Keying in "f50" initiates the "compass damping" function. This operation adjusts the amount of weighted averaging automatically applied by the apparatus to heading values successively received from the ship's compass, if any. The averaging or "damping" is used to smooth or steady the compass signal, to minimize the erratic fluctuations due to yaw. The amount of yaw varies considerably—between slight, in calm waters, and great, in heavy seas. The exact effect depends on ship design, helmsman skill, shape and frequency of swells, etc. The amount of damping must be varied correspondingly.

The apparatus of the preferred embodiment applies damping in different degrees, identified on a scale of zero to nine (light to heavy damping). When the apparatus is first powered up, damping is automatically preset to five. The apparatus is to be set by the operator to light-damping values when there is very little compass swing, or in particular when it is necessary for the DR track to follow course changes very closely (for example, within a half-minute). The apparatus should be set to heavy-damping values when the compass swings are wide and irregular. The compass signal can be observed, to determine the degree of damping desired, by touching the DIR/SPEED key 32 while the apparatus is in the DR or Loran mode.

The procedure is simple. The operator touches "f50 ENT"; the displays indicate "CMPS DMP X", where "X" is the damping value previously set; and the operator touches either (1) the ENT key, to keep the preset value X, or (2) a numeral key and then the ENT key, to change the setting and complete the f50 function.

Keying in "f51 ENT" initiates the "speed damping" function, which smoothes the automatic input from the "ship's log"—that is, the knotmeter. Like compass damping, the speed damping applied by the apparatus is a weighted averaging of values successively received. The damping is applied in varying strengths designated from zero (lightest) to nine (heaviest). The apparatus automatically sets its own speed damping to five at power-up. The operator can control the effects of speed variation-caused by pitch of the craft at sea, by adjustment of the speed damping factor.

The need for this adjustment will vary even in heavy seas, depending upon ship design, heading relative to the direction of wave motion, wave height, and so forth. Strong damping will be particularly essential in heavy seas, especially when swells are from ahead or following; light damping will be in order in light seas and particularly when the DR track should respond accurately and quickly to speed changes arising from maneuvering.

To assess the need for speed-damping adjustment, the operator touches the DIR/SPEED key and observes the averaged knotmeter reading. If this value is changing rapidly or excessively, the operator keys in "f51 ENT"; the display reads "SPD DMP X," where "X" is the damping value previously set, and the operator touches either (1) the ENT key, to keep the preset value X, or (2) a numeral key and then the ENT key, to change the setting and complete the f51 function.

Keying in "f52 ENT" initiates the "variation maintenance" function. In this operation the apparatus prompts the operator to update the stored value of magnetic variation, to a value that is appropriate for the region in which the craft is operating. This variation value is automatically applied by the apparatus to magnetic compass headings and bearings, unless the operator specifically indicates (see "f91" and "f92" below) that the correction is not applicable.

Compass variation is the difference between the direction given by a magnetic compass—after correction for deviation (see "f93" below)—and the true direction. Variation is caused by the fact that the earth's magnetic lines of force are not aligned with the meridians of longitude, but rather, in general, run at angles to the meridians. A magnetic compass, of course, is subject to the corresponding misalignment. The error angle or "variation," in degrees clockwise from true north, is thus essentially constant (subject generally to a slow, perennial drift of the variation value) for any given region.

The preferred embodiment of the invention corrects for variation—if the operator enters the local variation angle—by adding easterly variation or subtracting westerly variation to obtain the true direction. The values of variation are shown on DMAHC chart number 42, "Magnetic Variation Chart of the World for 1975." For small areas, variation and its annual rate of change are shown on the compass rose of navigation charts. The present value should be calculated using the annual rate.

Where there are significant local irregularities in magnetic force lines, within the area covered by a single chart, the compass rose appears in several locations on that chart. As described above in relation to the chart-loading operation, an initial value of variation for the region of interest is entered into the apparatus in conjunction with the calibration data for the chart. Even while using the same chart, however, it may be necessary to revise the variation setting, as follows.

The operator keys in "f52 ENT"; the displays indicate "MAG VRY XXX," where "XXX" is the previously entered value, if any; the operator then touches either (1) the ENT key, to keep the same value XXX, or (2) numeral keys, and one of the direction keys E or W, and finally the ENT key, to enter the value and complete the f52 function.

Keying in "f53 ENT" initiates the "chart table maintenance" function. This operation prompts the operator step by step through a procedure for removing or replacing chart-data sets previously entered in the apparatus memory. The procedure for entry of chart number, calibration data and variation value has already been described; the "f53" function simply represents a way of systematically eliminating the data that correspond to a particular chart—to make room for data relating to a different chart. Although the apparatus holds data sets for as many as eleven (counting the temporary memory) charts at a time, in some situations a craft changes operating regions or for some other reason incurs a change in the pattern of frequently used charts. Such changes can require a shifting of the "memorized" chart-data sets.

This f53 function is typically initiated by the operator at the point in the chart-loading procedure (described earlier) when a new chart-data set has been loaded into the temporary memory and the displays have indicated that the permanent memories are full. To review the collection of chart-data sets that are filling those memories, the operator keys in "f53 ENT." Depending on the type of chart that is first in the "table" or "list" within the apparatus, the display indicates "DELETE XXXXX?" or "DELETE YYYYYY?"—where "XXXXX" is a five-digit United States NOAA chart number, and "YYYYYY" is a six-digit foreign chart number. The apparatus is inquiring whether the operator wishes to delete the corresponding chart data from the stored table. These data, of course, are related to only one of the ten charts for which data are stored in the apparatus. The operator may therefore prefer to leave this particular data set in the memory—or may prefer to review all of the other charts in memory first, to see which charts' data set it would be least inconvenient to erase. If this is the case, the operator can answer "No" to the inquiry, by touching the "N" key 40 and then the ENT key 42.

The display then indicates a similar query for the next chart in sequence, and this series of operations can be continued until the operator reaches a chart number that is acceptable to erase, or until the entire ten-chart table has been reviewed (in which case the operator can start the process again by repeating the entry "f53 ENT"). When the apparatus displays a chart number for a chart that the operator considers dispensable (relative to the new one in temporary memory), the operator answers the display query by touching the "Y" key 39—which deletes the data set for the selected chart, and substitutes the data set (if any) standing in temporary memory.

Keying in "f54" initiates the "TD offset" function. This function enters a constant adjustment value to be applied to Loran TDs, when the apparatus calculates a position fix. The apparatus is preprogrammed to automatically apply generally known corrections for certain sources of Loran error—"secondary phase factor" (SF) and "additional secondary phase factor" (ASF). If, however, the operator has dependable information concerning additional errors, such as local variation in ASF, or other errors arising from local conditions, the operator should total these errors and enter the total as a correction to the received TD values.

One way to determine such errors very exactly is to compare the received values with the theoretical values at a known location. Present position may be exactly known from a chart location, such as a mooring or buoy alongside. This location fix is of course independent of any TD errors, and the corresponding theoretical Loran TD values can be determined by using the GRI/TD key 35 as previously described—with the apparatus in the DR mode.

By comparing these theoretical TD values with the TD values displayed in the Loran mode, the operator can determine the extent of any error in the received Loran signal. Such an error, as suggested above, can arise through a local variation in the additional secondary phase factor caused by a local physical peculiarity of the area, or through an imperfection in the receiver. The delay may amount to only a fraction of a microsecond or could be as large as several microseconds, although applicable only within a small area in the immediate vicinity of the known position. If the operator notes this discrepancy and wishes to improve the accuracy of the position computation in the local area, he or she may apply a correction by entering the number of microseconds, positive or negative, in the "f54" function.

Another situation in which the "TD offset" or "f54" function may be used is the coordinated operation of several craft—as, for instance, during search and rescue operations. Loran receivers on the different craft often read out different values for the same point, leading to failures of complete area coverage or even to accidents. The corrective procedure is analogous to synchronizing watches. Each operator, reading the display of an apparatus (i.e., the preferred embodiment of the invention) aboard his or her own craft, enters TD offsets that bring the TDs on all the apparatuses into agreement.

The procedure follows. The operator keys in "f54 ENT". The upper display indicates "TD 1 ASF," to invite entry of an additional secondary-phase-factor increment or offset, for the first TD that is output from the Loran receiver. The lower display indicates the offset value, if any, previously entered. The operator touches (1) the numeral keys 37, then the + or − key 39 or 40, and then the ENT key 42, to enter a new TD offset calculated to bring the TD display in Loran mode to the desired value, or (2) the CLR key 41, to remove the previously entered offset, if any, without substituting any new value, or (3) the ENT key to retain the previously entered offset value. The displays then will indicate "TD 2 ASF" and an offset value for the second TD. The operator responds similarly to this information, and may if desired proceed in the same way for all the available TDs of the GRI chain that is in use; the operator then presses the ENT key twice to complete the f54 function. While it is possible for the operator to determine correct Loran TDs for all the stations in the GRI chain, and to key in offsets for all of the TDs, it will generally be satisfactory to correct only those two TDs that the invention apparatus is selecting for use in the local area—since, outside that area, the offset values may well be inapplicable anyway.

Keying in "f55 ENT" initiates the "automatic log interval" function. This operation commands an immediate printout and continuing subsequent periodic printouts of position, date, and time, at an optional printer—if one is attached to the invention apparatus—and invites the operator to revise the frequency of automatic printout. The apparatus is set, when it first powers up, to produce hourly printouts. An immediate printout at the recorder, without disturbing the periodic printout, can be obtained using the operating controls of the recorder.

The operator keys in "f55 ENT"; the display indicates "PERIOD AA MIN," where "AA" represents any previously entered number of minutes (with a maximum of two digits), or is 60 if no value has previously been entered. The operator then touches either (1) the ENT key, to retain the present printout period, or (2) numeral keys (a maximum of two digits) and the ENT key, to revise the period. The first printout in the periodic series (as newly established) occurs as soon as the ENT key is touched. To end the printout series, the operator keys in "f54 ENT CLR."

Keying in "f90 ENT" initiates a "memory maintenance" function. This operation leads the operator step by step through a series of data presentations and queries which are actually the same as five other functions, taken one after the other: f91, f92, f93, and f94 (all discussed below), and "f MANL/LOAD"—the chart-loading function described earlier. The f90 function thus provides for rapid and orderly review and restoration of data, instructions and information previously entered by performing other functions. The f90 function is to be performed when there is a possibility that the apparatus has developed "digital amnesia"—due to loss of ship's power for an interval longer than the ten-hour capacity of the backup battery.

While the f90 function guides the operator through a review of those data that should be replaced in memory immediately to resume navigation modes, there are certain other data that the apparatus holds in memory for up to ten hours that are not reviewed by the f90 function; they are instead to be restored while performing mode operations or by performing the related "f"-key functions. These items are (1) destination and way-point coordinates, (2) chart data, (3) bearing-point coordinates, (4) set and drift, (5) compass damping, (6) speed damping, (7) TD offset, (8) automatic log interval, (9) present position, and (10) group repetition interval.

In the preferred embodiment certain data are immediately lost from memory upon loss of ship's power: (1) direction and speed, (2) estimated arrival time, "course to steer" and distance to next way point or destination, and (3) previous mode and function operations. It will be apparent that the selection of data for maintenance by the backup battery, and the selection of data for review by the f90 (or equivalent) function, and the selection of data items to be discarded upon loss of power are all matters of design choice, constrained by the limited capacity of a CMOS memory that can be supplied with power for a reasonable time from a backup battery of reasonable size and cost.

Keying in "f91 ENT" initiates the "bearings are true" function. This function prompts the operator to indicate to the apparatus the character of bearings taken visually on navigational objects such as buoys or lighthouses. If these bearings are made using the ship's magnetic compass—the same compass that is connected for automatic provision of bearings to the navigating apparatus of the present invention—it is necessary to inform the apparatus that the bearings are magnetic, and therefore subject to the variation and deviation corrections stored in the apparatus. Otherwise it is necessary to inform the apparatus that the bearings are "true" bearings, such as might be obtained with a gyrocompass. The answer to this query is of course essential to proper performance of the calculations made by the apparatus using bearing data entered manually. A gyrocompass, needless to say, is not perfect, but error in a well-adjusted gyrocompass can be kept to a fraction of a degree and is not considered significant in design and operation of the preferred embodiment of the invention.

The operator keys in "f91 ENT"; the display indicates "BRGS TRUE?"—and the operator keys in either (1) Y and ENT to reply, "Yes" or (2) N and ENT to reply, "No, bearings are magnetic."

Keying in "f92 ENT" initiates the "display true headings" function. This operation is performed if the operator desires the apparatus to display true headings, rather than magnetic headings directly comparable with those taken automatically at the magnetic compass. This function does not affect the corrected headings used for calculations within the apparatus. If a gyrocompass is connected to provide the apparatus with true headings, then the deviation and variation corrections available in the apparatus are presumably set to zero and it does not matter how the f91 and f92 queries are answered.

When the operator keys in "f92 ENT" the display indicates "DIS TRUE HDGS?" The operator answers by touching either (1) the Y and ENT keys to reply, "Yes," or (2) the N and ENT keys to reply, "No, display magnetic headings."

Keying in "f93 ENT" initiates the "load deviation table" function. This operation prompts the operator through a procedure for entering compass deviation values to be applied automatically to all magnetic compass inputs. Like the f52 variation-maintenance function, this operation provides a correction to magnetic compass readings, to obtain more nearly true direction signals for calculations made within the invention apparatus and for readout at the displays. The deviation correction, however, unlike the variation correction, is independent of natural disturbances in the earth's magnetic field. The deviation correction instead compensates for magnetic influences aboard the craft itself. Metallic objects, structures (such as tanks), and electrical circuits contribute to a magnetic field pattern that is unique to the particular craft, and generally varies with heading.

The deviation is the angle by which the compass is deflected, east or west, from alignment with the earth's lines of magnetic force. Measurement of deviation for different headings—taken at fifteen-degree heading intervals—produces a table of deviation values which is to be loaded into the memory of the navigating apparatus, using the f93 function. The apparatus then automatically applies these deviation corrections, with interpolation between the fifteen-degree measurement points, to headings and bearings taken by magnetic compass—adding easterly deviation and subtracting westerly deviation. The operator must take care that nothing is done to alter the ship's magnetic field and change the deviation values—or, when a change is necessary, the operator must take care to revise the deviation table after the change. Small metallic objects placed very near the compass, or larger metallic aggregations, electrical wiring, or electronic equipment even though placed farther away, can all change the value of deviation.

When the operator keys in "f93 ENT," the display indicates "DEV XXXS 000", where "000" identifies the first heading interval in the table—namely, the interval from −7.5 to +7.5 degrees. The indicated value "XXX" is the initially preset amount (if any) of deviation for that first heading interval, and "S" is the direction—E for east and W for west—of that initially preset deviation value. The operator uses the numeral keys 37 and the E or W key as appropriate to specify the deviation measured at the center (i.e., zero degrees) of this heading interval. The operator then touches the ENT key to enter this keyed-in value, and the display indication shifts to "DEV XXXS 015"—requesting the deviation entry (measured at fifteen degrees) for the interval +7.5 to +22.5 degrees. This procedure, with different interval and deviation values, of course, is continued to complete the table and the f93 function.

Keying in "f94 ENT" initiates the "time set" function. In this operation the operator enters the present date and Greenwich mean time to set the internal clock in the apparatus. The clock is then able to provide precise time labeling for DR and fix positions, for calculation of arrival times, and for convenient display of correct local time. The internal clock, which operates on the traditional naval twenty-four-hour system, should be set after initial installation, and should be checked (and if necessary reset) after interruption of ship's power longer than ten hours. The backup battery powers the clock directly during loss of ship's power for ten hours or less.

Time is displayed as "DDHHMMX MON" where "DD" is the date of the month, "HH" is the hour of the day in local-zone standard time, "MM" is the minute of the hour, "X" is a local time-zone designator and "MON" is the name of the month, abbreviated. The time-zone designator is actually a "Z" for the fifteen-degree time zone centered on the Greenwick meridian at zero degrees, an "A" for the next fifteen-degree time zone to the east, then a "B," and so forth (the letter "J" being omitted) to the zone between 157.5 and 172.5 degrees east longitude. The seven-and-a-half-degree zone between 172.5 and 180 degrees east longitude is assigned designator "M." Similarly the designator is an "N" for the fifteen-degree time zone to the west of the Greenwich-centered zone, then an "0," and so forth to the zone between 157.5 and 172.5 degrees west longitude. The remaining seven-and-a-half-degree zone between 172.5 and 180 degrees west longitude is assigned designator "Y." As an example, 121423R SEP is 1423 hours (2:23 pm) standard time, in zone R (67.5 to 82.5 west longitude) on Sept. 12. The time zone R is the zone in which New York City is located; hence the time displayed is United States eastern standard time. (Simple geometrical time zones, defined in this way by the principal meridians, are used rather than the complex zone boundaries established in some areas.)

Once the clock is properly set, the displayed time when the operator touches the TIME/CTS-D key is the local time for whatever point is designated—either present time at present position, or estimated arrival time for a way point or destination. The displayed time thus is not necessarily the time that would prevail at the craft's present position, for the way point may be in a different time zone.

The operator keys in "f94 ENT"; the display indicates "CURRENT TIME" and "YEAR YY", where "YY" is the current year. If YY is indeed the current year, the operator touches the ENT key; if not, the operator uses the numeral and ENT keys to enter the last two digits of the current year—e.g., 93 for 1993. The display then shows "CURRENT TIME" and "MONTH MM", where "MM" is the month number of the present month. The operator touches the ENT key if "MM" is correct, or uses the numeral and ENT keys to enter the correct number—e.g., 11 for November.

The display then continues to prompt the operator in similar fashion through entry of the day, hour, and minute (all in Greenwich mean time). When the operator has entered the minute, the displays indicate "ENT ON TONE" and "DDHHMMX MON". The second portion of the display gives the date and time information the operator has just entered, but now converted to local date and time, for convenience of checking against local time before the entered value is finally set on the clock. The first portion of the display, "ENT ON TONE," reminds the operator that the time should ideally be set on the clock in coordination with a Greenwich-mean-time signal tone obtained from a standard time service such as WWV or WWVH (see DMAHTC Publication 117A, "Radio Navigational Aids"). The operator presses the ENT key at the time tone, to complete setting of the clock.

b. Startup

Operation of the apparatus will begin under one of the following conditions.

(1) On initial installation or after a long powerless shutdown, the operator should perform function f90, "memory maintenance," described earlier. The final portion of this procedure will include the function obtained by keying in "f MANL/LOAD," also described earlier, which will reestablish variation and chart data for the map to be used first. Other chart data may be reestablished whenever convenient. Compass and speedometer damping are preset to strength of five, on the damping scale described in connection with functions f50 and f51 in part a above, and the operator may reset them too whenever convenient. The desired operational mode may then be selected using keys 45 through 47; and the use of the apparatus can proceed as desired.

(2) On startup in a new area with a new chart, if power has not been down more than ten hours the operator need only perform the "f MANL/LOAD" function—the chart-loading function described earlier—and select the desired mode, proceeding with use of the apparatus.

(3) On startup with the chart for the local area still in place in the apparatus, again assuming that power has not been down more than ten hours, the chart and its data are both ready for service, and the operator need only key in the desired mode and proceed.

c. DR Mode

In the dead-reckoning mode, operation is largely automatic—unless heading, speed, set, and drift data must be manually entered as previously described. If not, the operator's function is simply to observe the various information presented at the screen and displays, and use it as appropriate in guiding the craft.

This description is only true, of course, between bearing fixes (using the bearing-fix mode, discussed below), so unless the craft is in the open ocean the operator will generally not be inactive, as to the navigation process, for very long intervals.

d. Bearing-Fix Mode Details

The BRG FIX key 45 is used in piloting to determine (or "fix") the craft's current position, based on "observations" of navigational aids—that is, stationary objects of known position. The known positions of these objects are called "bearing points." Usually, but not necessarily, these so-called "bearing points" appear or can be located on the chart being used. "Observations" may be made on one, two or three such "bearing points." Each "position fix" found using a bearing point requires two kinds of data: (1) the known, fixed position (e.g., latitude and longitude) of the bearing point itself—as found from the chart or other reference literature—and (2) the bearing and/or distance from the craft to the bearing point, as "observed."

The words "observed" and "observation" are placed in quotation marks because these "observations" are not necessarily visual. A bearing taken with compass, pelorus, radar or (as a last resort) radio direction finder (RDF) is usable to determine a line of position (LOP). A distance measured by radar, stadimeter or sextant is usable to determine a distance circle of position (COP). Bearings and distances observed by other means—for example, a range line of bearing, or a short distance measured on the chart from a buoy alongside to a bearing point—can be used also. In air navigation a somewhat different group of bearing points and observation systems is available—including, for example, a "distance-measuring equipment" (DME) radio receiver, in the so-called "TACAN" system.

Bearings are entered in three digits—for example, 030 or 153—including the zeroes where applicable. Distances are entered in two digits on each side of the decimal point—for example, 09.10 or 13.70—likewise including the decimal point and zeroes where applicable. The apparatus automatically records time of entry of the bearing data, for a particular bearing, as the time of that bearing; and it advances LOPs by dead reckoning to take account of ship movement between bearings. The operator's procedures will be illustrated shortly, and the calculations which the apparatus performs in response are detailed in subsection 5, "Programming." The time of the fix position (that is, the calculated present position of the craft) is the time the last bearing is entered for the fix.

After the apparatus has calculated two or more fixes in succession, the apparatus proceeds automatically to calculate the effective set and drift between the two positions, and applies these calculated values as a correction to subsequent course and speed for dead-reckoning tracking.

A general description of the fix procedure will be presented first, and then a more detailed stepwise procedure. The operator selects bearing points or objects in advance, numbering them "1," "2," "3," etc., to prepare for entry into the apparatus for later use. The apparatus advantageously accepts and stores up to nine points. The operator places the apparatus in its bearing-fix mode, and the displays 31 ask whether location data are to be entered for new bearing points, and, if so, how many points. The operator enters new bearing points, if any, with their position data—replacing those points no longer needed. A new point 2, for example, is entered by "writing over" the old point 2; the latter point is automatically erased from the apparatus memory. Bearing points, unlike way points, need not be entered in the anticipated order of use.

The operator is then asked whether bearing data are ready for entry. If it is not yet time to make the bearing observations, the operator has completed bearing-mode operation for the time being. The bearing points with their position data will remain in memory until the craft moves into the area where the bearing data are to be taken.

When the operator decides to make the bearing observations, he again places the apparatus in its bearing-fix mode, and the apparatus requests bearing data. The operator enters bearing (or distance) data in responses to questions in the displays, identifying each item of data with the previously entered bearing-point numbers (and therefore the corresponding position data). As data are entered, the apparatus will then calculate position fixes in this programmed order of preference: (1) bearings on two points—FIG. 21*c*, (2) bearings on three points—FIG. 21*d*, (3) bearing and distance to one point—FIG. 21*a*, and (4) bearing on one point plus later bearing on the same point—FIG. 21*b*.

The apparatus automatically finds the fix position (i.e., craft's calculated present position) whenever enough data are entered for any of the above four cases. The fix position is displayed in either latitude-and-longitude or GRI-and-TD format, as determined by the display key 34 or 35 last pressed. The display blinks on and off if it was necessary for the apparatus to advance an LOP by dead reckoning for more than thirty minutes for the fix; it continues to blink until a more reliable fix is obtained.

The map transport mechanism then moves to align the calculated fix position (on the map) with the crosshairs; and from this position the craft's present location continues to be advanced by tracking in whatever mode (DR track or Loran) the apparatus was in prior to entering the bearing-fix mode—or by tracking in whatever new mode is now selected. The optional recorder, if present, automatically records fix latitude and longitude, with the corresponding bearing (and distance, if any) data and the date-time group of the fix.

The foregoing procedure will now be described in terms of keystrokes and display indications. To enter the preliminary bearing-point identification and location data, the operator touches the BRG FIX key 45, and the apparatus displays read "NEW BRG PTS?" and "ENTER Y OR N". It is assumed for the purposes of this discussion that the operator wishes to enter new bearing points with their positions; therefore the operator's appropriate response is to touch the Y (yes) key. The displays 31 will then indicate "HOW MANY PTS?" The operator touches one of the numeral keys and then the ENT key in reply, to indicate the total number of bearing points which the operator wishes to have active in the bearing-point list.

The apparatus then initiates a systematic review of all the bearing points, if any, that are already in its memory—up to the number of points just indicated. If no bearing points are in memory already, or there are some but fewer than the number of points just indicated by the operator, the apparatus will ask the operator to fill the empty memory positions as part of the "review." The review procedure is as follows.

If one or more bearing points were previously entered, the apparatus automatically operates the map transport mechanism to move the charted location of bearing-point number 1 to the crosshairs—if this bearing point is on the chart at all—and the displays 31 indicate the position coordinates for bearing-point number 1. The operator touches the MARK key 44 if point number 1 is to be kept in the list. If, however, no bearing points were previously entered, the displays indicate "MOVE TO PT 1," and the operator responds by operating the direction keys 43 to align the desired point-number-1 position with the crosshairs—or, if point number 1 is off the chart, the operator keys in coordinate or GRI-and-TD data as previously described in part a—and then touches the MARK key to enter point number 1 on the list.

The apparatus then proceeds to bearing point number 2 (assuming that the operator indicated that there would be more than one point in the list), and again either presents the previously entered bearing-point location or invites the operator to "MOVE TO PT 2," depending upon whether there are previously entered data in the point-number-2 memory bank. This sequence is repeated for higher-numbered points, up to the total number of active points indicated by the operator, prompting the operator to review and update all of the point numbers and positions in the active list of bearing points. Higher-numbered (i.e., inactive) bearing-point memory locations, if any, are neither reviewed nor disturbed in this procedure.

When the last point in the active part of the list has been reviewed, the map transport mechanism returns the craft's present position to the crosshairs, and the displays indicate "BRGS?" and "ENTER Y OR N". Assuming that the operator has not yet reached the area in which the first actual bearing (or distance) measurements are to be made, the appropriate response is to key in N and ENT; the apparatus then automatically returns to whatever tracking mode was last in use.

When ready to make the actual observations, the operator again touches the BRG FIX key, and the displays again query "NEW BRG PTS?" and "ENTER Y OR N". Assuming now that the operator has no new points to add to the list, but only wishes to make and enter the measurements, the appropriate response this time is to touch the N and ENT keys. The apparatus responds by initiating a procedure for accepting measurement data. The displays indicate "PT NO? . . . 0", and the operator responds by touching the numeral key for the bearing point he is observing—e.g., 4 for point number 4—and then the ENT key. The displays indicate "BRG X 000000" to ask for bearing data for the selected point ("X" being the selected point number), and the operator touches the numeral keys and the ENT key to enter the bearing.

The apparatus then asks the operator whether there are data for another point, by indicating at the displays "PT NO? . . . 0". In accordance with the order of preference listed earlier in this discussion, the apparatus does not invite entry of distance (as opposed to bearing) data unless there are bearing data for only one point. If there are bearing data for more than one point, the operator now keys in the next bearing-point number for which bearing data are available, and the display again requests the data by displaying "BRG X 000000"; the operator responds with the bearing for this point, and so forth until all bearing data have been entered. The operator then touches the ENT key. It is still assumed for purposes of this discussion that bearing data have now been entered for more than one point. The apparatus calculates a position fix (as described below with reference to FIGS. 21*c* and 21*d*), completing the bearing-fix mode of operation and returning to the tracking mode previously in use.

Figure 21A:
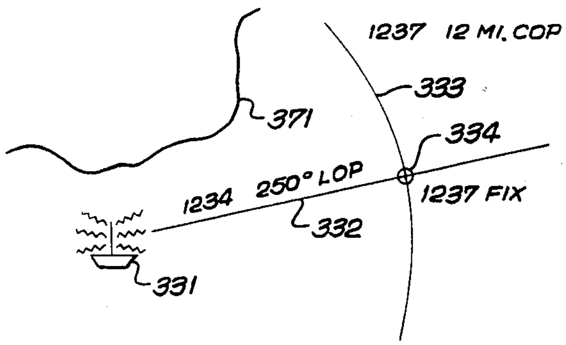
Figure 21B:
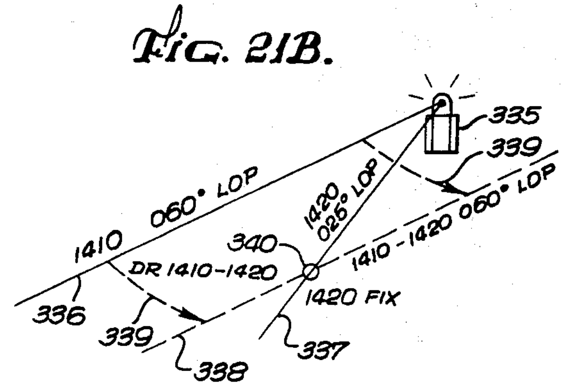

If, however, there are bearing data for only one point, then when the operator touches the ENT key (the second time) after entering the data for that one point the display indicates "DIST 000000"—asking for a distance measurement on that one point, to complete the calculation (as described below with reference to FIG. 21*a*). If the distance is known the operator uses the numeral keys and the ENT key to enter the distance in nautical miles; or if the distance is not known the operator touches the ENT key again. In the latter case the display then indicates "BRG 000000"—asking for a second bearing on the same point, to be taken later, after the craft has moved to a significantly different position, but preferably within a thirty-minute period to minimize dead-reckoning inaccuracy. When the craft has reached a suitable second position, the operator takes the second bearing on the same point and uses the numeral and ENT keys to enter the measurement. The apparatus then completes the calculation (as described below with reference to FIG. 21*b*), and then returns to the tracking mode previously in use.

Figure 21C:
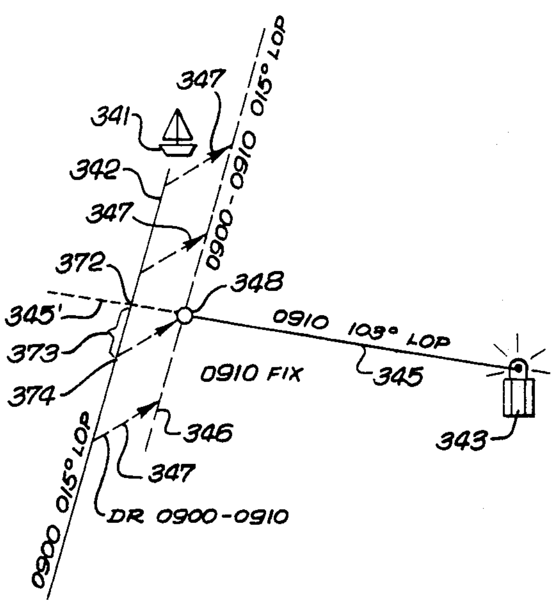
Figure 21D:
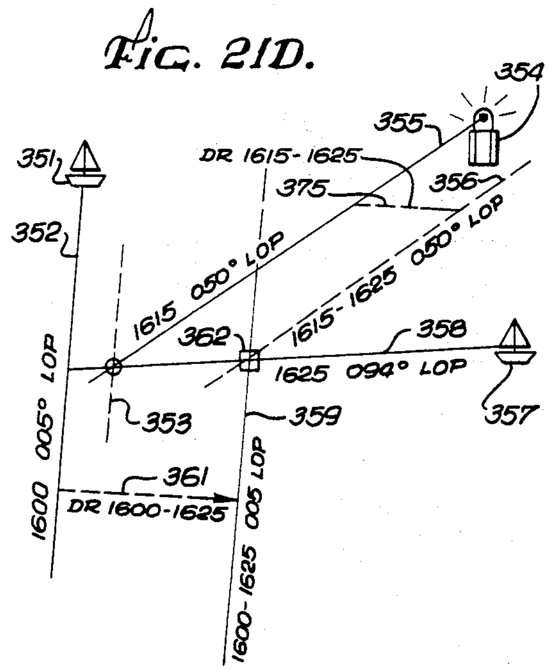

Numerical examples of the calculations for the four types of bearing fix will now be presented. FIG. 21*c* illustrates a two-bearing fix in a coastal piloting situation, with bearings to be taken on a lighthouse 343 and a channel departure buoy 341. Assuming that the bearing-point position data have previously been entered, the key operation sequence is: BRG FIX (enter mode), N ENT (no new points), Y ENT (bearing data are available . . .), 1 ENT (. . . for point 1), 015 ENT (the bearing to point 1 is 015 degrees).

It is also assumed here that the last touching of the ENT key occurred at precisely 0900 hours, and that the previously entered location of bearing-point number 1 was the location of the buoy 341. Accordingly, the apparatus has now recorded the time 0900 and the fifteen-degree bearing measurement in association with the buoy 341 (and its previously entered position coordinates). The geometric implication of this is that the craft has been located somewhere along the straight "line of position" (LOP) 342.

It will next be assumed that the operator prepares to take a sighting on the lighthouse 343, and that nearly ten minutes elapse before this measurement is completed. The key operation sequence now is: 3 ENT (bearing data are now available for point 3), 103 ENT (the bearing to point 3 is 103 degrees), ENT (no more bearings). It is assumed that the previously entered location of bearing-point number 3 was the location of the lighthouse 343, and that the next-to-last touching of the ENT key occurs at 0910 hours; accordingly, the apparatus has now recorded the time 0910 and the 103-degree bearing measurement in association with the lighthouse. The geometric implication of this is that the craft has been located somewhere along the straight LOP 345.

During the ten-minute interval required for the second measurement, however, the craft has moved. Although the apparatus was not previously able to compute the place along LOP 342 at which the craft was located, it is able to compute by dead reckoning the effective new position 346 of the earlier-determined LOP 342. The dashed lines 347 illustrate the DR "advance" of the LOP 342 during the interval from 0900 to 0910 hours, following the craft's motion, to new virtual LOP position 346. The geometric (or physical) significance of this is that if the craft was "somewhere along LOP 342" at 0900 hours, it must be "somewhere along LOP 346" at 0910 hours.

The apparatus is now able to calculate the craft's position as point 348, at the intersection of the dead-reckoning-advanced virtual LOP 346 and the actual LOP 345. From the direction of the dashed lines 347 it may be seen that if the apparatus did not advance the actual LOP 342 by dead reckoning, but merely treated the LOP 342 as having been taken at 0910 hours, the position at 0910 hours would be in error by distance along the projection 345' (dashed portion) of LOP 345 to erroneous intersection point 372.

Figure 22:
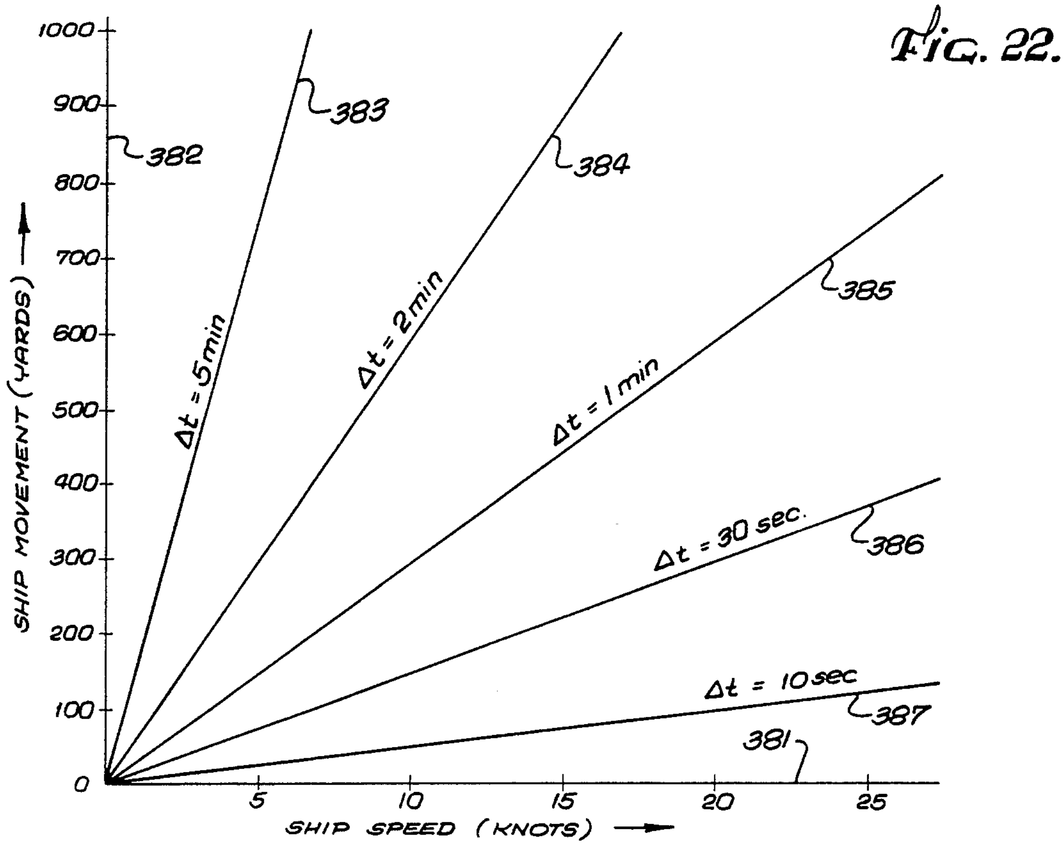

If instead the apparatus treated both measurements as having been taken at 0900 hours the position at that time would be erroneously found as point 372, in error by distance 373 (shown bracketed) along LOP 342—the correct point at 0900 hours actually having been point 374. Such an error can be very significant, as suggested by FIG. 22, which shows the distance traveled by craft at various speeds for various time intervals Δt. FIG. 22 indicates, for example that a craft traveling at only five knots for only five minutes will travel over 700 yards—more than ample error distance to generate a catastrophe in coastal piloting.

FIG. **21*d* illustrates a three-bearing fix, which has the advantage of being independent of compass error (and in fact offering an opportunity to determine the size of compass error). It is assumed that a first buoy 351 is point 1, a lighthouse 354 is point 2, and a second buoy 357 is point 3—all with position data already entered. After measurement of the bearing to the first buoy, the operator's key operation is BRG FIX (enter mode), N ENT (no new points), Y ENT (data are available now . . .), 1 ENT (. . . for point 1), 005 ENT (the bearing to point 1 is five degrees). If the ENT key was last touched at exactly 1600 hours, the apparatus can now determine that the craft is somewhere along LOP 352, which passes through buoy 351. The operator next takes a bearing fix on the lighthouse 354, entering: 2 ENT (point 2 is next), 050 ENT (the bearing to point 2** is fifty degrees).

If it is assumed that the ENT key was last touched at 1615 hours, the apparatus could now determine a position fix at the intersection of dashed line 353 (the DR-advanced position of LOP 352) with LOP 355 through the lighthouse 354. To keep the calculation open for the third bearing, however, the operator now refrains from touching the ENT key again (which would indicate that there were no further bearing data). Instead the operator takes a sighting on the second buoy 357, and keys: 3 ENT (point 3 is next), 094 ENT (the bearing to point 3 is ninety-four degrees), ENT (there are no more bearing data).

If it is assumed that the ENT key was next-to-last touched at 1625 hours, the apparatus calculates a position fix at the most reliable value for the intersection 362 of three lines of position: (1) LOP 358, through the second buoy 357, (2) dashed line 359, which represents the LOP 352 through the first buoy 351, but advanced by dead reckoning along the line of motion 361 during the interval from 1600 to 1625 hours, and (3) the dashed line 356, which represents the LOP 355 through the lighthouse 354, but advanced by dead reckoning along the line of motion 356, during the interval from 1615 to 1625 hours.

If the sightings were geometrically perfect, the speed and heading sensors likewise, and the effects of set and drift negligible (or perfectly compensated), then in simplest theory the three lines 358, 359 and 356 would all pass through a single point 362. None of these theoretical assumptions is correct, of course, so the apparatus must resolve the apparent inconsistency (or "redundancy," or "overdetermination") in the data by calculations that attach various reliabilities to the LOPs 358, 359 and 356, based on the various angles between them. If desired, the assigned reliabilities could also be based on the lengths of the respective intervals during which the actual LOPs 352 and 355 were advanced by dead reckoning to obtain the virtual LOPs 359 and 356.

FIG. **21*a* illustrates a single-bearing-plus-distance fix, near coastline 371. It is assumed that visibility is poor, radar bearings and distances are available, six bearing points are entered in the apparatus memory—including a point 2 that will not be needed—and the radar target, a lightship 331, is a new bearing point not previously entered. The operator keys: BRG FIX (enter mode), Y ENT (I have a new point), 6 ENT (there are six on the list), MARK (point 1 is unchanged), N S E W MARK (replace previous point 2 with the lightship), MARK (point 3 is unchanged), MARK (point 4 is unchanged), MARK (point 5 is unchanged), MARK (point 6 is unchanged), Y ENT (I have a bearing . . .), 2 ENT (. . . on [new]point 2), 250** ENT (the bearing is 250 degrees).

The apparatus is now able only to place the craft somewhere along LOP 332, and if the ENT key was pressed at 1234 hours the apparatus is able to associate this line of position 332 with that time. The displays again query "PT NO? . . . 0". The final entries must now be made promptly, since the preferred embodiment of the invention does not advance LOPs in this type (single-point, bearing and distance) of fix. The operator answers by keying in ENT (no other points have bearing data). The displays indicate "DIST 000000"—asking for a distance fix. The operator keys in 12 ENT (distance is twelve nautical miles). The apparatus now calculates the craft's present position as the intersection 334 of LOP 332 with "circle of position" (COP) 333. Since both bearing and distance are read from the same apparatus it is easy to hold the interval between entries of the two data items to a minute or less; alternatively, if feasible, the craft can be halted, to eliminate any motion error as between the two pieces of data.

FIG. **21*b* illustrates a two-bearing fix on a single object—the so-called "running fix". It is assumed that the lighthouse 335 is bearing-point number 5 and that position data are already entered. The operator keys: BRG FIX (enter mode), N ENT (I have no new point), Y ENT (I now have bearing data . . .), 5 ENT (. . . for point 5), 060 ENT (the bearing is sixty degrees). The apparatus now can place the craft somewhere along LOP 336, at the time the ENT key was last touched—here assumed to be 1410 hours. As in the previous example the displays query "PT NO? . . . 0**" and the operator answers by keying ENT (no more points).

The displays indicate "DIST 000000"—asking for a distance fix as in the previous example—but now the operator answers by again keying ENT (no distance data). The displays then indicate "BEARING 000000," and the operator delays responding until the bearing on the lighthouse 354 has changed significantly—because small angles between bearings can produce a relatively uncertain position, relatively sensitive to errors in bearing measurement.

The operator must also, however, guard against accumulating too large a potential dead-reckoning error, which would arise from too large an interval between bearing measurements. As suggested in FIG. **21*b***, a ten-minute delay and thirty-five-degree angle between the LOPs represent a satisfactory compromise between the two potential error sources.

Thus, at 1420 hours the operator keys: 025 ENT. The apparatus now calculates present position at the intersection 340 of the new LOP 337 with dashed line 338, which represents earlier LOP 336 advanced by dead reckoning (along motion lines 339) during the interval from 1410 to 1420 hours. It will now be clear that, while the advancement of earlier LOP by dead reckoning is "merely" very important to accuracy in plural-bearing-point fixes (as discussed above with reference to FIG. **21*c*, and as can be understood with reference to FIG. 21*d*), such advancement by DR is absolutely essential to possibility of single-bearing-point, two-bearing fixes (FIG. 21*b***). The entire "running fix" calculation would be geometrically meaningless if the craft's motion were disregarded.

e. Loran Mode

It is assumed here that the apparatus has a suitably attached Loran receiver, and includes a suitably configured Loran Interface Module (FIG. 14, and 274 in FIG. 10). Once the operator has keyed in the Loran "group repetition interval" (GRI) for the craft's present operating area, the apparatus then continually receives Loran data for that GRI from the Loran receiver.

The apparatus evaluates Loran time differences (TDs) as they are received, assessing the distance to the corresponding Loran transmitters, the crossing angle between constant-TD lines (the conceptual equivalent of dead-reckoning LOPs and COPs), and the "station-pair baseline extension." (The latter may be thought of as the geometrical projection of a straight line between two of the Loran transmitters that produce a single TD.) The apparatus automatically selects the two best TDs, based on these criteria, and then computes a position fix. If the two best TDs provide only marginal positioning accuracy, the displays 31 blink on and off while indicating the computed fix position. The apparatus calculates a Loran fix once per minute; and performs the complete evaluation, selection and computation cycle every five minutes.

The apparatus uses the Loran fix position in two ways: (1) to reposition the DR track that it is maintaining, and (2) to compare with the DR track accumulated during the preceding minute, to compute the set and drift as explained in part a above. Course and speed are then automatically corrected for this up-to-date set and drift, and the corrected course and speed are used to improve all DR tracking calculations for the succeeding minute. The Loran fix position and the thus-updated set and drift are also used to display (or provide to an autopilot) a set-and-drift compensated "course to steer," as previously explained. Since this "course to steer" is updated each minute, both as to desired track and as to set and drift, the actual course made good over the bottom will be almost exactly a beeline for the next way station. This operation will be illustrated shortly.

(For best accuracy over very long distances, the apparatus should be programmed to project "course to steer" along "great circle" routes. Equations for this purpose are available in the literature; however, this type of calculation is not required for practice of the present invention under more typical circumstances and will not be discussed further here.)

To initiate the Loran mode, the operator verifies that the Loran receiver is properly connected, set to the GRI for the intended operating area, and tracking; and then touches the Loran key 47 (FIG. 2). The operator next touches the GRI/TD key 35, to verify that the GRI stored in the apparatus is the correct one for the operating area. If the displayed value is not the correct one, the operator keys in "f GRI/TD" and then enters the desired GRI using four digits and the ENT key. The operator watches the displayed TDs for a while to ensure that the Loran receiver is settled in its operation, and then enters present position by performing function f0, "enter present position," described in part a above—thus giving the DR calculations a suitable starting point.

If the apparatus is receiving only one TD, or none, no Loran operation is possible, and the displays 31 indicate "RECEIVER ON?" If two TDs are received, and they are in combination satisfactory for a fix, the apparatus determines and displays latitude and longitude each minute and uses the results as previously described; if the two TDs only permit a fix of marginal accuracy, operation is the same except that the displayed coordinates are shown blinking on and off. If three, four or five TDs are received, the apparatus selects the two best TD values for accurate results and then proceeds in the same way as when only two values are received.

f. Piloting Effectiveness; Fuel and Time Efficiency

The apparatus of the invention is useful in helping to guide—or in guiding—a craft to its way points and destination, not only with greater certainty but also more directly. As previously suggested, the preferred embodiment aids the operator in refining whatever knowledge is available about heading, speed, set, drift, and "course to steer."

If only manually observed or estimated values are available for these parameters, the apparatus helps the operator to make the most of them, by relating the estimates to bearing fixes and thereby progressively improving the estimates. If automatic heading and speed sensors are available, the resulting inherent improvements in certainty and convenience are positively enhanced by the apparatus of the present invention, which uses the automatically obtained information, in conjunction with bearing fixes, to derive quite good values for set and drift—and then to apply these values to obtain both heading-and-speed data and a "course to steer" that are set-and-drift compensated to a much better approximation than would be possible with either the automatic sensors alone or the apparatus of the invention alone.

When Loran capacity is added to this combination, an additional quantum step in piloting efficacy is obtained. Since accurate Loran fixes can be obtained automatically, and therefore quite frequently, the set-and-drift compensation for both the heading-and-speed calculation and the "course to steer" can be updated on virtually an instantaneous basis. The Loran fixes are also available to update the desired track on the same virtually instantaneous basis. The overall result is a "course to steer" that is set-and-drift compensated to a much better approximation than possible with either (1) the Loran system alone or (2) the combination, considered alone, of the apparatus of the present invention with the automatic speed and heading sensors. As will be shown in the following paragraphs, the sophistication and power of this overall system permit extremely beneficial economies of fuel and time.

Figure 23:
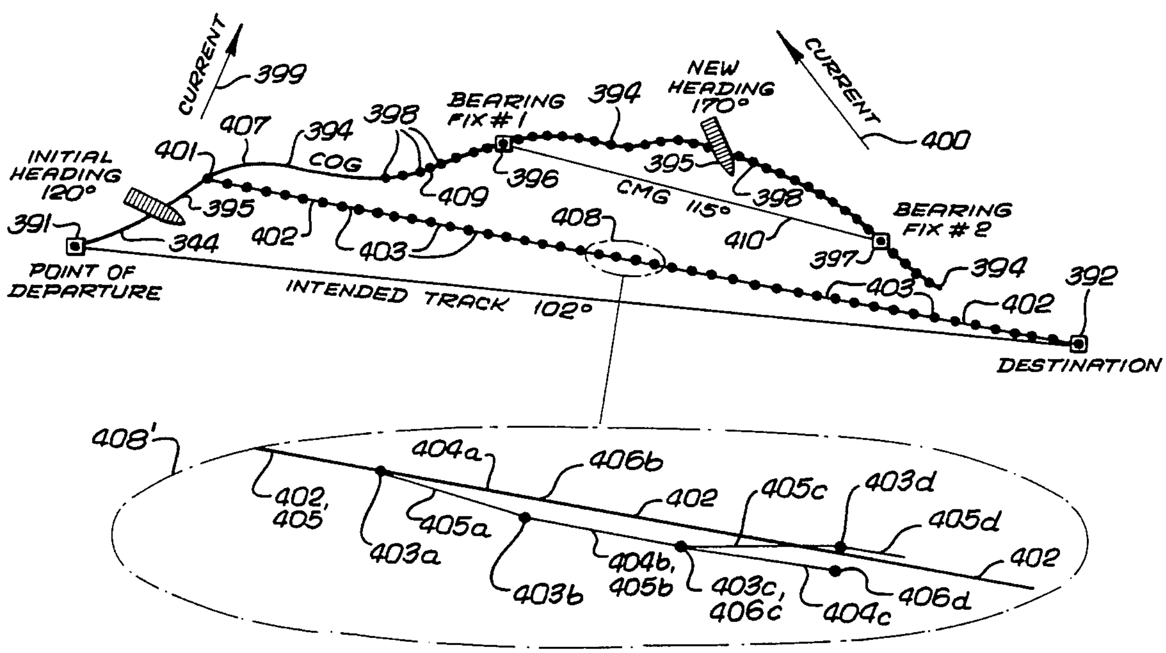

FIG. 23 illustrates some of the levels in the spectrum of capabilities just outlined. It is supposed that a craft sets out from departure point 391 intending to travel as directly as possible to destination point 392. The current 399 near the departure point is known to be generally northerly, but neither the exact set nor the exact drift is known—and in fact the actual values vary over the intended course, with a more westerly deflection arising nearer the destination point as shown at current vector 400. The navigator determines from charts that the bearing of destination point 392 from the point of departure is 102 degrees; this is the direction for the desired track 393.

It is assumed first that the apparatus of the present invention is not available. The navigator calls for an initial heading or "course to steer" of 120 degrees, in hopes of compensating for the known northerly current 399. This estimate of the necessary compensation, however, is in fact inadequate, and the craft is carried northerly from the intended track, along the actual course over ground (COG) 394. (In the drawing the north-south directions are slightly exaggerated relative to the east-west directions, for purposes of explanation.) The navigator nevertheless maintains the initial heading of 120 degrees, as indicated by the heading symbol at 395, until visual sightings and manual computations and plotting provide an alert to the erroneous course. This modus operandi is rather primitive, even using good modern charts and hand computing aids, by comparison with the other capabilities discussed here.

Using these manual methods, the navigator may find, when first able to take a bearing fix at point 396, that the craft has been swept far north of the intended track. A new heading or "course to steer" of 170 degrees, as at point 395, may be adopted in an effort to direct the craft once again toward the destination point 392. The navigator is unable to tell whether this corrective maneuver is of the appropriate magnitude until another bearing fix at point 397 becomes available. As it appears from the course over ground, the heading has this time been more auspiciously selected, and the craft appears to be traveling in the right direction, but the obvious wanderings along the way can be extremely expensive in terms of fuel, crew and equipment time, and consequently money. The energy waste alone, under modern conditions of international energy constraints, is highly significant.

Due to the availability of only two bearing points along the way, even with automatic speed and heading sensors the navigator would be hard put to make good use of the two bearing fixes in any other way than to realize that the craft is generally off course. The course made good (CMG) 410 between the two fix points is determinable to no greater accuracy than the 115-degree directed straight line joining the two points 396 and 397, obviously very different from the actual COG 394 between the two points.

Now let it be assumed instead that the navigator has automatic sensors and the preferred embodiment of the invention, but without Loran, and let it be still assumed that the initial heading, as at 395, is 120 degrees. Let the north-south scale exaggeration of FIG. 23 be taken now as considerably greater than for the previous discussion of operation without the apparatus of the invention, so that the same drawing can be used for this case too. Bearing fixes taken (but not illustrated) easily and quickly on shore points near the point of departure 391 will soon permit the navigator to determine quite accurately the set and drift of current 399. Using these data the navigator can systematically reset the heading or "course to steer" near point 407 to take up a more easterly COG. A significant saving of time, fuel, and money has already been achieved. At point 409, however, the craft begins to come under the influence of the more-westerly current 400, and the COG again swings northward. The navigator is unaware of this until a "running fix" (FIG. 21*b*) at point 396 makes it clear that the dead reckoning has been slightly inaccurate. Assuming that there is no other bearing point in the vicinity of point 396, it can further be supposed that the navigator takes another running fix on the same bearing point after a few minutes, obtaining an updated value for the set and drift near point 396.

As the craft travels eastward, however, the influence of the strong northwestward current 400 increases, and the craft continues to move northerly of the desired track. If the navigator suspects this, he may attempt to compensate—but without knowing exactly how much—by taking a new heading at point 395. Not until the fix at point 397 is taken can the navigator get an idea of the CMG 410 between points 396 and 397. As noted above, this CMG is a rough approximation for the actual COG 394 between the same points—but this is the very best that can be hoped for, where current set is varying strongly with position and there are few bearing points available. Under such conditions, even the apparatus of the present invention cannot produce highly accurate DR tracking without reasonably frequent data inputs. As already indicated, however, the improvement relative to manual methods or even prior instrumentation is substantial. At point 397 the navigator can again confidently (rather than by auspicious selection as before) set "course to steer" for the destination point 392.

It will next be assumed that the craft also has a Loran receiver and interface, and for purposes of discussion it will be assumed that those units are activated during the journey just to the left of point 409, and that Loran fixes are taken at each of the marked points 398. Limiting the discussion first to the matter of merely determining position, the Loran fixes taken at points 398 permit the operator to see the position of the craft, and visualize the COG, precisely as it appears at curving line 394. The Loran fixes are sufficiently frequent that any differences between COG and CMG between fix points are completely insignificant.

These discussion assumptions, however, are very unrealistic, for the navigator would not want to limit use of the system to providing an accurately scaled down view of the meandering COG shown at 394. Rather the navigator would be intent upon using the system to set a "course to steer" that would carry the craft as directly as possible to the destination point 392. In the diagram it is supposed that the navigator initiates this alternate mode of operation at point 401. The result would be a nearly perfect straight COG 402, guided by Loran fixes 403 at regular intervals along the way.

Area 408, along the straight course 402, is shown greatly expanded within the enclosed area 408', to illustrate more specifically the iterative compensations of course provided by the system. In the expanded drawing, line 402 represents the ideal straight course, and line segments 405, **405*a*, etc. through 405*d* represent the actual COG. Points 403*a*, etc. are Loran fix points, and points 406*b*, etc. are positions predicted by dead reckoning. The line segments 404*a*, etc. represent the track predicted by DR. It will be assumed that the craft position at 403*a* happens to be exactly on the desired track 402, and the "course to steer" extends directly along the desired track. When the next Loran fix is taken at point 403*b*, however, it will be discovered that—although the DR track 404*a* has brought the DR-calculated position of the craft to point 406*b*, precisely along the desired track 402 as predicted by the "course to steer" setting called for—the Loran fix produces a position 403*b* that is very slightly south of the DR position 406*b***.

This slight discrepancy, due principally to local variation in the ocean currents, causes the apparatus automatically to decrease very slightly its calculated value of northerly drift. This adjustment, plus the very slight change in bearing of the destination point, results in redirecting the "course to steer" slightly, aiming for the path **404*b*. It is assumed that along this leg of the travel the set and drift values are extremely close to the calculated values as just adjusted, so the COG line segment 405*b* lies almost perfectly along the desired track 404*b*. Accordingly, when the next Loran fix is taken at point 403*c*, and compared with the DR-predicted position 406*c*, it is found that the two points are virtually identical. This implies that the DR-track line segment 404*b* is practically congruent with the COG line segment 405*b***.

This being the case, no change is made in the "course to steer"—which is set to produce travel along line segment **404*c*. The DR calculations, therefore, predict travel along line segment 404*c* to point 406*d* at the time of the next Loran fix. Another local variation in set and drift, however, swings the course northerly along COG line segment 405*c* to Loran fix point 403*d*. Comparison of points 403*d* and 406*d* automatically by the apparatus once again revises the calculated set and drift values, and the "course to steer" is therefore reoriented to move the craft along line 405*d*. Even with the very extreme exaggeration of north-south excursions relative to east-west travel in the expanded area 408' of FIG. 23, the COG segments 405*a*, 405*b*, 405*c* and 405*d* are all rather closely parallel to the desired straight track 402; and the actual Loran-fix positions 403*a*, 403*b*, 403*c* and 403*d* are all extremely close to the desired track 402**. The lateral excursions are in fact negligible, resulting in very significant fuel, time and money economies.

5. PROGRAMMING

To enable a person skilled in the art to practice the present invention, in its preferred embodiment that has been described, some person skilled in the art of computer programming must program the three microprocessors to control all the hardware in such a way that all the many described tasks are performed correctly and conveniently. The skilled programming artisan can accomplish this task by reference to the program-structure diagrams that are presented as FIGS. 31 et seq. of the accompanying drawings, along with the other information given in this text.

Figure 24:
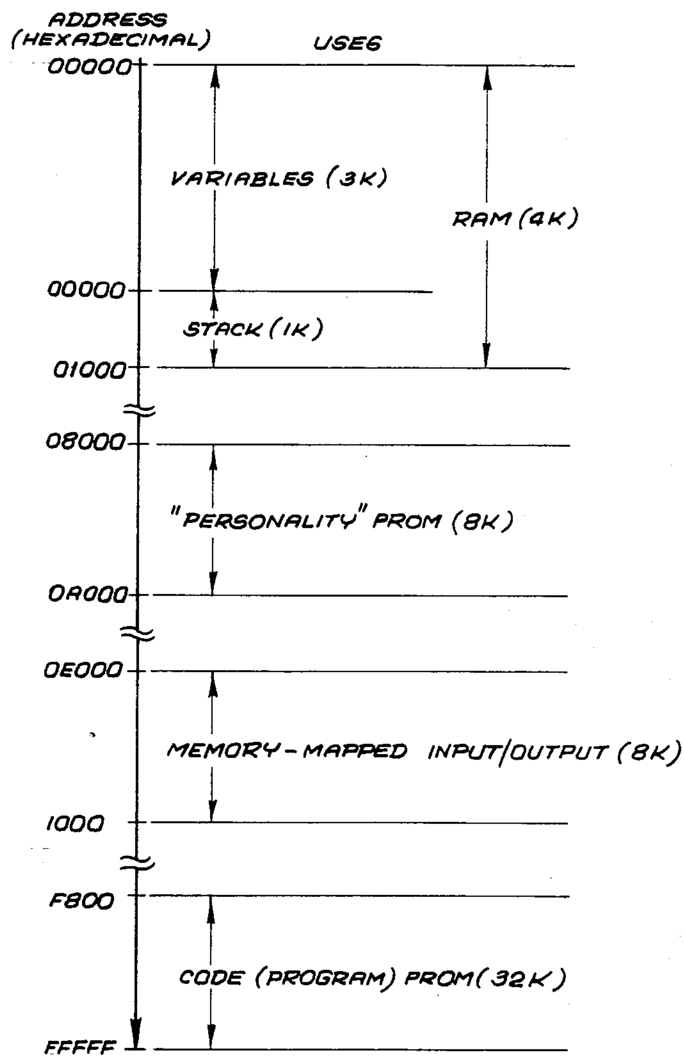
FIG. 24 is a "memory map" diagram, showing allocation of data to various memory components in the preferred embodiment of FIGS. 1 through 19.

FIG. 24 illustrates the allocation of memory-location numbers in the central processor unit of the preferred embodiment. The address numbers are given in hexadecimal notation, in which there are sixteen digits as follows: 0123456789ABCDEF. The digit "A" represents decimal 10, and the digit "F" represents decimal 15. Thus the notation "F 8000" represents decimal $15\times16^4+8\times16^3$, and the notation "FFFFF" represents $16^5-1$. With this notation established, FIG. 24 is largely self-explanatory. The gaps (as for example between 0A000 and 0E000) are simply unused address intervals. The terminology used in the drawing is either explained in the discussion of the electronic system, subsection 3 above, or is conventional in the programming arts.

Several navigating equations must be solved by the microprocessors, and special geometric problems must be solved for Loran operation. To practice the invention it will not be necessary to derive—or even completely understand—the necessary equations, for those equations are presented here, and their solution is a matter of simple algebra programming, well within the programmer's skill.

The dead-reckoning and "course to steer" and set-and-drift equations are all essentially simple arithmetic and trigonometry, derived simply from the elementary vector relations appearing in FIG. 20. The derivations take into account the fact that the distance (expressed in terms of arc about the center of the earth) corresponding to any longitude increment traversed by a craft is equal to the size of that longitude increment divided by the cosine of the latitude at which the excursion occurs, $\Delta x = \Delta\lambda/(\cos L)$.

In the foregoing expression and throughout the following text the customary notation $\lambda$ is used for longitude and L for latitude. It is convenient to manipulate these quantities in degrees—since that is the form in which they will be input and output—except where either appears as the "argument" of a trigonometric function (as does L in the expression above). In the latter case it is preferable to convert to radians, to accommodate the trig-function protocol in most suitable microprocessors. (The symbol x used above generally indicates distance, and the symbol $\Delta$ is used as is customary to indicate a small increment in the following parameter.)

Over relatively short distances on the earth's surface the dead-reckoning latitude L may be taken as the starting latitude $L_1$, or preferably as the average of the starting and ending latitudes $(L_1+L_2)/2$. Thus, to find latitude $L_2$ and longitude $\lambda_2$ of present position from latitude $L_1$ and longitude $\lambda_1$ at an earlier position, with known speed S and drift d in nautical miles per hour, known heading H and set s in radians clockwise from north, and known starting and present times $T_1$ and $T_2$ in hours and decimal fractions of hours (with appropriate correction when $T_2$ is in a later day than $T_1$):

$$L_2 = L_1 + (S \sin H + d \sin s)(T_2 - T_1)$$

$$\lambda_2 = \lambda_1 + (S \cos H + d \cos s)(T_2 - T_1)\cos\frac{L_1 + L_2}{2}$$

To find set and drift from present and earlier coordinates and known heading and speed, the same equations are solved for the desired values:

$$s = \tan^{-1}\frac{\dfrac{L_2 - L_1}{T_2 - T_1} - S \sin H}{\dfrac{\lambda_2 - \lambda_1}{(T_2 - T_1)\cos\dfrac{L_2 + L_1}{2}} - S \cos H}$$

$$d = \frac{\dfrac{L_2 - L_1}{T_2 - T_1} - S \sin H}{\sin s}$$

Figure 25A:
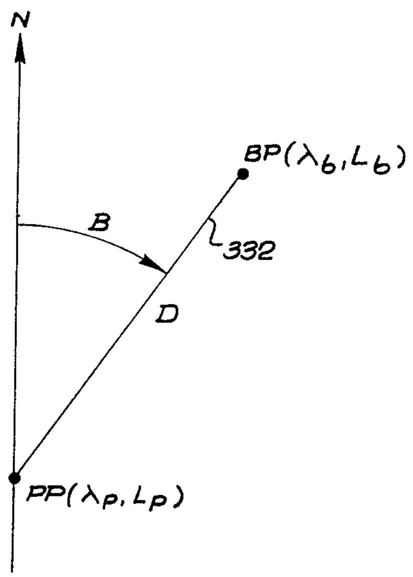
FIGS. 25–28 are diagrams defining terms in the mathematical equations that must be solved by the computer to perform its assigned navigating tasks.
Figure 25B:
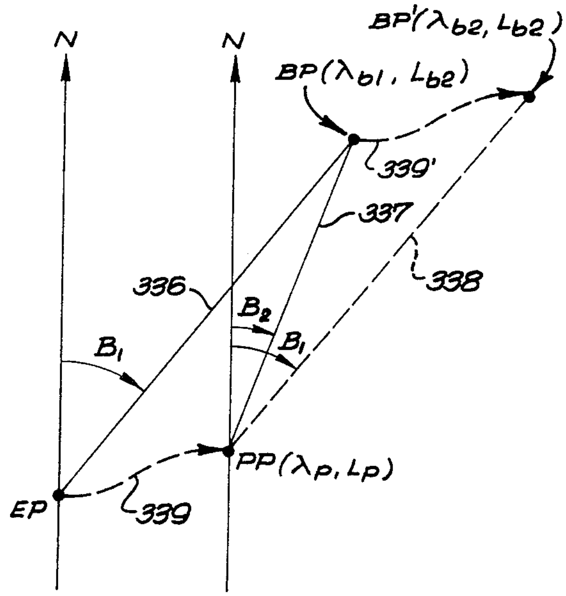
Figure 25C:
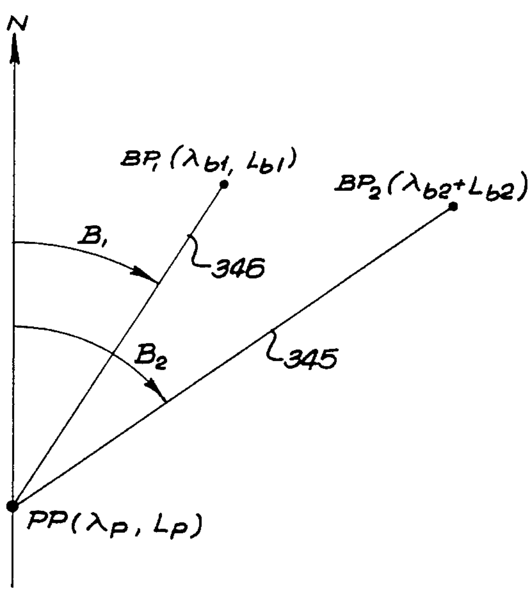

The equations necessary for bearing fixes are as follows. FIG. 25*c* illustrates the terms that must be defined for a two-bearing fix (see also FIG. 21*c* and the corresponding discussion). The point PP is the craft's present position, at longitude $\lambda_p$ and latitude $L_p$ to be determined. The points $BP_1$ and $BP_2$ are the effective bearing points of known longitude $\lambda_{b1}$ and $\lambda_{b2}$ and latitude $L_{b1}$ and $L_{b2}$ respectively. The term "effective" is used here because the point $BP_1$ is not the actual tabulated or charted location of the bearing point—e.g., the buoy 341 in FIG. 21*c*—but rather the virtual position obtained by applying the dead-reckoning track 347 (FIG. 21*c*) to the actual coordinates of the bearing point. In effect the bearing point is "moved over" along with the craft, by dead reckoning. This provides the effect of shifting the entire LOP 342 (FIG. 21*c*), as described in subsection 4d above, to the new position 346 (FIGS. 21*c* and 25*c*).

The angles $B_1$ and $B_2$ are the bearings, entered in degrees but preliminarily converted within the computer to radian measure to accommodate the format used for trigonometric "arguments" in the microprocessor. (As previously noted, latitude values where involved as cosine "arguments" should be converted too, but not latitude values otherwise.) If neither $B_1$ nor $B_2$ is either zero or 180 degrees, the desired present-position longitude $\lambda_p$ and latitude $L_p$ are found in degrees as follows, $x_p$ and $y_p$ being useful intermediate variables.

$$x_p = \frac{(\lambda_{b2} - \lambda_{b1})\cos\dfrac{L_{b1} + L_{b2}}{2} - (L_{b2} - L_{b1})\tan(\pi/2 - B_2)}{\tan(\pi/2 - B_1) - \tan(\pi/2 - B_2)} \quad (1)$$

$$y_p = x_p \tan(\pi/2 - B_1) \quad (2)$$

$$L_p = L_1 + y_p \quad (3)$$

$$\lambda_p = \lambda_1 + x_p/\cos\frac{L_p + L_1}{2} \quad (4)$$

If, however, the angle $B_1$ is zero or 180 degrees ($\pi$ radians) then the singularities (infinitely high values of the tangents, preventing completion of the computation) in the foregoing equations require use of a different solution:

$$x_p = 0; \quad (5)$$

$$y_p = L_{b2} - L_{b1} - (\lambda_{b2} - \lambda_{b1})\cos\frac{L_{b1} + L_{b2}}{2}\tan(\pi/2 - B_2) \quad (6)$$

These values are inserted into equations 3 and 4 above. If the other bearing angle $B_2$ is zero or 180 degrees, then equations 5 and 6 with subscripts 1 and 2 exchanged provide the correct intermediate results for insertion into equations 3 and 4.

For a running fix (FIGS. 25*b* and 21*b*), the equations are exactly the same except that the coordinates of the single bearing point are translated by the amount of the dead-reckoning track between the two bearing times, to give a virtual or effective position of the bearing point for association with the first bearing taken. This statement may be better understood from the following details. With reference to FIG. 26*b*, it will be recalled that the single bearing point BP is sighted from an earlier position EP and from a later position PP. The position EP is not known and will not be determined. The position PP has coordinates $\lambda_p$, $L_p$ to be determined. The dead-reckoning track 339 is applied to the bearing point BP, to locate the virtual bearing point BP'.

Now assigning the coordinate notation $\lambda_{b1}$, $L_{b1}$ to the known longitude and latitude of the actual bearing point BP, and the coordinate notation $\lambda_{b2}$, $L_{b2}$ to the known longitude and latitude of the virtual bearing point BP', the coordinates of the present position PP are found from equations 1 through 6 above.

Figure 25D:
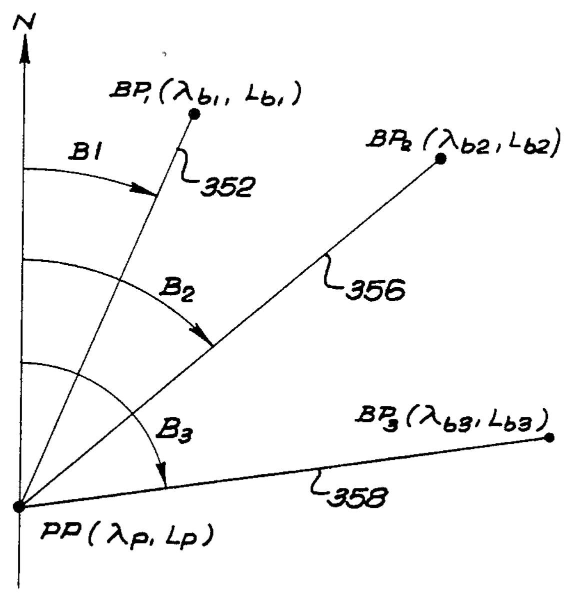

For a three-bearing fix (FIGS. 25*d* and 21*d*), the program must shift the first two bearing points by dead reckoning as for the two-bearing case. The next step is to compute the intermediate $x_p$ and $y_p$ for each pair of bearings—that is, for all three of the possible combinations that can be formed by taking the bearings two at a time. Equations 1 and 2, and/or 5 and 6 if any of the bearings is zero or 180 degrees, are used to find these intermediate variables. More specifically, the intermediate variables $x_{p1}$ and $y_{p1}$ are formed for the combination of bearings $B_1$ and $B_2$; the variables $x_{p2}$ and $y_{p2}$ are formed for the combination of bearings $B_1$ and $B_3$; and the variables $x_{p3}$ and $y_{p3}$ are formed for the combination of bearings $B_2$ and $B_3$. Treating these sets of variables and corresponding bearings generally as $x_{pn}$, $y_{pn}$ for bearings $B_i$, $B_j$, and $B_k$, with the i, j, and k subscripts to be defined below, another set of intermediate variables $x_p'$ and $y_p'$ must next be calculated according to:

$$x_p' = \frac{y_{pi} + x_{pi}\cot\frac{\pi - B_i - B_j}{2} - y_{pj} - x_{pj}\cot\frac{\pi - B_i - B_k}{2}}{\cot\frac{\pi - B_i - B_k}{2} - \cot\frac{\pi - B_i - B_j}{2}} \quad (8)$$

$$y_p' = y_{pi} + (x_{pi} - x_p')\cot\frac{\pi - B_1 - B_j}{2} \quad (9)$$

in which the subscripts i, j, and k must be assigned as follows. First it is necessary to identify which bearing value among the three is the largest, and which is the smallest, and which is between the other two. These will be referred to as the maximum, minimum and middle bearings, respectively; and the difference between the maximum and minimum bearings will be called the bearing spread. If the bearing spread is equal to or greater than 180 degrees, then the subscripts should be assigned thus:

$$i=1,\ j=2,\ k=3. \quad (10)$$

If the bearing spread is less than 180 degrees, then the middle bearing controls the assignment of subscripts, as follows:

middle bearing is $B_1$—$i=1,\ j=2,\ k=3$; (11)

middle bearing is $B_2$—$i=2,\ j=1,\ k=3$; (12)

middle bearing is $B_3$—$i=3,\ j=1,\ k=2$. (13)

Once the variables $x_p'$ and $y_p'$ have been found from equations 8 and 9, they are used in place of $x_p$ and $y_p$ respectively in equations 3 and 4 above to establish the fix coordinates $L_p$ and $\lambda_p$ that are sought.

Equations 8 and 9 are subject to singularities (infinitely high intermediate results, preventing completion of the computation) if either $B_i+B_j$ or $B_i+B_k$ is very close to zero or 180 degrees. The easiest way to deal with this problem is to program the computer to "inspect" these sums of bearings before beginning equations 8 and 9, and if either sum is very close to zero or 180 degrees, then to present that sum to an arbitrary small value (but not too small)—for example, 0.001 degree, or 0.00001 radian—to permit the apparatus to complete the calculation. The exact small value arbitrarily chosen will cancel out of the results, as long as it is used consistently and is not so small that the singularity effectively arises anyway.

For a bearing-and-distance fix (FIGS. 21*a* and 25*a*) the input data are the known latitude and longitude $L_b$ and $\lambda_b$ of the single bearing point BP, and the measured bearing B and distance D to the bearing point BP. The bearing B is initially entered in degrees and the distance D in nautical miles. The bearing B should be converted to radian measure; and likewise the latitude $L_b$ where it is to be used as a cosine argument, but not otherwise. The distance D should be converted from nautical miles to degrees by multiplying the entered value by sixty. No dead-reckoning adjustment of either the bearing or the distance should be made. The desired coordinates are to be calculated from:

$$L_p = L_b - D\cos B \quad (14)$$

$$\lambda_p = \lambda_b - D\sin B \div \cos L_b \quad (15)$$

Once the apparatus has calculated earth-surface position coordinates, such as longitude λ and latitude L, it will in most circumstances have to proceed with calculation of corresponding map-transport-mechanism position coordinates X and Y. In doing so the programmed apparatus must take into account (1) the orientation (particularly including rotation) of the film-transparency map relative to the optical system, (2) the basic scale of the map, and (3) the Mercator projection function.

Figure 26:
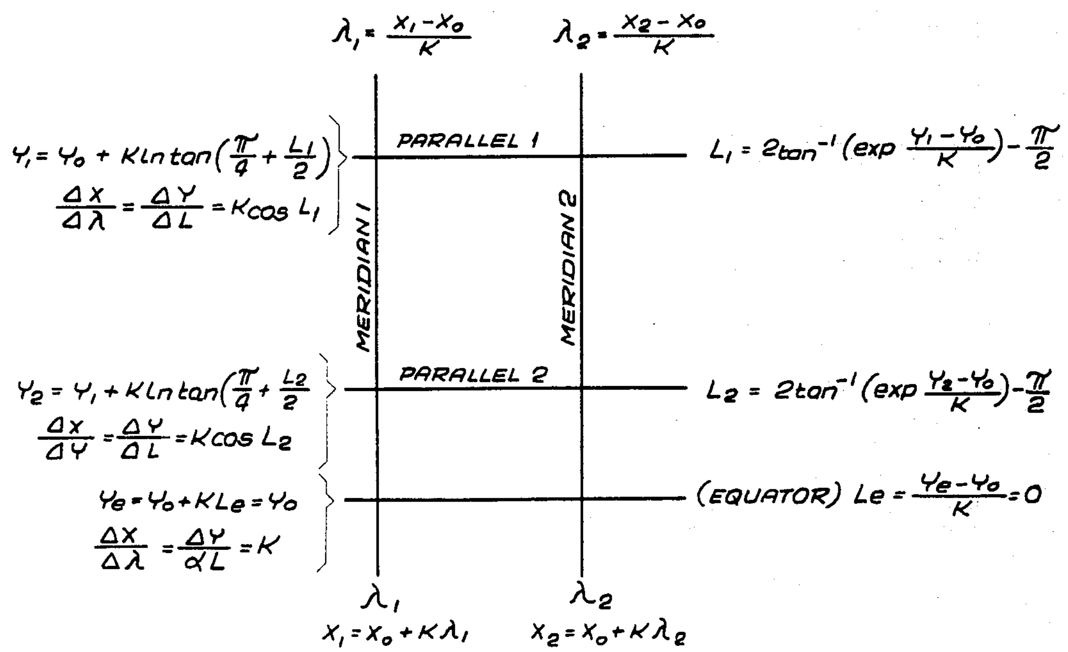

FIG. 26 illustrates the Mercator relations. Since all meridians are vertical, the horizontal position as measured at the map itself (i.e., ignoring for a moment the rotation of the film map relative to the transport mechanism) is simply $$x = x_o + k\lambda, \quad (16)$$

where k is the map scale (distance on the chart per nautical mile, in any direction) at the equator, and where $x_o$ is the offset required to account for the fact that the zero-longitude meridian is not aligned at the zero point of the transport-mechanism motion. Off the equator, the vertical position at the map (still disregarding rotation) is given by $$y = y_o + k\ln\tan\left(\frac{\pi}{4} + \frac{L}{2}\right), \quad (17)$$

where k is the same constant and $y_o$ is a similar offset value.

Now if the film map is rotated by an angle A relative to the optical system and the transport-mechanism tracks, the entire coordinate system must of course be transformed using $$X = x\cos A - y\sin A + X_o \quad (18)$$

$$Y = y\cos A + x\sin A + Y_o, \quad (19)$$

to obtain the actual transport-mechanism coordinates X and Y.

The constants in these several equations are all to be automatically calculated using the chart data entered by the operator for each map, and using the rotational-orientation information which the operator provides—when loading a chart—by slewing the mechanism down the entire left edge of the chart image and then stepping across the short distance to the lower left-hand corner (see the operating procedure presented in subsection 4*a*, above). The same equations are simply solved for the constants, making use of known information—such as, for the rotational calibration, the fact that the edge of the map represents x=constant. For example, the last two equations yield $$A = \sin^{-1}\frac{X_1 - X_2}{y_1 - y_2} \simeq \sin^{-1}\frac{X_1 - X_2}{Y_1 - Y_2} \quad (20)$$

in which $X_1$, $Y_1$ and $X_2$, $Y_2$ are the transport-mechanism positions at the top-left and bottom-left corners, respectively. The apparatus is programmed to insert the known coordinates and other information into the equations in that form, and to calculate and store the constants.

The desired transport-mechanism positions X and Y are best expressed in terms of stepper-motor steps, since the apparatus must at some point keep track of the number of such steps anyway. In calculating the desired step number that corresponds to a given longitude and latitude, in addition to the equations presented above it is of course necessary to take into account the number of steps of the map transport mechanism that correspond to a given displacement of the film-transparency map. The preferred embodiment uses bipolar four-phase stepper motors that take forty-eight steps per revolution, and uses lead screws that are pitched at forty threads per inch. The slave processor that controls the stepper motors must therefore provide 1,920 steps to move the transport mechanism one inch. Thus the mechanism steps approximately 7,300 times to cross the width of the film-mount sight, and approximately 8,650 times to traverse its length.

Figure 27:
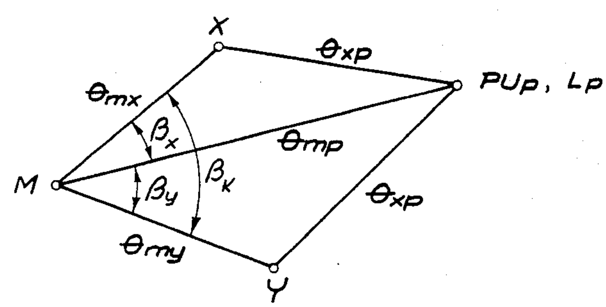

FIG. 27 (after Sheldon Razin, "Explicit [Noniterative] Loran Solution," *Navigation: Journal of the Institute of Navigation* volume 14, number 3, fall, 1967, p. 265 [adapted]) defines the terms necessary to perform the transformation from Loran time differences to latitude and longitude. (The reverse transformation, a much more straightforward calculation since the time-difference lines are hyperbolae, can be found in the literature and is not presented here.) The drawing represents a Loran complex on the surface of a sphere—that is, the known locations of a "master" Loran transmitter M and two associated "slave" transmitters X and Y, and the point PP (sometimes hereinafter "P") for which Loran time differences are known and latitude and longitude $L_p$ and $\lambda_p$ are sought. The latter position may represent a craft's present position or some way point or destination, depending upon the operation in progress. The values $\theta_{mx}$, $\theta_{yp}$, etc. respectively represent the distances between the points M and X, between the points Y and P, etc., all expressed as angles subtending arcs on the earth's surface, in radian measure.

These distances are straightforwardly calculated from the known coordinates of the three transmitter positions M, X and Y, in combination with the coordinates for the best available estimate of craft present position P. (If this initial position is taken incorrectly, the resulting error will be quickly eliminated through the iterations, one each minute, of this Loran fix procedure.) The angles $B_x$, $B_y$, and $B_k$ are respectively the angles formed by X, M and P; by Y, M and P; and by X, M and Y; these angles too are straightforwardly found from the known coordinates of the transmitters.

The calculation begins by finding the phase-delay observed at P for station X relative to station M, and the phase delay observed at P for station Y relative to station M, which are respectively:

$$\psi_x = \theta_{xp} - \theta_{mp} \quad (21)$$

$$\psi_y = \theta_{yp} - \theta_{mp} \quad (22)$$

Next, intermediate variables are found as follows:

$$a_x = \frac{\cos \phi_x - \cos \theta_{mx}}{\sin \theta_{mx}} \quad (23)$$

$$a_y = \frac{\cos \phi_y - \cos \theta_{my}}{\sin \theta_{my}} \quad (24)$$

-continued $$b_x = \sin \phi_x \div \sin \theta_{mx} \quad (25)$$

$$b_y = \sin \phi_y \div \sin \theta_{my}, \quad (26)$$

and from these the further intermediates:

$$U_1 = a_x \cos \beta_k - a_y \quad (27)$$

$$U_2 = a_x \sin \beta_k \quad (28)$$

$$U_3 = a_y b_x - a_x b_y. \quad (29)$$

These quantities can be related to the angle $\beta_x$:

$$\cos \beta_x = \frac{U_3 U_1 \pm \sqrt{U_1^2 + U_2^2 - U_3^2}}{U_1^2 + U_2^2} \quad (30)$$

—in which expression the plus-or-minus sign differentiates between the two roots. The calculations continue:

$$\theta_{mp} = \tan^{-1} \frac{a_y}{b_x + \cos \beta_x}, \quad (31)$$

$$\theta_{xp} = \theta_{mp} + \phi_x, \text{ and} \quad (32)$$

$$\theta_{yp} = \theta_{mp} + \phi_y, \quad (33)$$

yielding the rectangular coordinates f, g, and h of the craft, in a three-dimensional cartesian coordinate system based at the earth's center- $$f = C_1 \cos \theta_{xp} + C_2 \cos \theta_{mp} + C_3 \cos \theta_{yp} = \cos L_p \cos \lambda_p \quad (34)$$

$$g = C_4 \cos \theta_{xp} + C_5 \cos \theta_{mp} + C_6 \cos \theta_{yp} = \cos L_p \sin \lambda_p \quad (35)$$

$$h = C_5 \cos \theta_{xp} + C_8 \cos \theta_{mp} + C_9 \cos \theta_{yp} = \sin L_p, \quad (36)$$

which are then used to obtain the latitude and longitude, by solving in the form $$\lambda_p = \tan^{-1}(g/f)$$

$$L_p = \sin^{-1} h.$$

The constants $C_1$ through $C_9$, derived from the three space coordinates of each of the three Loran stations M, X, and Y, are tabulated in the literature and available from government sources. Alternatively, they can be calculated by the microprocessor from the position coordinates—e.g., latitude and longitude—of the stations M, X, and Y as explained in the literature.

Figure 28:
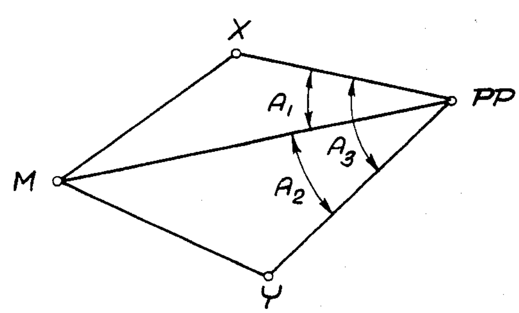

FIG. 28 defines the terms required to calculate a measure of the probable error in a Loran fix that may be anticipated for the craft's present position if a particular time difference (TD) is selected for use—that is, if a particular group (triad) of Loran transmitters is selected for use in making the fix. More specifically, the calculation aims to determine the adverse geometrical effect on accuracy that may result from selecting a particular TD.

The measure of error that is employed has been termed the "geometric dilution of precision" (GDOP). This measure isolates geometric effects, finding only the probable position error per unit probable error in TD. Thus the calculation does not purport to take into account any of the unknowable errors in phase factors or the like, which are by necessity simply assumed to be roughly the same for all the TDs available.

The GDOP is to be calculated by the apparatus automatically every five minutes, for each TD that is available. By comparing the GDOP values, the apparatus can select the TDs with minimum GDOP and therefore maximum available precision and accuracy. The equation for each GDOP is:

$$GDOP = csc\ A_1\ csc\ A_2\ csc\ A_3. \tag{39}$$

The apparatus should be programmed to select and use the two TDs associated with the two minimum GDOP values.

Following is a glossary of variables that are important to control of the apparatus. The terminology introduced here corresponds to that used in the Chapin diagrams, FIGS. 29 et seq., which specify the program structure.

"PF"—The "power fail" flag is used during initialization. A checksum test is done on memory to determine whether the battery backing up the CMOS power-down memory (RAM) has dropped in voltage. If that power-fail condition is found to have occurred, this flag is set.

"OPR MODE"—The "operating mode" flag is used during operation to determine which of two modes the machine is in, DR (dead reckoning) or Loran. (The bearing-fix mode, described conceptually earlier for purposes of discussion as a mode, is treated for programming purposes as a function rather than a mode.) OPR MODE is altered by the keyboard-interrupt subroutine whenever the user touches either the DR or LORAN key.

"OPR FUNC"—The "operating function" flag indicates a request by the user to execute one of the functions. The request is indicated by touching one of the function keys, BRG FIX, LOAD/MANL, DEST/PP, or the "f" key followed by a numeral key. OPR FUNC is reset when the requested function is performed.

"INPUTS"—The "inputs" flag indicates that the operator wants to present "inputs" (data) to the apparatus. The "inputs" flag is set when the operator touches the "f" key followed by one of the display keys, DIR/-SPEED, SET/DRIFT, LAT/LONG, GRI/TD, or TIME/CTS/D. When the input request is serviced the flag is reset.

"DSP MODE LST"—The "display mode for last key touched" flag holds the code of the last display key (see list in preceding paragraph) touched. This flag is set in the keyboard-interrupt service routine when the key is touched. The flag is never reset, but rather is overwritten by the next display-key interrupt (and accordingly might more properly be called a register than a flag). This flag is referenced when the display is being generated.

"DSP MODE NTL"—The "display mode for next-to-last key touched" flag holds the code of the next-to-last display key touched. Whenever a display-key interrupt occurs, the value in DSP MODE LST is put into DSP MODE NTL. This value too is never reset—only overwritten—and is referenced when the display is being generated.

"INPUT KEY"—The "last key input" byte holds the code of the last key touched. It is set and overwritten in the keyboard-interrupt service routine. It is referenced by the numeric input subroutines and those elements of code that rely on individual keystrokes.

The following discussion of input subroutines will be helpful.

"GET POS"—The "get position" subroutine performs the task of inputting a position from the user, either as a "marked" position (using the N, S, E, and W keys and the MARK key) or numerically (using the numeral keys to enter latitude and longitude or GRI and TD). These two methods of input must be selectable by some flags in the calling sequence, on one call to GET POS. For example, one flag may indicate that only input by "marking" position is permitted, another that only input by latitude and longitude (or GRI and TD) is permitted, or yet another flag may indicate that input by either method is permitted. This subroutine requires the presence of the local input/output devices—steppers and limit switches, keyboard, and display. The input conditions for the subroutine are the flags determining whether position entry is to be by "marking" and/or numerical entry. The output condition is that the position has been selected, in X and Y stepper increments (if entry is by "marking") and/or the position in degrees of latitude and longitude (if so entered) or equivalent. The "LASC" subroutine (see below) is used in conjunction with this one.

"INP NUM"—The "input a number" subroutine performs the task of inputting a number of fixed maximum magnitude and fixed precision (number of decimal places) from the user. The number may be unsigned (always positive), or signed by "+" or "−", or signed by "E" or "W", or signed by "N" or "S". This subroutine requires the keyboard and display. The input conditions are a flag to determine what kind of sign (if any) is to be used, and values dictating the total number of digits in the number and the number of digits to the right of the decimal point. The output condition is that the numerical input has been received from the user. The "FASC" subroutine (see below) is used in conjunction with this one.

"GET YN"—The "get a yes or no answer" subroutine has the task of inputting either a Y or an N from the operator. The subroutine requires keyboard and display. Its input condition is a flag to hold true (OFFH) for yes or false (OOH) for no, and its output condition is that the flag holds true or false.

"FASC"—The "floating point to ASCII" subroutine performs the task of converting a floating-point number to an ASCII representation with variable sign (+−, NS, EW, or none), variable length, and variable precision. The subroutine requires no noncomputer hardware. Its input conditions are (1) flags to determine the sign used, ASCII representation length, and ASCII representation precision, (2) the floating-point number to be converted, and (3) the buffer to hold the ASCII representation. The subroutine's output condition is that the ASCII representation is in its buffer unless the number was too large to fit, in which case all the digit positions in the buffer are filled with nines.

"LASC"—The "latitude or longitude to ASCII" subroutine performs the task of converting a floating-point number into either a standard latitude format (namely, "XX-XX.XXS", in which "X" is a digit and "S" is the sign N for north or S for south) or a standard latitude format (namely, "XXXXX.XXS", in which "X" is a digit and "S" is the sign E for east or W for west). The subroutine has no external-hardware requirements. Its input conditions are the number to be converted, the buffer to hold the ASCII representation, and a flag to determine whether the number is latitude or longitude. The output condition is that the buffer holds the ASCII representation.

The numbered functions "f0" through "f94" described in subsection 4a above, and certain other functions not mentioned earlier, have the function names (used in the programming diagrams) and purposes indicated below.

f0 "ENT PP"—enter the present position
f1 "ENT DEST"—enter some way points
f2 "ENT SET DRIFT"—enter the set and drift
f10 "DSP GMT"—continuously display Greenwich mean time
f11 "DSP CTE"—continuously display cross-track error
f12 "DSP BRG DIST"—continuously display bearing and distance to some point
f50 "COMPASS DAMPING"—adjust the damping factor on incoming compass data
f51 "SPEED DAMPING"—adjust the damping factor on incoming speedometer data
f52 "MAG VARY MAINT"—adjust the local magnetic variation as tabulated
f53 "CHRT TBL MAINT"—maintain the RAM chart table
f55 "AUTO LOG INTRVL"—set the interval for printing of the automatic log
f90 "MEM MAINT"—recover from total memory loss (invoke functions 91 through 94)
f91 "BRG"—set the flag for bearings true, magnetic or relative
f92 "DISP HDG"—set the flag for heading displays true, magnetic or relative
f93 "ENT DEV TBL"—enter the compass deviation table
f94 "TIME SET"—set the internal clock calendar
f96 "KNT CALIB"—calibrate the speedometer Those functions that appear in this list but are not discussed earlier are not essential to operation of the preferred embodiment, but are included here because they appear in the accompanying Chapin diagrams.

Figure 29:
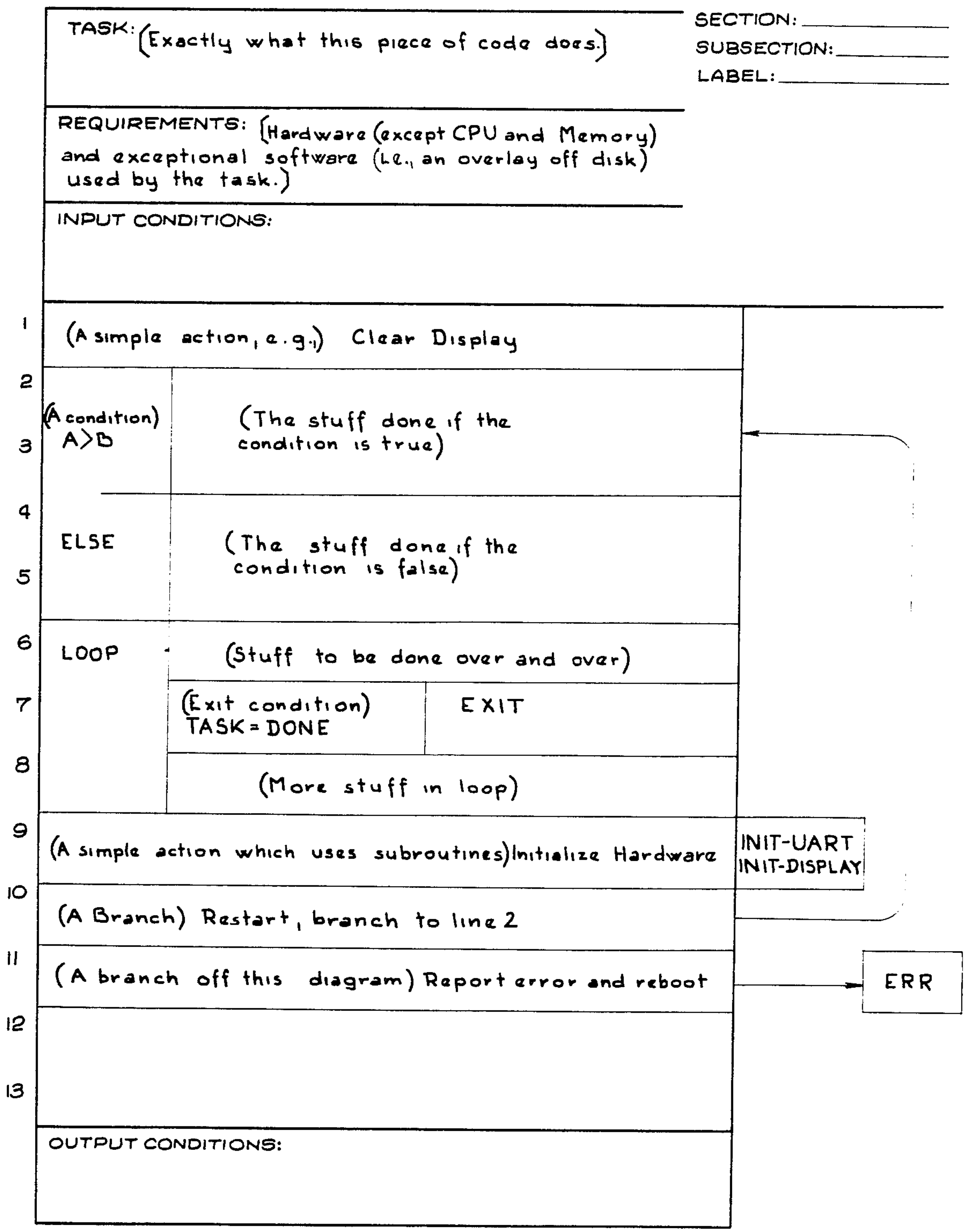
Figure 64:
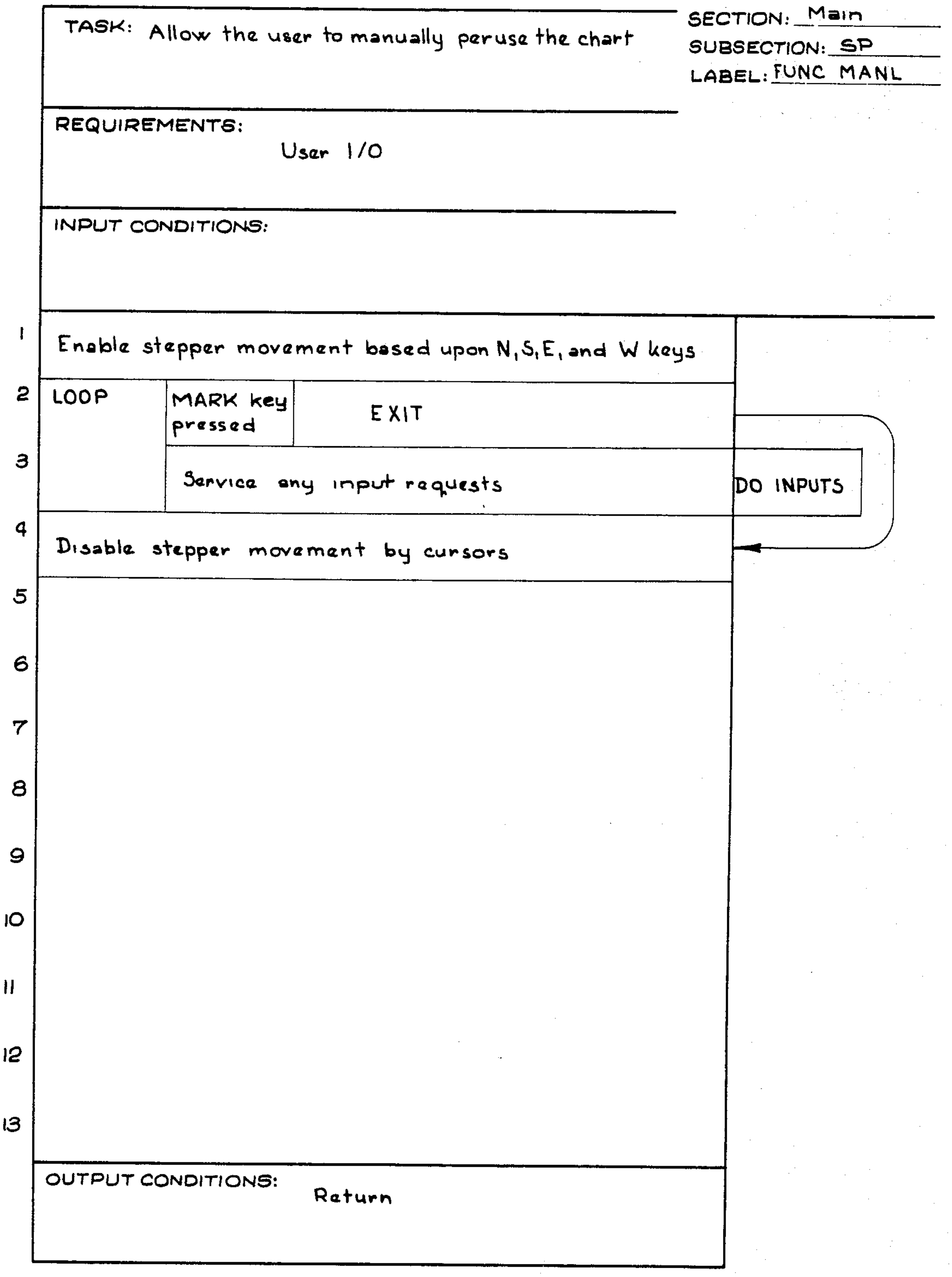

FIGS. 29 and 30 are merely format samples intended to explicate the Chapin-diagram format and notation used in FIGS. 31 et seq. Study of FIGS. 29 and 30 will be facilitated by reference to the computer-programming literature on Chapin diagrams, particularly Reducing Cobol Complexity with Structured Programming by D. McClure or Flowcharts by Ned Chapin.

Although the Chapin diagrams are self-explanatory—given the information presented above and in the format samples—it may be helpful to note that the programming as represented in these diagrams accords with one of the important principles of the present invention: all craft-position calculations should be performed in earth-surface coordinates. Only for purposes of map display (or for purposes of "marking"-style data input) should the map-transport mechanism operation or the map projection function (e.g., the Mercator function) be considered. In FIG. 71, at line 8, right-hand side, the entry is "Move chart to present position." It is only at this step, and not before, in the generation of DR-controlled or Loran-controlled map display, that the transport mechanism, map scale, and projection function are brought into play (using, if a Mercator chart is employed, the relationships given in FIG. 26 and the associated text). All prior steps use latitude and longitude or equivalent earth-surface position coordinates.

As described in detail above, the practice of the present invention requires reduction to mathematical methods of certain navigational operations that have traditionally been performed using graphical methods. Sufficient details are presented here to enable persons skilled in the computer-programming art to accomplish this task. Further insights into the navigational operations may, however, be obtained by study of BOWDITCH'S AMERICAN PRACTICAL NAVIGATOR, a book published by the Defense Mapping Agency Hydrographic Center (Pub. No. 9).

It is to be understood that all of the foregoing detailed descriptions are by way of example only, and not to be taken as limiting the scope of the present invention—which is expressed only in the appended claims.

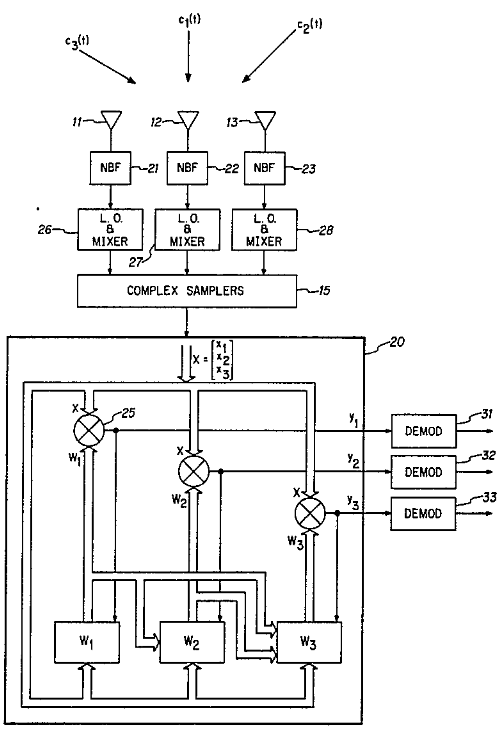

I claim:

1. A navigational apparatus for use with a craft, said apparatus comprising:

an optical projection system having an optical path terminating in a visible display field;

an optically projectable map locatable in the optical path of said projection system, said map providing a scaled representation of a geographical area and including at least two calibration indicia at respective positions on said map corresponding to predetermined known coordinates, map transport means for controllably effecting relative movement between said map and said projection system in accordance with applied transport control signals;

map calibration means for for moving said calibration indicia to a predetermined position within said projection system and for then coordinating said known coordinates with the position of the map transport means to derive calibration data used in thereafter generating transport control signals; and transport drive means for generating said transport control signals in accordance with said calibration data and in accordance with supplied craft position data to vary said map position relative to said projection means in accordance with the geographic position of said craft.

2. The apparatus of claim 1 wherein said map calibration means and said transport drive means comprise a common processor means, responsive to said supplied craft position data and to supplied desired point data for generating course signals indicative of the course required to steer said craft to said desired point.

3. The apparatus of claim 1 wherein said transport drive means includes dead reckoning means responsive to said craft position data and to input signals indicative of at least two of heading, speed, set and drift parameters related to the craft's travel for generating signals indicative of calculated updated craft present position data.

4. The apparatus of claim 3 wherein said transport drive means includes processor means responsive to said calculated updated craft present position data and to signals indicative of the actual course made good by said craft for generating said input signals indicative of set and drift parameters and for also updating said craft present position data in accordance with said actual course made good.

5. The apparatus of claim 4 wherein said transport drive means includes means responsive to signals indicative of Loran fixes for generating said input signals indicative of the actual course made good.

6. The apparatus of claim 4 wherein said transport drive means includes means responsive to input signals indicative of bearing fixes for generating said input signals indicative of the actual course made good.

7. The apparatus of claim 1 wherein said transport drive means is responsive to input signals indicative of bearing fixes for generating input signals indicative of the actual position of said craft as said supplied craft position data.

8. The apparatus of claim 1 wherein said map includes a plurality of said calibration indicia and wherein said apparatus further comprises means for storing reference data including the coordinates of said calibration indicia.

9. The apparatus of claim 8 wherein said reference data includes the coordinates of a plurality of calibration indicia on said map and magnetic variation data in respect of at least a portion of said geographical area.

10. The apparatus of claim 9 wherein said map includes said calibration indicia at two corners of said map.

11. The apparatus of claim 1 wherein said optically projectable map comprises a film transparency and wherein said map transport means includes a film mount adapted to receive said map and a carriage mechanism for removably receiving said film mount and for controllably effecting relative movement between said film mount and said optical projection system, said film mount comprising:

first and second outer frames, each including a cut out portion, a transparent glass sheet disposed in each frame covering said cutout portion and chart locating projections disposed to align said film transparency with respect to said cut out portion; and means for securing said frames together with said film transparency sandwiched therebetween in alignment and therewith viewable through said cut out portion.

* * * * *

United States Patent [19]

Hackett, Jr.

[11] Patent Number: 4,513,383

[45] Date of Patent: Apr. 23, 1985

[54] SEPARATION OF COMMUNICATION SIGNALS IN AN ADAPTIVE ANTENNA ARRAY

[75] Inventor: Charles M. Hackett, Jr., Irvine, Calif.

[73] Assignee: Rockwell International Corporation, El Segundo, Calif.

[21] Appl. No.: 305,296

[22] Filed: Sep. 24, 1981

[51] Int. Cl.[3] .......................... G06F 15/20; G01S 3/46

[52] U.S. Cl. .................................. 364/517; 343/5 DP; 343/5 NQ; 364/570; 364/582

[58] Field of Search ............... 364/516, 517, 570, 573, 364/581, 582; 343/5 DP, 5 NQ, 370, 372

[56] References Cited

U.S. PATENT DOCUMENTS

| | | | |
|---|---|---|---|
| 4,099,075 | 7/1978 | Goldberg et al. | 364/517 X |
| 4,117,538 | 9/1978 | Shrader et al. | 364/581 X |
| 4,180,814 | 12/1979 | Barton | 343/5 DP |
| 4,234,939 | 11/1980 | Grall | 364/517 X |

OTHER PUBLICATIONS

Bershad et al.: Sonar Array Detection of Gaussian Signals in Gaussian Noise of Unknown Power. IEEE Transactions on Aerospace and Electronic Systems vol. AES-10 No. 1 Jan. 1974, pp. 94-99.

Applebaum: Adaptive Arrays, IEEE Transactions on Antennas and Propagation vol. AP-24 No. 5 Sep. 76 pp. 585/598.

White: Cascade Preprocessors for Adaptive Antennas, IEEE Transactions on Antennas and Propagation, vol. AP-24, No. 5, Sep. 1976, pp. 670-684.

White: Adaptive Cascade Networks for Deep Nulling, IEEE Transactions on Antennas and Propagation, vol. AP-26, No. 3, May 1978, pp. 396-402.

Hackett, Jr.: Adaptive Arrays can be used to Separate Communication Signals, IEEE Transactions on Aerospace and Electronic Systems, vol. AES-17, No. 2, Mar. 1981, pp. 234-247.

Corrections to above AES-17 No. 4 Jul. 1981 p. 606

*Primary Examiner*—Felix D. Gruber

*Attorney, Agent, or Firm*—V. Lawrence Sewell; Howard R. Greenberg; H. Fredrick Hamann

[57] ABSTRACT

Method and apparatus are disclosed for separating radio frequency signals incident upon an array of antenna elements which has available from each of the elements an input signal capable of being processed by the method and apparatus. The processing includes combining the input signals according to a first set of complex weights, thereby providing a first output signal. The first set of weights is derived from the input signals and from the first output signal and converges to the eigenvector corresponding to the largest eigenvalue of the cross-correlation matrix of the complex envelopes of the input signals. The input signals are also combined according to a second set of complex weights to provide a second output signal. The second set of weights is derived from the input signals, from the second output signal and from the first set of weights. The second set of weights converges to the eigenvector corresponding to the second largest eigenvalue of said cross-correlation matrix. As a result of this processing, the first and second output signals respectively, correspond, in general, to the first and second most powerful signals incident on the array. Additional sets of weights can be developed to separate any additional signals.

11 Claims, 3 Drawing Figures